(12) United States Patent
Burch, V et al.

(10) Patent No.: US 10,878,365 B2
(45) Date of Patent: Dec. 29, 2020

(54) AERIAL DRONE-BASED SYSTEMS AND METHODS FOR ADAPTIVELY PROVIDING AN AERIAL RELOCATABLE COMMUNICATION HUB WITHIN A DELIVERY VEHICLE

(71) Applicant: Federal Express Corporation, Memphis, TN (US)

(72) Inventors: Reuben F. Burch, V, Mississippi State, MS (US); David A. Doyle, Hernando, MS (US); Brian D. Popp, Southaven, MS (US)

(73) Assignee: FEDERAL EXPRESS CORPORATION, Memphis, TN (US)

( * ) Notice: Subject to any disclaimer, the term of this patent is extended or adjusted under 35 U.S.C. 154(b) by 147 days.

(21) Appl. No.: 15/711,005

(22) Filed: Sep. 21, 2017

(65) Prior Publication Data
US 2018/0086456 A1 Mar. 29, 2018

Related U.S. Application Data

(60) Provisional application No. 62/400,906, filed on Sep. 28, 2016.

(51) Int. Cl.
*G06Q 10/08* (2012.01)
*G06Q 50/30* (2012.01)
(Continued)

(52) U.S. Cl.
CPC ....... *G06Q 10/0833* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS

| 8,982,207 B2 | 3/2015 | Jang |
| 8,989,053 B1 * | 3/2015 | Skaaksrud ............ H04W 12/06 370/255 |

(Continued)

FOREIGN PATENT DOCUMENTS

| JP | 2015131713 A | 7/2015 |
| WO | 2017019728 A1 | 2/2017 |

OTHER PUBLICATIONS

FMCSA, "Driver's Handbook on Cargo Securement", Nov. 2003.
(Continued)

*Primary Examiner* — David P. Merlino
(74) *Attorney, Agent, or Firm* — Withers & Keys, LLC

(57) ABSTRACT

Drone-based systems and methods are described for providing an airborne relocatable communication hub within a delivery vehicle for broadcast-enabled devices maintained within the delivery vehicle. Such a method has an aerial communication drone paired with the delivery vehicle transitioning to an active power state, uncoupling from a secured position on an internal docking station fixed within the delivery vehicle and then moving to a first deployed airborne position within the delivery vehicle. At a first position, the method has the aerial communication drone establishing a first wireless data communication path to a first broadcast-enabled device within the delivery vehicle, then establishing a second wireless data communication path to a second broadcast-enabled device within the delivery vehicle. The drone then couples the first and second wireless data communication paths it established operating as the airborne relocatable communication hub for the devices.

33 Claims, 46 Drawing Sheets

(51) Int. Cl.
| | | |
|---|---|---|
| H04W 4/48 | (2018.01) | |
| G01S 19/49 | (2010.01) | |
| B64C 39/02 | (2006.01) | |
| G01S 5/00 | (2006.01) | |
| G05D 1/00 | (2006.01) | |
| B64F 1/22 | (2006.01) | |
| B64D 47/08 | (2006.01) | |
| G06Q 50/28 | (2012.01) | |

(52) U.S. Cl.
CPC ............ *B64F 1/222* (2013.01); *G01S 5/0018* (2013.01); *G01S 19/49* (2013.01); *G05D 1/0094* (2013.01); *G06Q 10/08* (2013.01); *G06Q 10/083* (2013.01); *G06Q 10/0832* (2013.01); *G06Q 50/28* (2013.01); *G06Q 50/30* (2013.01); *H04W 4/48* (2018.02); *B64C 2201/123* (2013.01); *B64C 2201/127* (2013.01); *B64C 2201/128* (2013.01); *B64C 2201/141* (2013.01)

(56) References Cited

U.S. PATENT DOCUMENTS

| | | | |
|---|---|---|---|
| 9,056,676 B1* | 6/2015 | Wang | B64F 1/00 |
| 9,096,189 B2 | 8/2015 | Golden | |
| 9,373,014 B1* | 6/2016 | Mehranfar | G05D 1/104 |
| 9,487,356 B1 | 11/2016 | Aggarwal | |
| 9,609,288 B1 | 3/2017 | Richman et al. | |
| 9,718,564 B1* | 8/2017 | Beckman | G06Q 10/0832 |
| 9,928,749 B2* | 3/2018 | Gil | H04W 4/70 |
| 10,102,586 B1 | 10/2018 | Marlow et al. | |
| 10,301,018 B2* | 5/2019 | Mucci | B64C 39/024 |
| 10,384,777 B1* | 8/2019 | Welsh | B64C 39/022 |
| 10,453,348 B2* | 10/2019 | Speasl | G06Q 10/08 |
| 10,482,418 B2 | 11/2019 | Burch, V et al. | |
| 10,657,485 B2 | 5/2020 | Burch et al. | |
| 10,664,791 B2 | 5/2020 | Burch et al. | |
| 10,679,172 B2 | 6/2020 | Burch et al. | |
| 2008/0165047 A1* | 7/2008 | Fisher | G01S 5/22 342/45 |
| 2010/0250022 A1 | 9/2010 | Hines et al. | |
| 2013/0033381 A1 | 2/2013 | Breed | |
| 2013/0157611 A1 | 6/2013 | Small | |
| 2013/0233964 A1* | 9/2013 | Woodworth | G05D 1/104 244/2 |
| 2014/0032034 A1 | 1/2014 | Raptopoulos et al. | |
| 2014/0277854 A1* | 9/2014 | Jones | G05D 1/102 701/3 |
| 2014/0323038 A1* | 10/2014 | Hubbell | H04B 7/18506 455/11.1 |
| 2014/0354809 A1 | 12/2014 | Shondel | |
| 2015/0120094 A1 | 4/2015 | Kimchi et al. | |
| 2015/0158513 A1 | 6/2015 | Costa et al. | |
| 2015/0302669 A1 | 10/2015 | Gonnsen et al. | |
| 2015/0349917 A1* | 12/2015 | Skaaksrud | G06Q 10/0833 370/328 |
| 2016/0039436 A1 | 2/2016 | Bhagwatkar et al. | |
| 2016/0129999 A1 | 5/2016 | Mays | |
| 2016/0159496 A1* | 6/2016 | O'Toole | B64D 1/12 244/110 E |
| 2016/0185466 A1* | 6/2016 | Dreano, Jr. | G06Q 30/0635 705/26.81 |
| 2016/0200438 A1* | 7/2016 | Bokeno | B64C 39/024 |
| 2016/0207627 A1 | 7/2016 | Hoareau et al. | |
| 2016/0244187 A1* | 8/2016 | Byers | B64C 39/024 |
| 2016/0253907 A1 | 9/2016 | Taveira | |
| 2016/0253908 A1 | 9/2016 | Chambers et al. | |
| 2016/0266579 A1 | 9/2016 | Chen et al. | |
| 2016/0272317 A1* | 9/2016 | Cho | G08G 1/162 |
| 2016/0275801 A1 | 9/2016 | Kopardekar | |
| 2016/0309341 A1* | 10/2016 | Priest | B64C 39/022 |
| 2016/0339277 A1 | 11/2016 | Angelopoulos | |
| 2016/0364989 A1 | 12/2016 | Speasl et al. | |
| 2017/0041949 A1 | 2/2017 | Ngo et al. | |
| 2017/0045894 A1 | 2/2017 | Canoy et al. | |
| 2017/0092109 A1* | 3/2017 | Trundle | B64D 47/04 |
| 2017/0129603 A1 | 5/2017 | Raptopoulos et al. | |
| 2017/0139409 A1 | 5/2017 | Clarke | |
| 2017/0181117 A1* | 6/2017 | Dowlatkhah | H04W 64/003 |
| 2017/0199520 A1 | 7/2017 | Glatfelter | |
| 2017/0253330 A1 | 9/2017 | Saigh et al. | |
| 2017/0257779 A1 | 9/2017 | Zerick et al. | |
| 2017/0337510 A1 | 11/2017 | Shroff et al. | |
| 2017/0349283 A1 | 12/2017 | Paunicka et al. | |
| 2018/0033315 A1* | 2/2018 | Winkle | B64C 39/024 |
| 2018/0047295 A1 | 2/2018 | Ricci | |
| 2018/0050798 A1* | 2/2018 | Kapuria | B64C 39/024 |
| 2018/0089622 A1 | 3/2018 | Burch, V et al. | |
| 2018/0170540 A1 | 6/2018 | Claybrough | |
| 2018/0245365 A1* | 8/2018 | Wankewycz | B64C 39/024 |
| 2018/0346120 A1* | 12/2018 | Hoareau | B64C 39/024 |
| 2019/0039731 A1 | 2/2019 | Marcath et al. | |
| 2019/0120929 A1 | 4/2019 | Meadow | |
| 2019/0122455 A1* | 4/2019 | Howard | G07C 5/085 |
| 2019/0176862 A1 | 6/2019 | Kumar et al. | |
| 2019/0220819 A1 | 7/2019 | Banvait et al. | |
| 2020/0017210 A1* | 1/2020 | Neubecker | E05F 15/70 |
| 2020/0017218 A1 | 1/2020 | Ahmad et al. | |

OTHER PUBLICATIONS

Dhital et al., "A Fully Non-Contact Ultrasonic Propagation Imaging System for Closed Surface Crack Evaluation", Experimental Mechanics, Nov. 1, 2011, pp. 1111-1122.

FAA, "Air Cargo Operations", Advisory Circular, Jun. 25, 2015, U.S. Department of Transportation, AC No. 120-85A.

Japanese Patent Application No. 2019-512708 Office Action dated Sep. 15, 2020.

* cited by examiner

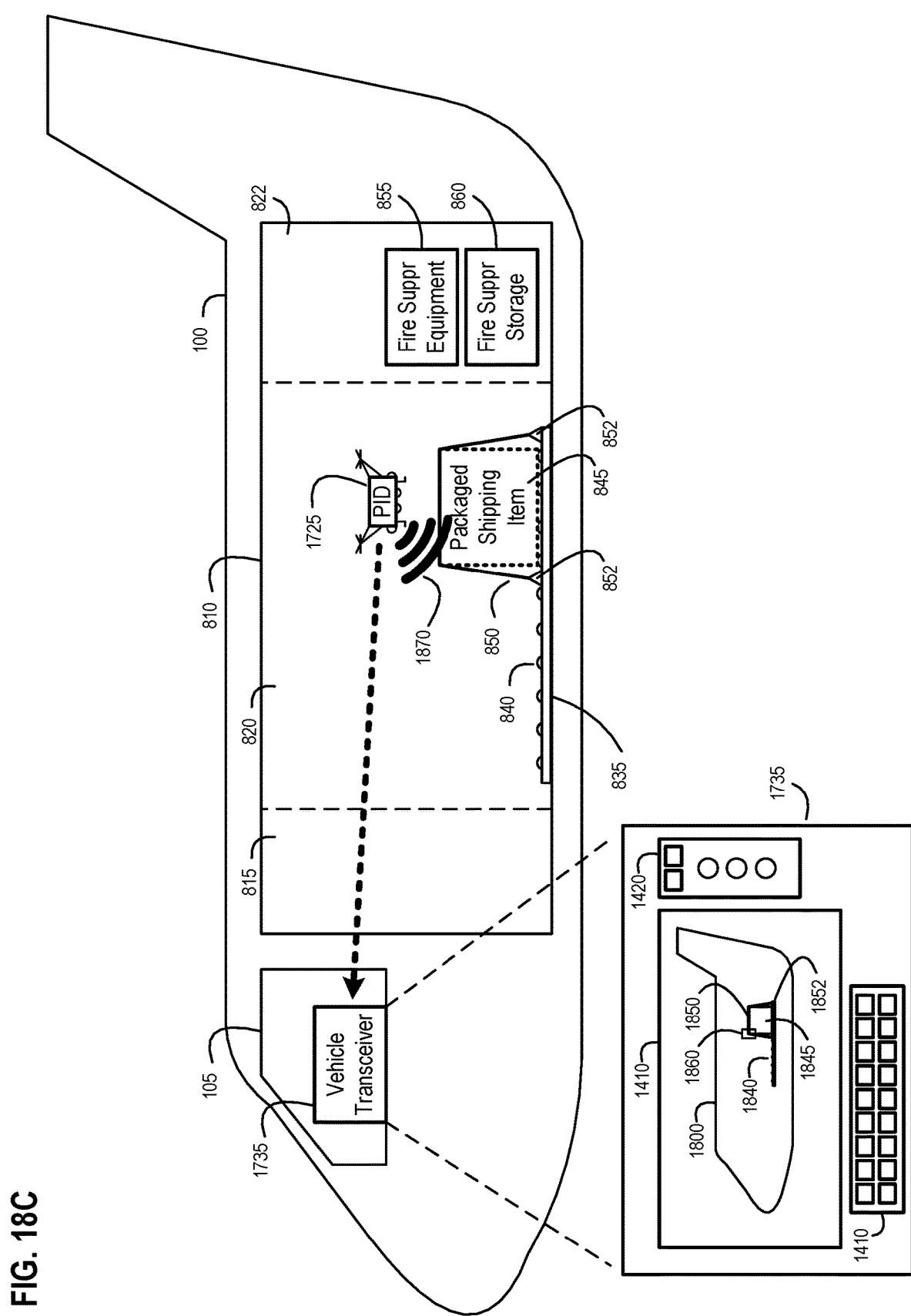

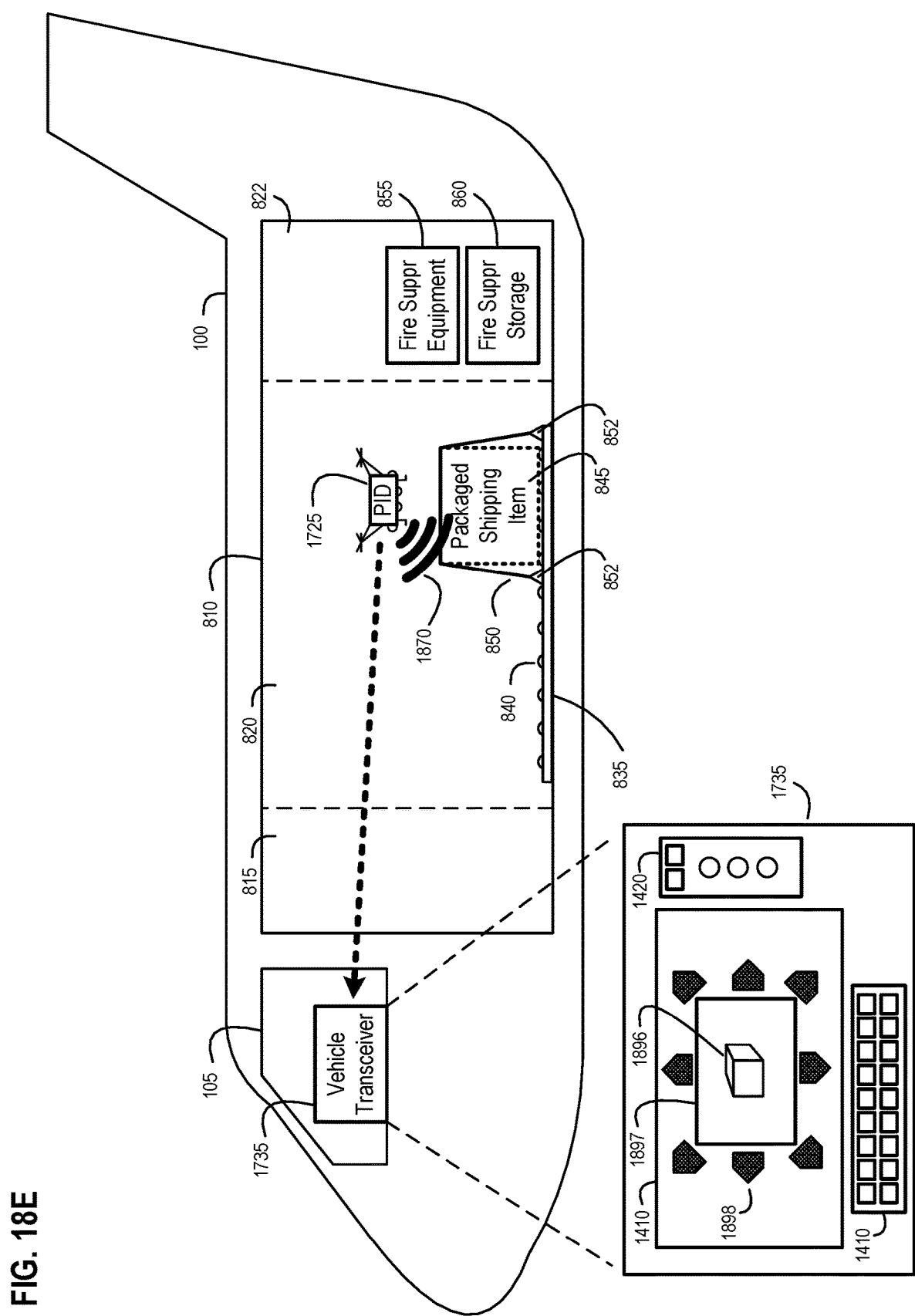

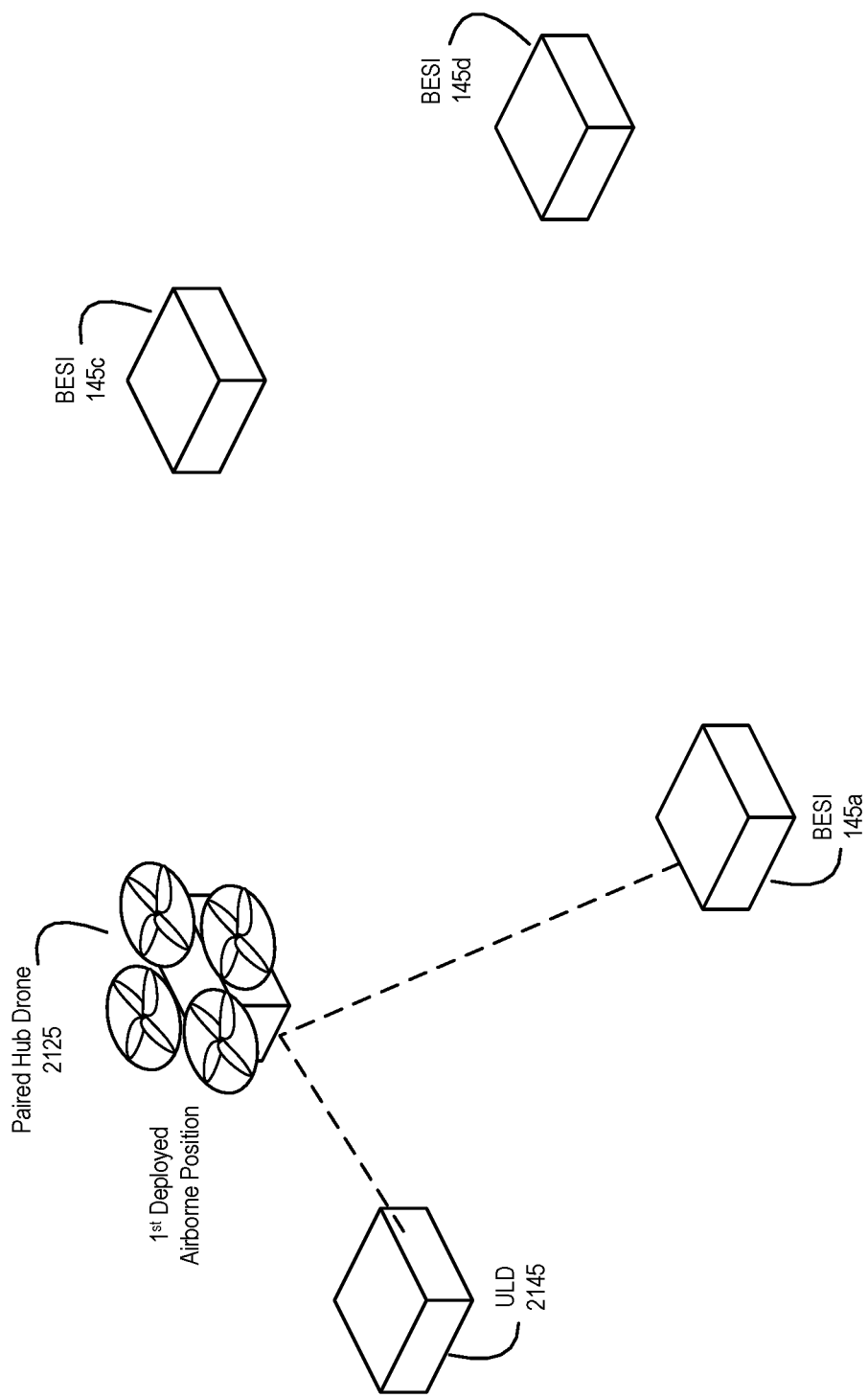

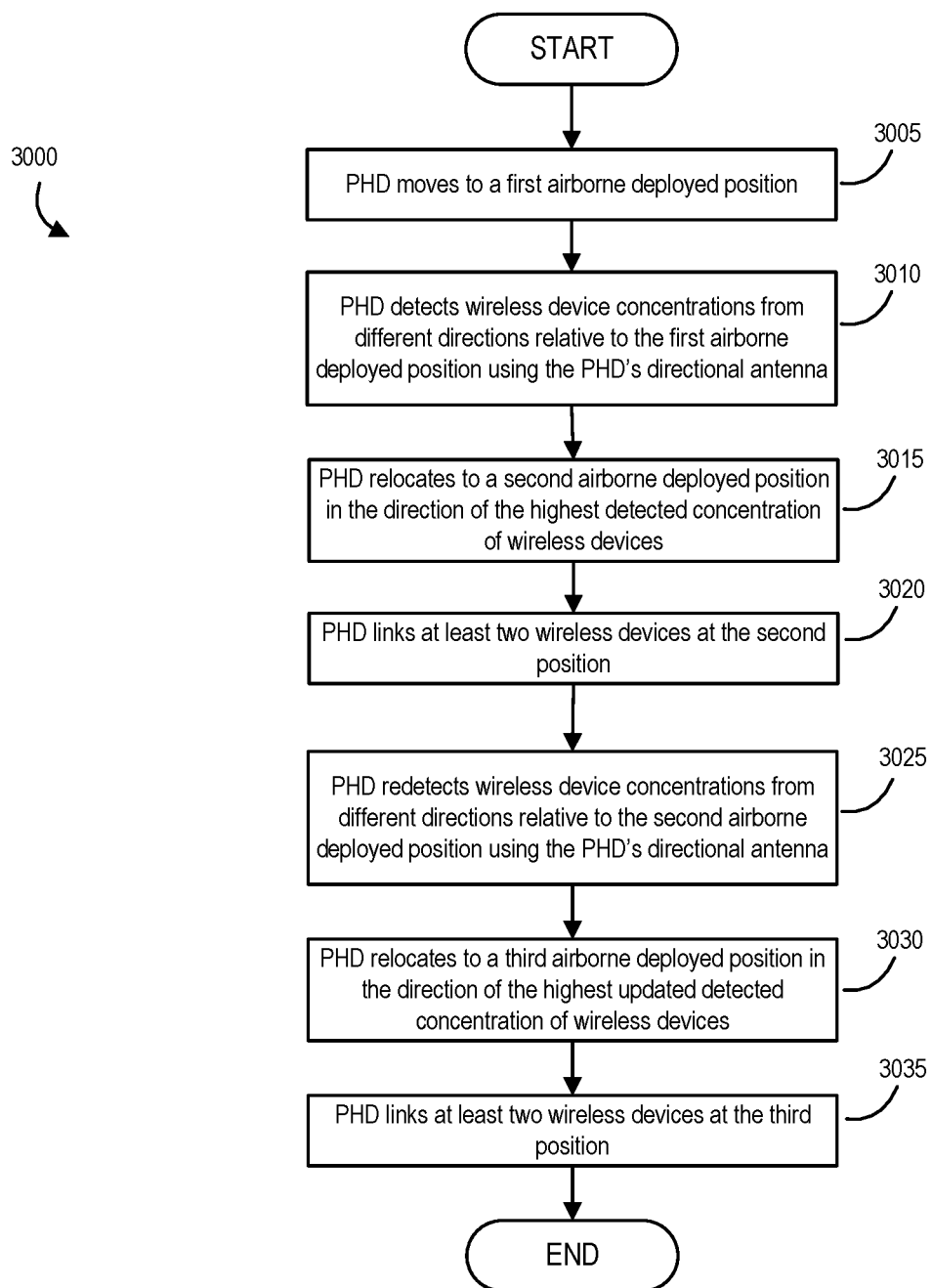

AERIAL DRONE-BASED SYSTEMS AND METHODS FOR ADAPTIVELY PROVIDING AN AERIAL RELOCATABLE COMMUNICATION HUB WITHIN A DELIVERY VEHICLE

PRIORITY AND RELATED APPLICATIONS

The present application hereby claims the benefit of priority to related U.S. Provisional Patent Application No. 62/400,906 and entitled "Drone-based Monitoring of Shipped Items in a Deliver Vehicle, Drone-based Inspections of the Delivery Vehicle, and Providing Adaptive Extension of Communications With One or More Items Shipped Within the Delivery Vehicle Using a Drone-based Aerial Communication Hub."

The present application is also related in subject matter to the following U.S. non-provisional patent applications where each also claims the benefit of priority to the same above-referenced provisional patent application: (1) Non-Provisional patent application Ser. No. 15/710,957 entitled "Systems and Methods for Monitoring the Internal Storage Contents of a Shipment Storage Using One or More Internal Monitor Drones"; (2) Non-Provisional patent application Ser. No. 15/710,980 entitled "Systems and Methods for Inspecting a Delivery Vehicle Using a Paired Inspection Drone"; (3) Non-Provisional patent application Ser. No. 15/711,136 entitled "Enhanced Systems, Apparatus, and Methods for Positioning of an Airborne Relocatable Communication Hub Supporting a Plurality of Wireless Devices"; (4) Non-Provisional patent application Ser. No. 15/711,167 entitled "Paired Drone-based Systems and Methods for Conducting a Modified Inspection of a Delivery Vehicle"; (5) Non-Provisional patent application Ser. No. 15/711,244 entitled "Paired Drone-based Systems and Methods for Conducting a Verified Inspection of a Delivery Vehicle."

FIELD OF THE DISCLOSURE

The present disclosure generally relates to systems, apparatus, and methods in the field of airborne drones integrally applied to different logistics operations and, more particularly, to various aspects of systems, apparatus, and methods related to logistics operations using an aerial inspection or communication drone to enhance monitoring of shipped items in a delivery vehicle, perform various types of inspections of the delivery vehicle, and providing a drone-based airborne relocatable communication hub within a delivery vehicle as the drone is exclusively paired with the delivery vehicle.

BACKGROUND

Delivery vehicles are often used as part of a logistics operation that ships one or more items from one location to another. Examples of such a delivery vehicle may include an aircraft, an automotive vehicle (such as a delivery van or a tractor trailer), a rail car, or a marine vessel. Logistics operations that ship items from one location to another depend upon a sufficient operational status of the delivery vehicle in order to safely and securely move such items as well as for the delivery vehicle to safely and securely maintain the items in a desired configuration while being transported within a storage area of the delivery vehicle. Such a storage area (more generally referred to as a shipment storage) may, for example, come in the form of a storage compartment of an aircraft, a storage area on a delivery van, a trailer that is moved by a truck, a train car capable of being moved by a locomotive on a railway system, or a cargo hold of a marine vessel.

One problem commonly faced when maintaining items within such a storage area or shipment storage is how to monitor such items. In some instances, the items may be equipped with radio frequency identification (RFID) tags and interrogated by multiple RFID readers disposed within different parts of the shipment storage. While an RFID reader and its reader antenna has a characteristic read range for communicating with RFID tags, the read range may pose a limitation given the size of the shipment storage as well as for items that are not equipped with such RFID tags. There remains a need to monitor the internal storage contents of a shipment storage in a more robust and inclusive manner as well as in an adaptive way that avoids the need for large numbers of fixed monitors.

Beyond the challenges with monitoring items maintained within a shipment storage, further problems may be encountered with delivery vehicle based logistics operations that involve inspecting key parts of the delivery vehicle. For example, manual inspection of parts of a delivery vehicle can be undesirably expensive and time consuming for logistics personnel, such as flight crew personnel responsible for operating an aircraft type of delivery vehicle or maintenance personnel responsible for servicing such an aircraft. In some situations, the point to be inspected may not be easily reached or viewed by such personnel and may unfortunately require deployment of support structures, such as a ladder or gantry in order to gain access to such an inspection point. Doing so undesirably slows down the delivery vehicle based logistics operation.

Further still, problems may be encountered with limited communications with and/or between one or more items being shipped within the delivery vehicle. For example, in some instances, the communication range of a respective item is not far enough to allow communication with another item or other network device (such as a wireless transceiver onboard the delivery vehicle or disposed relative to a logistics facility). This may, in some instances, result in the loss of communication with an item in total or periodically while the item is being transported or maintained within the delivery vehicle.

To address one or more of these issues, there is a need for a technical solution that may be deployed as part of delivery logistics operations to enhance monitoring of shipped items in a delivery vehicle, inspections of the delivery vehicle, and providing adaptively extended and enhanced communications with one or more items shipped within a delivery vehicle.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

In general, aspects of the disclosure relate to drone-based improvements to the technology of logistics operations that involve using an aerial communication drone to provide an airborne relocatable communication hub within a delivery vehicle for multiple broadcast-enabled devices maintained within the delivery vehicle. Methods, apparatus, and systems are described herein that help unconventionally and adaptively facilitate communication between such broadcast-enabled devices and so they may handle longer distances between devices as they are disposed within the delivery vehicle and to accommodate the changing internal environment of the delivery vehicle. Generally, such an aerial communication drone is exclusively paired with the delivery vehicle and operates in an airborne mode within the delivery vehicle (such as within an internal shipment storage area of the delivery vehicle). This type of exclusively paired drone is advantageously used within the delivery vehicle as a repositionable communication hub to improve the onboard communication environment for what is being transported within the delivery vehicle and for what may be a changing communication environment. Accordingly, the disclosure provides a technical solution with systems and methods that improve how different broadcast-enabled devices within a delivery vehicle can establish and maintain adequate communications with each other using a paired aerial communication hub drone strategically deployed within the delivery vehicle In particular, one aspect of the disclosure describes an aerial drone-based method for providing an airborne relocatable communication hub within a delivery vehicle for broadcast-enabled devices maintained within the delivery vehicle. The method first has an aerial communication drone paired with the delivery vehicle transitioning from at least a low power state to an active power state, and then automatically uncoupling the aerial communication drone from a secured position on an internal docking station fixed within the delivery vehicle once the aerial communication drone transitions to the active power state. The method continues with the aerial communication drone moving from the secured position on the internal docking station to a deployed airborne position within an interior of the delivery vehicle. At the deployed airborne position, the method has the aerial communication drone establishing a first wireless data communication path to a first of the broadcast-enabled devices within the delivery vehicle, and then establishing a second wireless data communication path to a second of the broadcast-enabled devices within the delivery vehicle. The method then proceeds with coupling the first wireless data communication path and the second wireless data communication path by the aerial communication drone operating as the airborne relocatable communication hub for at least the first of the broadcast-enabled devices and the second of the broadcast-enabled devices.

In another aspect of the disclosure, an airborne drone-based system is disclosed that adaptively provides communication hub services within a delivery vehicle for broadcast-enabled devices maintained within the delivery vehicle. In general, the system includes at least an internal docking station and an aerial communication drone paired to the delivery vehicle. More specifically, the internal docking station is fixed within the delivery vehicle, and has at least a physical docking interface, an electronic charging connection interface, and an electronic data connection interface. The aerial communication drone has at least a main housing, an onboard controller disposed within the main housing, lifting engines, a drone capture interface, a communication hub interface, and an onboard battery. Each of the lifting engines is coupled with a lifting rotor, each is fixed to a different portion of the main housing, and each lifting engine is responsive to flight control input generated by the onboard controller as part of maintaining a desired flight profile. The drone capture interface is disposed on the main housing and is also responsive to the onboard controller to be operative to selectively mate to the physical docking interface of the internal docking station in response to a docking command from the onboard controller. The drone capture interface, when activated using the docking command, holds the aerial communication drone in a secure position when selectively mated to the physical docking interface of the internal docking station. The communication hub interface is also coupled to the onboard controller, where it is operative to establish different wireless data communication paths to at least two of the broadcast-enabled devices within the delivery vehicle. The onboard battery provides electrical power to each of the onboard controller, lifting engines, drone capture interface, and communication hub interface, and connects to the electronic charging connection interface when the aerial communication drone is in the secure position on the internal docking station. During system operation, the onboard controller of the aerial communication drone is operative to transition from at least a low power state to an active power state, cause the drone capture interface to automatically uncouple the aerial communication drone from the secure position on the internal docking station fixed within the delivery vehicle once the aerial communication drone transitions to the active power state, and change the desired flight profile to cause the lifting engines to move the aerial communication drone from the secure position on the internal docking station to a first deployed airborne position within an interior of the delivery vehicle. At this deployed airborne position, the onboard controller is further operative to cause the communication hub interface to establish a first wireless data communication path to a first of the broadcast-enabled devices within the delivery vehicle, cause the communication hub interface to establish a second wireless data communication path to a second of the broadcast-enabled devices within the delivery vehicle, and cause the communication hub interface on the aerial communication drone to couple the first wireless data communication path and the second wireless data communication path for at least the first of the broadcast-enabled devices and the second of the broadcast-enabled devices.

In yet another aspect of the disclosure, another airborne drone-based system is described for maintaining a plurality of broadcast-enabled devices and adaptively providing communication hub services to the broadcast-enabled devices. This system generally includes a delivery vehicle for maintaining the broadcast-enabled devices while transporting the broadcast-enabled devices and an aerial communication drone paired to the delivery vehicle. More particularly, the delivery vehicle has at least an interior storage area that maintains the broadcast-enabled devices, and a drone storage area disposed within the delivery vehicle. The aerial communication drone has at least a main housing, an onboard controller disposed within the main housing, lifting engines coupled with respective lifting rotors, and a communication hub interface. Each of the lifting engines is fixed to a different portion of the main housing and responsive to flight control input generated by the onboard controller as part of maintaining a desired flight profile. The communication hub interface is coupled to the onboard controller, and is operative to establish wireless data communication paths to at least two of the broadcast-enabled devices within the delivery vehicle. During system operation, the onboard controller of the aerial communication drone is operative to change the desired flight profile to cause the lifting engines to move the aerial communication drone from a secured position within the drone storage area of the delivery vehicle to a first deployed airborne position within the interior storage area of the delivery vehicle, cause the communication hub interface to establish a first wireless data communication path to a first of the broadcast-enabled devices within the delivery vehicle, cause the communication hub interface to establish a second wireless data communication path to a second of the broadcast-enabled devices within the delivery vehicle, and cause the communication hub interface on the aerial communication drone to couple the first wireless data communication path and the second wireless data communication path for at least the first of the broadcast-enabled devices and the second of the broadcast-enabled devices.

Additional advantages of these and other aspects of the disclosed embodiments and examples will be set forth in part in the description which follows, and in part will be evident from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

FIGS. 18A-18F are diagrams of the exemplary drone-based system of FIG. 17 using an exemplary paired inspection drone to communicate with a delivery vehicle transceiver related to an interactive intervention request and interaction with the transceiver's user interface related to conducting the modified inspection with additional sensor-based inspection information and relevant verification result input in accordance with an embodiment of the invention;

FIG. 26A is a diagram of an exemplary paired aerial communication drone at a first deployed airborne position within a delivery vehicle and multiple broadcast-enabled devices maintained within the delivery vehicle in accordance with an embodiment of the invention;

FIG. 30 is a flow diagram illustrating yet another improved method for enhanced positioning of an airborne relocatable communication hub supporting a plurality of wireless devices and based on directional sensing of the wireless devices in accordance with an embodiment of the invention.

DESCRIPTION OF THE EMBODIMENTS

Figure 1A:
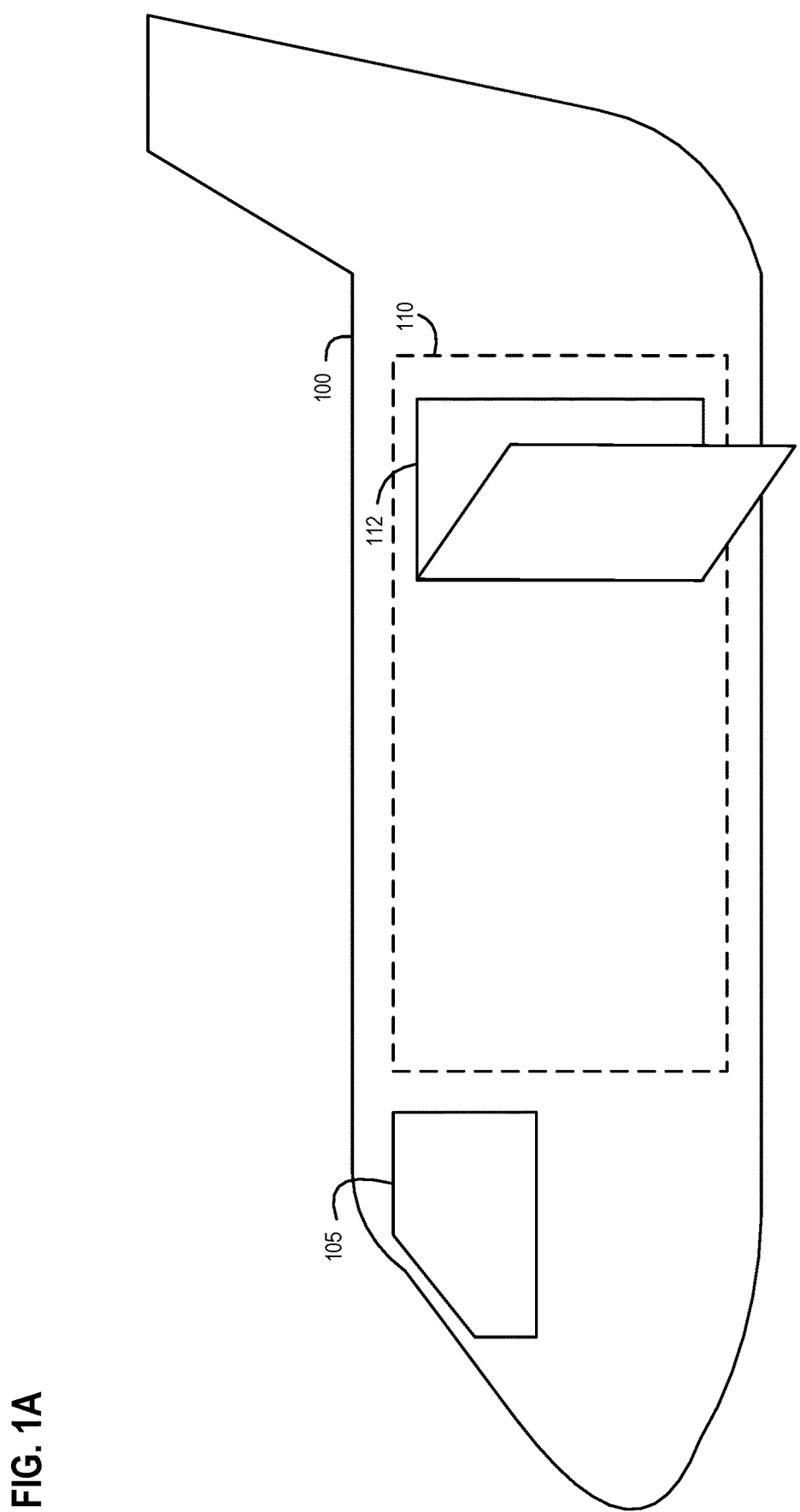
FIG. 1A is a diagram of an exemplary aircraft having a shipment storage with a closable entry for access to within the shipment storage in accordance with an embodiment of the invention.

Reference will now be made in detail to various exemplary embodiments. Wherever possible, the same reference numbers are used in the drawings and the description to refer to the same or like parts. However, those skilled in the art will appreciate that different embodiments may implement a particular part in different ways according to the needs of the intended deployment and operating environment for the respective embodiments.

In general, the following describes various embodiments of different systems, apparatus, and applied methods that deploy an aerial monitor, inspection and/or communication drone as an extension of a delivery vehicle. These embodiments provide advantageous and unconventional technical solutions focused on improving how to monitor the delivery vehicle's contents, inspect parts of the delivery vehicle, and/or how to allow for robust communications between devices within the delivery vehicle. Many of these embodiments rely on such an aerial drone that may be internally docked onboard the delivery vehicle and exclusively assigned as a paired device to the delivery vehicle. As such, the paired drone travels with and operates solely with respect to the delivery vehicle and the contents maintained therein.

The below described drone-based embodiments may individually relate to improvements on monitoring the delivery vehicle's contents, inspecting parts of the delivery vehicle, or how to allow for robust communications between devices within the delivery vehicle. Furthermore, those skilled in the art will appreciate that additional embodiments may combine some of these otherwise independent drone-based solutions to provide for an even more robust paired logistics drone that is exclusively assigned to a delivery vehicle and can provide two or more of such monitoring, inspecting, and communication hub service functionality as described in more detail below.

Drone-Based Monitored Shipment Storage

In more detail, FIGS. 1A-7 relate to embodiments of drone-based monitored storage systems where one or more internal monitor drones may be deployed from one or more respective internal docking stations of a shipment storage to monitor and detect the condition of items being shipped within the shipment storage. Referring now to FIG. 1A, an exemplary delivery vehicle having a shipment storage is shown as a logistics aircraft 100 that transports items between different locations. Those skilled in the art will appreciate that the exemplary aircraft 100 is shown in a simplified form having an operational control section 105 (e.g., a cockpit from which flight personnel can control and fly the aircraft 100) and a shipment storage 110 used for maintaining items being shipped within aircraft 100 between different locations. The shipment storage 110 may, for example, encompass one or more internal compartments of the aircraft, such as a central shipment storage area or different internal compartmentalized shipment storage areas where each storage area is configured to maintain items being shipped within the aircraft 100. Aside from a storage compartment within an aircraft, such as aircraft 100, other embodiments of a shipment storage may comprise a trailer capable of being moved by a truck, a train car capable of being moved on a railway system.

In the exemplary aircraft 100 shown in FIG. 1A, an exemplary closable entry 112 is illustrated that provides access to within the onboard shipment storage 110. Such a closable entry may take the form of door 112, which may be opened for loading and unloading operations and then secured for in-flight operations. Such a closable entry may, for example, also take the form of a rear ramp that may be opened and securely closed to provide access to the aircraft's shipment storage from the rear of the aircraft. In another example, such a closeable entry may be implemented with a belly door of the aircraft so as to provide access from beneath the aircraft. Further still, those skilled in the art will appreciate that different types of entry or access structure (e.g., doors, hatches, ramps, etc.) may be deployed on different kinds of delivery vehicles (e.g., tractor trailer, marine vessel, railroad car, etc.) in other embodiments that provide access to a shipment storage area within the delivery vehicle.

Figure 1B:
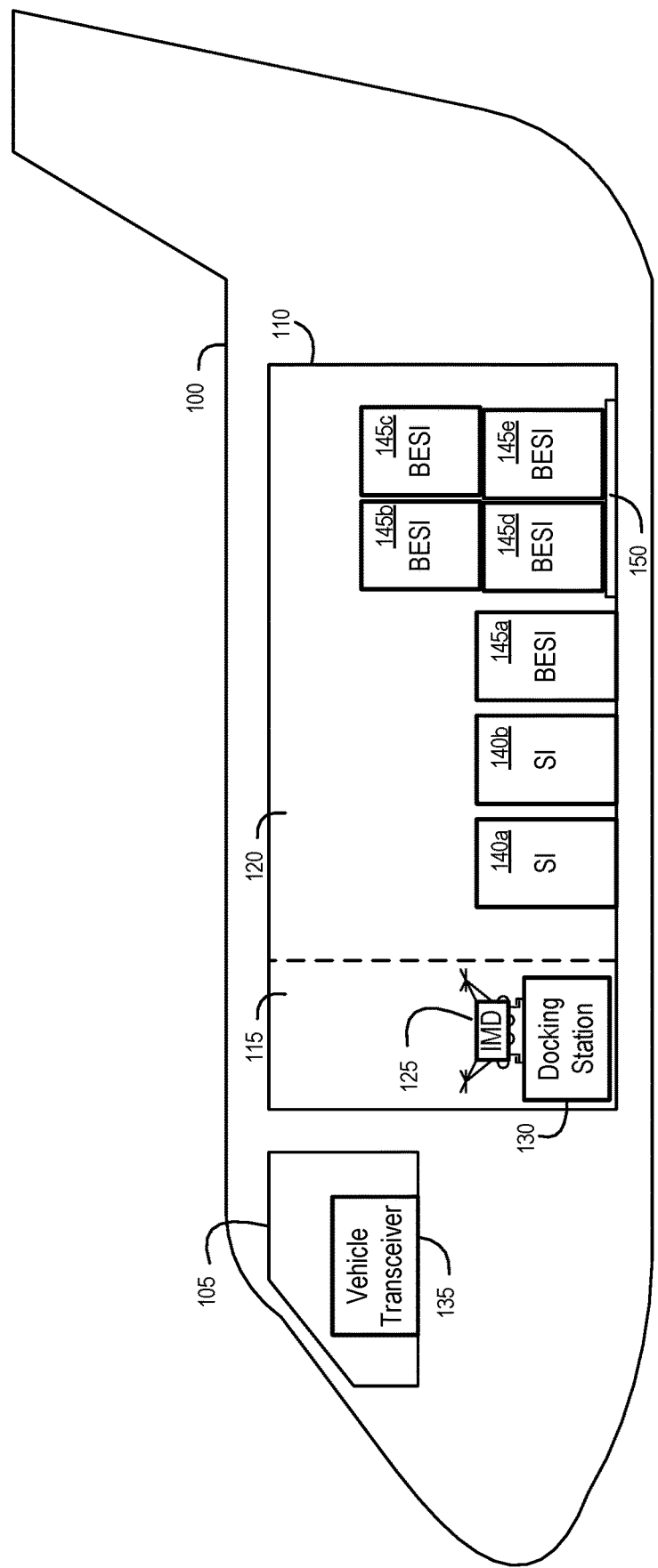
FIG. 1B is a diagram of an exemplary drone-based monitored storage system, including an exemplary shipment storage having an internal docking station and internal monitor drone in a secured position on the docking station in accordance with an embodiment of the invention.

As shown in FIG. 1B, the operational control section 105 of exemplary aircraft 100 may also include a vehicle transceiver 135. In general, such a vehicle transceiver 135 may be implemented as a standalone unit (e.g., a ruggedized radio-based tablet or smartphone used by aircraft crew personnel) or an integrated part of the aircraft's avionics suite. Vehicle transceiver 135 may be used in embodiments to communicate with devices located inside and outside of aircraft 100.

For example, vehicle transceiver 135 may communicate with a local logistics operation server (not shown), a remote cloud-based logistics management system (not shown), loading/unloading logistics personnel via radio-based transceivers (not shown), or vehicle maintenance personnel via similar types of radio-based transceivers (not shown)). Those skilled in the art will understand that such radio-based transceivers deployed with such personnel may be implemented as wireless handheld devices (such as smartphones, ruggedized tablets, UHF/VHF handheld radios, and the like) that communicate with vehicle transceiver 135 over a compatible communication path (e.g., a designated radio frequency, a cellular network, a data communication network, and the like). Additionally, vehicle transceiver 135 may be used in embodiments to communicate with an internal docking station 130 (e.g., via a wired or wireless connection) and/or an internal monitor drone 125 (e.g., via a wireless connection) disposed within aircraft 100 as described in more detail below. Further still, vehicle transceiver 135 may in some embodiments, provide an intermediary role between two other devices, such as between the internal monitor drone 125 and a radio-based transceiver operated by maintenance personnel assigned to the aircraft 100 or between the internal monitor drone 125 and a cloud-based logistics management system (i.e., a network of remote servers hosted on the Internet that can store, manage, and process shipment management information (such as loading plan data, messaging data related to the status of shipping items on aircraft 100, and the like) rather than a locally hosted logistics server).

As shown in FIG. 1B, exemplary shipment storage 110 within aircraft 100 includes an interior shipment storage area 120 and a drone storage area 115. While closable entry 112 from FIG. 1A is not shown in FIG. 1B, those skilled in the art will appreciate that interior shipment storage area 120 is both accessible through the closable entry 112 (directly or, in some embodiments indirectly) and used to temporarily maintain custody of one or more items being shipped within the interior shipment storage area 120 (as the internal storage contents of shipment storage 120), such as shipping items 140a-140b or broadcast-enabled types of shipping items 145a-145e. Exemplary shipping items 140a-140b, 145a-145e may include packaged or unpackaged items being transported alone or as part of a group of items (e.g., the group of items 145b-145e strapped and fixed relative to a shipping pallet 150 or a group of items maintained within a single packaged shipping item, such as a crate, box, or other logistics container). Likewise, those skilled in the art will appreciate that a shipping item may be implemented with a unit load device (ULD) used with aircraft-based logistics operations. Additionally, one or more shipping items may be placed within a single ULD or other logistics container prior to loading into shipment storage area 120. Thus, a shipping item maintained within interior shipment storage area 120 may be implemented as a single item, a packaged item, a group of items being shipped together in a package, or a group of separately packaged items being shipped together as a unit (e.g., a multi-piece shipment on a pallet 150).

While some shipping items maintained within interior shipment storage area 120 do not emit broadcast signals (such as items 140a-140b), exemplary broadcast-enabled shipping items 145a-145e may be deployed in some embodiments within interior shipment storage area 120 to broadcast signals related to the condition of the respective item or items being shipped. For example, broadcast-enabled shipping items 145a-145e may accomplish such broadcast functionality with a sensor-based tag (such as an RFID tag) that requires interrogation, prompting, or polling in order to initiate the broadcast of such signals. However, in other embodiments, broadcast-enabled shipping items 145a-145e may accomplish such broadcast functionality with a more independent node type of active sensor-based device that has a radio-based wireless transmitter or transceiver and that can broadcast the condition of item (e.g., an environmental condition of the item using one or more sensors on the device) without being polled or interrogated to do so. In particular, such sensor-based devices deployed as part of the broadcast-enabled shipping items 145a-145e may, for example, transmit or receive Bluetooth®, Zigbee, cellular, or other wireless formatted signals. Such devices or tags may be attached or otherwise secured to the shipping item, included in a package with the shipping item, or embedded as part of the package or packaging material used with the shipping item.

The drone storage area 115 within the shipment storage 110 is also accessible through the closable entry 112 and is separate from the interior shipment storage area 120. In particular, drone storage area 115 is located in a designated area within the shipment storage 110 that houses an internal docking station 130 for an internal monitor drone 125 paired with the aircraft 100. The separation of area 115 from area 120 allows for the internal monitor drone 125 to have open access to the internal docking station 130, where the internal monitor drone 125 may land, be secured within the shipment storage 110, receive charging power for flight operations within the shipment storage 110, and receive other data from the docking station 130 as described in more detail herein.

FIG. 1B shows internal monitor drone 125 in a secured position on the internal docking station 130. Such a secured position may be accomplished, as described in more detail below, by selectively mating parts of the internal monitor drone 125 to parts of the internal docking station 130. In some embodiments, certain parts of the internal monitor drone 125 may be actuated to couple or uncouple the drone 125 relative to parts of the docking station 130. In other embodiments, certain parts of the internal docking station 130 may be actuated to couple or uncouple the docking station 130 relative to parts of the internal monitor drone 125. Further still, other embodiments may selectively mate the drone 125 and the docking station 130 with actuated parts on both of the drone 125 and the docking station 130. Thus, various embodiments may have parts of the internal monitor drone 125 selectively mated to a physical docking interface of the internal docking station 130 in order to achieve a secure position of the internal monitor drone 125. For example, selectively energized magnetic attachments may be utilized to secure drone 125 and docking station 130 in other embodiments.

Figure 1C:
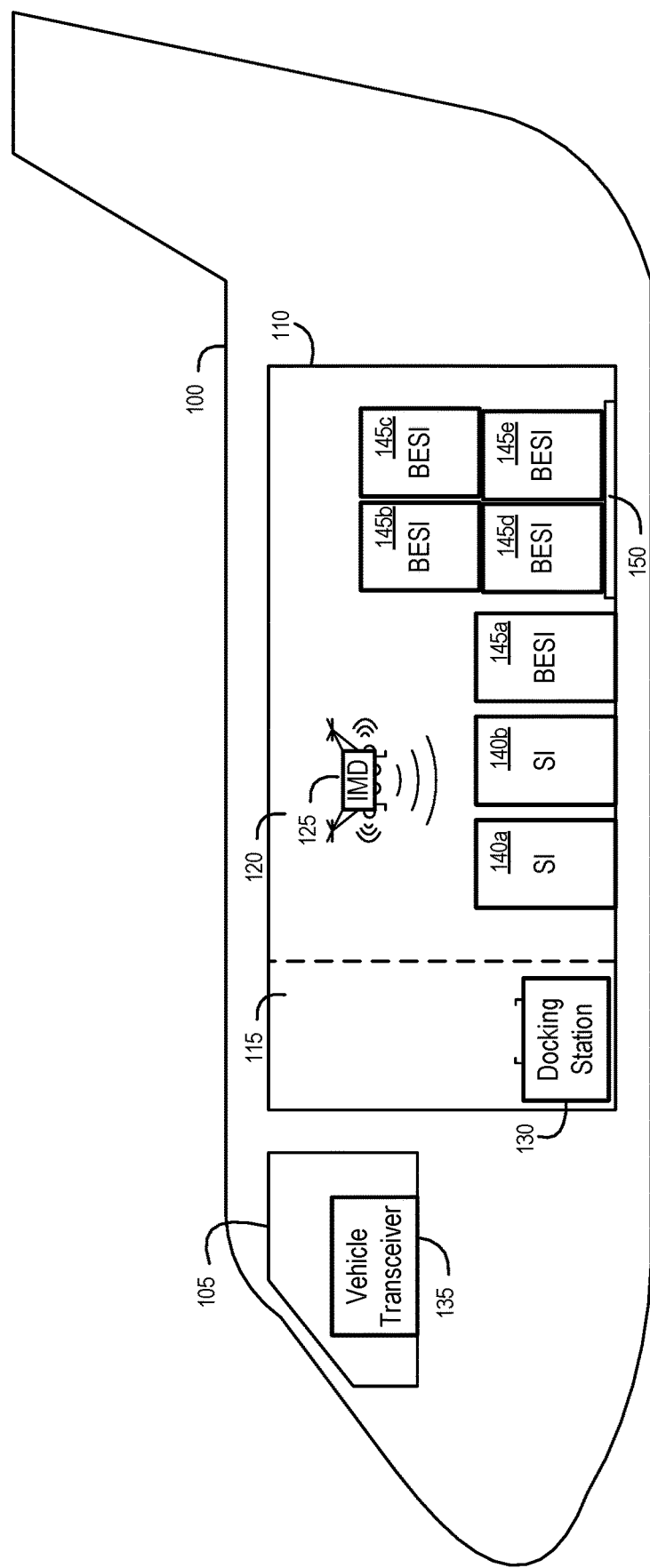
FIG. 1C is another diagram of the exemplary drone-based monitored storage system shown in FIG. 1A where the internal monitor drone has transitioned off the secured position on the docking station to an exemplary airborne position within the shipment storage, in accordance with an embodiment of the invention.

In this secured position, the internal monitor drone 125 may be powered off or in a low power state where drone 125 may be charging and/or communicating with either or both of internal docking station 130 and vehicle transceiver 135 (e.g., downloading data off of drone 125 while secured to docking station 130, uploading data related to flight control instructions for the internal monitor drone 125, etc.). When the internal monitor drone 125 is activated (e.g., by receiving an activation command via a wired signal from the internal docking station 130 or via reception of a wireless signal), the internal monitor drone 125 transitions to an active monitoring state as part of a logistics operation related to the shipment storage (e.g., during a loading or unloading operation of the internal shipment storage area 120, or during an in-transit monitoring operation of the internal shipment storage area 120 of the shipment storage 110 while the shipment storage 110 is moving). The internal monitor drone 125 then is automatically uncoupled from the internal docking station 130, and moves from the secured position to an initial airborne position so that the drone 125 may then move along an airborne monitoring path within the interior shipment storage area 120 as shown in FIG. 1C. While moving along the airborne monitoring path within area 120, the internal monitor drone uses guidance components, such as proximity sensors, to help guide the drone 125 along the path while deploying an onboard sensor array to gather sensory information (such as environmental information) as a way of autonomously detecting a condition of one or more items being shipped within the storage area 120.

Figure 2:
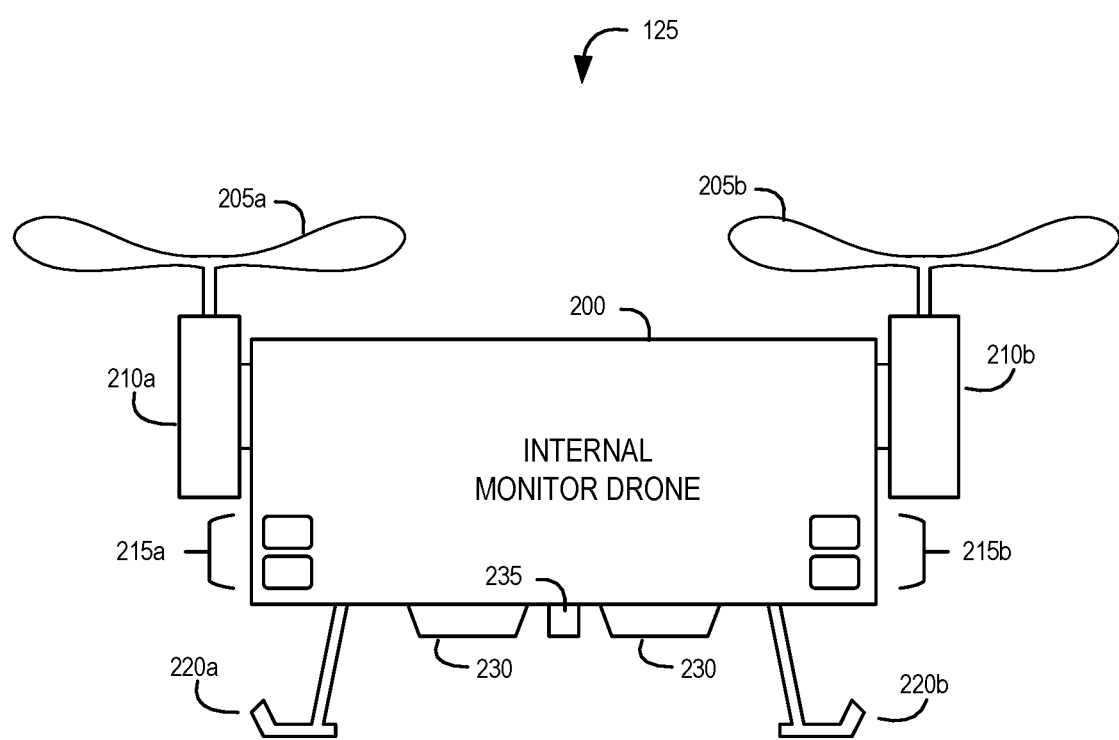
FIG. 2 is a detailed diagram providing further details of an exemplary internal monitor drone in accordance with an embodiment of the invention.

FIG. 2 is a diagram of exemplary internal monitor drone 125 in accordance with an embodiment of the invention. Referring now to FIG. 2, an exterior of exemplary internal monitor drone 125 is shown having an airframe 200; rotors 205a, 205b; lifting engines 210a, 210b; proximity sensors 215a, 215b; landing gear 220a, 220b; a sensor array 230; and an electronic docking connection 235. In more detail, the airframe 200 provides a core structure or housing for drone 125, which may be implemented as an unmanned aerial vehicle (UAV) having two or more sources of propulsion (e.g., lifting engines). The airframe 200 may be equipped with a central portion (or main deck) at its core that houses many of the drone's internal components and with multiple arms of the airframe extending between the central portion and each lifting engine 210a, 210b. The airframe 200 may be implemented with an enclosure/housing or may be implemented without such an enclosure/housing. Those skilled in the art will appreciate that airframe 200 may be implemented using low weight carbon fiber or other light weight rigid materials. Further, while FIG. 2 presents airframe 200 in a two-dimensional view, those skilled in the art will appreciate that airframe 200 may be implemented in a tri-copter, quad-copter, or hex-copter configuration to accommodate a desired number of lifting engines as needed for a particular embodiment. Examples of such an airframe 200 may include Model 680UC Pro Hexa-Copter Umbrella Carbon airframe from Quanum that has an articulating/retractable landing gear wheelbase, a Turnigy H.A.L. (Heavy Aerial Lift) Quadcopter Frame 585 mm airframe, a Turnigy Talon Carbon Fiber Quadcopter airframe, or a more simplified Quanum Chaotic 3D Quad airframe.

Rotors 205a, 205b are respectively coupled to each of lifting engines 210a, 210b, which are fixed to different portions of airframe 200 to provide selectively controlled sources of propulsion for internal monitor drone 125. An embodiment of lifting engines 210a, 210b may be implemented using multiple brushless electric motors (e.g., NTM Prop Drive Series 35-30 electric motors, LDPOWER brushless multirotor motors, and the like). In some embodiments, rotors 205a, 205b are also protected with rotor guards (also known as prop guards but not shown in FIG. 2) to avoid damage to rotors 205a, 205b during operation of drone 125. Some prop guards may encircle the entire rotational area for a respective rotor, while other types of prop guards may only provide a radius of protection along the outward facing edges of where a respective rotor operates. The lifting engines 210a, 210b, as coupled with respective rotors 205a, 205b, are responsive to flight control input generated onboard internal monitor drone 125 as part of maintaining a desired flight profile for the drone 125.

In the embodiment illustrated in FIG. 2, the exemplary airframe 200 has proximity sensors 215a, 215b disposed at multiple locations around the airframe 200 that serve as location indicators. Proximity sensors 215a, 215b may be configured on airframe 200 to focus outwardly in different directions relative to the airframe 200—e.g., up, down, and along different sides of airframe 200. The output of such proximity sensors 215a, 215b may be provided to a flight controller within internal monitor drone 125 as a positional warning for any desired or current flight path. Different embodiments of proximity sensors 215a, 215b may use one or more different technologies—e.g., magnetic proximity sensors, visual proximity sensors, photoelectric proximity sensors, ultrasonic proximity sensors, laser range finding proximity sensors, capacitive proximity sensors, and/or inductive proximity sensors.

Landing gear 220a, 220b is disposed along the bottom of the internal monitor drone 125. Landing gear 220a, 220b may be in the form of legs, skids, articulating wheels, and the like used to support the drone 125 when landing on internal docking station 130 and as at least part of holding drone 125 secure relative to the docking station 130. In one embodiment, landing gear 220a, 220b may be articulated by a docking control interface on internal monitor drone 125 that may move, rotate, and/or retract the landing gear 220a, 220b with servos or other actuators onboard the internal monitor drone 125. In this way, the drone 125 may cause the landing gear 220a, 220b to move or rotate in order to hold the drone 125 in a secure position relative to moving or non-moving parts of the internal docking station 130; and/or retract upon transitioning from the secure position to an airborne position. Those skilled in the art will appreciate that extending the landing gear 220a, 220b helps to support the drone 125 and protect the sensor array 230 and electronic docking connection 235 positioned beneath the drone 125, while retracting the landing gear 220a, 220b helps to clear obstructions from the sensory view of the sensor array 230.

A further embodiment, may have selectively energized magnets that may be extended to operate as landing gear 220a, 220b such that the extended magnetic structure may act as a physical protective structure as well as to provide structure that can be articulated and then energized so to make a secure magnetic connection with a surface (such as a surface on internal docking station 130).

Sensor array 230 is generally two or more sensor elements that are mounted on one or more points of the airframe 200 (such as along the bottom of the airframe 200). In such a configuration, sensor array 230 gathers sensory information relative to shipping items (such as items 140a-145e) as the internal monitor drone 125 moves from an initial airborne position along an airborne monitoring path within the interior shipment storage area 120 of the shipment storage 110. Such an airborne monitoring path may be preprogrammed into the internal monitor drone 125 to account for the size, boundaries, and any fixed obstacles relative to the internal shipment storage area 120 and a loading plan for the internal shipment storage area 120 that spatially accounts for what should be loaded within area 120.

In various embodiments, sensor array 230 may be implemented with one or more different types of sensors or receivers. In one example, sensor array 230 may use one or more environmental sensors where each sensor detects environmental information when positioned at and relative to the environmental surroundings existing at multiple airborne locations (e.g., within effective sensor range of particular shipping items) within the shipment storage 110. Such environmental information is detected as the internal monitor drone 125 transits the airborne monitoring path within the interior shipment storage area 120. Based upon the detected environmental information obtained by the group of environmental sensors in sensor array 230, the internal monitor drone 125 can autonomously detect an environmental condition of items being shipped within shipment storage 110. In more detail, the environmental condition detected may be a movement condition as sensed by a motion sensor operating as the environmental sensor, a light condition as sensed by a light sensor operating as the environmental sensor, a sound condition as sensed by a microphone operating as the environmental sensor, a temperature condition as sensed by a temperature sensor operating as the environmental sensor, a smoke condition as sensed by a smoke sensor operating as the environmental sensor, a humidity condition as sensed by a moisture sensor operating as the environmental sensor, and a pressure condition as sensed by a pressure sensor operating as the environmental sensor. Thus, an embodiment of sensor array 230 may deploy multiple different types of environmental sensors (as noted above) so are to provide a robust and multi-faceted environmental monitoring capability to the internal monitor drone 125.

In some embodiments, sensor array 230 may also include an image sensor as another type of sensing element. Such an image sensor, as part of sensor array 230, may capture images of the items being shipped as the internal monitor drone 125 transits the airborne monitoring path within the internal shipment storage area 120. In other words, the images captured by such an image sensor are from different airborne locations within the shipment storage 110 as the internal monitor drone 125 transits the airborne monitoring path within the interior shipment storage area 120. For example, as internal monitor drone 125 enters an active monitoring state and moves from a secured position on internal docking station 130 to above shipping item 140b, an image sensor from sensor array 230 may capture images (e.g., still pictures or video; visual images; and/or thermal images) that may be used as sensory information for detecting a condition of the shipping item 140b (e.g., a broken package for shipping item 140b, a leak coming from shipping item 140b, etc.). Exemplary image sensor may be implemented with a type of camera that captures images, thermal images, video images, or other types of filtered or enhanced images that reflect the contents of the internal shipment storage area 120 and provide information about the status of the shipping items within that area 120. Exemplary image sensor may also read and provide imagery or other information that identifies an asset number on an item maintained within the internal shipment storage area 120 (which may eliminate the need for barcode scanning).

In further embodiments, sensor array 230 may also include a depth sensor as a further type of sensing element that may make up the array. This depth sensor may be a depth-sensing camera or stereo camera that can interactively capture or map a configuration of the interior shipment storage area 120 of the shipment storage 110 as the internal monitor drone 125 transits the airborne monitoring path within the interior shipment storage area 120. This configuration of the interior shipment storage area represents a multi-dimensional mapping of at least the items being shipped within the interior shipment storage area 120 of the shipment storage 110 (i.e., shipping items 140a-145e as shown in FIGS. 1B and 1C). As will be discussed in more detail below, comparisons of such mapped configurations of the interior shipment storage area 120 over time allow for detection of a movement condition for one or more items in the area 120 as monitored from the aerial positions by the internal monitor drone 125. This may be especially helpful during transit as aircraft 100 is airborne and emerges from rough weather conditions where turbulence may have been experienced, and robust monitoring with aerially coordinated depth sensing can check for loose shipping items and help avoid dangerous in-flight cargo scenarios. Additional embodiments may use an ultrasonic transducer as a type of depth sensor that uses sound ways to map surfaces or to help validate data received by a depth sensor camera.

In still other embodiments, sensor array 230 may include a scanning sensor, such as a barcode reader, that scans an identification symbol fixed to one of the items being shipped as the internal monitor drone 125 transits the airborne monitoring path within the interior shipment storage area 120 of the shipment storage 110. If an embodiment implements such a scanning sensor with a barcode reader, the identification symbol may be a barcode symbol identifying shipping information related to the item being shipped. In another embodiment, such an identification symbol may be a sign affixed to the shipping item where the sign identifies shipment loading information related to placement of the item when being shipped within the shipment storage 110. As will be described in more detail below, scanning of a shipping item (such as items 140a-145e) by a scanning sensor within the sensor array 230 of internal monitor drone 125 may be used as part of determining a loading status of that shipping item relative to a loading plan for the shipment storage 110.

In another embodiment, sensory array 230 may also include a radio-based receiver that functions to monitor for signals broadcast from different shipping items. For example, sensory array 230 may have a Bluetooth or Zigbee radio transceiver that can scan and listen for wireless signals being broadcast from one of the broadcast-enabled shipping items 145a-145e being loaded, unloaded, or existing within the internal shipment storage area 120. Such wireless signals may include condition information (e.g., environmental sensory information) so that the internal monitor drone 125 may autonomously detect a condition of one of the broadcast-enabled shipping items via such wireless signals.

Further still, it is contemplated that an embodiment of sensor array 230 may include multiple different types of sensor elements—e.g., one or more different types of environmental sensors, one or more image sensors, one or more depth sensors, and one or more scanning sensors. In this way, different embodiments of the exemplary internal monitor drone 125 may deploy a rich and robust variety of different types of sensing elements to make up the sensor array 230.

Different embodiments of sensor array 230 may be connected to the airframe 200 of internal monitor drone 125 in various different ways. For example, in one embodiment, the sensor array 230 may be fixed relative to the airframe 200 of internal monitor drone 125. This may be limited to a lower or bottom surface of the airframe 200, but other embodiments may deploy some sensing elements of the sensor array 230 on other parts of the airframe so as to allow the internal monitor drone 125 to continue capturing relevant sensory information even if the drone 125 descends between two shipping items. In still other embodiments, the sensor array 230 may be fixed relative to the airframe 200 but still have selective movement capabilities controlled by the internal monitor drone 125—e.g., moving lenses that allow for selective focusing abilities for an image sensor, articulating scanning sensors that allow for selective aiming of a barcode scanning laser, etc. Further still, the sensory array 230 may be deployed on an entirely movable structure relative to the airframe 200, such as a gimballed platform that may be controlled to maintain a reference orientation. Thus, in such an embodiment where some or all sensor elements of the sensor array 230 are on a gimballed platform part of airframe 200 (not shown in FIG. 2), the circuitry within the internal monitor drone 125 may use a separate gimbal controller, such as an AlexMos brushless gimbal controller (BGC) from Quanum or an H4-3D GoPro gimbal from DJI, to interface to a dedicated brushless gimbal motor that articulates such a platform in order to keep those sensors of the sensor array 230 deployed on that platform in a reference orientation and attitude.

Finally, FIG. 2 illustrates an electronic docking connection 235 on the lower part of internal monitor drone 125. The electronic docking connection 235 is generally a type of connection for multiple electronic interfaces between the internal monitor drone 125 and the internal docking station 130. In one embodiment, as explained in more detail with respect to FIGS. 3, 4A, and 4B, electronic docking connection 235 provides a connection for electronic charging of the drone's onboard battery and for wired data communications to and from the drone 125 through connection 235. For example, when the internal monitor drone 125 is in a secured position on internal docking station 130, the electronic docking connection 235 may be mated with a complementary connection on the docking station 130 so as to charge the drone 125, upload data to the drone 125 (e.g., updated flight commands for onboard flight profile data maintained in the drone's memory, updated loading plan data for an upcoming loading operation for aircraft 100, and the light), and download data from the drone 125 (e.g., gathered sensory information stored as sensor data in the drone's memory).

Figure 3:
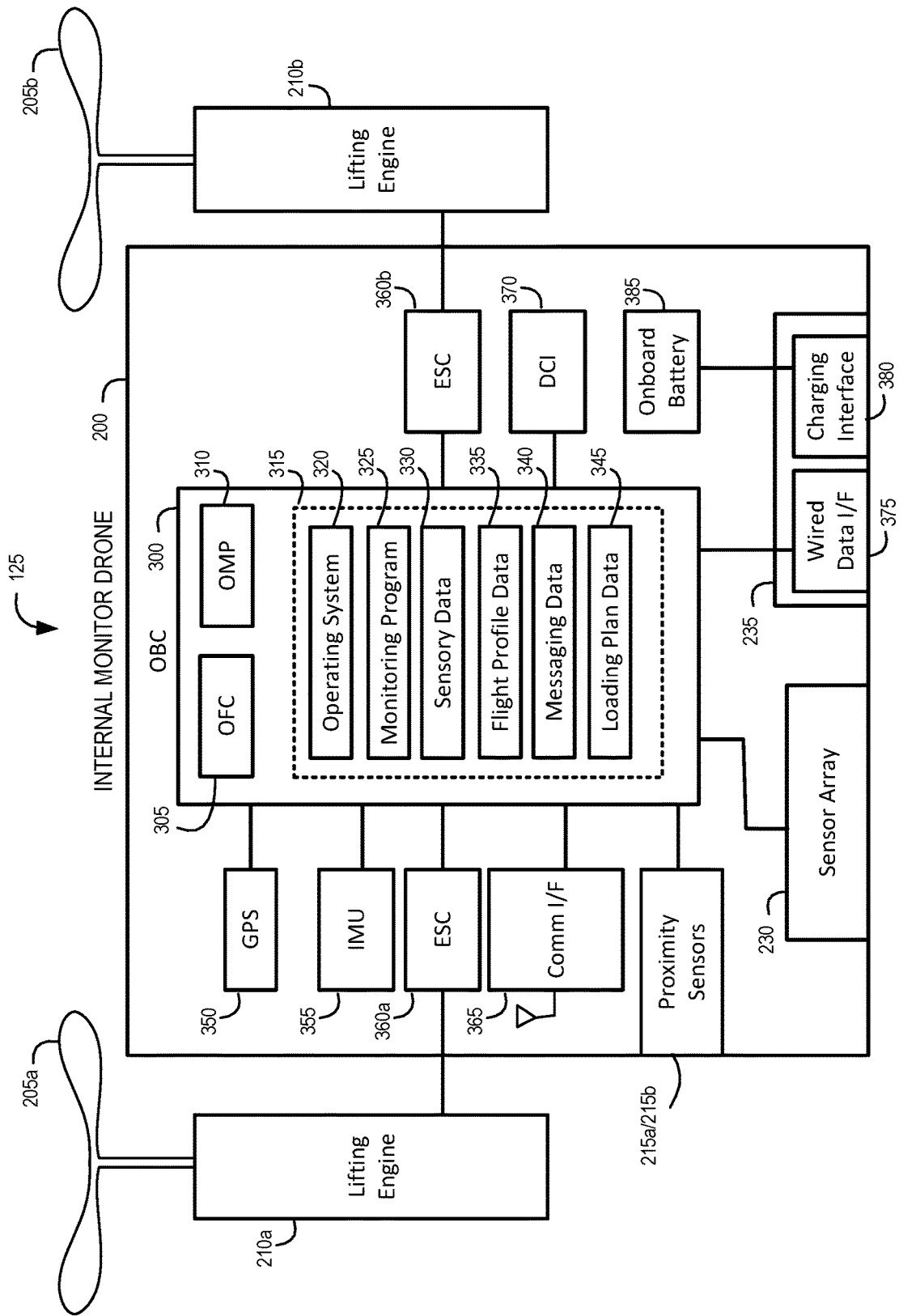
FIG. 3 is a schematic illustration of connected electronic and sensory components of an exemplary internal monitor drone in accordance with an embodiment of the invention.

Further to the explanation of components shown in FIG. 2 that make up an exemplary internal monitor drone 125, FIG. 3 presents further details in the form of a block diagram illustration of different connected electronic and sensory components of an embodiment of an exemplary internal monitor drone 125. Referring now to FIG. 3, exemplary internal monitor drone 125 includes an onboard controller (OBC) 300 (having one or more processors and memory) at its core along with memory 315 (e.g., volatile, non-volatile, or both depending on the configuration of the OBC 300). The OBC 300 interfaces or connects with motor control circuitry (such as electronic speed controllers 360a, 360b), guidance related circuitry (such as global positioning system (GPS) chip 350, inertial measurement unit (IMU) 355, and proximity sensors 215a, 215b), dedicated docking circuitry (such as drone capture interface 370 and the electronic docking connection 235), communication related circuitry (such as communication interface 365), payload electronics (such as the onboard sensor array 230), and an onboard power source that provides power for all of the onboard active electronics (such as onboard battery 385). An embodiment of OBC 300 may interface or connect with such circuitry by deploying various onboard peripherals (e.g., timer circuitry, USB, USART, general-purpose I/O pins, IR interface circuitry, DMA circuitry, buffers, registers, and the like) that implement an interface (e.g., a plug type or connectorized interface) to the different components disposed within internal monitor drone 125 (e.g., mounted on different parts of airframe 200).

As part of the exemplary internal monitor drone 125, the OBC 300 generally controls autonomous flying and docking of the drone 125 as well as monitoring and data gathering tasks related to the shipment storage area 120 using sensory array 230. In some embodiments, OBC 300 may be implemented with a single processor, multi-core processor, or multiple processors and have different programs concurrently running to manage and control the different autonomous flying/docking and internal monitoring tasks. For example, in the embodiment shown in FIG. 3, flight/docking control and monitoring operations may be divided between an onboard flight controller (OFC) 305 and an onboard monitoring processor (OMP) 310. In such an embodiment, OFC 305 and OMP 310 may have access to the same memory, such as memory storage 315 or, alternatively, OBC 300 may be implemented with separate dedicated memories that are accessible by each of OFC 305 and OMP 310. Those skilled in the art will appreciate that memory accessible by OFC 305 may have different accessibility and size requirements compared to memory accessible by OMP 310 given the different memory demands for the different responsibilities. For example, memory accessible by OMP 310 may be significantly large given the anticipated size of sensory information gathered through sensory array 230 when compared to the size of memory needed for tasks performed by OFC 305. As will be explained further, each of OFC 305 and OMP 310 may include peripheral interface circuitry that couples the processing element(s) to the different onboard peripheral circuitry, such as the GPS 350, inertial measurement unit 355, the communication interface 365, the electronic speed controllers 360a, 360b that control each lifting engine 210a, 210b, and the like.

In general, the OFC 305 is a flight controller capable of autonomous flying of drone 125. Such autonomous flying may involve automatic take off, transiting an airborne monitoring path (e.g., via waypoint flying), and data communication or telemetry while airborne and while secured to the docking station 130. For example, exemplary OFC 305 may be responsible for generating flight control input to change the drone's desired flight profile by causing the lifting engines 210a, 210b to move the internal monitor drone 125 from a secured position on the internal docking station 130 to an initial airborne position within the shipment storage 110 and then move internal monitor drone 1255 from the initial airborne position along the airborne monitoring path within the interior shipment storage area 120 of the shipment storage 110. As such, the OFC 305 controls movement and flight stability of drone 125 while navigating and avoiding collisions during movement. In more detail, an embodiment of OFC 305 includes peripheral interface circuitry (not shown in FIG. 3, but those skilled in the art will appreciate that it may be implemented with buffers, registers, buses, and other communication and command pathways) for interacting with guidance related circuitry, motor control circuitry, dedicated docking circuitry, and communication circuitry onboard the internal monitor drone 125 as part of controlling movement and flight stability of drone 125 while navigating and avoiding collisions during movement. Examples of such an OFC 305 include multi-rotor flight controllers from Turnigy, NAZA flight controllers from DJI, and Pixhawk flight controllers from 3D Robotics specifically designed for autonomous flying.

OFC 305 uses electronic speed controllers (ESC) 360a, 360b to control respective lifting engines 210a, 210b. Generally, an electronic speed controller varies the speed of a particular electronic motor (such as the motor in lifting engine 210a) as a type of throttle control. In this way, the OFC 305 provides flight control input as throttle control to each of the different ESCs 360a, 360b in order to vary the speed of the lifting rotors 205a, 205b. Those skilled in the art will appreciate that having the OFC 305 generate flight control input that changes the power to all lifting engines 210a, 201b results in the internal monitor drone 125 moving higher or lower, while other flight control input for the ESCs may cause horizontal movement or changes in attitude for the internal monitor drone 125. An example of such an ESC may be a Turnigy Multi star multi-rotor speed controller, however those skilled in the art will appreciate there are a variety of other models used depending on the current and current ranges required to drive the respective lifting engines.

For flight operations and navigation, OFC 305 may be implemented with integrated global positioning system (GPS) onboard as well as an integrated inertial measurement unit (IMU) (including one or more gyroscopes) onboard. The integrated GPS and IMU provide OFC 305 with current position information in the form of a satellite-based location and/or a relative location using the IMU based on a resettable position fix. Alternatively, as shown in the embodiment illustrated in FIG. 3, the OFC 305 may be implemented by separately interfacing with external guidance related circuitry, such as a GPS module/chip 350 (including a GPS compatible antenna), inertial measurement unit (IMU) 355, and proximity sensors 215a, 215b. The GPS unit 350 provides similar satellite-based location information in the form of coordinates usable by OFC 305 for navigating the airborne monitoring path or a portion thereof. IMU 355 is a device that comprises at least a gyroscope and accelerometer to measure acceleration and angle of tilt. As such, IMU 355 may provide such measured positional information (e.g., acceleration, attitude, orientation, and the like) to OFC 305 for use in navigating within internal shipment storage area 120. IMU 355 may also have its reference position reset via the current position information provided by GPS 350. Proximity sensors 215a, 215b sense the presence of different targets in close relation to the drone's airframe 200 and provide OFC 305 with detection telemetry as a positional warning as the drone 125 is moved by OFC 305 via flight control commands and input generated. In a further embodiment, proximity sensors 215a, 215b or other sensors in the sensor array 230 (such as a scanning sensor) may detect reflective or otherwise known reference points as part of navigating the space within the shipment storage.

Figure 4A:
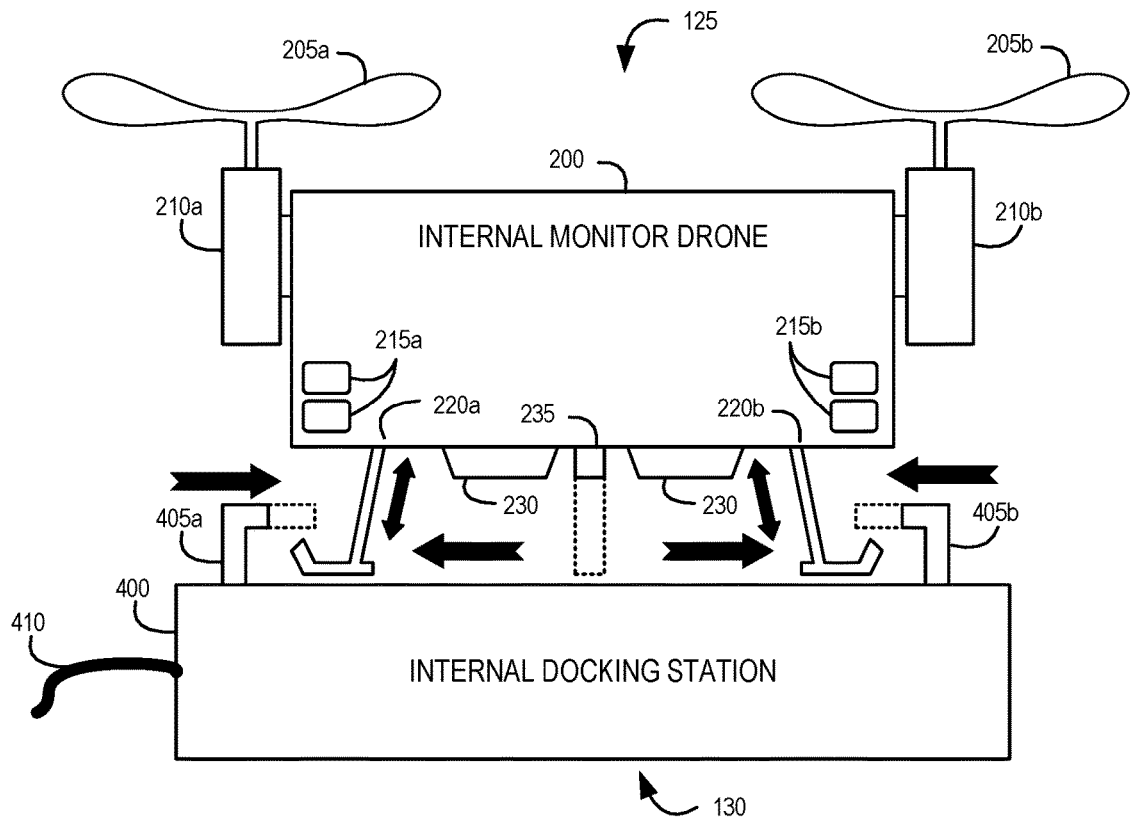
FIGS. 4A and 4B are more detailed diagrams providing further details of an exemplary internal docking station that can interface with an internal monitor drone in accordance with an embodiment of the invention.

In one embodiment, the internal monitor drone 125 may use fixed landing gear 220a, 220b such that securing the drone 125 to the docking station 130 is accomplished by actuating movable structure (e.g., clamps, pins, locking arms) on the internal docking station 130 to hold and secure the drone 125 in place via its fixed landing gear 220a, 220b. In such an embodiment, landing gear 220a, 220b are considered part of the drone capture interface 370 that selectively mate to a physical docking interface of the internal docking station 130. However, in another embodiment, the drone capture interface (DCI) 370 as shown in FIG. 3 may include selectively activated servos or actuators that move, rotate, and/or retract/extend the landing gear 220a, 220b in a controlled manner. As such, the OFC 305 may generate commands (such as a docking command) to cause the DCI 370 to electronically and selectively cause the landing gear 220a, 220b to mate to the physical docking interface of the internal docking station by moving, rotating, and/or retract/extend the landing gear 220a, 220b (such as shown in FIG. 4A).

The OBC 300 shown in FIG. 3 is also operatively coupled to several communication circuits. In general, the OBC 300 is coupled to a wireless communication interface 365 as well as a wired data interface 375 (as part of electronic docking connection 235). The OBC 300 may send messages or information over one or both of the wireless communication interface 365 and the wired data interface 375. When the internal monitor drone 125 is docked on docking station 130 and electronic docking connection 235 is mated to another connection on docking station 130, the wired data interface 375 may be connected to another wired communication path and be useful for transmitting messages, downloading/uploading data (such as sensory data, new flight profile data, or new loading plan data), or updating program files stored in memory 315 of the OBC 300. When airborne, wireless communication interface 365 allows for similar over the air communications. For example, communication interface 365 may transmit a monitoring update message in response to a transmission instruction from the OBC 300 while monitoring the internal shipment storage area 120 along an airborne monitoring path. Such a monitoring update message may, for example, be received by the vehicle transceiver 135 operated by flight personnel associated with aircraft 100. Additionally, the monitoring update message may, in other embodiments, be received by wireless-enabled transceivers outside of aircraft 100, such as one or more of loading/unloading logistics personnel via radio-based transceivers (not shown), and/or vehicle maintenance personnel via similar types of radio-based transceivers (not shown)). Depending upon the specific embodiment of OBC 300, those skilled in the art will appreciate that such communication circuits (i.e., wireless communication interface 365 and wired data interface 375) may be accessible by either or both of the OFC 305 or the OMP 310 depending on which of these processor devices are tasked with communication functionality.

An exemplary onboard monitor processor (OMP) 310 is generally considered a low power microprocessor or processor-based microcontroller that at least receives sensory information from the sensory array 230 and autonomously detects the condition of an item being shipped within the interior shipment storage area 120 based upon the received sensor information. OMP 310 may be deployed in an embodiment of internal monitor drone 125 as a task-dedicated processor that executes operational and application program code (e.g., operating system 320, monitoring program 325) and other program modules maintained in memory 315 useful in monitoring the shipping items on aircraft 100 in accordance with embodiments of the invention.

More specifically, operating system 320 may be loaded by OMP 310 upon power up and provide basic functions, such as program task scheduling, executing of application program code (such as exemplary monitoring program 325), and controlling lower level circuitry (e.g., registers, buffers, buses, counters, timers, and the like) on OMP 310 that interface with other peripheral circuitry onboard internal monitor drone 125 (such as the sensory array 230, proximity sensors 215a, 215b, the electronic docking connection 235, GPS 350, IMU 355, ESC 360a, 360b, communication interface 365, and DCI 370).

During operation and once operating system 320 is loaded, monitoring program code 325 may be run as part of implementing an aerial drone-based method for monitoring the internal storage contents of shipment storage 110. Exemplary monitoring program code 325 is a set of executable instructions in the form of one or more machine-readable program code modules or applications. The program code module(s) may be loaded and executed by OBC 300 (or at least the OMP 310) to adapt the drone 125 into a specially adapted and configured aerial monitoring apparatus. This specially configured OBC 300 of drone 125, as described in more detail herein as a part of an embodiment, implements operative process steps and provides functionality that is unconventional, especially when the process steps are considered collectively as a whole. Such a specially adapted and configured drone 125 helps, as a part of an embodiment, to address and improve targeted and technical monitoring of the condition of shipping items during all phases of logistics transport of such items as described in more detail below.

During operation, the OBC 300 (or at least the OMP 310) may access and/or generate data maintained within memory 315, such as sensory data 330, flight profile data 335, messaging data 340, and loading plan data 345. In general, sensory data 330 comprises sensory information gathered by different sensors (described above) on the sensory array 230 and may take different forms depending on the type of sensor used and the type of information gathered (e.g., numeric measurements of temperature or pressure, images, video, depth sensing measurements, etc.).

Flight profile data 335 comprises information that defines how the internal monitor drone 125 is to be flying. This data may include navigational data on an airborne monitoring path for the drone 125 to transit, as well as flight control setting information to use when generating flight control input for the ESCs 360a, 360b.

Messaging data 340 is generally a type of data used when the internal monitor drone generates and/or transmits a notification or other type of message related to the condition of one or more of the shipping items on aircraft 100. Such messaging data 340 may include information on messages received or generated onboard to be sent outside the drone 125.

Loading plan data 345 provides information on what is expected to be loaded within the shipment storage 110 and may also include information on what has actually been loaded and where such items are located within the internal shipment storage area 120.

Those skilled in the art will appreciate that the above identification of particular program code 325 and data 330-345 are not exhaustive and that embodiments may include further executable program code or modules as well as other data relevant to operations of a specially programmed processing-based internal monitor drone 125. Furthermore, those skilled in the art will appreciate that not all data elements illustrated in FIG. 3 as being within memory 315 must appear in memory 315 at the same time.

Those skilled in the art will further appreciate that OBC 300 (as well as OFC 305 and/or OMP 310) may be implemented with a low power embedded processor as part of a single-board computer having a system-on-chip (SoC) device operating at its core. In such an embodiment, the SoC device may include different types of memory (e.g., a removable memory card slot, such as a Secure Digital (SD) card slot, as removable memory; flash memory operating as onboard non-volatile memory storage; and RAM memory operating as onboard volatile memory); an operating system (such as Linux) stored on the non-volatile memory storage and running in volatile RAM memory; and peripherals that may implement any of the GPS 350, IMU 355, ESC 360a, 360b, communication interface 365, DCI 370, wired data interface 375 and charging interface 380.

Additionally, the exemplary internal monitor drone 125 includes an onboard power source, such as onboard battery 385. Onboard battery 385 provides electrical power to the active electric circuitry described above disposed on the internal monitor drone 125. Onboard battery 385 may be charged via charging interface 380 (one part of the electronic docking connection 235), which may be connected to an external power supply via the internal docking station 130. Such an onboard battery 385 may, for example, be implemented with a lightweight lithium-ion polymer battery.

Figure 4B:
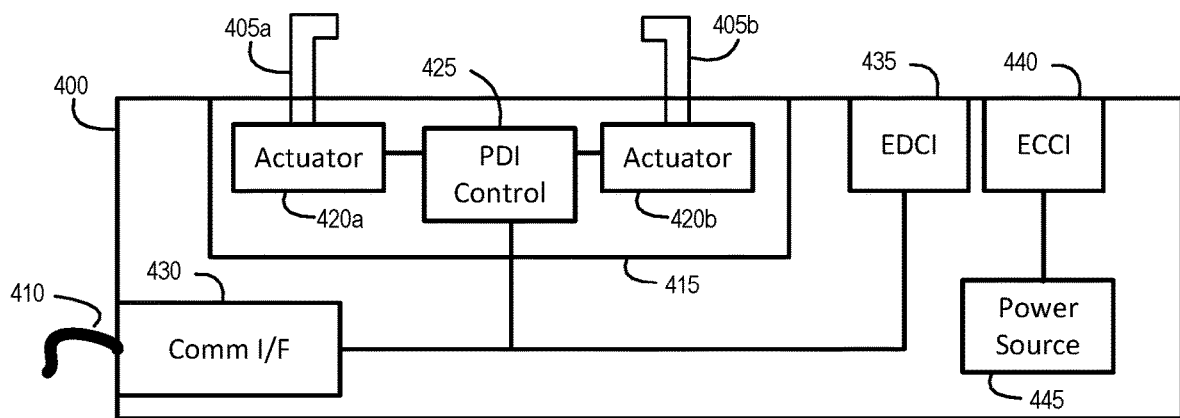

FIGS. 4A and 4B are diagrams providing further details of an exemplary internal docking station 130 as it interfaces with and supports an internal monitor drone 125 in accordance with an embodiment of the invention. Referring now to FIG. 4A, exemplary internal monitor drone 125 is shown in a configuration and position relative to exemplary internal docking station 130 where the drone 125 is being secured to the docking station 130. Exemplary internal docking station 130 is shown in FIG. 4A having a housing 400, a set of securing clamps 405a, 405b disposed on the top of housing 400 as part of a physical docking interface that mates with the internal monitoring drone 125, and a wired communication line 410 (which may also include a power line providing power to the station 130.

As shown in FIG. 4A, exemplary landing gear 220a, 220b supports the drone 125 when landing on internal docking station 130 and as at least helps to hold drone 125 secure relative to the docking station 130 via exemplary securing clamps 405a, 405b. Such a secure configuration may be achieved in one embodiment that may have fixed landing gear 220a, 220b being grabbed and held securely by movable securing clamps 405a, 405b. In another embodiment, the securing clamps 405a, 405b may be fixed relative to the docking station 130 while the landing gear 220a, 220b is moved to grab the securing clamps 405a, 405b. In still a further embodiment, each of securing clamps 405a, 405b may be articulated or actuated to grab a bottom portion of each landing gear 220a, 220b while the landing gear 220a, 220b may also be articulated or actuated to mate with the securing clamps 405a, 405b. Further, the electronic docking connection 235 may be implemented so as to be an actuated connector that mates with a complementary connector on the docking station 130.

FIG. 4B provides a block diagram of elements within the housing 400 of an exemplary internal docking station 130. Referring now to FIG. 4B, a physical docking interface 415 is disposed along the top surface of the housing 400 to physically mate with parts of the internal monitor drone 125, and includes at least the securing clamps 405a, 405b. While some embodiments may have the securing clamps 405a, 405b in a fixed arrangement relative to the housing 400, other embodiments may deploy the securing clamps 405a, 405b as being movable and capable of being articulated using actuators 420a, 420b under the control of physical docking interface (PDI) control 425. In this later embodiment, a docking command may be received by the PDI control circuit 425 (e.g., a switch or relay) over wired communication line 410. In response to receiving the docking command, the PDI control circuit 425 controls the actuators 420a, 420b coupled to the securing clamps 405a, 405b. In an alternate embodiment, the PDI control circuit 425 may have a wireless linear actuator control that allows for remote wireless control of actuators 420a, 420b and, as a result, securing clamps 405a, 405b. For example, internal monitor drone 125 may rely on proximity sensors 215a, 215b and send the docking command to PDI control circuit 425 via a wireless message from communication interface 365.

Further still, an embodiment of internal docking station 130 includes its own communication interface 430 that mates with wired communication line 410. Communication interface 410 is coupled to an electronic data connection interface (EDCI) 435, which connects to wired data interface 375 when the internal monitor drone 125 is secured on the docking station 130 and when the electronic docking connection 235 is extended to mate with at least the EDCI 435. Communication interface 430 on the docking station 130 may include a compatible radio-based transceiver for wirelessly communicating with the communication interface 365 on internal monitor drone 125. This allows the docking station 130 to wireless communicate with the drone 125 without having the drone 125 secured to the docking station 130. For example, using such wireless communication functionality of interface 430 may allow the docking station 130 to act as a local base station for the internal monitor drone 125 and act as a communication intermediary with the vehicle transceiver 135 (e.g., when the drone 125 reports a detected condition of a shipping item by wireless transmission from interface 365 to the docking stations' wireless transceiver in interface 430, and then forwarding of the relevant reported condition information to vehicle transceiver 135.

Additionally, the internal docking station 130 may use an onboard power source 445, such as an AC/DC power supply or larger capacity battery that can provide current through electronic charging connection interface (ECCI) 440 to charge onboard battery 385 when the drone 125 is secured to the docking station 130.

Figure 5:
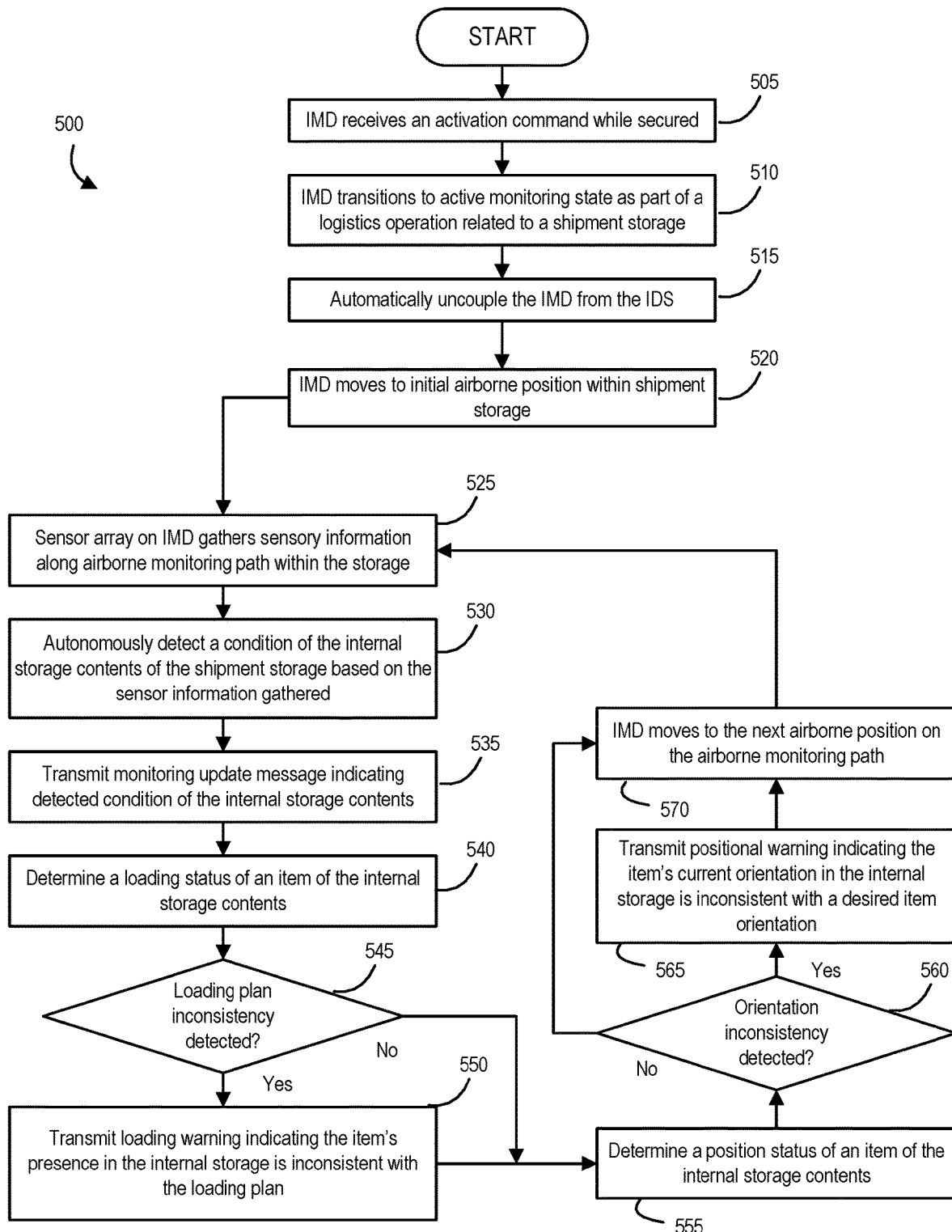
FIG. 5 is a flow diagram illustrating an exemplary aerial drone-based method for monitoring the internal storage contents of a shipment storage in accordance with an embodiment of the invention.

FIG. 5 is a flow diagram illustrating an exemplary aerial drone-based method for monitoring the internal storage contents of a shipment storage in accordance with an embodiment of the invention. Referring now to FIG. 5, exemplary method 500 begins at step 505 with an internal monitor drone, such as internal monitor drone 125, receiving an activation command while in a secured position on an internal docking station fixed to the shipment storage in a drone storage area of the shipment storage. The activation command may be in the form of a wireless message received by the internal monitor drone from the docking station 130, the vehicle transceiver 135, or from a radio-based transceiver operated by logistics personnel involved in a logistics operation (such as loading or unloading the shipment storage). Alternatively, the activation command may be received in the form of a time-based command generated onboard the internal monitor drone where, for example, the internal monitor drone may be deployed to activate from the secured position periodically rather than stay airborne for a lengthy duration. As noted with reference to FIGS. 1A-1C, the shipment storage may be implemented by a storage compartment within an aircraft (e.g., shipment storage 110 within aircraft 100), a trailer capable of being moved by a truck, or a train car capable of being moved on a railway system. When the shipment storage is within an aircraft, the internal storage contents may include one or more shipping items, such as a unit load device (ULD) container. Such a ULD container may be broadcast-enabled with a sensor-based radio transceiver that can broadcast a signal (as detected by the internal monitor drone's sensor array) without a preliminary interrogation of the ULD container to prompt broadcast of the signal. For example, rather than rely on an RFID tag that must be polled or prompted in order to broadcast a signal, the ULD container may be deployed with a sensor-based radio transceiver that may periodically broadcast signals having information within it that pertains to a condition of the ULD container and its contents.

At step 510, method 500 continues with the internal monitor drone transitioning from at least a low power state to an active monitoring state as part of a logistics operation related to the shipment storage. Such a logistics operation related to the shipment storage may be a loading operation of the shipment storage area of the shipment storage; an unloading operation of the shipment storage area of the shipment storage; or an in-transit monitoring operation of the shipment storage area of the shipment storage while the shipment storage is moving. The low power state may be a complete shut off condition where the internal monitor drone is unpowered. In other embodiments, the low power state may be a sleep type of state where some circuitry is off (e.g., lifting engines 210a, 210b, etc.) while another subset of the onboard circuitry remains powered on (e.g., GPS 350 and IMU 355 to help avoid delays prior to lift off from the docking station 130). When transitioning to the active monitoring state, where the internal monitor drone will be ready for airborne sensor activities along an airborne monitoring path within the shipment storage, the internal monitor drone prepares to separate from the internal docking station. For example, as shown in FIG. 1B, internal monitor drone (IMD) 125 transitions to the active monitoring state from the low power state in preparation for flying above the shipping items 140a-145e within the internal shipment storage area 120.

At step 515, method 500 proceeds with the internal monitor drone automatically uncoupling from the internal docking station once the internal monitor drone transitions to the active monitoring state. For example, internal monitor drone 125 may automatically uncouple from the internal docking station 130, as depicted and described with respect to FIGS. 1C and 4A. In this embodiment, the drone's landing gear 220a, 220b separates from being mated with the securing clamps 405a, 405b of the docking station 130 to accomplish such automatic uncoupling. This may be implemented by articulating the landing gear 220a, 220b, articulating the securing clamps 405a, 405b, or both depending on the complexity of the internal monitor drone, docking station, and anticipated vibrational environment within the drone storage area 115 (which may warrant articulating both the securing structure on the drone 125 and the docking station 130).

At step 520, method 500 continues with the internal monitor drone moving from the secured position on the internal docking station to an initial airborne position within the shipment storage. For example, internal monitor drone 125 is shown in FIGS. 1B and 1C moving to an initial airborne position. Such a position may be just above the docking station 130 and still within drone storage area 115 or, may be at a first waypoint or location along an airborne monitoring path within the internal shipment storage area 120 of aircraft 100.

At step 525, method 500 continues with the internal monitor drone deploying its sensor array to gather sensory information as the internal monitor drone flies/moves from the initial airborne position along an airborne monitoring path within a shipment storage area of the shipment storage. The gathered sensory information is provided from the sensor array to an onboard processor on the internal monitor drone, such as the OBC 300 or OMP 310, where it may be processed, reviewed, and analyzed onboard the internal monitor drone as part of detecting a condition of the contents of the shipment storage area.

In one embodiment, the gathered sensory information may be identification-related information involving barcodes, signs, and/or labels related to different contents within the shipment storage (e.g., different shipping items 140a-145e). For example, step 525 may implement gathering the sensory information by using a scanning sensor element of the sensor array to scan an identification symbol fixed to an item of the internal storage contents as the internal monitor drone transits the airborne monitoring path within the shipment storage. For example, as IMD 125 shown in FIG. 1C transits an airborne path above or near shipping item 140b, a scanning sensor element of sensor array 230 may scan an identification symbol on the top or side of shipping item 140b. Such an identification symbol may be a barcode symbol identifying shipping information related to shipping item 140b (e.g., recipient, destination address, tracking number, shipment loading information, weight, and the like). In another example, the identification symbol may be a sign (such as a shipping label) affixed to the shipping item where the sign identifies the shipment information related to the item (such as loading information on placement of the item when being shipped within the shipment storage).

At step 530, method 500 has the onboard processor on the internal monitor drone autonomously detecting a condition of the internal storage contents (e.g., at least one item being shipped within the internal shipment storage) based upon the sensory information provided by the sensor array. For example, when the sensory array gathers environmental information in step 525 relative to different airborne locations (e.g., particular waypoints, locations near particular shipping items, or locations near groups of shipping items maintained within the shipment storage) while transiting the airborne monitoring path within the shipment storage, the internal monitor drone's onboard processor may automatically identify an environmental condition as the condition of the internal storage contents in step 530.

Different types of environmental conditions may be automatically identified depending on the type of sensing element used within an embodiment of the internal monitor drone's sensor array. For example, the environmental condition identified may be a movement condition as sensed by a motion sensor element of the sensor array; a light condition as sensed by a light sensor element of the sensor array; a sound condition as sensed by a microphone element of the sensor array; a temperature condition as sensed by a temperature sensor element of the sensor array; a smoke condition as sensed by a smoke sensor element of the sensor array; a humidity condition as sensed by a moisture sensor element of the sensor array; and a pressure condition as sensed by a pressure sensor element of the sensor array. In other words, the sensor array deployed on the internal monitor drone implementing method 500 may include one or a wide variety of different types of sensors used to identify different environmental conditions relative to one or more items being shipped within the shipment storage (such as shipping items 140a-145e within internal shipment storage area 120).

Further embodiments may use multiple types of sensor-based environmental information as part of automatically identifying the environmental condition as the condition of the internal storage contents in step 530. For example, using a smoke sensor, a light sensor, and a temperature sensor in the sensor array may allow the onboard processor to automatically identify a fire condition relative to a particular shipping item. In another example, using a moisture sensor and a microphone in the sensory array may allow the onboard processor to automatically identify a breakage/leak condition relative to a particular shipping item. Those skilled in the art will appreciate that the onboard processor of the internal monitoring drone may cross reference the gathered environmental information against parameters that fit different types of environmental conditions as a way of automatically identifying the environmental condition based on one or more types of environmental information gathered through one or more sensing elements of the sensor array. This may involve a multi-variate table lookup in a simpler internal monitoring drone implementation or, in another embodiment, may involve having monitoring program 325 including a database for matching the gathered environmental information to different environmental conditions as part of automatically identifying the environmental condition in step 530.

In another embodiment, method 500 may have the sensory information and detected condition related to captured images and detection of a configuration change of what is maintained within the shipment storage. More specifically, a further embodiment of method 500 may implement the gathering step 525 as using an image sensor as an element of the sensor array to capture different images of the internal storage contents from one or more airborne locations within the shipment storage as the internal monitor drone transits the airborne monitoring path within the shipment storage. As such, the autonomously detecting step 530 may then be implemented by automatically identifying a configuration change as the condition of the internal storage contents. The configuration change may be automatically identified by the onboard processor of the internal monitor drone based upon a comparison of at least two of the captured images. For example, the captured different images may include one or more images of a portion of the internal storage contents from the same airborne location at different times as the internal monitor drone repeatedly transits the airborne monitoring path within the shipment storage. In doing so, the internal monitor drone captures what may be a time sequence of images related to the same item or items being shipped within the shipment storage or a sequence of images over time of the same item or items from more than one perspective (e.g., images of a top of a shipping item 140a and a side of the shipping item 140a over time). Using such a sequence of images, the onboard controller of the internal monitor drone may image process the different images to find what has changed relative to what should be the same image of the same item or items. If shipping item 140a unintentionally moves during flight, this comparison of images allows the internal monitor drone's onboard controller (such as the OMP 310) to automatically identify a configuration change relative to item 140a given its movement. Likewise, if shipping item 145d is unintentionally crushed due to the weight of item 145b, this comparison of images allows the internal monitor drone's onboard controller (such as the OMP 310) to automatically identify a configuration change relative to item 145d given its damaged exterior.

In still another embodiment, method 500 may have the sensory information and detected condition related to depth sensor information and multi-dimensional mappings of what is maintained within the shipment storage. More specifically, a further embodiment of method 500 may implement the gathering step 525 using a depth sensor as an element of the sensor array to map a configuration of the shipment storage area of the shipment storage as the internal monitor drone transits the airborne monitoring path within the shipment storage. The mapped configuration of the shipment storage area is, in more detail, a multi-dimensional mapping of the internal storage contents of the shipment storage. For example, internal monitor drone 125 may fly within the internal shipment storage area 120 and use a depth sensor as part of sensor array 230 to map this area 120 and the shipping items 140a-145e maintained within it. As such, the autonomously detecting step 530 may then be implemented by automatically identifying a change in the multi-dimensional mapping of the internal storage contents over time as the internal monitor drone repeatedly transits the airborne monitoring path within the shipment storage to be the autonomously detected condition of the internal storage contents. Thus, the autonomously detected condition may reflect a shift in location for some of the contents (such as after experiencing turbulence during in-flight monitoring), or may reflect a loading status for what has been loaded within or unloaded from the shipment storage (such as during loading or unloading logistics operations of aircraft 100).

In an embodiment where one or more of the internal storage contents of the shipment storage include broadcast enabled shipping items (e.g., items 145c-145e), a further embodiment of method 500 may have the gathering step 525 implemented by receiving a wireless signal broadcast from a broadcast-enabled package of the internal storage contents and then proceed as part of step 530 to automatically identifying the condition of the internal storage contents based upon the received wireless signal broadcast from the broadcast-enabled package. This wireless signal may be received by a radio-based receiver operating as at least part of the sensor array. In some implementations, the radio-based receiver part of the sensor array may operate as an RFID tag reader where it first interrogates the broad-enabled package in order to prompt the broadcast of such a wireless signal. However, in other implementations, the radio-based receiver part of the sensor array may receive the wireless signal without interrogating the broadcast-enabled package to prompt the broadcast of the wireless signal and merely be a listening type of radio-based receiver element of the sensor array.

At step 535, an embodiment of method 500 may have the onboard processor of the internal monitor drone transmitting a monitoring update message indicating the autonomously detected condition of the internal storage contents. In more detail, the transmitted monitoring update message may be transmitted to a wireless receiver on the internal docking station (e.g., the wireless part of communication interface 430 as described above), which then may pass along the message to another transceiver (e.g., vehicle transceiver 135 operated by flight crew personnel, or a radio-based receiver operated by maintenance personnel assigned to the aircraft 100 or logistics personnel responsible for loading/unloading the aircraft 100). Alternatively, the transmitted monitoring update message may be wirelessly sent directly at least one of the vehicle transceiver 135 operated by flight crew personnel, or a radio-based receiver operated by maintenance personnel assigned to the aircraft 100 or logistics personnel responsible for loading/unloading the aircraft 100.

In a further embodiment of step 535, any such transmission of the monitoring update message may be delayed and transmitted at a later time. In particular, the onboard processor of the internal monitor drone may opt to transmit the monitoring update message to a shipment storage transceiver (e.g., vehicular transceiver 135 or a radio-based receiver operated by personnel that load/unload the shipment storage or perform maintenance on the aircraft having the shipment storage) only if the onboard processor autonomously confirms a communication channel to the shipment storage transceiver is active. This may be accomplished by scanning for such a transceiver and receiving a wireless signal indicating that the transceiver is active and able to receive transmissions from another device, such as the internal monitor drone. If the onboard processor cannot confirm the communication channel is active, the onboard processor of the internal monitor drone may store the monitoring update message for later transmission to the shipment storage transceiver. Such a delay may be useful when the internal monitor drone is transiting a distant part of the airborne monitor path that may be outside the acceptable reception range of vehicular transceiver 135 or a radio-based receiver operated by personnel that load/unload the shipment storage or perform maintenance on the aircraft having the shipment storage. For example, the internal monitor drone may delay transmission of the monitoring update message to a radio-based receiver operated by logistics personnel loading the shipment storage for when the personnel are back within the shipment storage attempting to load another item. Such a delayed message helps avoid missed messages and enhances how the shipment storage is being loaded so that quicker corrective actions may be initiated and completed.

Steps 540-550 of method 500 involve monitoring for a loading plan inconsistency while steps 555-565 involve monitoring for an orientation inconsistency for logistics operations related to the shipment storage. In more detail, an embodiment of method 500 may continue at step 540 to have the onboard processor of the internal monitor drone autonomously determining a loading status of the item by comparing the item's identification symbol (as scanned by the scanning sensor of the sensor array) to a loading plan for the shipment storage maintained within a memory of the internal monitor drone. Such a loading plan (e.g., loading plan data 345) may have been preloaded into the internal monitor drone's memory, or alternatively, method 500 may include the step of downloading the loading plan into the memory of the internal monitor drone. In such an embodiment, downloading the relevant loading plan for what is supposed to be loaded and carried within the shipment storage may take place prior to or right after scanning the item's identification symbol. In this way, the internal monitor drone has a current and up-to-date loading plan and can reference such information to the scanned identification symbol in step 545 to detect a loading plan inconsistency (e.g., a loading status for the item showing it is loaded within the shipment storage but should not be according to the loading plan). Thus, at step 545, method 500 may proceed directly to step 555 if there is no inconsistency detected. However, if method 500 detects a loading plan inconsistency at step 545 (i.e., when the loading status of the item indicates the presence of the item within the shipment storage area of the shipment storage is inconsistent with the loading plan), method 500 proceeds to step 550 where the onboard processor of the internal monitor drone automatically transmits a loading warning.

For example, as shown in FIG. 1C, exemplary internal monitor drone 125 may have a scanning sensor within sensory array 230 and use that to capture an identification symbol (e.g., a barcode symbol or the like) from shipping item 140b while transiting an airborne monitoring path within internal shipment storage area 120. The internal monitor drone 125 may then compare the captured identification symbol for shipping item 140b with the loading plan data 345 kept in memory 315 to identify or detect that item 140b should not be present within internal shipment storage area 120. This may occur when loading personnel mistakenly load item 140b thinking it actually belongs on aircraft 100, or when loading personnel mistakenly load item 140b on aircraft 100 accidently believing aircraft 100 was another aircraft. A further embodiment may have separate loading plans for separate internal shipment storage areas when such is available on another delivery vehicle, and unintended loading into an incorrect one of the different storage areas may be more prevalent.

Like the transmitted monitoring update message from step 535, an embodiment of method 500 may transmit the loading warning to a wireless receiver on the internal docking station (e.g., the wireless part of communication interface 430 as described above), which then may pass along the message to another transceiver (e.g., vehicle transceiver 135 operated by flight crew personnel, or a radio-based receiver operated by logistics personnel responsible for loading the aircraft 100). Alternatively, the transmitted loading warning may be wirelessly sent directly at least one of the vehicle transceiver 135 operated by flight crew personnel, or the radio-based receiver operated by logistics personnel responsible for loading the aircraft 100. In such a manner, an embodiment may rapidly detect a loading plan inconsistency and allow for faster resolution of this issue—especially while the loading operation is still ongoing and correction can be prompted automatically in response to the transmitted loading warning. Method 500 then proceeds from step 550 to step 555.

As stated above, steps 555-565 generally involve monitoring for an orientation inconsistency for logistics operations related to the shipment storage. In particular, at step 555, an embodiment of method 500 continues with the onboard processor of the internal monitor drone autonomously determining a position status of a shipping item based upon item's identification symbol as scanned by the sensor array (e.g., a barcode reader or image sensor that captures information on the identification symbol). In this embodiment, the identification symbol scanned may include a directional sign, image, or symbol indicating a desired item orientation (e.g., a graphic image denoting a desired orientation, such as which surface should be facing up, and the like). Here, the position status of the item relies on such orientation-related information on the identification symbol and the current orientation of the item as scanned to reflect whether the current orientation of the identification symbol as scanned is inconsistent with the desired item orientation.

Thus, at step 560, method 500 may proceed directly to step 570 if there is no inconsistency detected relative to the orientation of the shipping item. However, if method 500 detects an orientation inconsistency for the item at step 560 (i.e., when the current orientation of the item is different from the desired orientation per the scanned information), method 500 proceeds to step 565 where the onboard processor of the internal monitor drone automatically transmits a positional warning.

Like the transmitted monitoring update message from step 535 and the loading warning in step 550, an embodiment of method 500 may transmit the positional warning to a wireless receiver on the internal docking station (e.g., the wireless part of communication interface 430 as described above), which then may pass along the message to another transceiver (e.g., vehicle transceiver 135 operated by flight crew personnel, or a radio-based receiver operated by logistics personnel responsible for loading the aircraft 100). Alternatively, the transmitted positional warning may be wirelessly sent directly at least one of the vehicle transceiver 135 operated by flight crew personnel, or the radio-based receiver operated by logistics personnel responsible for loading/unloading the aircraft 100. In such a manner, an embodiment may rapidly detect that one or more shipping items placed within the interior shipment storage area are not placed correctly (which may cause damage—especially if not corrected before the shipment storage moves (e.g., the aircraft 100 takes off, flies, and experiences vibrations and turbulence in-flight).

Method 500 then proceeds from step 565 to step 570 where the internal monitor drone moves to the next airborne position on the airborne monitoring path. Method 500 then proceeds back to step 525 to continue aerial drone-based monitoring of the internal storage contents of the shipment storage.

In some embodiments, the internal monitor drone may transit the airborne monitoring path once and then autonomously land back on the internal docking station (where it may recharge, download sensory information gathered, and upload revised flight profile data). In other embodiments, the internal monitor drone may transit the airborne monitoring path multiple times and then autonomously land back on the internal docking station. The complexity and length of the airborne monitoring path as well as the weight of the internal monitor drone (with its onboard suite of sensors in the sensory array) will impact a time aloft factor that impacts airborne monitoring operations of the internal monitor drone.

In still other embodiments, the internal monitor drone may operate as explained with respect method 500, and then further receive a follow-up monitor command. The follow-up monitor command causes the internal monitor drone to return to at least a particular airborne position in the monitoring path and gather further sensory information using the sensor array. The further sensory information may be enhanced sensory information to gather additional details, such as additional sensory information taken in higher resolution, taken over a longer time period, taken with more than one sensing element of the sensor array, and/or taken from a broader range of perspectives relative to one or more shipping items. In a more specific embodiment, the internal monitor drone may receive such a follow-up monitor command as feedback from the vehicle transceiver 135 operated by flight crew personnel, the radio-based receiver operated by logistics personnel responsible for loading/unloading the aircraft 100, or the radio-based receiver operated by maintenance personnel responsible for servicing the aircraft 100. Such feedback may be in response to a monitoring update message, a loading warning, or a positional warning where the broadcaster of the follow-up message may desire more sensory information before taken any corrective action (e.g., having personnel enter the internal shipment storage area 120 to physically inspect one of the shipping items 140a-145e, rearrange placement of such an item, or remove such an item).

Those skilled in the art will appreciate that method 500 as disclosed and explained above in various embodiments may be implemented with an apparatus, such as exemplary internal monitor drone 125, running an embodiment of airborne monitoring program code 325, and as a part of a drone-based monitored storage system including the shipment storage, docking station, and internal monitor drone. Such code 325 may be stored on a non-transitory computer-readable medium such as memory storage 315 on internal monitor drone 125. Thus, when executing code 325, the OBC 300 (or OMP 310) of internal monitor drone 125 (in cooperation with other circuitry onboard the drone 125, such as elements of the sensor array 230) may be operative to perform certain operations or steps from the exemplary methods disclosed above, including method 500 and variations of that method.

FIG. 1C, as discussed above, illustrates a general example of such a drone-based monitored storage system that relies on a single internal monitor drone. However, other embodiments may deploy multiple internal monitor drones to monitor a shipment storage, such as shipment storage 110. Using multiple internal monitor drones to monitor a shipment storage may enhance monitoring of the shipment storage, for example, by allowing for divided monitoring responsibilities, allowing the different internal monitor drones to use different types of sensors in their respective sensor arrays, and employ a more robust level of monitoring in a given time within the shipment storage. By deploying a swarm of internal monitor drones to monitor the shipment storage, the task of monitoring what is maintained in the shipment storage is coordinated and accomplished in a much quicker way.

Figure 6:
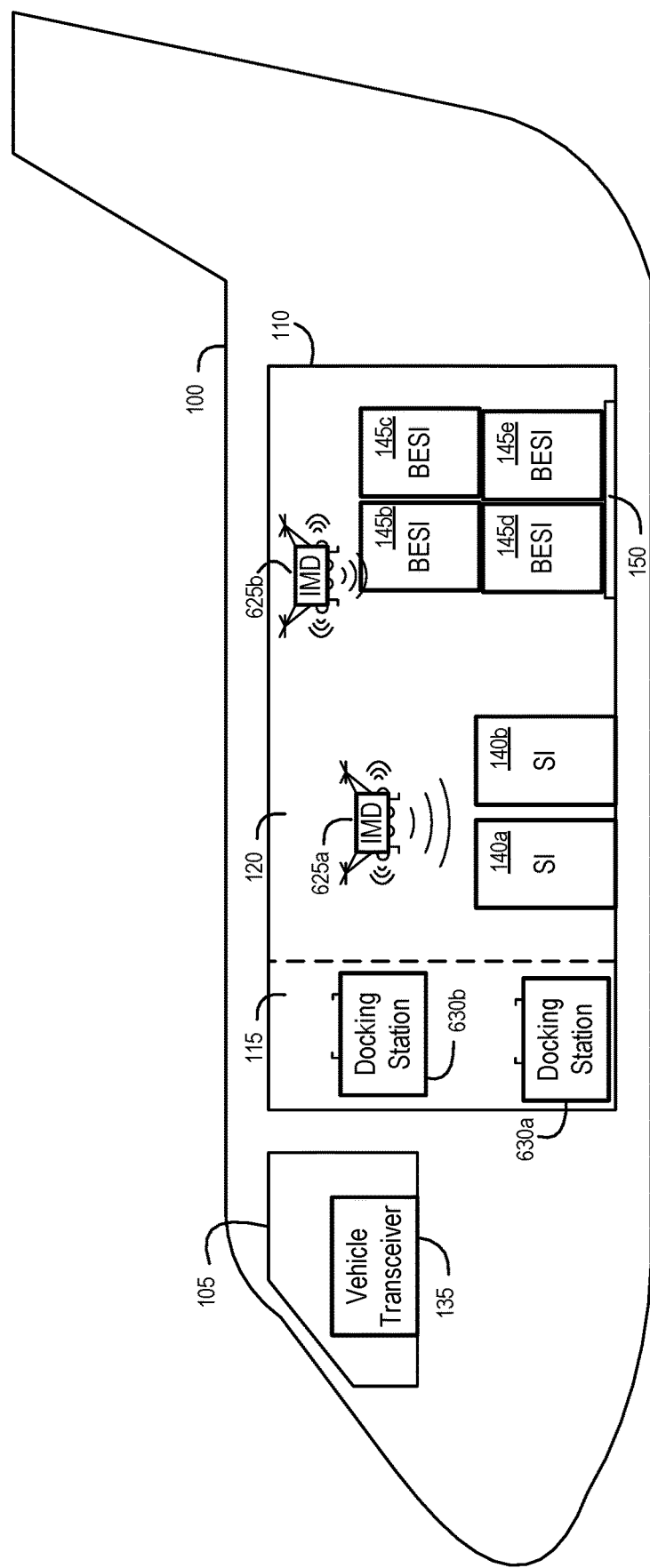
FIG. 6 is a diagram of an exemplary multiple drone-based monitored storage system in accordance with an embodiment of the invention.

FIG. 6 is a diagram of an exemplary multiple drone-based monitored storage system that includes shipment storage 110, two internal docking stations 630a, 630b, and two internal monitor drones 625a, 625b. Referring now to FIG. 6, exemplary shipment storage 110 is similar to that described with respect to FIGS. 1A-1C in that it includes a closable entry similar to entry 112 shown in FIG. 1A that provides access to within the shipment storage, and an interior shipment storage area 120 within shipment storage 110 that temporarily maintains custody of items being shipped (e.g., shipping items 140a, 140b, and 145b-145e). The shipment storage 110 further includes multiple drone storage areas as part of area 115 (e.g., different parts of drone storage area 115 where two internal docking stations 630a, 630b are respectively disposed). In other words, each of the internal docking stations 630a, 630b are fixed within respectively different areas or part of drone storage area 115. The internal monitor drones 625a, 625b are initially disposed on respective ones of the internal docking stations 630a, 630b. Each of the internal monitor drones 625a, 625b has a sensor array that gathers sensory information as the respective internal monitor drone moves within a part of the interior shipment storage area of the shipment storage. As mentioned above, in some embodiments, the sensor array in one internal monitor drone may be equipped with similar sensing elements as the sensor array in the other internal monitor drone. However, in other embodiments, the different sensor arrays in the different internal monitor drones may include sensor elements that do not entirely overlap. For example, exemplary internal monitor drone 625a may include a suite of sensors in its sensor array that includes a scanning sensor or image sensor capable of capturing identification information from labels, signs, or barcodes on the exterior of shipping items 140a, 140b while exemplary internal monitor drone 625b may deploy with a different suite of sensors in its array better suited to monitor broadcast-enabled shipping items 145b-145e (where some surfaces of items 145b-145e are not visible or scannable).

As deployed as part of such an exemplary multiple drone-based monitored storage system, one of the internal monitor drones (e.g., drone 625a) may operate as part of the system to move from one of the internal docking stations (e.g., docking station 630a) to a first initial airborne position within the shipment storage as part of a first airborne monitoring path within a first part of the interior shipment storage area of the shipment storage (e.g., an airborne monitoring path that takes drone 625a over items 140a and 140b). At this first initial airborne position, this first internal monitor drone aerially monitors a first part of the items being shipped within the interior shipment storage area using the sensor array on the first of the internal monitor drones. As such, this first internal monitor drone begins aerial monitoring of items at the first initial airborne position and as the drone transits the first airborne monitoring path from the first initial airborne position. A second of the internal monitor drones (e.g., drone 625b) may operate as part of the system to move from one of the internal docking stations (e.g., docking station 630b) to a second initial airborne position within the shipment storage as part of a second airborne monitoring path within a second part of the interior shipment storage area of the shipment storage (e.g., a second airborne monitoring path that takes drone 625b over items 145b-145e). At this second initial airborne position, the second internal monitor drone aerially monitors the second part of the items being shipped within the interior shipment storage area using the sensor array on the second of the internal monitor drones.

As the different internal monitor drones are using their respective sensory arrays to gather sensory information and monitor the first part of the items being shipped and the second part of the items being shipped, at least one of the first and second internal monitor drones autonomously detects a condition of an item being shipped based upon sensory information generated when monitoring the items being shipped within the interior shipment storage area by the first of the internal monitor drones and the second of the internal monitor drones. Such a condition may generally be related to the sensory information gathered by one or both internal monitor drones, or may be related how such sensory information gathered is beyond a threshold or range of acceptable values. The types of sensors that may be deployed on the respective first and second internal monitor drones are similar to those discussed above as being part of exemplary sensor array 230 and those that may be used as part of embodiments of method 500.

Likewise, one or more of the internal monitor drones may be operative to autonomously determine a loading status for an item being monitored relative to a loading plan for that drone's monitored part of the internal shipment storage and to automatically transmit a loading warning when the loading status of the item indicates the item's presence within the interior shipment storage area of the shipment storage is inconsistent with that particular loading plan used by that internal monitor drone (similar to steps 540-550 of method 500). Additionally, one or more of the internal monitor drones may be operative to autonomously determine a position status for an item being monitored. That internal monitor drone may determine the position status of the item based upon an identification symbol as scanned by that monitor drone's scanning sensor (where the identification symbol comprises a directional sign indicating a desired item orientation for the one item and where the position status of the item reflects whether a current orientation of the identification symbol as scanned is inconsistent with the desired item orientation) and then automatically transmit a positional warning when the position status indicates the current orientation of the identification symbol is inconsistent with the desired item orientation (similar to steps 555-565 of method 500).

Figure 7:
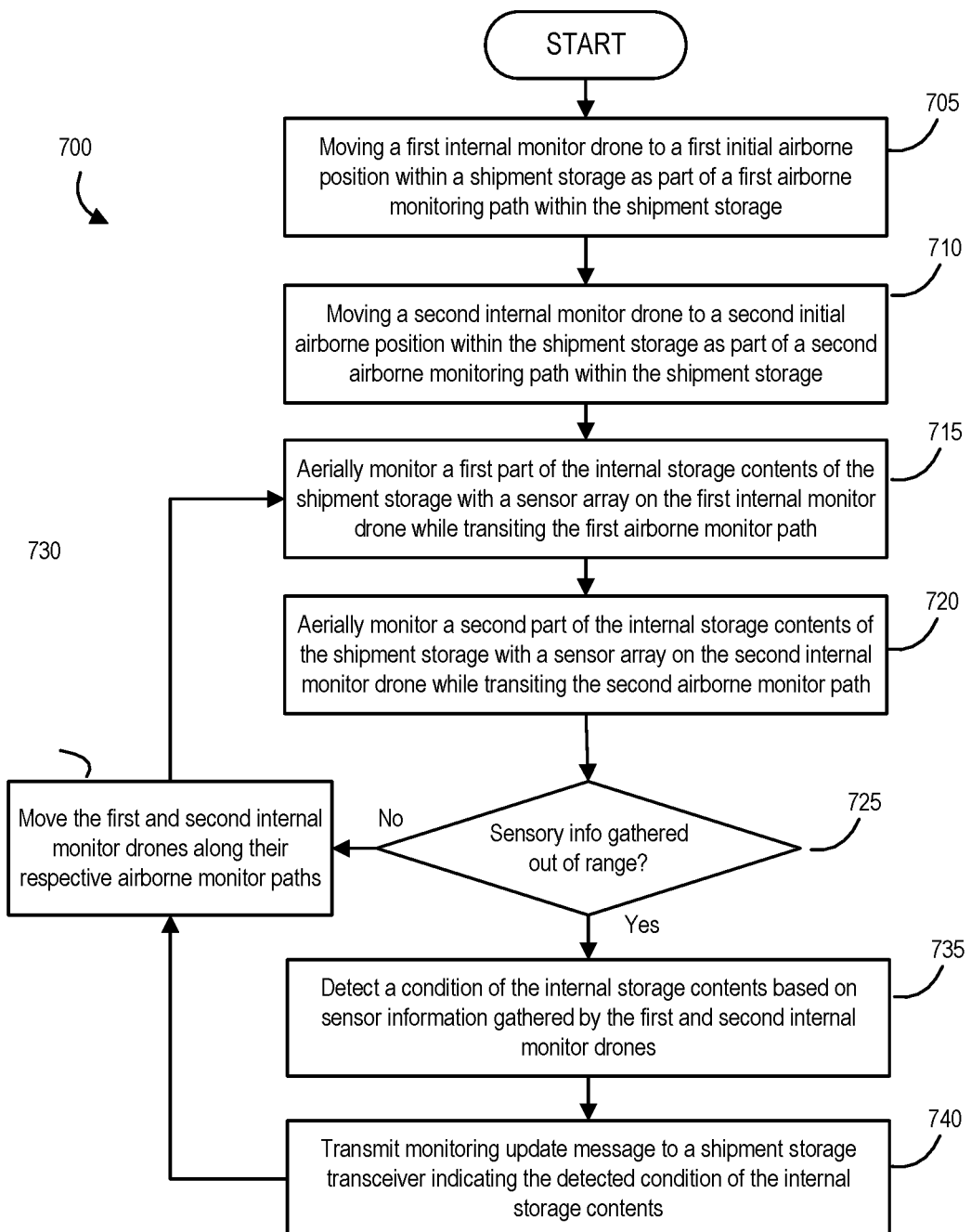
FIG. 7 is a flow diagram illustrating an exemplary multiple aerial drone-based method for monitoring the internal storage contents of a shipment storage in accordance with an embodiment of the invention.

Explaining how such a system may operate in more detail, FIG. 7 is a flow diagram illustrating an exemplary multiple aerial drone-based method for monitoring the internal storage contents of a shipment storage in accordance with an embodiment of the invention. Such a shipment storage may, for example, be implemented by a storage compartment within an aircraft, a trailer capable of being moved by a truck, a storage or cargo compartment of a marine vessel, or a train car capable of being moved on a railway system. Referring now to FIG. 7, exemplary method 700 begins at step 705 by moving a first internal monitor drone to a first initial airborne position within the shipment storage as part of a first airborne monitoring path within the shipment storage. The first internal monitor drone (e.g., drone 625a shown in FIG. 6) is disposed within a first drone storage area of the shipment storage (e.g., a first part of drone storage area 115 where internal docking station 630a is located). In more detail, an embodiment of step 705 may have the first internal monitor drone being selectively uncoupled from a first internal docking station (e.g., internal docking station 630*a*) disposed at a fixed location within the first drone storage area of the shipment storage prior to moving the first internal monitor drone from its secured position on the first internal docking station to its initial airborne position of the first airborne monitoring path.

In one embodiment, the first airborne monitoring path used by the first internal monitor drone in this embodiment corresponds to a first part of an interior shipment storage area within the shipment storage. However, in other embodiments, the different internal monitor drones may have different monitoring paths that overlap or transit through overlapping or coexistent parts of the internal shipment storage area (but that would not have one of the drones being at a location too close to another drone at the same time).

At step 710, method 700 continues by moving a second internal monitor drone to an initial airborne position for that drone within the shipment storage as part of a second airborne monitoring path within the shipment storage. The second internal monitor drone (e.g., drone 625*b* shown in FIG. 6) is disposed within a second drone storage area of the shipment storage (e.g., a second part of drone storage area 115 where internal docking station 630*b* is located). In more detail, an embodiment of step 710 may have the second internal monitor drone being selectively uncoupled from a second internal docking station (e.g., internal docking station 630*b*) disposed at a fixed location within the second drone storage area of the shipment storage prior to moving the second internal monitor drone from its secured position on the second internal docking station to its initial airborne position of the second airborne monitoring path. As such, steps 705 and 710 have the first and second internal monitoring drones airborne and ready to begin gathering sensory information as part of aerially monitoring the internal contents of the shipment storage.

At steps 715 and 720, the different internal monitor drones are deployed to aerially gather different sensory information related to what is loaded and maintained within the shipment storage. In particular, method 700 proceeds at step 715 with aerially monitoring a first part of the internal storage contents of the shipment storage with a first sensor array on the first internal monitor drone as the first internal monitor drone transits the first airborne monitoring path within the shipment storage from the first initial airborne position. This aerially monitoring action may take the form or be implemented with the first sensor array sensing environmental information relative to one or more airborne locations within the shipment storage as the first internal monitor drone transits the first airborne monitoring path within the shipment storage.

Similarly, at step 720, method 700 proceeds with aerially monitoring a second part of the internal storage contents of the shipment storage with a second sensor array on the second internal monitor drone as the second internal monitor drone transits the second airborne monitoring path within the shipment storage from the second initial airborne position. And like step 715, the aerial monitoring in step 720 may be implemented with the second sensor array sensing environmental information as the second sensory information relative to one or more airborne locations within the shipment storage as the second internal monitor drone transits the second airborne monitoring path within the shipment storage.

An embodiment of method 700 may continue to step 725 where method 700 may take action based upon the sensory information gathered by the different internal monitor drones. In particular, at step 725, method 700 may proceed by determining if any of the sensory information gathered by the first and second internal monitor drones is out of range or beyond what may be anticipated for the items maintained within the shipment storage. For example, the sensory data maintained within each of the first and second internal monitory drones may include range/threshold data (e.g., range/threshold information maintained as part of sensory data 330 in drones 625*a* and 625*b*). Such range/threshold data may define expected sensor value ranges or sensor value thresholds relevant to the sensor elements that make up the drones' respective sensor array. For example, such range/threshold data may be specific to temperature and light conditions anticipated to be experienced relative to the items in the respective parts of internal shipment storage area 120 monitored by each of internal monitor drone 625*a* and internal monitor drone 625*b*. Further examples of what may be considered out of range in step 725 may, in some embodiments, extend to inconsistencies with loading plan data (e.g., the gathered sensor information includes identification information on a shipping item that should be present within that part of the internal shipment storage area and, thus, reflects an out of range situation relative to the loading plan data for that part of the internal shipment storage area). Likewise, what may be considered out of range in step 725 may, in some embodiments, extend to inconsistencies with item orientations. For example, sensory information gathered by a first of the internal monitor drones 625*a* may include an image of a sign denoting a desired orientation for a particular shipping item. When comparing the orientation of that image to the current orientation of the item, such gathered sign information (as gathered sensory information) may indicate an out of range situation between the current orientation and the desired orientation. The particular item may have been loaded incorrectly, shifted while the aircraft 100 taxied for takeoff, during takeoff, during airborne flight (such as after experiencing turbulence), or upon landing. Thus, if the sensory information gathered by the first and second internal monitor drones is not out of range, method 700 continues from step 725 to step 730 where the first and second internal monitor drones may further transit and aerially monitor their respective parts of the internal storage contents along their respective airborne monitor paths. Otherwise, step 725 proceeds directly to step 735 where method 700 detects a condition of the internal storage contents based upon at least one of (1) first sensory information generated when monitoring with the first sensor array of the first internal monitor drone and (2) second sensory information generated when monitoring with the second sensor array of the second internal monitor drone.

In one embodiment of method 700, detecting the condition of the internal storage contents in step 735 may be accomplished by automatically identifying an environmental condition as the condition of the internal storage contents based upon at least one of environmental information gathered by the first internal monitor drone and environmental information gathered by the second internal monitor drone. As previously explained, different types of environmental conditions may be automatically identified depending on the type of sensing element used within the particular internal monitor drone's sensor array. For example, the environmental condition identified may be a movement condition as sensed by a motion sensor element of the sensor array on the first or second internal monitor drone; a light condition as sensed by a light sensor element of the sensor array on the first or second internal monitor drone; a sound condition as sensed by a microphone element of the sensor array on the first or second internal monitor drone; a temperature condition as sensed by a temperature sensor element of the sensor array on the first or second internal monitor drone; a smoke condition as sensed by a smoke sensor element of the sensor array on the first or second internal monitor drone; a humidity condition as sensed by a moisture sensor element of the sensor array on the first or second internal monitor drone; and a pressure condition as sensed by a pressure sensor element of the sensor array on the first or second internal monitor drone. In other words, the respective sensor arrays deployed on the different internal monitor drones implementing method 700 may include one or a wide variety of different types of sensors used to identify different environmental conditions relative to one or more items being shipped within the shipment storage (such as shipping items 140a-145e within internal shipment storage area 120). And further embodiments may use multiple types of sensor-based environmental information as part of automatically identifying the environmental condition by one or the first or second internal monitor drones as the condition of the internal storage contents in step 735.

After step 735, method 700 may transmit a monitoring update message to a shipment storage transceiver, such as vehicle transceiver 135, in step 740. Such a monitoring update message indicates the detected condition of the internal storage contents and is transmitted either by the first internal monitor drone when the detected condition is based upon the first sensory information, or by the second internal monitor drone when the detected condition is based upon the second sensory information.

Similar to that disclosed relative to method 500, a further embodiment of method 700 may also include steps that verify proper loading of the shipment storage using one or more of the multiple internal monitor drones. For example, the first internal monitor drone may determine a loading status of a first monitored shipping item based upon comparing an identification symbol as scanned by the first internal monitor drone to a downloaded loading plan for the shipment storage maintained within memory of the first internal monitor drone. The first internal monitor drone may then generate a first loading warning when the loading status of this first item indicates the presence of the first item within the shipment storage is inconsistent with the loading plan, and transmit the first loading warning to a shipment storage transceiver (such as vehicle transceiver 135). Likewise, the second internal monitor drone may determine a loading status of a second monitored shipping item based upon comparing the second identification symbol as scanned by the second internal monitor drone to the loading plan for the shipment storage maintained within memory of the second internal monitor drone. The second internal monitor drone may then generate a second loading warning when the loading status of the second item indicates that the presence of the second item within the shipment storage is inconsistent with the loading plan, and transmit the second loading warning to a shipment storage transceiver (such as vehicle transceiver 135).

And similar to that disclosed relative to method 500, a further embodiment of method 700 may also include steps that verify proper positioning of items within the shipment storage using one or more of the multiple internal monitor drones. For example, the first internal monitor drone may determine a position status of a first shipping item based upon the first identification symbol as scanned by the first internal monitor drone. This first identification symbol includes at least a first directional sign indicating a desired item orientation for the first item, and the position status of the first item reflects whether a current orientation of the first item is inconsistent with the desired item orientation as reflected by the identification symbol's directional sign. The first monitor drone then generates a first positional warning when the position status of the first item indicates the current orientation of the first item is inconsistent with the desired item orientation for the first item, and then transmits the first positional warning to a shipment storage transceiver (such as the vehicle transceiver 135). Additionally, the second internal monitor drone may determine a position status of a second item based upon a second identification symbol as scanned by the second internal monitor drone. The second identification symbol includes a second directional sign indicating a desired item orientation for the second item, and the position status of the second item reflects whether a current orientation of the second item is inconsistent with the desired item orientation for the second item. The second internal monitor drone then generates a second positional warning when the position status of the second item indicates the current orientation of the second item is inconsistent with the desired item orientation for the second item, and transmits the second positional warning to the shipment storage transceiver (such as vehicle transceiver 135). With such loading and/or positional warnings, the shipment storage transceiver may respond as part of an embodiment of such a multiple internal monitor drone system to notify logistics radio-based transceivers operated by loading personnel that can then address the loading or positional related issue underlying such warnings.

In steps 715 and 720 of method 700, the aerial monitoring may be more specifically implemented using further types of sensor elements. For example, in a further embodiment of method 700, aerially monitoring the first part of the internal storage contents with the first sensor array in step 715 may involve capturing, with a first image sensor part of the first sensor array, at least one image of the first part of the internal storage contents from each of a first plurality of airborne locations within the shipment storage as the first internal monitor drone transits the first airborne monitoring path within the shipment storage. In like fashion, aerially monitoring the second part of the internal storage contents with the second sensor array in step 720 may involve capturing, with a second image sensor part of the second sensor array, at least one image of the second part of the internal storage contents from each of a second plurality of airborne locations within the shipment storage as the second internal monitor drone transits the second airborne monitoring path within the shipment storage. As such, step 735 may then involve automatically identifying the condition of the internal storage contents based upon at least one of the at least one image captured by the first image sensor or the at least one image captured by the second image sensor.

In a further embodiment, method 700 may have step 735 automatically identifying a configuration change as the condition of the internal storage contents based upon at least one of (1) a comparison of multiple images over time from the first image sensor as the first internal monitor drone repeatedly transits the first airborne monitoring path and (2) a comparison of multiple images over time from the second image sensor as the second internal monitor drone repeatedly transits the second airborne monitoring path.

In still another more detailed embodiment, a depth sensor may be used in the first and/or second internal monitor drone's sensor array so as to gather multi-dimensional mapping information as the relevant monitored sensory information related to the internal storage contents. In particular, an embodiment of method 700 may implement aerially monitoring the first part of the internal storage contents with the first sensor array in step 715 by mapping, with a first depth sensor part of the first sensor array, a first configuration of a first storage area within the shipment storage that maintains the first part of the internal storage contents as the first internal monitor drone transits the first airborne monitoring path within the shipment storage. The first configuration represented as a multi-dimensional mapping of at least the first part of the internal storage contents. For example, internal monitor drone 625a may use a depth sensor on its sensor array to map the part of the internal shipment storage area 120 patrolled by internal monitor drone 625a. The mapping produced by such a depth sensor may take the form of a three-dimensional mapping of shipping items 140a and 140b as they exist within the front part of internal shipment storage area 120. Such a mapping can be referred to as a configuration of shipping items 140a and 140b as that particular time. In similar fashion, aerially monitoring the second part of the internal storage contents with the second sensor array in step 720 may involve using a second depth sensor part of the second sensor array to map a second configuration of a second storage area within the shipment storage that maintains the second part of the internal storage contents as the second internal monitor drone transits the second airborne monitoring path within the shipment storage. As such, step 735 in this further embodiment of method 700 may be done by automatically identifying the condition of the internal storage contents based upon at least one of the multi-dimensional mapping of at least the first part of the internal storage contents and the multi-dimensional mapping of at least the second part of the internal storage contents. More specifically, step 735 may be implemented by automatically identifying a configuration change as the condition of the internal storage contents based upon at least one of (1) a comparison of the multi-dimensional mapping of the first part of the internal storage contents over time and (2) a comparison of the multi-dimensional mapping of the second part of the internal storage contents over time.

As a result, a configuration change notification may be transmitted by the first internal monitor drone to a shipment storage transceiver in response to identifying the configuration change as part of step 735 when the identified configuration change is based upon the comparison of the multi-dimensional mapping of the first part of the internal storage contents over time. Such a configuration change notification provides a prompted intervention request message from the first internal monitor drone related to the particular configuration change identified In a further embodiment of method 700, steps 715 and 720 may involve scanning for identification symbols when aerially monitoring the internal storage contents of the shipment storage. This may involve scanning, for example, the name of a shipping item printed on the side of the item or the actual dimensions of a shipping item indicated on the item (such as on a ULD loaded within the internal storage area). In more detail, step 715 may aerially monitor the first part of the internal storage contents with the first sensor array by scanning a first identification symbol fixed to a first item within the first part of the internal storage contents using a first scanner part of the first sensor array (e.g., a barcode scanner or image sensor) as the first internal monitor drone transits the first airborne monitoring path within the shipment storage. Likewise, step 720 may aerially monitor the second part of the internal storage contents with the second sensor array by scanning a second identification symbol fixed to a second item within the second part of the internal storage contents using a second scanner part of the first sensor array (e.g., a barcode scanner or image sensor) as the second internal monitor drone transits the second airborne monitoring path within the shipment storage. Thereafter, step 735 may be implemented by automatically identifying the condition of the internal storage contents based upon at least one of the first identification symbol scanned by the first scanner or the second identification symbol scanned by the second scanner. These identification symbols may be barcode symbols that identify shipping information related to their respective item, or may be a sign affixed to the respective item that identifies shipment loading information (e.g., a desired orientation for the item, or other placement information for the item, such as a hazardous material warning label for the item).

Those skilled in the art will appreciate that method 700 as disclosed and explained above in various embodiments may be implemented with an apparatus, such as exemplary internal monitor drones 625a, 625b, running an embodiment of airborne monitoring program code 325, and as a part of a multiple drone-based monitored storage system including the shipment storage, internal docking stations 630a, 630b, and internal monitor drones 625a, 625b. Such code 325 may be stored on a non-transitory computer-readable medium in each of the drones, such as memory storage 315 disposed within each of internal monitor drones 625a, 625b. Thus, when executing code 325, the OBC 300 (or OMP 310) of internal monitor drones 625a, 625b (in cooperation with other circuitry onboard the drones 625a, 625b, such as elements of their respective sensor arrays 230) may be operative to perform certain operations or steps from the exemplary methods disclosed above, including method 700 and variations of that method.

Drone-Based Delivery Vehicle Part Inspections

While the above description focuses on embodiments of an applied technical solution that enhances how to unconventionally monitor and intelligently notify others about a condition related to what may be in a delivery vehicle's shipment storage compartment, the following describes various embodiments that deploy an aerial inspection drone paired as an exclusive part of a delivery vehicle. In general, an embodiment of an aerial inspection drone paired to the delivery vehicle may perform airborne inspections of specific parts of the delivery vehicle and transmit messages based upon the airborne inspections to other logistics entities, such as vehicle operators (such as flight crew personnel) and/or logistics personnel assigned to the vehicle that may service the vehicle. This type of airborne extension of the delivery vehicle improves how a delivery vehicle may be self-inspecting using an exclusively paired aerial inspection drone.

Figure 8A:
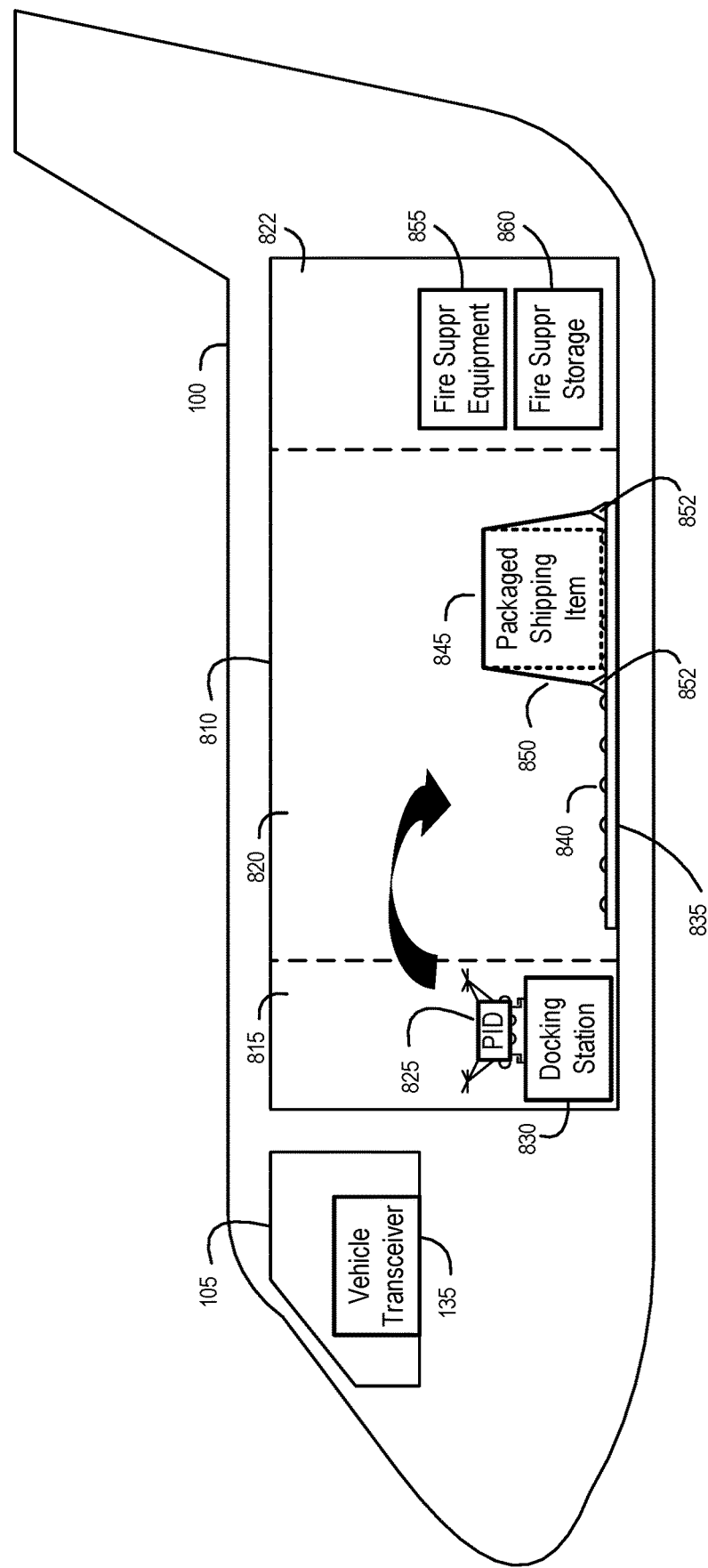
FIGS. 8A-8G are diagrams of an exemplary drone-based inspection system using an exemplary paired inspection drone that inspects targeted points on a delivery vehicle from inside the delivery vehicle and outside the delivery vehicle in accordance with an embodiment of the invention.

In more detail, FIGS. 8A-12 relate to embodiments of a drone-based delivery vehicle inspection system and its operation where a paired aerial inspection drone may be deployed to aerially gather sensor-based inspection information related to targeted inspection points on the delivery vehicle, automatically identify an inspection condition if the inspection point is out of range, and transmit a notification to others about such an inspection condition. FIG. 8A illustrates an exemplary aircraft 100 as a type delivery vehicle similar to that shown in earlier Figures. In FIG. 8A, aircraft 100 has operational control section 105 (e.g., a cockpit from which flight personnel can control and fly the aircraft 100) and a shipment storage 810 used for maintaining items being shipped within aircraft 100 between different locations.

Similar to that shown in FIGS. 1A-1C, exemplary operational control section 105 includes a vehicle transceiver 135. As previously explained, such a vehicle transceiver 135 may be implemented as a standalone unit (e.g., a ruggedized radio-based tablet or smartphone used by aircraft crew personnel) or an integrated part of the aircraft's avionics suite. In more detail, an embodiment of exemplary vehicle transceiver 135 may include a display (such as a touch screen display or avionics display unit); a control input interface with buttons, switches, or touch sensitive receptors on the touch screen display; and a radio. The exemplary delivery vehicle transceiver 135 communicates with a paired aerial inspection drone (PID) 825 and other radio-based devices over the radio, receives user/operator input via the control input interface, and generates vehicle related information for presenting to the user/operator on the display. Thus, as explained in more detail below, an embodiment of exemplary delivery vehicle transceiver 135 may be used as a base station type of device that interacts with PID 825 as well as other radio-based devices operated by flight personnel, logistics personnel, and maintenance personnel.

Exemplary shipment storage 810, as shown in FIG. 8A, includes a drone storage area 815, an interior shipment storage area 820, and an onboard safety system area 822. Exemplary drone storage area 815 includes an internal docking station 830 that provides secure storage for the PID 825 when PID 825 is not flying. Exemplary docking station 830 may be implemented similar to internal docking station 130 as described above and shown in FIGS. 4A and 4B. Thus, similar to docking station 130, internal docking station 830 also includes a physical docking interface, an electronic charging connection interface, and an electronic data connection interface similar to PDI 415, ECCI 435, and EDCI 440.

Figure 9:
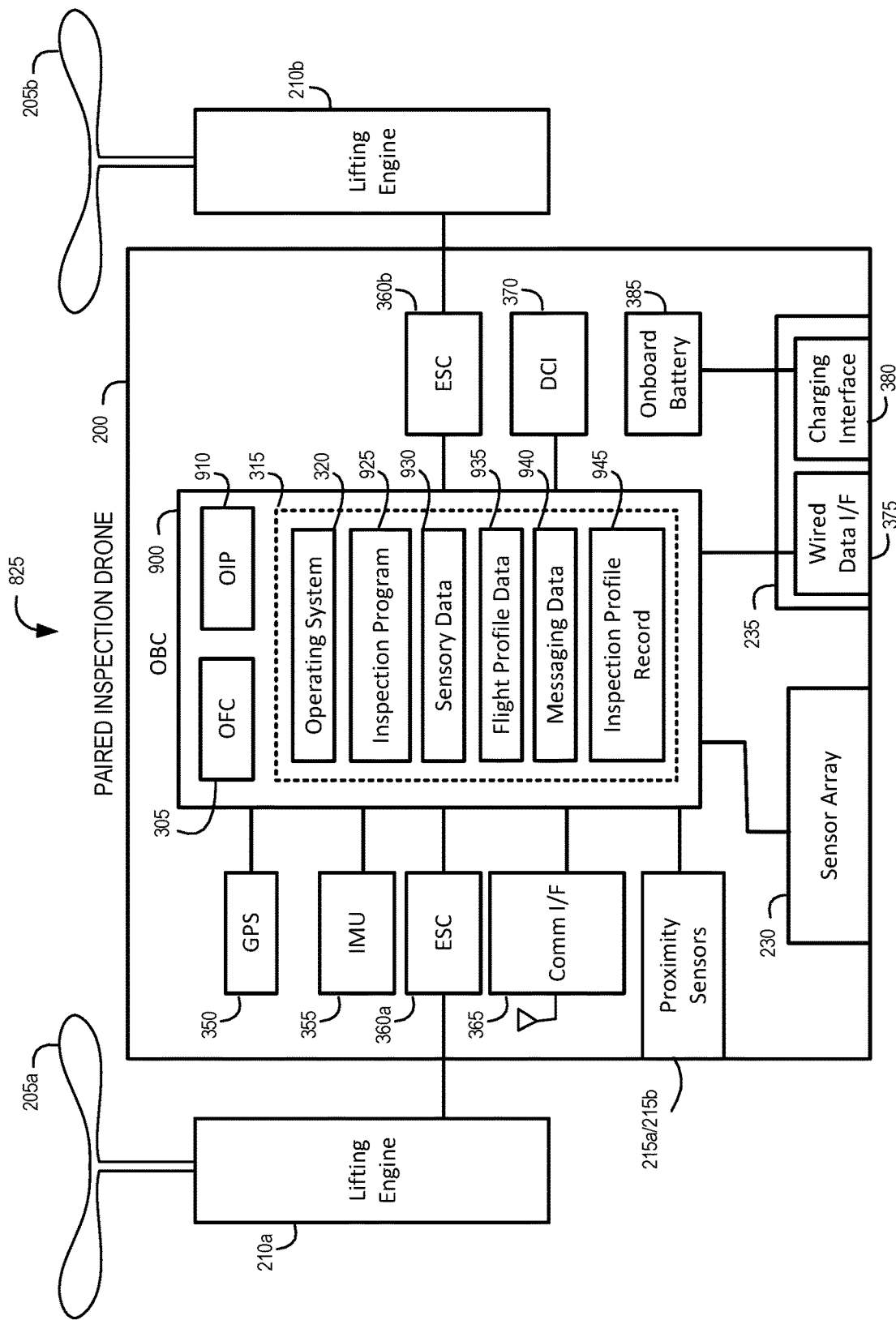
FIG. 9 is a schematic illustration of connected electronic and sensory components of an exemplary paired inspection drone in accordance with an embodiment of the invention.

An exemplary PID 825 (as shown and explained in more detail below with respect to FIG. 9) secured within the drone storage area 815 is a linked part of aircraft 100 that travels with the aircraft 100 during a delivery vehicle based shipment operation (e.g., shipping one or more items from a first location to a second location while the items are maintained within a cargo storage area (such as internal shipment storage area 820)). Exemplary PID 825, as shown in FIG. 9, may be implemented with similar component elements as that of internal monitor drone 125 for providing an airborne sensory platform capable of maneuvering and navigating in close proximity to aircraft 100. PID 825 may generally use a similar drone capture interface (DCI) with which to become secured relative to internal docking station 830 within drone storage area 815. Additionally, the sensor array deployed on PID 825 typically includes at least one type of image sensor with which to capture images relative to different inspection points on the delivery vehicle 100 targeted for aerial review. As will be explained in more detail below, such an aerial inspection review may be autonomously conducted by the PID 825 or may be controlled with flight commands wirelessly provided to the PID 825 from a wireless base controller or through a wired control tether connection to a base controller on the aircraft 100 (as shown and explained in more detail with reference to FIG. 10). Furthermore, such an aerial inspection review may be conducted by the PID 825 on inspection points targeted within the delivery vehicle as well as inspection points outside the delivery vehicle.

The interior shipment storage area 820 is generally an accessible storage compartment of aircraft 100 where items being shipped (also generally referred to as cargo) may be loaded, moved, secured, and maintained during flight operations of the aircraft 100. For example, packaged shipping item 845 is shown in FIG. 8A secured within aircraft 100 within internal shipment storage area 820. Packaged shipped item 845 may be moved as cargo within this storage area 820 using different types of cargo handling points (e.g., a roller, a caster, a portion of a roller deck, a roller ball mat, a castor mat, a turntable, a conveyor, and the like) deployed on aircraft 100. Such exemplary cargo handling points facilitate moving cargo into, within, and out of the storage area 820 so that cargo can safely and more easily moved into, within, and out of the aircraft 100. For example, package shipping item 845 is shown in FIG. 8A on a portion of a roller ball mat 835 having rollers 840. Such rollers 840 may be fixed or articulated to provide a motion-capable surface interface for cargo but later be retracted. The exemplary rollers 840 shown in FIG. 8A allow for logistics personnel to move item 845 as cargo from outside the aircraft 100 and into a desired location within area 820 where the item 845 may be secured. Securing cargo may be accomplished with a cargo attachment point, such as tie down attachment 852 (e.g., a hole, slot, hook, or loop in the mat 835) configured to receive a tie down strap 850. Generally, such a cargo attachment point may be located within the storage area 820 (including ramp accesses) and used as a type of anchor that helps maintain and secure cargo in its desired location. In one embodiment, the cargo attachment point may be configured to receive a cargo netting that may be placed over the item 845 as part of securing the item within storage area 820. Another embodiment may use an exemplary cargo attachment point in the form of a pin disposed on a support floor (such as roller mat 835) that directly contacts and securely holds part of the structure of a ULD as the item 845. Thus, cargo handling points and cargo attachment points are types of mechanical structure that interface with what is being shipped within storage area 820 and may need periodic inspection to ensure proper operation. However, a typical cargo aircraft (such as aircraft 100) may have a very large number of cargo handling points and cargo attachment points.

A delivery vehicle's shipment storage (such as storage 810) may also have one or more designated areas where an enhanced level of inspection may be desired or warranted. An enhanced level of inspection generally is an inspection with more detail or scrutiny, such as when using tighter ranges of tolerance for the applicable acceptable range of sensor data gathered, when spending more time doing the inspection than for other areas, when deploying a greater number of sensor types in order to conduct the inspection, and the like. In general, such designated areas may be associated with particular systems, equipment, or materials that are important from a safety aspect on what is being transported or from a mission critical aspect of the aircraft itself. For example, as shown in FIG. 8A, exemplary storage 810 includes an onboard safety system area 822 deemed appropriate for an enhanced level inspection of points within that area. In other words, areas for certain types of equipment and/or storage for certain types of materials (e.g., hazardous materials, caustic materials, corrosive materials, mission-critical equipment or systems, and the like) may be considered designated areas in an embodiment and receive an enhanced level of inspection for those inspection points related to such a designated area. Thus, in the illustrated example, PID 825 may spend more time, use special tolerances, or deploy a more robust set of sensors when detecting sensor-based inspection information from an aerial position near fire suppression equipment 855 and fire suppressant storage 860 located in the designated onboard safety system area 822.

As mentioned above, embodiments of the delivery vehicle have targeted inspection points associated with the delivery vehicle. The targeted inspection points correspond to respective parts of the delivery vehicle to be inspected in an unconventionally advantageous manner. Such targeted inspection points may be different for different delivery vehicles, such as for different models and configurations of a particular cargo aircraft (such as aircraft 100), and may comprise multiple designated inspection areas inside the aircraft and outside the aircraft. For example, as shown in FIGS. 8A-8G, exemplary PID 825 conducts inspections from aerial positions proximate different targeted inspection points for aircraft 100—both inside and outside aircraft 100.

Targeted inspection points inside aircraft 100 may, for example, include designated inspection areas of an accessible cargo storage area (such as area 820) as well as cargo handling and attachment points. This may include tie down attachment 852 within storage area 820 as a type of cargo attachment point that would be inspected by PID 825; roller 840 and roller ball mat 845 as a type of cargo handling point that facilitates movement of cargo (such as item 845) within the aircraft 100. Further examples of cargo handling points may include, but are not limited to a caster, a portion of a roller deck, a castor mat, a turntable, and a conveyor.

Targeted inspection points inside the aircraft 100 (i.e., a type of delivery vehicle) may also include other designated inspection areas inside the aircraft, such as the onboard safety system area 822 having onboard safety system equipment (such as fire suppression equipment 855 or fire extinguishing equipment) and related storage 860 for related material (such as fire suppression or fire extinguishing material). Further designated inspection areas that may be targeted inspection point within the aircraft 100 may be for storing hazardous materials or other sensitive materials (e.g., areas for temperature sensitive materials that need to be kept within a tight temperature range, areas for moisture sensitive materials, areas for other environmentally sensitive materials) that may have strict regulations on how such materials are to be stored and transported.

Exemplary targeted inspection points may also include designated inspection areas externally exposed on the delivery vehicle. For example, such exterior viewable targeted inspection points may include, but are not limited to, a panel on the aircraft; a rivet that joins structure together; a seam or joint between parts; an engine (such as a jet or propeller driven engine for an aircraft); a flight control surface disposed on a leading or trailing edge of wing, stabilizer, or tail (such as a flap, aileron, tab, spoiler, and the like); a window seal; a closable entry to within the aircraft (such as a door to the interior of the aircraft, a belly or side door to a cargo bay, an access door or hatch to an avionics bay, landing gear doors, and the like); aircraft lighting disposed on the exterior of the aircraft; an antenna that may be conformally mounted or that extends from the body of the aircraft; and landing gear and tires that may be fixed or retractable. Furthermore, some exemplary targeted inspection points may be otherwise exceptionally difficult and time consuming to inspect as they may only be accessible from above the aircraft delivery vehicle such that those points (e.g. aircraft lights, control surfaces, window seals, or other components mounted on top of the body of the aircraft) are not visible from a ground level perspective.

In one embodiment, the exemplary targeted inspection points may include a prioritized subset designated for an enhanced level of sensor-based inspection (such as a subset of targeted inspection points for aircraft 100 for a designated inspection area having an onboard safety system 855, 860 for the aircraft 100). Thus, an embodiment with a paired inspection drone conducting aerial inspections of a delivery vehicle (such as aircraft 100) may use different levels of inspection scrutiny based on whether a particular targeted inspection point is part of the prioritized subset.

For example, FIGS. 8A-8G generally show an embodiment of a drone-based system for inspecting an aircraft (as an exemplary delivery vehicle) involving an exclusively paired inspection drone (PID 825) and targeted inspection points both within the aircraft 100 and externally exposed on the aircraft 100. Referring back to FIG. 8A, PID 825 (as paired and exclusively assigned to aircraft 100 as a dedicated inspection tool for that delivery vehicle and used only for aircraft 100) is shown in a secure position on docking station 830. Similar to internal docking station 130, docking station 830 in this embodiment uses a physical docking interface that facilitates maintaining a PID 825 in a secure position on the station 830, an electronic charging connection interface that can provide power to PID 825, and an electronic data connection interface that can provide a wired bi-direction data link with PID 825. Docking station 830 may be connected to vehicle transceiver 135, which may generate an activation command to initiate an aerial inspection of targeted inspection points on aircraft 100. In another embodiment, the activation command may be provided by docking station 830 to PID 825 in response to a wireless signal from another device (e.g., a signal received over a communication interface on docking station 830 similar to communication interface 430). Further still, another embodiment may have the activation command provided wirelessly directly to the PID 825 rather than through the docking station 830.

Upon receiving an activation command, PID 825 transitions from at least a low power state to an active power state as part of a targeted inspection operation of the delivery vehicle. In the active power state, PID 825 causes its drone capture interface to automatically uncouple PID 825 from the physical docking interface of internal docking station 830. This may be accomplished with articulating or actuated components on the PID 825, the docking station 830, or both. The PID 825 accesses its memory to identify the targeted inspection points from an onboard inspection profile record related to the aircraft 100. In particular, the targeted inspection points correspond to respective parts of the aircraft 100—both inside and outside the aircraft 100.

Figure 8B:
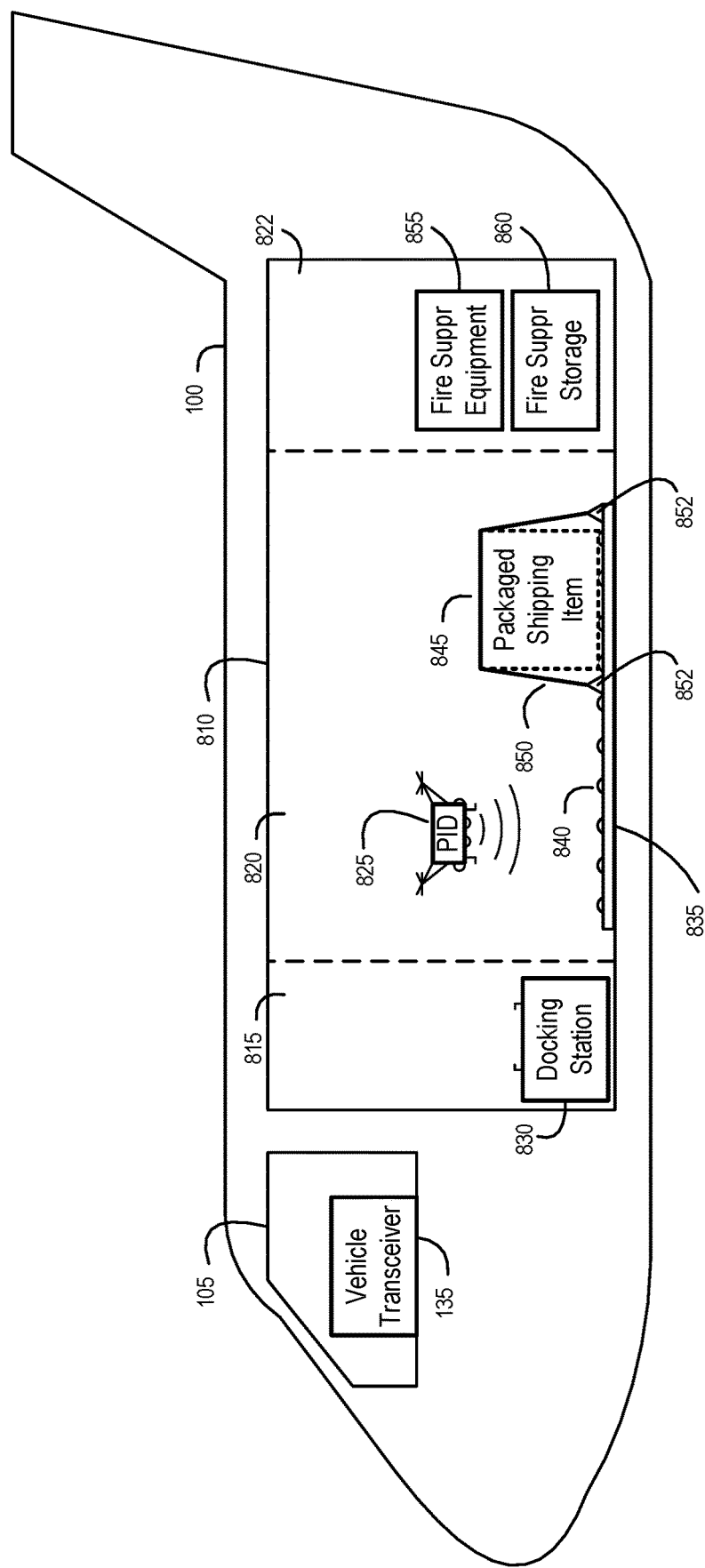

In FIG. 8B, exemplary PID 825 has used its lifting engines to take off from the docking station 830, moved to an initial airborne position within the drone storage area 815, and then moved to an aerial position proximate one of the targeted inspection points, such as the roller mat 835. At this aerial position above the roller mat 835, PID 825 uses an onboard sensor array to detect sensor-based inspection information relative to this targeted inspection point. In more detail, PID 825 can automatically identify an unacceptably out of range inspection condition about the roller mat 835 (a targeted inspection point for aircraft 100) based upon the sensor-based inspection information detected from the aerial position above the roller mat 835. The out of range inspection condition is specific to the particular targeted inspection point and identified relative to an acceptable range for that inspection point. An inspection profile record maintained on the PID 825 may identify each targeted inspection point, indicate whether the inspection point is prioritized for an enhanced level of inspection, indicate what sensors may be used to perform the inspection of that point, and an associated acceptable range for sensor-based inspection information gathered relative to that point. For example, in FIG. 8B, if PID 825 moves to an airborne position above roller 840 from an initial position above docking station 830, PID 825 can automatically identify an inspection condition related to roller 840 (as one of the aircraft's targeted inspection points) based on sensor-based inspection information detected relative to roller 840. Such sensor-based inspection information gathered may be imagery of the roller 840 that may be processed to identify damage or encumbrances and/or depth mapping information that may be processed to identify whether roller 840 has been damaged, shifted from an anticipated position relative to other nearby reference objects (e.g., other rollers), or simply no longer where it anticipated to be located. If roller 840 does not appear to be damaged and is present, PID 825 may move to another targeted inspection point in the aircraft 100. However, if PID 825 identifies an inspection condition that roller 840 is outside the acceptable range for that point (e.g., roller is not located, roller appears encumbered, roller appear damaged or shifted relative to its anticipated position), the PID 825 can transmit an inspection notification message to a delivery vehicle receiver, such as vehicle transceiver 135, so that the inspection condition may be acted upon. Similar types of aerial inspections may be conducted within aircraft 100 for other targeted inspection points within the aircraft, such as tie down attachment 852, fire suppression equipment 855, or fire suppressant storage 860.

Figure 8C:
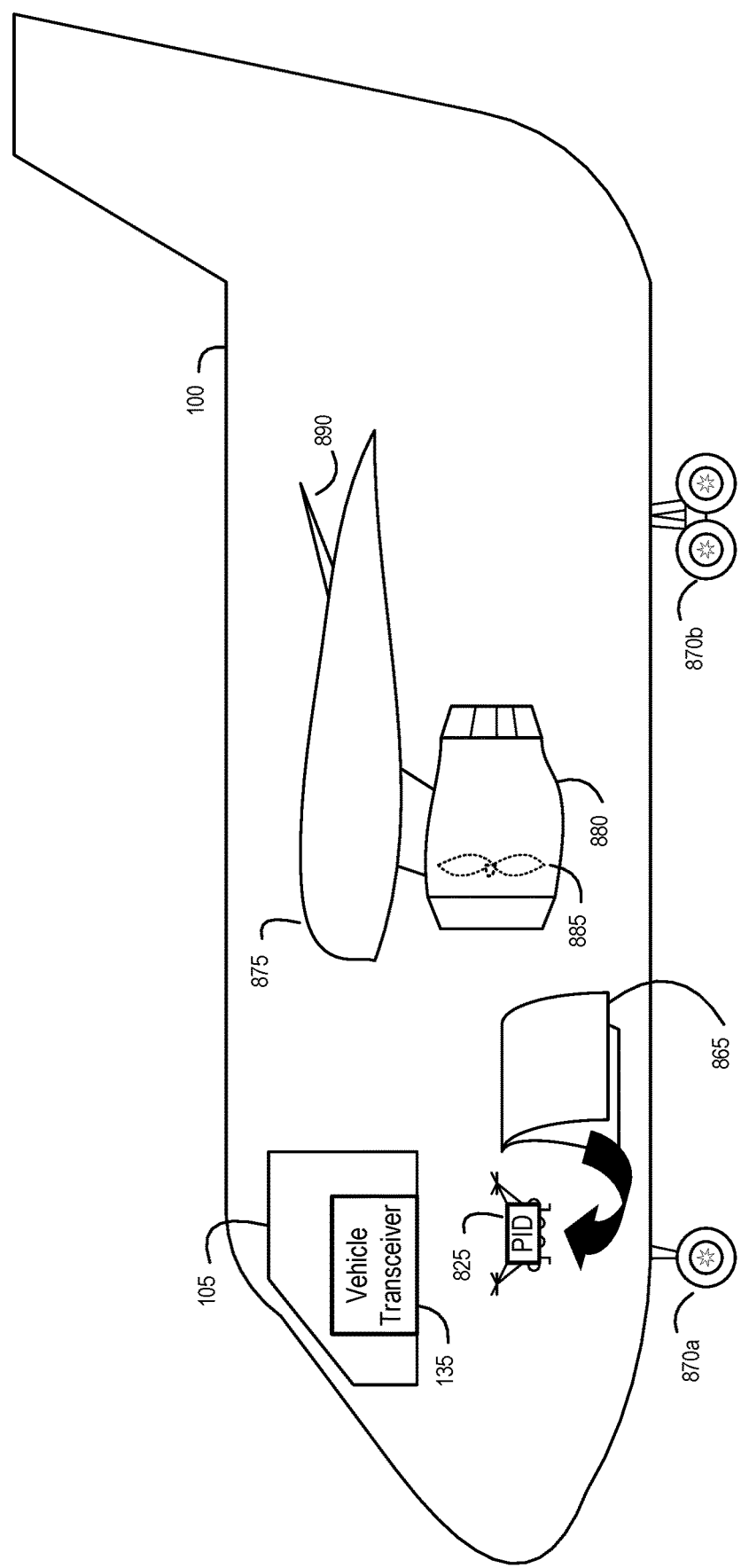
Figure 8D:
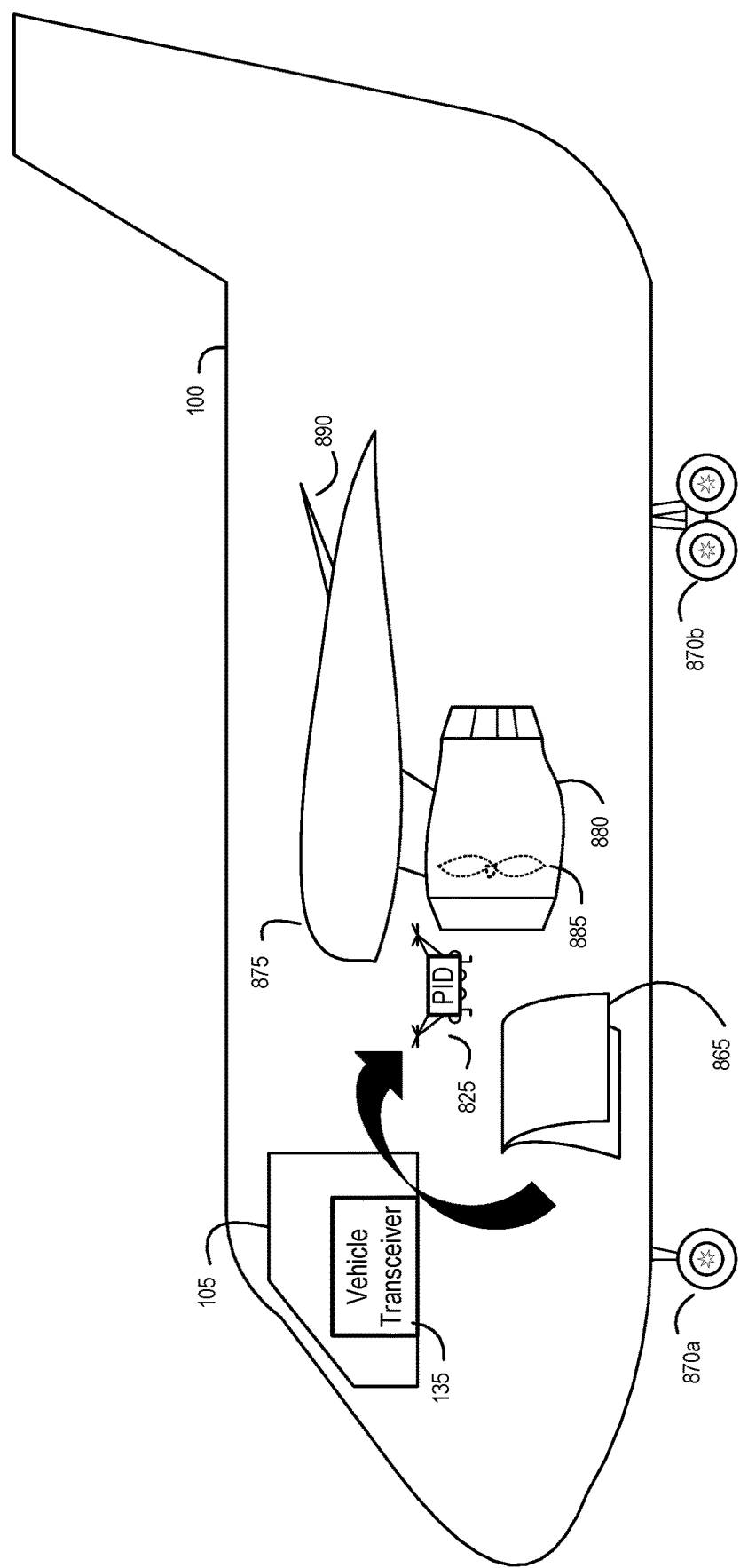

As noted above, some of the targeted inspection points for a delivery vehicle may be externally exposed to the vehicle. As shown in FIG. 8C, a closeable entry or access hatch 865 for aircraft 100 may be opened (or be remotely actuated to open) to allow PID 825 to move to airborne positions proximate to targeted inspection points accessible and viewable from outside aircraft 100. In the example shown in FIG. 8D, once out the closable entry or access hatch 865 (whether a cargo ramp opening, belly storage hold doors, or a dedicated drone hatch), PID 825 may move to an aerial position near wing 875 and proximate the air intake fan 885 of jet engine 880. From this aerial position, PID 825 may detect sensor-based inspection information to automatically identify an out of range inspection condition about the air intake fan 885 as a targeted inspection point (and transmit a related inspection notification message to vehicle transceiver 135 if such a condition is automatically identified).

Figure 8E:
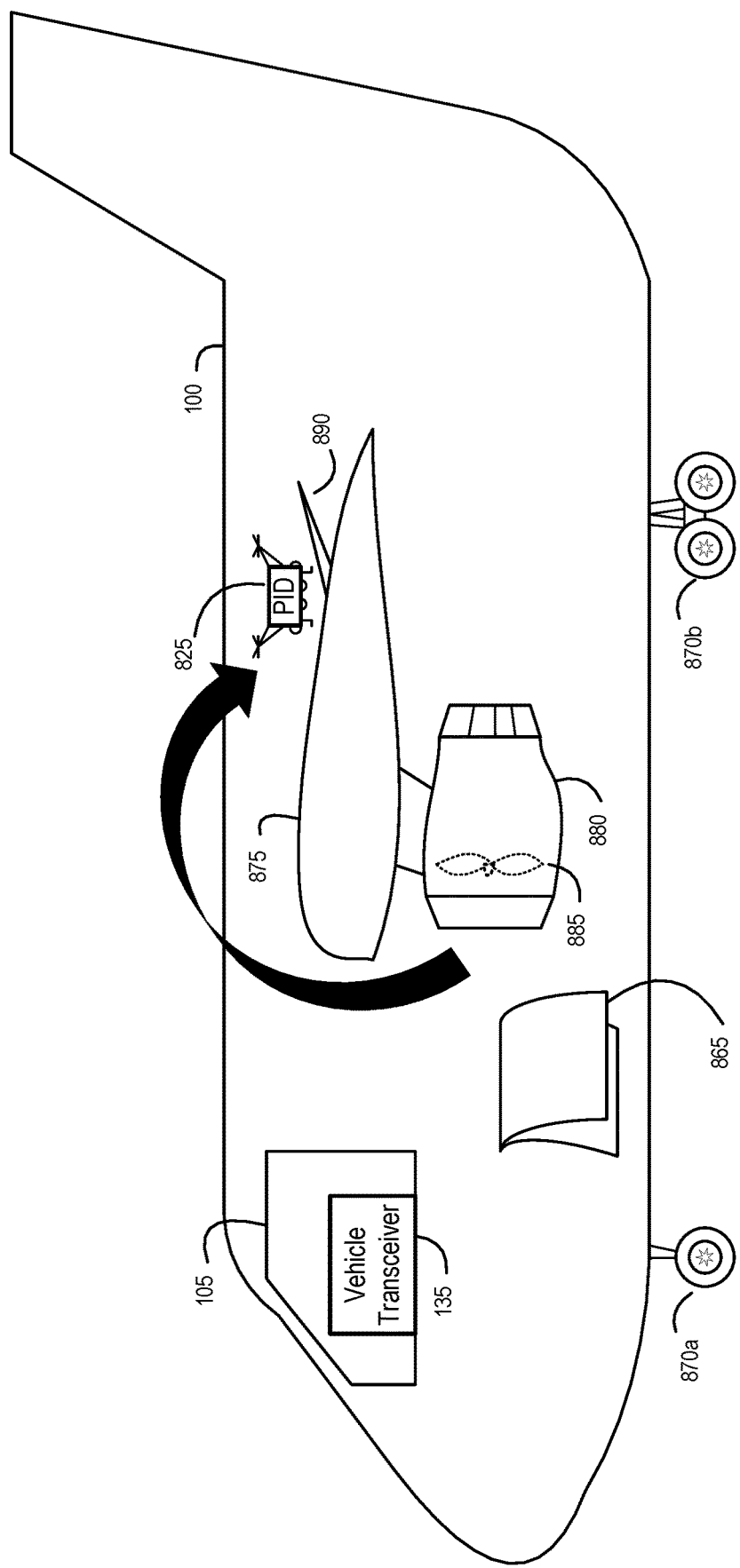

In like manner, as shown in FIG. 8E, PID 825 may move to an aerial position above wing 875 and proximate the control surface aileron 890. From this further aerial position, PID 825 may detect sensor-based inspection information about the control surface 890 (e.g., its rivets, seams, joints, actuating structure, range of motion, etc.) to automatically identify an out of range inspection condition about the control surface 890 as a targeted inspection point (and transmit a related inspection notification message to vehicle transceiver 135 if such a condition is automatically identified). In an embodiment where range of motion action for control surface 890 is to be inspected, PID 825 may directly or indirectly communicate with vehicle transceiver 135 to request actuated movement of the control surface being inspected as part of the inspection and while PID 825 is in the aerial position above wing 875 and proximate the control surface aileron 890. The vehicle transceiver 135 may then request human actuation of aircraft controls to responsively cause the control surface to move (e.g., via messaging to flight personnel, display of a message on a transceiver display, or the like), or may responsively interface with the aircraft's avionics system to electronically cause the control surface to move without human intervention.

Figure 8F:
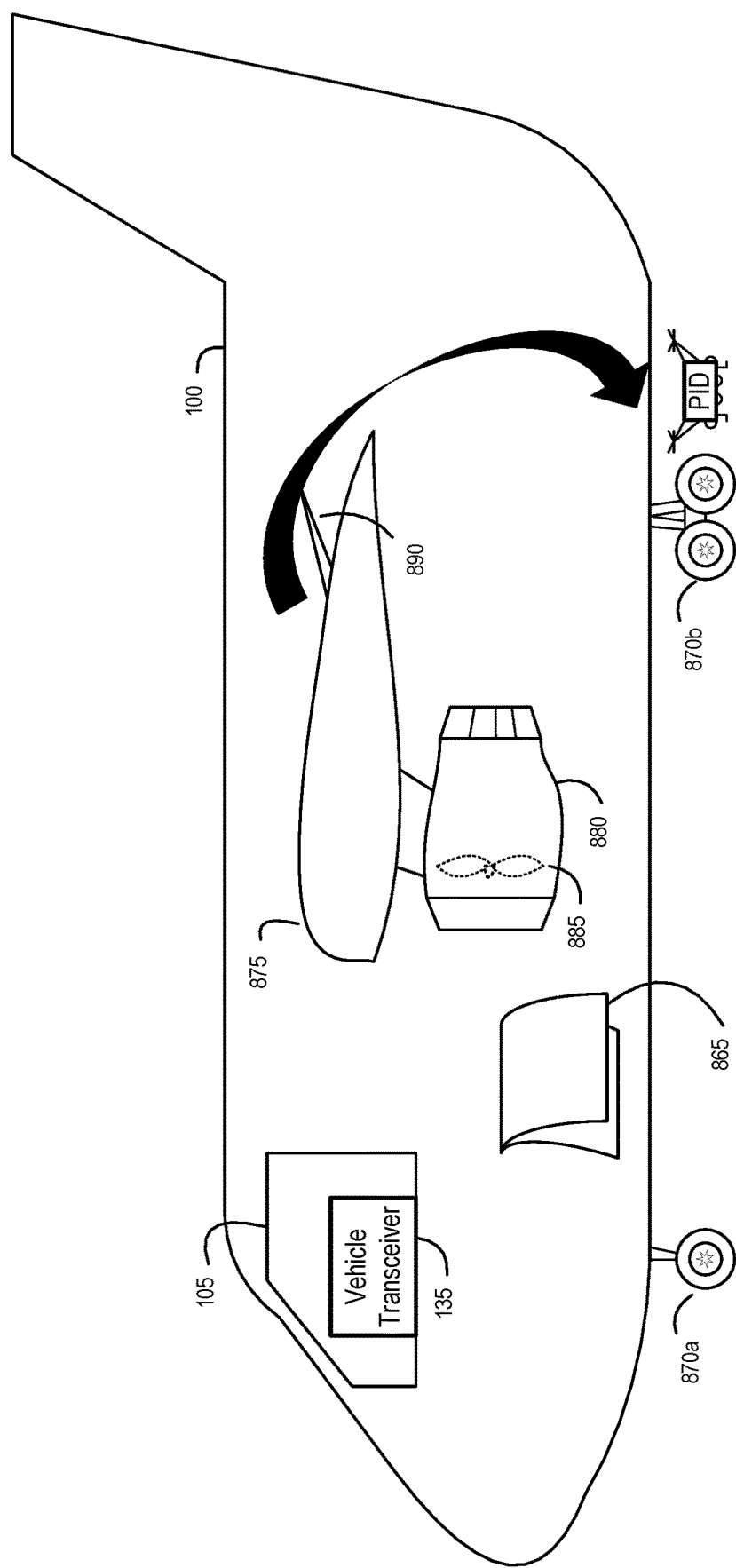
Figure 8G:
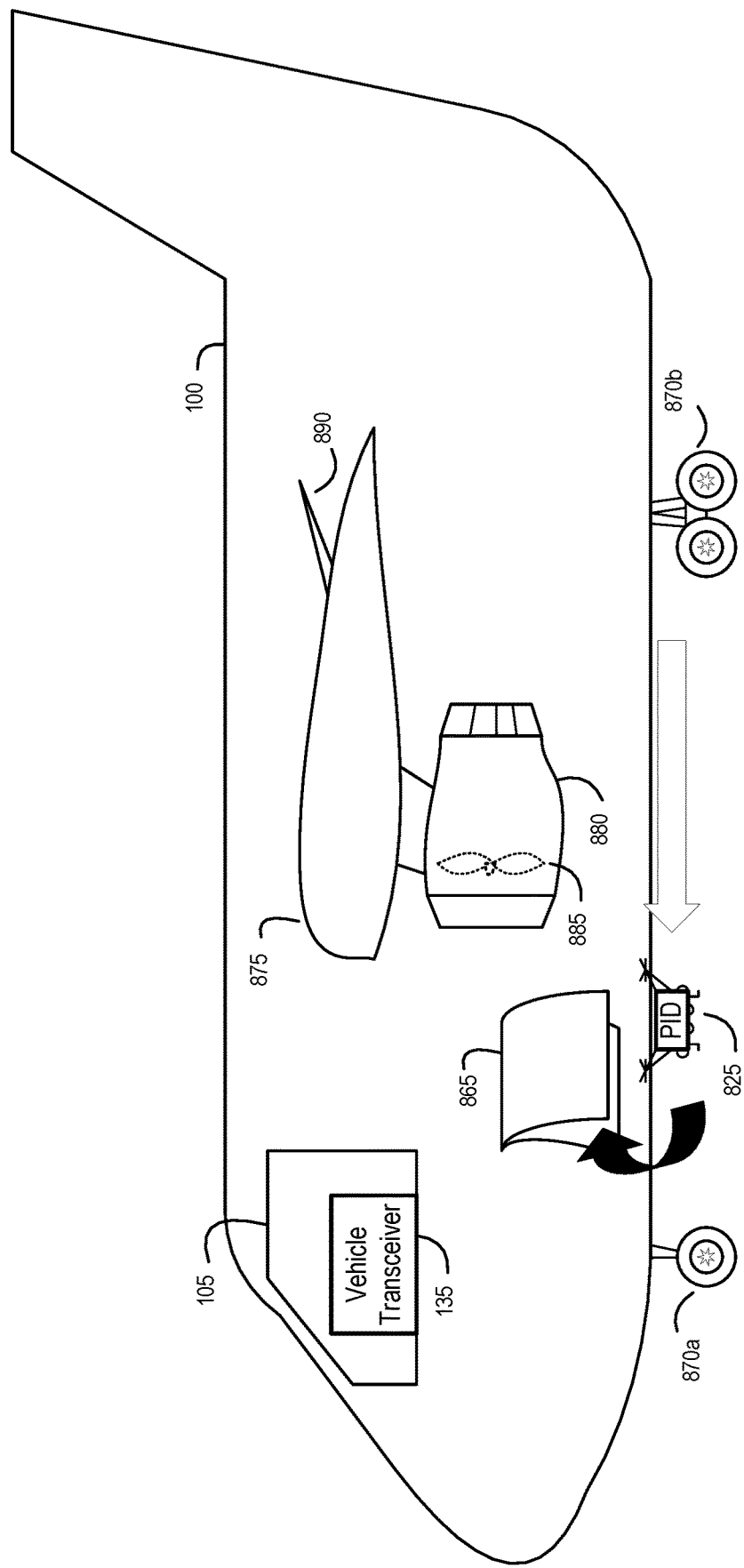

PID 825 may also inspect targeted inspection points below aircraft 100, such as landing gear 870a, 870b shown in FIGS. 8C-8G. For example, as shown in FIG. 8F, PID 825 may move to an aerial position below aircraft 100 and proximate rear landing gear 870b. From this position, PID 825 may use its sensor array to detect sensor-based inspection information about the rear landing gear 870b (e.g., its tires, suspension, actuating structure, landing gear doors, etc.) to automatically identify an out of range inspection condition about the landing gear 870b as a targeted inspection point. And if there is an out of range inspection condition identified, PID 825 may transmit a related inspection notification message to vehicle transceiver 135. From there, PID 825 may re-enter aircraft 100 through entry hatch 865 and may either continue moving to other positions near further targeted inspection points or return to land on docking station 830 within drone storage area 815.

As part of automatically identifying inspection conditions, exemplary PID 825 may be implemented with connected electronic and sensory components as shown in FIG. 9. Referring now to FIG. 9, exemplary PID 825 includes similar components shown and explained with reference to FIGS. 2 and 3 for exemplary internal monitor drone 125. Beyond those similar components, exemplary PID 825 includes an onboard controller (OBC) 900, which is similar to OBC 300. Like OBC 300, OBC 900 uses one or more processors at its core along with memory 315 (e.g., volatile, non-volatile, or both depending on the configuration of the OBC 900). And like OBC 300, OBC 900 interfaces or connects with motor control circuitry (such as electronic speed controllers 360a, 360b), guidance related circuitry (such as global positioning system (GPS) chip 350, inertial measurement unit (IMU) 355, and proximity sensors 215a, 215b), dedicated docking circuitry (such as drone capture interface 370 and the electronic docking connection 235), communication related circuitry (such as communication interface 365), payload electronics (such as the onboard sensor array 230), and an onboard power source that provides power for all of the onboard active electronics (such as onboard battery 385). An embodiment of OBC 900 may interface or connect with such circuitry by deploying various onboard peripherals (e.g., timer circuitry, USB, USART, general-purpose I/O pins, IR interface circuitry, DMA circuitry, buffers, registers, and the like) that implement interfaces (e.g., a plug type or connectorized interface) to the different components disposed within PID 825 (e.g., mounted on different parts of airframe 200).

As part of the exemplary PID 825, the OBC 900 generally controls autonomous flying and docking of the drone 825 as well as data gathering tasks related to different targeted inspection points using sensory array 230. In some embodiments, OBC 900 may be implemented with a single processor, multi-core processor, or multiple processors and have different programs concurrently running to manage and control the different autonomous flying/docking and sensor-based inspection information detecting tasks. For example, in the embodiment shown in FIG. 9, flight/docking control and inspection data gathering/assessment operations may be divided between an onboard flight controller (OFC) 305 and an onboard inspection processor (OIP) 910, respectively. In such an embodiment, OFC 305 and OIP 910 may have access to the same memory, such as memory storage 315 or, alternatively, OBC 900 may be implemented with separate dedicated memories that are accessible by each of OFC 305 and OIP 910. Those skilled in the art will appreciate that memory accessible by OFC 305 in an embodiment may have different accessibility and size requirements compared to memory accessible by OIP 910 given the different memory demands for the different responsibilities. For example, memory accessible by OIP 910 may be significantly large given the anticipated size of sensor-based inspection information gathered through sensory array 230 (e.g., imagery, video, depth mappings, etc.) when compared to the size of memory needed for tasks performed by OFC 305. As will be explained further, each of OFC 305 and OIP 910 may include peripheral interface circuitry that couples the processing element(s) to the different onboard peripheral circuitry, such as the GPS 350, inertial measurement unit 355, the communication interface 365, the electronic speed controllers 360*a*, 360*b* that control each lifting engine 210*a*, 210*b*, and the like.

In more detail, exemplary OIP 910 may be implemented with a low power microprocessor or processor-based microcontroller that is tasked/programmed to gather or receive sensor-based inspection information from the sensory array 230 and automatically identify an out of range inspection condition about a targeted inspection point based upon the sensor-based inspection information detected from an aerial position proximate the targeted inspection point. The out of range inspection condition generally indicates the detected sensor-based inspection information is outside an acceptable range for safe or desired operation of the delivery vehicle relative to that particular targeted inspection point. As such, OIP 910 may be deployed in an embodiment of PID 825 as a task-dedicated processor that executes operational and application program code (e.g., operating system 320, delivery vehicle inspection program 925) and other program modules maintained in memory 315 useful in aerially inspecting different targeted inspection points within and on its paired aircraft 100 in accordance with embodiments of the invention.

More specifically, operating system 320 may be loaded by OIP 910 upon power up and provide basic functions, such as program task scheduling, executing of application program code (such as exemplary inspection program 925), and controlling lower level circuitry (e.g., registers, buffers, buses, counters, timers, and the like) on OIP 310 that interface with other peripheral circuitry onboard PID 825 (such as the sensory array 230, proximity sensors 215*a*, 215*b*, the electronic docking connection 235, GPS 350, IMU 355, ESC 360*a*, 360*b*, communication interface 365, and DCI 370).

Once operating system 320 is loaded, inspection program code 925 may be loaded and execute as part of implementing an aerial drone-based method for inspecting a delivery vehicle, such as aircraft 100. Exemplary inspection program code 925 is a set of executable instructions in the form of one or more machine-readable, non-transient program code modules or applications. The program code module(s) may be loaded and executed by OBC 900 (or by OIP 910 when flight control is dedicated to a separate OFC 305) to adapt the PID 825 into an unconventionally configured aerial inspection apparatus exclusively paired to the aircraft as a linked part of the aircraft that travels with the aircraft during shipment operations providing quick and assured inspection functionality for the aircraft wherever the aircraft is located. This specially configured OBC 900 of PID 825, as described in more detail herein as a part of an embodiment, implements operative process steps and provides functionality that is unconventional, especially when the overall inspection process steps performed by the PID 825 are considered collectively as a whole. Such a specially adapted and configured paired inspection drone 825 helps, as a part of an embodiment, to improve the speed and robust nature of inspection operations for parts of the related delivery vehicle—both for designated inspection areas within the delivery vehicle, outside the delivery vehicle, and areas aerially accessible from above the delivery vehicle but that are not visible from a ground level perspective relative to the delivery vehicle.

During operation, the OBC 900 (or at least the OIP 910) may access and/or generate data maintained within memory 315, such as sensory data 930, flight profile data 935, messaging data 940, and an inspection profile record 945. In general, sensory data 930 comprises sensor-based inspection information gathered by different sensors (described above) deployed as part of the sensory array 230 and may take different forms depending on the type of sensor used and the type of information gathered (e.g., numeric measurements of temperature, images, video, depth sensing measurements, etc.). For example, the different sensors that may be used on the sensory array 230 of PID 825 may include an image sensor (e.g., a visual imaging sensor, an infrared (IR) imaging sensor, and/or a thermal imaging sensor), a temperature sensor, and/or a depth sensor (e.g., a LIIDAR sensor and/or an ultrasonic transducer). The sensor-based inspection information detected making up sensory data 930 may be generated by one of these sensors on sensor array 230 or by multiple sensors on the sensory array 230 depending on the type of inspection desired for a particular inspection point.

Flight profile data 935 comprises information that defines how the PID 825 is to be flying. This data 935 may include navigational data on an airborne inspection path for the PID 825 to transit that includes an aerial position proximate each of the respective targeted inspection points for this aircraft 100, as well as flight control setting information to use when generating flight control input for the ESCs 360*a*, 360*b* when moving relative to these aerial positions.

Messaging data 940 is generally a type of data used when the paired inspection drone generates and/or transmits a notification or other type of message related to the condition of one or more of the targeted inspection points on aircraft 100. Such messaging data 940 may include information on messages received or generated onboard to be sent outside PID 825.

Inspection profile record 945 maintains delivery vehicle dependent information accessed and used by inspection program 925. Inspection profile record 945 may be initially loaded into memory 315 or later updated via a download received by PID 825 and stored into memory 315 so as to provide inspection-related information specific to the particular delivery vehicle, such as aircraft 100. Inspection profile record 945 at least includes data indicating the different targeted inspection points corresponding to parts of the delivery vehicle to be inspected and an acceptable range of sensor-based inspection information for each of the targeted inspection points for operation of the delivery vehicle. Using the information in the inspection profile record 945 and the sensor-based inspection information gathered, the OIP 910 may automatically identify an unacceptable condition related to the one of the targeted inspection points (i.e., an out of range inspection condition), such as a missing condition, a loose condition, a damaged condition, a cracked condition, a worn condition, a leaking condition, and a thermal related condition.

In one embodiment, the inspection profile record 945 may also include prior sensor-based inspection information detected for one or more of the targeted inspection points.

The PID 825 may store such prior detected information as a benchmark or local reference condition. In this way, the OIP 910 may use relative measurements (in addition to or instead of absolute measurements) when comparing the sensor-based inspection information for one of the targeted inspection points to prior sensor-based inspection information detected for the same targeted inspection points as part of automatically identifying an inspection condition for that targeted inspection point.

In another embodiment, the targeted inspection points defined within the inspection profile record 945 may include a prioritized subset of the targeted inspection points designated for an enhanced level of sensor-based inspection. Such a subset may be designated in the inspection profile record as, for example, including parts of the delivery vehicle serviced within a threshold period of time and/or including parts of the delivery vehicle exceeding an age threshold. As noted above, the enhanced level of sensor-based inspection may involve more detail or scrutiny, such as using tighter ranges of tolerance for the applicable acceptable range of sensor-based inspection information gathered, spending more time doing the inspection compared to that for other areas, deploying a greater number of sensor types in order to conduct the inspection, and the like.

After PID 825 conducts an aerial inspection of relevant targeted inspection points of aircraft 100, the inspection profile record 945 maintained in the memory 315 may be updated by OIP 910 based upon the sensor-based inspection information gathered. As a result, the updated inspection profile record 945 may reflect an electronic catalog of aerial inspections relative to each of the targeted inspection points on the specific delivery vehicle. Such a catalog may be referenced and used by OIP 910 to identify a condition trend for particular targeted inspection points that may not yet outside the acceptable range, but may be increasingly approaching the out of range or unacceptable inspection condition to warrant issuing a relevant inspection notification message. Furthermore, the updated inspection profile record 945 (which may include trend information on particular targeted inspection points) may be transmitted by OIP 910 to other devices outside of the PID 825, such as a vehicle transceiver 135 or maintenance related receivers operated by maintenance personnel responsible for the delivery vehicle—i.e., aircraft 100.

Those skilled in the art will appreciate that the above identification of particular inspection program code 925 and related data 930-945 used by such code 925 are not exhaustive and that embodiments may include further executable program code or modules as well as other data relevant to operations of a specially programmed processing-based paired inspection drone 825. Furthermore, those skilled in the art will appreciate that not all data elements illustrated in FIG. 9 as being within memory 315 must appear in memory 315 at the same time.

As discussed above relative to FIG. 3, OFC 305 (as part of OBC 900) is a flight controller capable of autonomous flying of drone 825. In other words, OFC 305 (as part of OBC 900) may generate the flight control input autonomously to enable the PID 825 to self-control aerial movements of the PID 825 from the secured position on the internal docking station 830 to respective aerial positions proximate each of the targeted inspection points identified in inspection profile record 945. Such autonomous flying may involve automatic take off, transiting an airborne monitoring path (e.g., via waypoint flying), and data communication or telemetry while airborne and while secured to the docking station 830. In more detail, an embodiment of OFC 305 (as part of OBC 900) includes peripheral interface circuitry (not shown in FIG. 9, but those skilled in the art will appreciate that it may be implemented with buffers, registers, buses, and other communication and command pathways) for interacting with guidance related circuitry, motor control circuitry, dedicated docking circuitry, and communication circuitry onboard the PID 825 as part of controlling movement and flight stability of drone 825 while navigating and avoiding collisions during movement.

Like that of OBC 300, OBC 900 (as well as OFC 305 and/or OIP 910) may be implemented with a low power embedded processor as part of a single-board computer having a system-on-chip (SoC) device operating at its core. In such an embodiment, the SoC device may include different types of memory (e.g., a removable memory card slot, such as a Secure Digital (SD) card slot, as removable memory; flash memory operating as onboard non-volatile memory storage; and RAM memory operating as onboard volatile memory); an operating system (such as Linux) stored on the non-volatile memory storage and running in volatile RAM memory; and peripherals that may implement any of the GPS 350, IMU 355, ESC 360a, 360b, communication interface 365, DCI 370, wired data interface 375 and charging interface 380.

Figure 10:
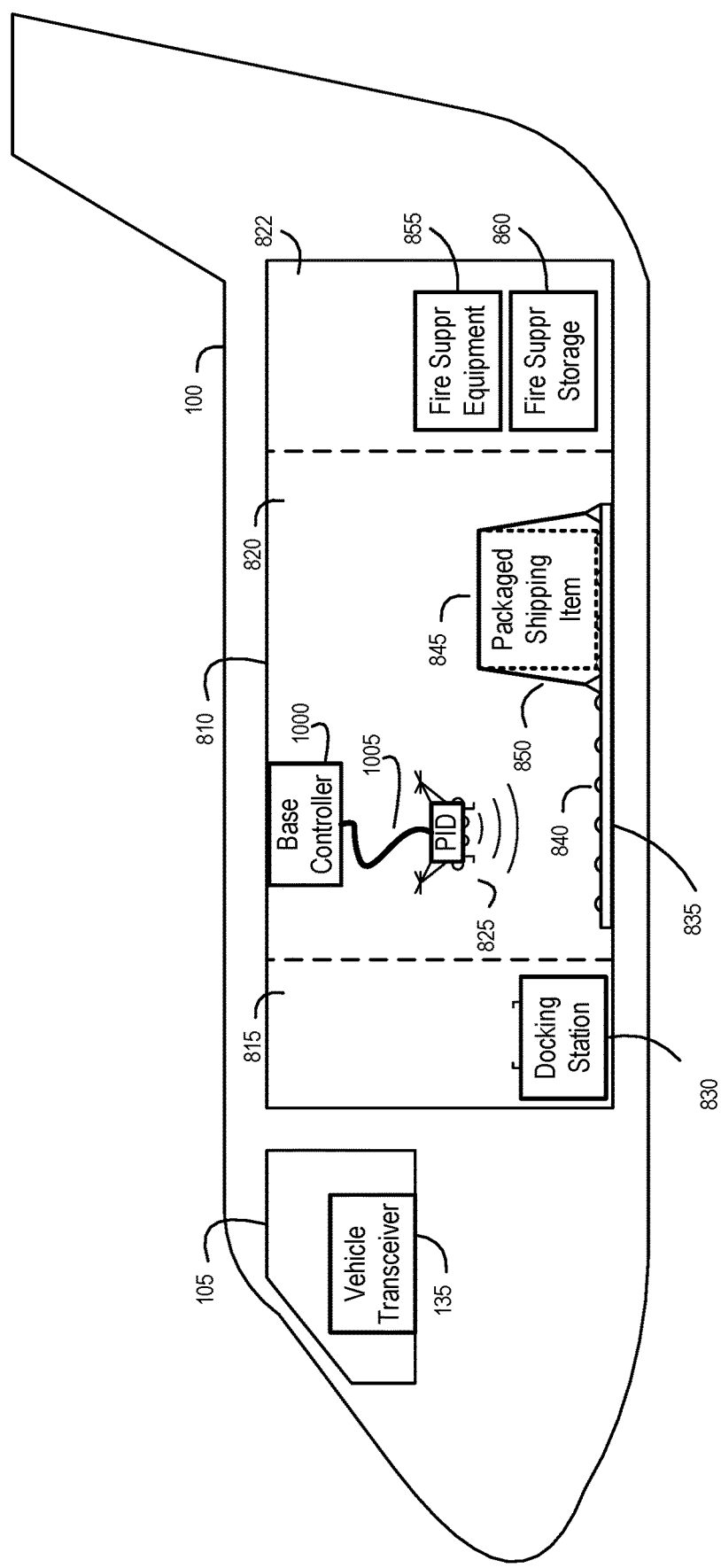
FIG. 10 is a diagram illustrating an exemplary paired inspection drone coupled to an exemplary control tether in accordance with an embodiment of the invention.

In some embodiments, the PID 825 may be coupled to a base controller on the delivery vehicle via a type of control tether. For example, FIG. 10 illustrates an embodiment where exemplary PID 825 is coupled to an exemplary base controller 1000 with an exemplary control tether 1005 in accordance with an embodiment of the invention. In particular, the base controller 1000 shown in FIG. 10 fixed to aircraft 100 and providing at least data (e.g., flight commands) and, in some embodiments, power to the PID 825 through the control tether 1005 (e.g., an electric and/or fiber optic conduit between PID 825 and base controller 1000). As such, the PID 825 shown in the embodiment of FIG. 10 may also include a control receiver coupled to the OBC 900 of PID 825 (or implemented as part of OFC 305) where the control receiver has an input connected to tether 1005. Such a control receiver (e.g., a receiver interface for OFC 305 operating as the PID's control receiver) receives the flight command from the base controller 1000, and passes the received flight command to the onboard controller (e.g., to the OFC 305), which then generates the appropriate flight control input for the lifting engines 210a, 210b based upon the received flight command. With such a control tether 1005, PID 825 is more limited in its flight range, and has its flight to the different aerial positions proximate targeted inspection points controlled in a non-autonomous way via the control tether 1005 and base controller 1000.

In a further embodiment involving flight operations of PID 825 controlled by base controller 1000, the OFC 305 of PID 825 may be configured and operative to self-generate landing control input for the lifting engines 210a, 210b (via signals provided to ESC 360a, 360b) if the control tether 1005 breaks. In such a situation, the landing control input provided by OFC 305 helps to safely return PID 825 to the internal docking station 830 and secure the DCI 370 of PID 825 to the physical docking interface of the internal docking station 830.

Figure 11:
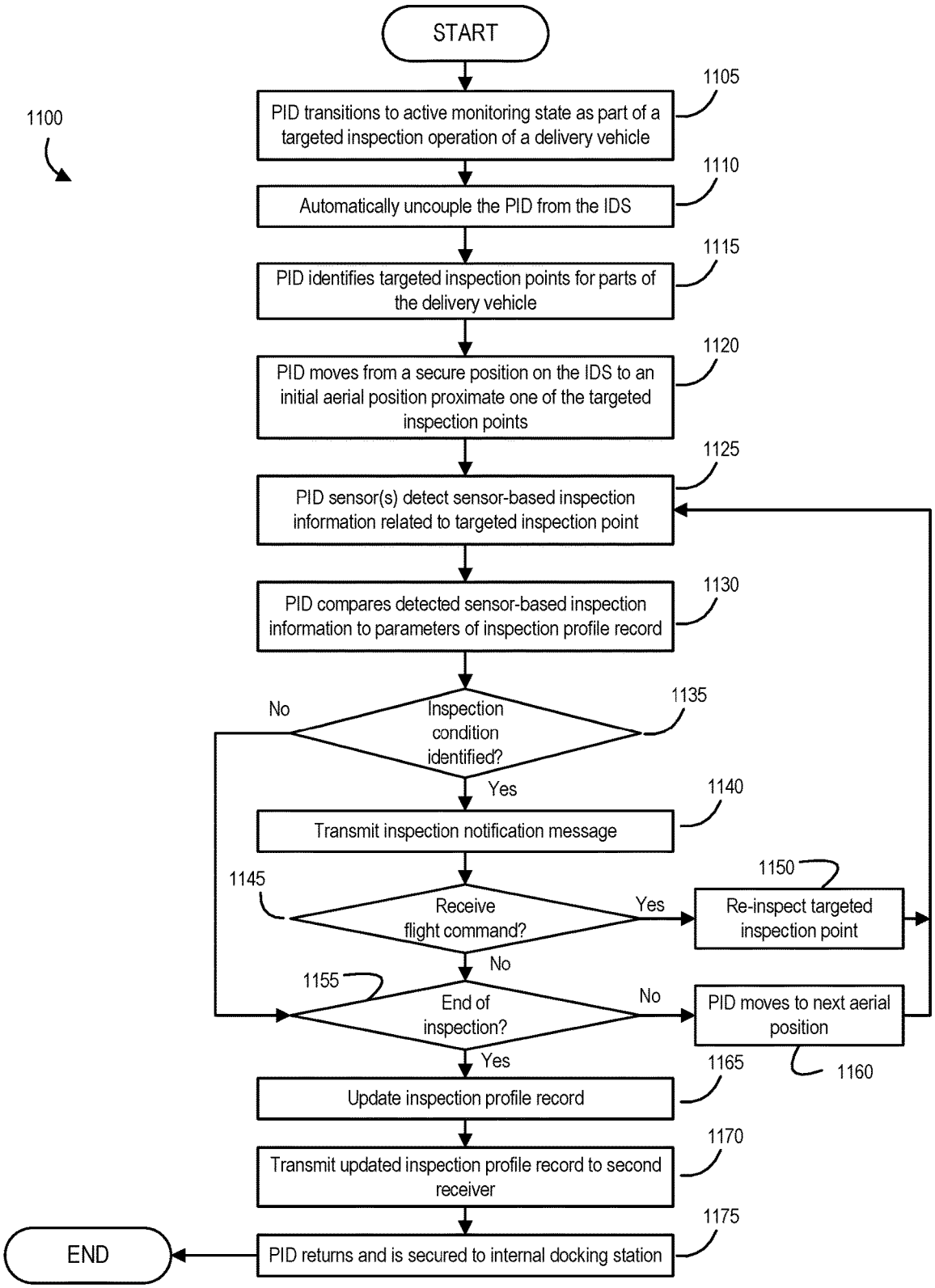
FIG. 11 is a flow diagram illustrating an exemplary drone-based method for inspecting a delivery vehicle in accordance with an embodiment of the invention.

From a process perspective of inspecting a delivery vehicle, an embodiment of a drone-based method for inspecting the delivery vehicle, such as aircraft 100, involves operations of an exclusively paired inspection drone, such as PID 825. FIG. 11 is a flow diagram illustrating such an exemplary drone-based method for inspecting a delivery vehicle in accordance with an embodiment of the invention. Referring now to FIG. 11, method 1100 begins at step 1105 with the paired inspection done (PID) transitioning from at least a low power state to an active power state as part of a targeted inspection operation of the delivery vehicle. The PID may transition from an unpowered state or, alternatively, transition from a low power state such as a sleep mode that conserves power and does not have the full complement of onboard circuitry powered up for normal airborne operations. As explained above with respect to exemplary PID 825, the PID is exclusively assigned to the delivery vehicle (e.g., an aircraft (such as aircraft 100), a delivery van, a truck coupled with a cargo hauling trailer, or a marine vessel) and travels with the delivery vehicle during a delivery vehicle based shipment operation. Such an operation may be one where the delivery vehicle ships one or more items from a first location to a second location while those items are maintained within a cargo storage area of the delivery vehicle. Thus, the PID is an extension of the delivery vehicle given this linked relationship and physical coupling between the PID and its assigned delivery vehicle.

At step 1110, method 1100 continues by automatically uncoupling the PID from a secured position on an internal docking station fixed within the delivery vehicle (e.g., within an accessible cargo storage compartment of an aircraft) once the paired inspection drone transitions to the active power state. For example, as shown in FIG. 8A, PID 825 may be automatically uncoupled from internal docking station 830. This may involve actuating a drone capture interface (and articulating landing gear) on PID 825 to release PID 825 from stationary structure on docking station 830, actuating a physical docking interface on docking station 830 to release PID 825 using movable securing clamps on the docking station 830, or actuating movable structure on both the PID 825 and the docking station 830 to release PID 825 from its secured position on docking station 830. In a further embodiment, step 1110 may also involve opening at least one access door (not shown) to the accessible storage compartment where the access door may separate a drone storage area from the accessible storage compartment. In still another embodiment, step 1110 may also involve opening a closable entry door or hatch (such as hatch 865) that allows the PID to move outside of the delivery vehicle to conduct aerial inspections of certain targeted inspection points for the delivery vehicle.

At step 1115, method 1100 proceeds with an onboard processor on the PID identifying targeted inspection points corresponding to respective parts of the delivery vehicle. This step may involve downloading an inspection profile record for the delivery vehicle into a memory of the PID, where the inspection profile record (such as record 945 as explained with respect to FIG. 9) identifies designated inspection areas specific to the delivery vehicle as the targeted inspection points. Alternatively, this step may have the PID simply accessing an existing inspection profile record in the PID's memory. As explained above, such targeted inspection points may be designated inspection areas specific to inside of the vehicle (e.g., an accessible cargo storage area within an aircraft, a cargo attachment point, a cargo handling point, an onboard safety system area for equipment and material used for fire extinguishing and suppression, an onboard areas for hazardous material storage, and the like). Further, such targeted inspection points may be designated areas externally exposed on the delivery vehicle (e.g., a designated inspection area aerially accessible from above the delivery vehicle but that is not visible from a ground level perspective relative to the delivery vehicle, one or more aircraft components of an aircraft type of delivery vehicle (such as a panel, a rivet, a seam, an engine, a flight control surface, a window seal, a closable entry to within the aircraft, aircraft lighting, an antenna, landing gear, and tires), and the like).

In a further embodiment of method 1100, one or more of the identified targeted inspection points for the delivery vehicle may be identified as a prioritized subset of the targeted inspection points. As explained above, such a prioritized subset is automatically designated for an enhanced level of sensor-based inspection as part of detecting the sensor-based inspection information for the prioritized group of the targeted inspection points. For example, an exemplary prioritized subset of the delivery vehicle's targeted inspection points may include certain parts of the delivery vehicle not serviced within a threshold period of time or certain parts of the delivery vehicle exceeding an age threshold. Thus, if landing gear 870b as shown in FIG. 8F has not been serviced within a designated maintenance period of time, the inspection conducted by PID 825 as shown in FIG. 8F may be an enhanced level of inspection because landing gear 870b is identified as within such a prioritized subset of targeted inspection points for aircraft 100. An enhanced level of inspection for a targeted inspection point identified as one of the prioritized subset may occur over an enhanced inspection period of time (compared to the time taken by the PID to detect sensor-based inspection information for those not in the prioritized group of the targeted inspection points), may involve multiple sensors on the PID (for a more robust type of inspection—imagery, temperature, IR, etc.).

At step 1120, method 1100 proceeds with aerially moving the PID from the secured position on the internal docking station fixed within the delivery vehicle to an aerial position proximate one of the targeted inspection points. This may be a position within the delivery vehicle (such as that shown in FIG. 8B proximate roller 840 inside aircraft 100) or a position outside the delivery vehicle (such as that shown in FIG. 8D proximate air intake fan 885 of engine 880 outside of aircraft 100). If the position is outside the delivery vehicle, step 1120 may involve causing a closeable entry access hatch, door, or panel to open so that the PID may move from inside the delivery vehicle's docking station to the aerial position proximate one of the targeted inspection points outside the delivery vehicle.

At step 1125, method 1100 has the PID detecting and gathering sensor-based inspection information related to the targeted inspection point. Specifically, this involves having at least one sensor on the PID detecting the sensor-based inspection information once the PID has aerially moved to the aerial position proximate one of the targeted inspection points. The sensor(s) used to detect such sensor-based inspection information may be identified by information in the PID's inspection profile record (e.g., inspection profile record 945 of exemplary PID 825 shown in FIG. 9). For example, the PID's sensor array may include an image sensor (e.g., a visual imaging sensor, an infrared (IR) imaging sensor, and a thermal imaging sensor) used to capture one or more images relative to a targeted inspection point; a temperature sensor used to measure a temperature relative to a targeted inspection point; or a depth sensor (e.g., a LIDAR sensor, a radar sensor, an ultrasonic transducer) used to surface map a targeted inspection point.

At step 1130, method 1100 has the onboard processor of the PID (e.g., OIP 910) compare the detected sensor-based inspection information gathered at step 1125 to information (e.g., reference parameters) maintained as part of the PID's inspection profile record. Such a comparison is part of automatically finding differences between the anticipated condition of the targeted inspection point and the actual condition of the targeted inspection point and quantifying those differences. In one embodiment, the reference information or parameters may be prior sensor-based inspection information for this targeted inspection point. In another embodiment, the reference information or parameters may be measurement or sensor based ranges for the targeted inspection point that corresponds with acceptable operation of that part of the delivery vehicle. In a further embodiment, such reference information or parameters may include both prior sensor-based inspection information for this targeted inspection point and sensor data ranges that may be used in the comparison. In other words, the comparison at step 1130 may involve a more simplistic comparison of sensor information detected to a limit or range, but may also involve multiple comparisons of different types of detected sensor information to various types of reference information.

At step 1135, method 1100 automatically identifies an inspection condition related to the targeted inspection point based upon the results of the comparison in step 1130. In other words, the processing of the currently gathered sensor-based inspection information for this targeted inspection point may yield a result that the targeted inspection point is now outside an acceptable range for operation of the delivery vehicle. In more detail, this may be due to the comparison indicating the current state of the targeted inspection point is different enough from prior sensor-based inspection information gathered on the same point so that the result indicates an inspection condition for the point. Such an inspection condition may indicate the targeted inspection point is in an unacceptable condition for proper operation of the inspection point itself and/or proper operation of the delivery vehicle. For example, the unacceptable condition related to the targeted inspection point may be a missing condition, a loose condition, a damaged condition, a cracked condition, a worn condition, a leaking condition, and a thermal related condition. Thus, if step 1135 fails to automatically identify an inspection condition for the targeted inspection point, step 1135 proceeds directly to step 1155. However, if step 1135 does automatically identify an inspection condition based upon the sensor-based inspection information detected (e.g., the comparison of such sensor-based inspection information to reference information for the targeted inspection point), step 1135 proceeds to step 1140.

At step 1140, the PID responsively transmits an inspection notification message to a delivery vehicle receiver disposed on the delivery vehicle (such as vehicle transceiver 135). The inspection notification message is a type of feedback for a paired inspection drone-based system associated with the delivery vehicle (or including the delivery vehicle). As such, the delivery vehicle receiver is able to alert personnel associated with the delivery vehicle. In more detail, an embodiment may have step 1140 also (or alternatively) transmit the inspection notification message to a mobile interactive transceiver operated by vehicle crew personnel for the delivery vehicle to notify the vehicle crew personnel that operate the delivery vehicle (e.g., a flight engineer that uses a ruggedized tablet as a type of mobile interactive transceiver and can view the inspection notification message as well as relevant sensor-based inspection information about the related targeted inspection point). Likewise, an embodiment may have step 1140 also (or alternatively) transmit the inspection notification message to a maintenance receiver operated by maintenance personnel for the delivery vehicle to notify the maintenance personnel that service the delivery vehicle (e.g., an aircraft mechanic that uses a ruggedized tablet as a type of maintenance receiver and can view the inspection notification message as well as relevant sensor-based inspection information about the related targeted inspection point).

At step 1145, an embodiment of method 1100 may have the PID receive a flight command in response to the transmitted inspection notification message. Such a flight command may be received so as to effectively redirect aerial movement of the PID from moving to another of the targeted inspection points and, instead, head back to the prior targeted inspection point for re-inspection of that targeted inspection point. Such a flight command may be sent to the PID from, for example, a delivery vehicle transceiver, a mobile interactive transceiver, or a maintenance receiver—i.e., any of those radio-based devices that received the transmitted inspection notification message. Thus, if the PID did not receive a flight command in step 1145, method 1100 proceeds directly to step 1155. Otherwise, step 1145 continued to step 1150 where the PID prepares to re-inspect the targeted inspection point. In other words, at step 1150, the PID has received a flight command and the PID re-assesses the reference information about the targeted inspection point in order to prepare to re-inspect the targeted inspection point. In this step, re-assessing the reference information may have the PID using further information from the inspection profile record and/or information provided in or with the flight command relevant to an enhanced level of inspection so that the PID can proceed back to step 1125 from step 1150 to conduct the re-inspection. Such an enhanced level may gather further detailed sensor-based inspection information that than performed previously, such as more images, more views or gathering images from different perspectives relative to the targeted inspection point. Thus, method 1100 continues back to step 1125 from step 1150 for the re-inspection of the targeted inspection point.

However, if no flight command was received in step 1145, method 1100 continued at step 1155 to determine if the PID is at the end of an inspection associated with each of the targeted inspection points for the delivery vehicle. If not, then step 1155 proceeds to step 1160 where the PID moves to the next aerial position proximate another of the targeted inspection points and then continues back to step 1125. Otherwise, the PID is at the end of the inspection and method 1100 continued from step 1155 to step 1165.

At step 1165, method 1100 may proceed with the onboard processor of the PID updating the inspection profile record stored in a memory of the PID based upon the sensor-based inspection information provided by the sensor to the onboard processor (i.e., the sensor-based inspection information detected at step 1125. In a more detailed embodiment, the updated inspection profile record may reflect an electronic catalog of aerial inspections relative to each of the targeted inspection points on the delivery vehicle. This type of catalog may, thus, provide a part-by-part inspection history with which to identify trends and pre-failure conditions as types of inspection conditions to automatically identify as part of step 1135. In some embodiments, this update step may be performed as part of another embodiment of method 1100 after the inspections for all of the delivery vehicle's targeted inspection points have been conducted. However, in other embodiment, this update step may be implemented incrementally after the sensor-based inspection information is detected for anything less than all of the delivery vehicle's targeted inspection points. For example, the PID may update the inspection profile record in its memory based upon the sensor-based inspection information gathered after inspecting different subsets of the targeted inspection points or after inspecting each of the targeted inspection points for the delivery vehicle.

At step 1170, method 1100 may proceed with the PID transmitting the updated inspection profile record to a second radio-based receiver, such as a maintenance receiver separate from the delivery vehicle, to the delivery vehicle receiver, and/or to a mobile interactive transceiver operated by vehicle crew personnel for the delivery vehicle. Similar to that described above related to step 1165, in some embodiments, step 1170 may be performed as part of a further embodiment of method 1100 after all inspections for the delivery vehicle's targeted inspection points have been conducted. However, in other embodiment, this update step may be implemented incrementally after the sensor-based inspection information is detected relative to each of the delivery vehicle's targeted inspection points.

At step 1175, method 1100 has the PID returning to the internal docking station to land and be secured relative to the docking station, such as when PID 825 lands on internal docking station 830 and PID 825 transitions to a secured position on docking station 830. In a further embodiment, the PID may return to the internal docking station prior to the end of the delivery vehicle's inspection—e.g., while awaiting a flight command from another radio-based device used by personnel involved with the delivery vehicle, such as flight personnel or maintenance personnel.

Figure 12:
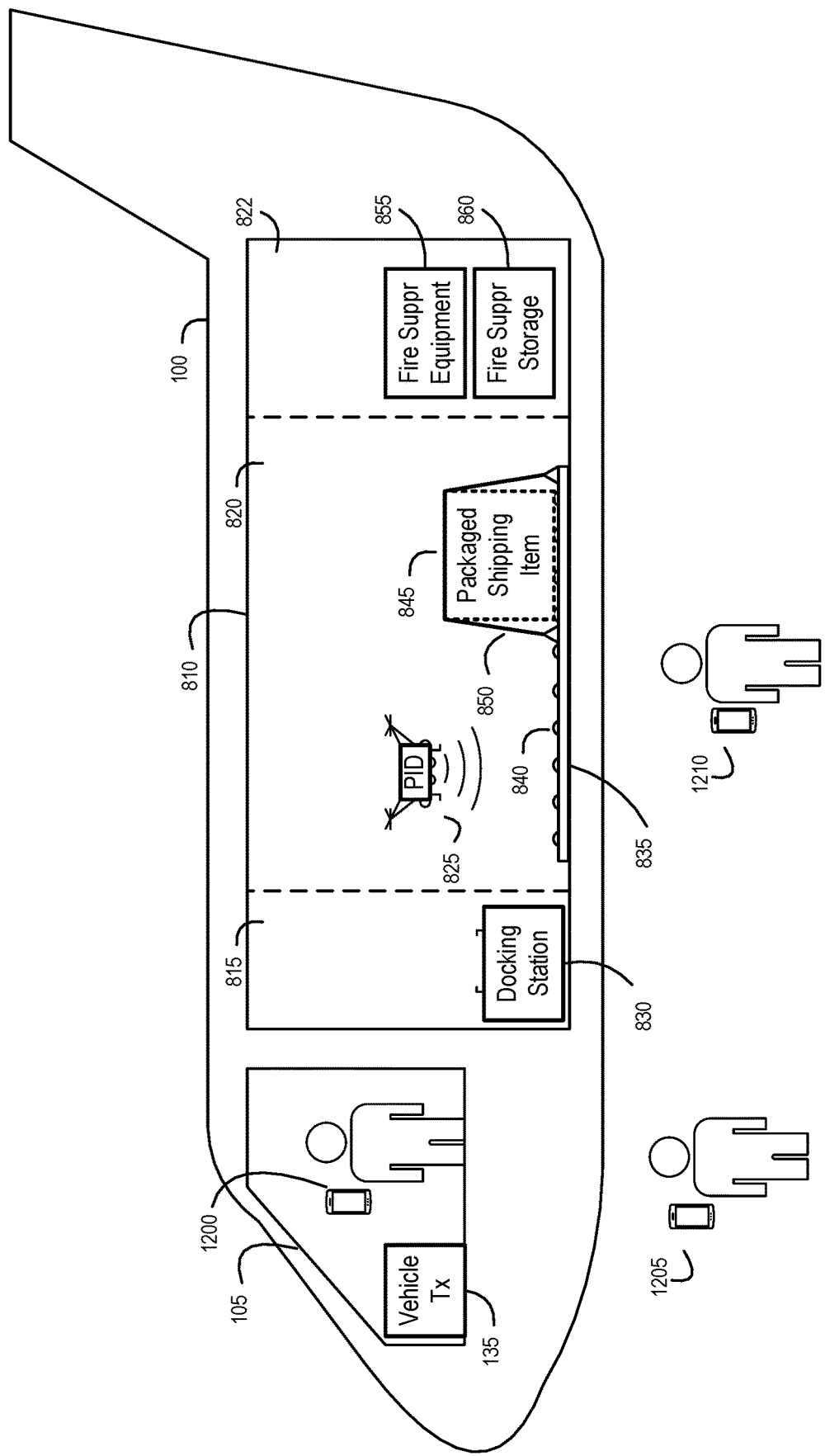
FIG. 12 is a diagram of an exemplary delivery vehicle inspection system that includes an aerial inspection drone paired to a delivery vehicle and exemplary mobile interactive transceivers operated by different personnel associated with the delivery vehicle in accordance with an embodiment of the invention.

FIG. 12 is a diagram of another embodiment that more explicitly shows additional radio-based devices that may interact with PID 825 as part of a more detailed drone-based system for inspecting aircraft 100 and that may implement embodiments of method 1100. Referring now to FIG. 12, exemplary aircraft 100 is shown as a type of delivery vehicle for transporting items (e.g., packaged shipping item 845) as part of a shipment operation. Similar to that shown in FIG. 8B, FIG. 12 shows exemplary PID 825 in an aerial position proximate a targeted inspection point (e.g., roller 840) within a cargo storage area 820 of aircraft 100. Exemplary PID 825, as described above, may transmit messages (e.g., an inspection notification message) to and receive messages/commands from a variety of radio-based devices, such as delivery vehicle transceiver 135 and radio-based transceivers 1200, 1205, and 1210.

As noted above, delivery vehicle transceiver 135 is a radio-based device that may be implemented as a standalone unit (e.g., a ruggedized radio-based tablet or smartphone used by aircraft crew personnel) or an integrated part of the aircraft's avionics suite disposed within the aircraft's operation control section 105 (e.g., a cockpit compartment from which flight personnel can control and fly the aircraft 100). In more detail, an embodiment of the vehicle transceiver 135 may be fixed within operation control section 105 and have at least a display, a control input interface, and a radio. As such, the delivery vehicle transceiver 135 may generate vehicle related information for presenting on the display (such as information related to any received inspection notification messages on a particular targeted inspection point), receive user input via the control input interface (such as a selective follow-up action (e.g., re-inspection at an enhanced level) to take relative to a targeted inspection point), and communicate with PID 825 over the radio (or communicate with any of radio-based transceivers 1200, 1205, and 1210 used by flight personnel responsible for operating the aircraft 100, maintenance personnel, or logistics personnel).

As shown in FIG. 12, radio-based transceivers 1200, 1205, and 1210 are exemplary types of mobile interactive transceivers that may communicate with at least the delivery vehicle transceiver 135 or each other. For example, radio-based transceiver 1200 is shown as an exemplary mobile interactive transceiver associated with and operated by an aircraft operator (e.g., pilot, co-pilot, flight engineer, cargo specialist, and the like) in compartment 105 that is responsible for controlling the aircraft 100. Exemplary radio-based transceiver 1200 may be implemented as a ruggedized radio-based tablet or smartphone used by aircraft crew personnel and carried with them while performing duties within aircraft 100.

Radio-based transceiver 1205 is shown as an exemplary maintenance transceiver separate from the aircraft 100 and the delivery vehicle transceiver 135 onboard aircraft 100. Radio-based transceiver 1205, as a maintenance transceiver, is operated by maintenance personnel (e.g., a mechanic) associated with servicing the aircraft 100. In some embodiments, delivery vehicle transceiver 135 (or flight personnel radio-based mobile interactive transceiver 1200) may forward information related to the inspection notification message to the maintenance transceiver 1205. This may occur automatically when the inspection notification message meets an automatically identifiable criteria (e.g., a relevant targeted inspection point associated with the inspection notification message is not found or is demonstrably damaged as indicated by the identified inspection condition). However, in other embodiments, the forwarding of information to the maintenance transceiver 1205 may occur based upon user input provided to the delivery vehicle transceiver 135 (or transceiver 1200), such as when flight personnel reviews the inspection notification message from an initial aerial inspection by PID 825 and provides user input to cause transceiver 135 (or transceiver 1200) to forward such information to maintenance transceiver 1205 as a type of maintenance request specific to the targeted inspection point at issue in the inspection notification message. Further still, other embodiments may forward information related to an inspection notification message after a re-inspection of the targeted inspection point of interest is performed. This may also occur based upon user input received by the delivery vehicle transceiver 135 (or transceiver 1200) or automatically based upon information related to the re-inspection. For example, delivery vehicle transceiver 135 (or transceiver 1200) may automatically forward a re-inspection related notification message to maintenance transceiver 1205 after flight personnel reviews another inspection notification message from a re-inspection performed by PID 825.

In further embodiments, the PID 825 may directly transmit the relevant inspection notification message to the maintenance transceiver and avoid the need to use the delivery vehicle transceiver 135 (or transceiver 1200) as an intermediary component in such an enhanced drone-based inspection system for aircraft 100.

Those skilled in the art will appreciate that the advantageous and unconventional integration of a maintenance transceiver as part of a paired inspection drone-based system for inspecting a delivery vehicle, such as aircraft 100, yields an improved and enhanced inspection system that reduces the inspection and related maintenance time it takes to keep the delivery vehicle operating as part of logistics operations.

Likewise, exemplary radio-based transceiver 1210 may be implemented as a ruggedized radio-based tablet or smartphone used by logistics personnel responsible for loading and unloading shipping items (such as item 845) within aircraft 100. Radio-based transceiver 1210 is shown as another mobile interactive logistics transceiver separate from the aircraft 100 and the delivery vehicle transceiver 135 onboard aircraft 100. As with transceiver 1205, in some embodiments, delivery vehicle transceiver 135 (or flight personnel radio-based mobile interactive transceiver 1200) may forward information related to the inspection notification message to the mobile logistics transceiver 1210. This may occur automatically when the inspection notification message meets an automatically identifiable criteria (e.g., a relevant targeted inspection point associated with the inspection notification message is not found or is demonstrably damaged as indicated by the identified inspection condition). However, in other embodiments, the forwarding of information to the mobile logistics transceiver 1210 may occur based upon user input provided to the delivery vehicle transceiver 135 (or transceiver 1200), such as when flight personnel reviews the inspection notification message from an initial aerial inspection by PID 825 and provides user input to cause transceiver 135 (or transceiver 1200) to forward such information to mobile logistics transceiver 1210 as a type of logistics request specific to the targeted inspection point at issue in the inspection notification message. This may, for example, inform logistics personnel responsible for loading/unloading the delivery vehicle of an issue with a cargo handling point that is missing or otherwise may be malfunctioning. Further still, other embodiments may forward information related to an inspection notification message after a re-inspection of the targeted inspection point of interest is performed. This may also occur based upon user input received by the delivery vehicle transceiver 135 (or transceiver 1200) or automatically based upon information related to the re-inspection. For example, delivery vehicle transceiver 135 (or transceiver 1200) may automatically forward a re-inspection related notification message to mobile logistics transceiver 1210 after flight personnel reviews another inspection notification message from a re-inspection performed by PID 825. In further embodiments, the PID 825 may directly transmit the relevant inspection notification message to the mobile logistics transceiver 1210 and avoid the need to involve the delivery vehicle transceiver 135 (or transceiver 1200) as an intermediary component in such an enhanced drone-based inspection system for aircraft 100.

With reference to the embodiment illustrated in FIG. 12 (and the earlier descriptions of embodiments that aerially inspect targeted inspection points on a delivery vehicle in FIGS. 8A-11), an exemplary enhanced drone-based inspection system may include the paired aerial inspection drone (e.g., PID 825), an internal docking station (e.g., station 830), a delivery vehicle transceiver (e.g., vehicle transceiver 135), and a mobile interactive transceiver (e.g., such as one or the radio-based transceivers 1200-1210). Some embodiments of this system may also include the delivery vehicle itself as part of the system—especially, as the paired inspection drone is essentially an exclusively assigned extension of the vehicle as a sensor-based monitor that travels with the delivery vehicle during shipment operations. Examples of such a relevant delivery vehicle may include an aircraft (such as aircraft 100), a delivery van, a truck coupled with a cargo hauling trailer, or a marine vessel.

Regarding operation of such a system, the system's paired aerial inspection drone in this embodiment automatically uncouples from the internal docking station at the beginning of a targeted inspection flight to inspect targeted inspection points of the delivery vehicle; automatically identifies an inspection condition about at least one of the targeted inspection points based upon sensor-based inspection information gathered related to at least one of the targeted inspection points (where such an inspection condition indicates a situation that is outside an acceptable range for operation of the delivery vehicle); and transmits an inspection notification message to the delivery vehicle transceiver upon identifying the inspection condition. In response, the system's delivery vehicle transceiver is configured to forward information related to the inspection notification message to the mobile interactive transceiver (e.g., where delivery vehicle transceiver 135 forwards information related an inspection notification message about roller 840 to mobile interactive transceiver 100 operated by flight personnel that control aircraft 100). In further response, the mobile interactive transceiver is configured to receive the information related to the inspection notification message from the delivery vehicle transceiver and display at least a portion of the forwarded information related to the inspection notification message to the delivery vehicle personnel associated with the delivery vehicle (e.g., a pilot, co-pilot, flight engineer, cargo specialist, or other flight personnel that control aspects of the operation of aircraft 100).

In a more detailed embodiment, the delivery vehicle transceiver may generate inspection notification information related to the inspection condition as vehicle related information for presenting on the display of the delivery vehicle transceiver. In response, the delivery vehicle transceiver may receive inspection condition feedback input as user input received via the control input interface of the delivery vehicle transceiver. This inspection condition feedback may indicate an instruction to forward information related to the inspection notification message to the mobile interactive transceiver. Based upon such an instruction, the delivery vehicle transceiver may then selectively transmit the information related to the inspection notification message to the mobile interactive transceiver.

Relative to interactive display aspects of the mobile interactive transceiver in this exemplary system embodiment, the mobile interactive transceiver may display at least a portion of the forwarded information it receives related to the inspection notification message as a prompt for an enhanced inspection of the at least one of the targeted inspection points. Furthermore, the mobile interactive transceiver (such as transceiver 1200 used by flight personnel or transceiver 1210 used by logistics personnel) may receive input from such personnel in response to the displayed prompt. Such input may take the form of a verified result indication related to the enhanced inspection of the relevant targeted inspection point(s). Thereafter, the system's mobile interactive transceiver may transmit a confirmation message to the delivery vehicle transceiver, where the confirmation message indicate the result of the enhanced inspection of the at least one of the targeted inspection points.

In still a further embodiment of an enhanced drone-based inspection system, a separate maintenance transceiver (e.g., transceiver 1205 operated by a mechanic that services aircraft 100) may be added as part of the system. As such, the system's delivery vehicle transceiver may forward information related to the inspection notification message to the maintenance transceiver as a type of maintenance request. However, in another embodiment, the system's maintenance receiver may directly receive such information from the paired aerial inspection drone directly without relying upon an intermediary element, such as the delivery vehicle transceiver or the mobile interactive transceiver.

In particular, another embodiment of such an enhanced drone-based inspection system may focus more on such a direct communication link between the paired inspection drone (e.g., PID 825 as shown in FIG. 12) and a mobile interactive transceiver. Here, the aerial inspection drone is paired to the delivery vehicle as an exclusively assigned sensor-based monitor that travels with the delivery vehicle during a delivery vehicle based shipment operation. The paired aerial inspection drone deploys multiple sensors to detect sensor-based inspection information about targeted inspection points on the delivery vehicle similar to that discussed above. In this embodiment, the system's paired aerial inspection drone is configured and operative to control its internal flight control elements (e.g., lifting engines 210a, 210b) to fly proximate each of the targeted inspection points as part of a targeted inspection flight. During this targeted inspection flight, the system's paired aerial inspection drone detects, senses, or otherwise gathers sensor-based inspection information from one or more of the sensors relative to each of the targeted inspection points. While doing so (or in some embodiments after gathering all such sensor-based inspection information relative to each of the targeted inspection points), the system's paired aerial inspection drone automatically identifies an inspection condition about one or more of the targeted inspection points based upon the sensor-based inspection information gathered. Such an inspection condition indicating the one or more of the targeted inspection points are outside an acceptable range for operation of the delivery vehicle. Thereafter, the system's paired aerial inspection drone broadcasts an inspection notification message over a wireless communication channel.

The system's mobile interactive transceiver in this embodiment is disposed as a system element that is generally in communication with the paired aerial inspection drone and being operated by delivery vehicle personnel associated with the delivery vehicle, such as flight operator personnel, maintenance personnel, or logistics personnel. In more detail, the system's mobile interactive transceiver has a graphical display (e.g., a touchscreen) that presents visual information to the delivery vehicle personnel, a control input receiver that receives user input from the delivery vehicle personnel (e.g., buttons, switches, or a touchscreen part of the graphical display), and a wireless radio operative to communicate with the paired aerial inspection drone over the wireless communication channel (e.g., a cellular or other formatted wireless communication path). As part of the system, the system's mobile interactive transceiver receives the inspection notification message directly from the paired aerial inspection drone through the wireless radio, and generates a prompt message as the graphical display on the interactive display interface. The prompt message provides information related to the inspection notification message and the identified inspection condition related to at least one of the targeted inspection points. The system's mobile interactive transceiver may also receive input on the control input receiver from the delivery vehicle personnel in response to the generated prompt message. Such input may be provided as a verified result indication related to the enhanced inspection of at least one of the targeted inspection points. Further, the system's mobile interactive transceiver may transmit a confirmation message directly back to the paired aerial inspection drone. Such a confirmation message may indicates the result of the enhanced inspection of the at least one of the targeted inspection points, and allow the paired aerial inspection drone to quickly and efficiently continue to conduct its inspection of the remaining targeted inspection points.

In another embodiment, the system may include two different mobile interactive transceivers (e.g., transceiver 1200 operated by flight personnel and transceiver 1210 operated by logistics personnel associated with loading or unloading the delivery vehicle). Each of these different mobile interactive transceivers have a direct communication path to the paired aerial inspection drone and, thus, are capable of respectively receiving the inspection notification message directly from the paired aerial inspection drone through the wireless radio (and responding as described herein).

In still a further embodiment of this exemplary enhanced drone-based inspection system, a separate maintenance transceiver (e.g., transceiver 1205 operated by a mechanic that services aircraft 100) may be added as part of the system. As such, the system's delivery vehicle transceiver may forward information related to the inspection notification message to the maintenance transceiver as a type of maintenance request. However, in another embodiment, the system's maintenance receiver may directly receive such information from the paired aerial inspection drone directly without relying upon an intermediary element, such as the delivery vehicle transceiver or the mobile interactive transceiver.

Updating for Modified Inspections Using a Paired Inspection Drone

While the above described embodiments generally deploy an aerial inspection drone paired as an exclusive part of a delivery vehicle, further embodiments may include exemplary paired-drone based systems and methods for conducting a modified inspection of the delivery vehicle when the paired inspection drone receives an inspection update message. In general, an embodiment of an aerial inspection drone paired to the delivery vehicle may advantageously and unconventionally be re-tasked to conduct a modified airborne inspection of a different set of delivery vehicle parts, change how to inspect a given set of delivery vehicle parts, or both. Such a dynamic ability to update, modify, or change what should be inspected and how such inspection points should be inspected provides a further improvement on how a delivery vehicle is inspected. As such, the embodiments shown in FIGS. 13-16 and described below provide a technical solution that improves how a delivery vehicle may be more efficiently self-inspecting using an exclusively paired aerial inspection drone that can be updated on-the-fly to modify how the delivery vehicle is to be inspected or alter how an ongoing inspection is to be completed by such a paired aerial inspection drone.

Figure 13:
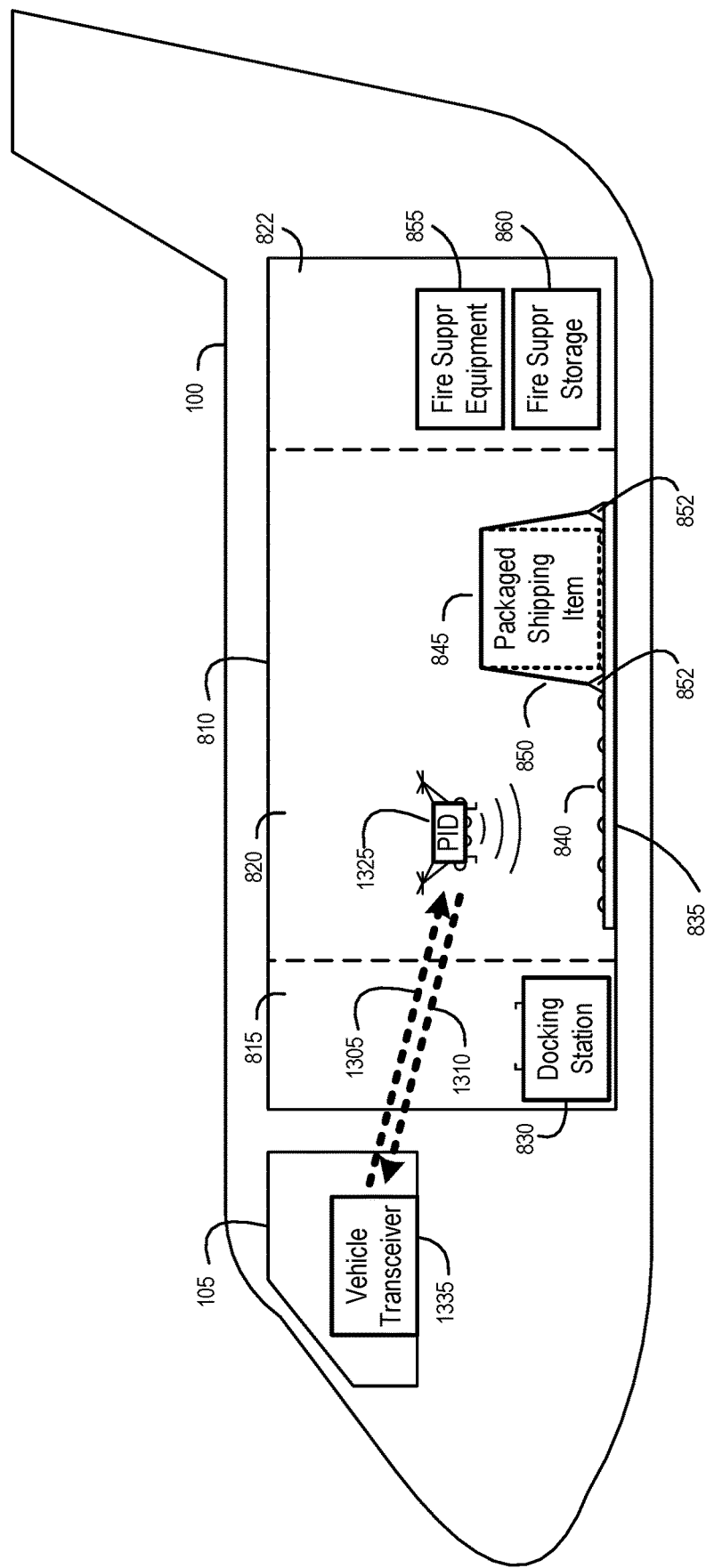
FIG. 13 is a diagram of an exemplary drone-based system for conducting a modified inspection of a delivery vehicle in accordance with an embodiment of the invention.

In more detail, FIG. 13 is a diagram of an exemplary drone-based system for conducting a modified inspection of a delivery vehicle in accordance with an embodiment of the invention. As shown in FIG. 13, this exemplary system embodiment includes an inspection drone 1325 paired to the delivery vehicle (e.g., an aircraft, a trailer pulled with a motorized vehicle, a marine vessel, and a railroad car) that communicates with a delivery vehicle transceiver 1335. Exemplary PID 1325 is configured similar to PID 825 (as described above) with some functional differences in its inspection program 925 as it operates as an element of an exemplary system for conducting a modified inspection of a delivery vehicle. In more detail and with similar parts as explained and shown for exemplary PID 825, exemplary PID 1325 is used to aerially inspect parts of aircraft 100 and includes a main housing, an onboard controller disposed within the main housing, a memory storage coupled to the onboard controller, and multiple lifting engines that are coupled with respective lifting rotors fixed to a different portions of the main housing. Each of the lifting engines on PID 1325 is responsive to flight control input generated by the onboard controller as part of maintaining a desired flight profile. Exemplary PID 1325 further includes one or more sensors (such as sensors from sensor array 230) along with a communication interface that each are coupled to the onboard controller. The sensor detects or gathers sensor-based inspection information while the PID 1325 is airborne and then provides the detected sensor-based inspection information to the onboard controller. The communication interface is deployed, in this example, as a wireless radio-based communication interface (similar to communication interface 365) that can send and receive wireless signals (such as signals 1305, 1310) from other radio-based devices, such as delivery vehicle transceiver 1335. For example, signal 1305 may be an inspection update message transmitted by delivery vehicle transceiver 1335 and received by the communication interface on PID 1325, while signal 1310 may be an inspection notification message transmitted by the communication interface on PID 1325 to the delivery vehicle transceiver 1335.

Figure 14:
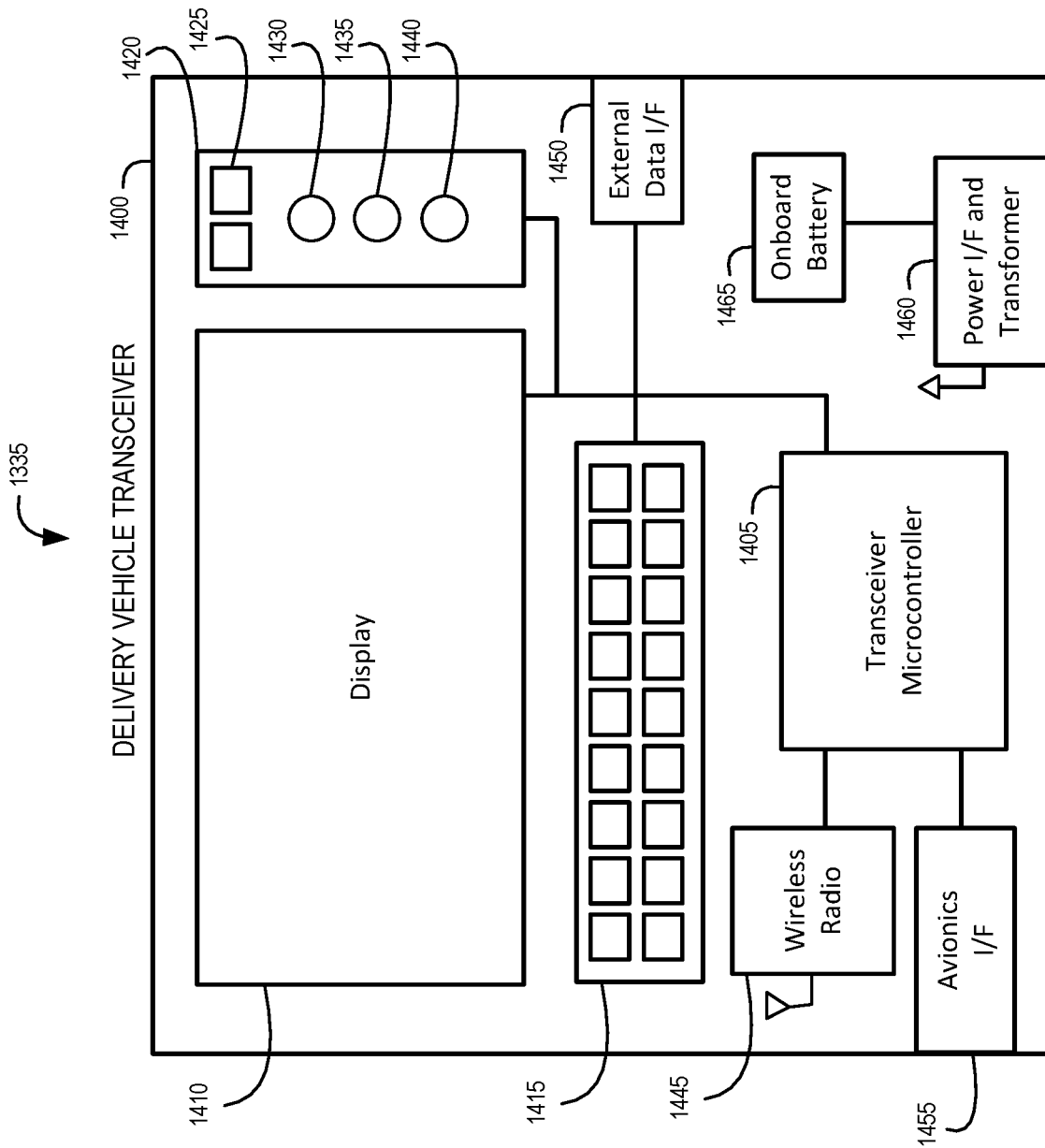
FIG. 14 is a schematic illustration of components of an exemplary delivery vehicle transceiver in accordance with an embodiment of the invention.

FIG. 14 presents further details about exemplary components that may be used to implement an exemplary delivery vehicle transceiver 1335 in accordance with an embodiment of the invention. Referring now to FIG. 14, exemplary delivery vehicle transceiver 1335 is shown having a housing 1400 that maintains elements on it or within it that make up the transceiver 1335. For example, housing 1400 supports an exemplary user interface that includes a display 1410 (e.g., a CRT display, flat screen display, dot matrix display, interactive touchscreen display, and the like); a panel 1420 of buttons 1425 (e.g., power button, illumination button, and the like) and control knobs/switches 1430-1440; and a set of keys 1415 that function as a type of keyboard for user input. Generally, such user interface components for delivery vehicle transceiver 1335 may display information to a user via display 1410 and accept input from the user via keys 1415 and panel 1420 to use in interactions with the PID 1325.

Exemplary delivery vehicle transceiver 1335 further includes a transceiver microcontroller 1405 having one or more processors and memory at its core along with memory disposed within housing 1400. Transceiver microcontroller 1405 interfaces with the user interface components described above along with a wireless radio 1445, an external data interface 1450, and an avionics interface 1455. An embodiment of transceiver microcontroller 1405 may interface or connect with such circuitry by deploying various onboard peripherals (e.g., timer circuitry, USB, USART, general-purpose I/O pins, IR interface circuitry, DMA circuitry, buffers, registers, and the like) that implement an interface (e.g., a plug type or connectorized interface) to these different components disposed within delivery vehicle transceiver 1335.

Wireless radio 1445 is generally a radio-based transceiver that may use one or more wireless formats (e.g., Wi-Fi frequencies and formats, cellular frequencies and formats, ISM radio frequencies and formats for RF data signaling, LMR and SMR wireless frequencies and formats, and the like) to broadcast and receive through its associated antenna. Wireless radio 1445 accepts control input and messaging input from transceiver microcontroller 1405 (such as information used for an inspection update message) and provides received messages and/or data received to transceiver microcontroller 1405 (such as an inspection notification message) for processing and appropriate display tasks performed by the transceiver microcontroller 1405 in conjunction with, for example, display 1410.

The exemplary delivery vehicle transceiver 1335 may deploy the external data interface 1450 coupled to the transceiver microcontroller 1405 as a general type of externally accessible interface, such as a USB interface or other data interface. Using such an external data interface 1450, delivery vehicle transceiver 1335 may interact with external peripherals, such as an external display (not shown) to show information related to an inspection notification message received or an external memory storage (not shown) that may maintain and provide access to updated information on additional inspection points for a delivery vehicle (e.g., a different or modified set of parts of the aircraft 100 to be inspected, changes in how to inspect one or more of such delivery vehicle parts, or both).

Likewise, exemplary delivery vehicle transceiver 1335 may use an avionics interface 1455 coupled to the transceiver microcontroller 1405 as a type interface to the avionics suite of electronics disposed on the delivery vehicle. For example, avionics interface 1445 may allow delivery vehicle transceiver 1335 to communicate over an avionics bus deployed on the delivery vehicle, such as an ARINC 429 data bus, a MIL-STD-1553 bus, a Honeywell SAFEbus backplane data bus used on different types of aircraft. Similar to the external data interface 1450, such an avionics interface 1455 may allow delivery vehicle transceiver 1335 to interact with avionics equipment, such as a cockpit multi-function display (not shown) to show information related to an inspection notification message received or an onboard avionics memory storage (not shown) that may maintain and provide access to updated information on additional inspection points for a delivery vehicle (e.g., a different or modified set of parts of the aircraft 100 to be inspected, changes in how to inspect one or more of such delivery vehicle parts, or both).

Those skilled in the art will further appreciate that transceiver microcontroller 1405 may be implemented with a low power embedded processor as part of a single-board computer having a system-on-chip (SoC) device operating at its core. In such an embodiment, the SoC device may include different types of memory (e.g., a removable memory card slot, such as a Secure Digital (SD) card slot, as removable memory; flash memory operating as onboard non-volatile memory storage; and RAM memory operating as onboard volatile memory); an operating system (such as Linux) stored on the non-volatile memory storage and running in volatile RAM memory; and peripherals that may implement any of wireless radio 1445, external data interface 1450, and avionics interface 1455.

Additionally, exemplary delivery vehicle transceiver 1335 includes a power interface and transformer 1460 that provides electrical power to the active circuitry within exemplary delivery vehicle transceiver 1335 using externally supplied electricity (which may be transformed to the desired voltage for use by the active circuitry within exemplary delivery vehicle transceiver 1335) or an onboard battery 1465. Onboard battery 1465 may be charged via the power interface and transformer 1460, which may be connected to an external power supply on the delivery vehicle (e.g., aircraft 100).

In an exemplary system embodiment that includes PID 1325 and delivery vehicle transceiver 1335, the delivery vehicle transceiver 1335 may generate an inspection update message identifying information about at least one or more additional inspection points. The additional inspection points for a delivery vehicle generally include updated information used for a modified inspection of the delivery vehicle. As noted above, this may include a different or modified set of parts of the delivery vehicle (e.g., aircraft 100) to be inspected, changes in how to inspect one or more of the delivery vehicle parts, or both. The updated information for the additional inspection points may be accepted as input on the user interface (e.g., via touchscreen interactions on display 1410, via alphanumeric input provided on keys 1415, via user input provided on panel 1420 of buttons 1425 and/or control knobs/switches 1430-1440). Such updated information may be accepted as raw data input manually through such user interface interactions or, in some instances, may be accepted as prompted interactions vis the user interface elements that cause delivery vehicle transceiver 1335 to access either onboard memory or externally accessible memory to retrieve such updated information. Once generated, the delivery vehicle transceiver 1335 transmits the inspection update message via its wireless radio 1445.

The system's PID 1325 is then operative to receive the inspection update message from the delivery vehicle transceiver 1335. This may occur prior to the PID 1325 lifting off from docking station 830 (shown in FIG. 13) or may occur once PID 1325 is airborne. Furthermore, reception of the inspection update message by the airborne PID 1325 may occur before the PID 1325 has begun conducting an inspection of certain targeted inspection points on the aircraft 100 or, alternatively, may occur after the PID 1325 has begun conducting its aerial inspection of targeted inspection points on the aircraft 100.

The onboard controller (e.g., transceiver microcontroller 1405) of PID 1325 receives the inspection update message from its onboard wireless communication interface and PID 1325 accesses its memory storage to identify existing delivery vehicle inspection points from the inspection profile record stored in the memory storage (e.g., existing delivery vehicle inspection points for aircraft 100 identified in inspection profile record 945 within memory 315). The identification of existing delivery vehicle inspection points may, in some instances, occur before receiving the inspection update message or, in other instances, may occur after and as a result of receiving the inspection update message. The delivery vehicle transceiver's onboard controller then updates the existing delivery vehicle inspection points with the information related to the additional inspection points to yield updated information that identifies relevant targeted inspection points corresponding to respective parts of the delivery vehicle to use in a modified inspection of the delivery vehicle. For example, the transceiver microcontroller 1405 of PID 1325 may modify the inspection profile record to identify the targeted inspection points (which include information on the additional inspection points) and store the modified inspection profile record in memory accessible by microcontroller 1405.

Such updated information on the additional inspection points may include the same parts to be inspected but with different inspection parameters (e.g., which sensor or sensors to use, how to position the PID 1325 when using such sensor(s), and how much data to gather using the sensor(s) over periods of time) and/or different parts to be inspected using new inspection parameters for such parts. Some of the additional inspection points may be specific to inside of the delivery vehicle (such as an accessible cargo storage area within an aircraft, a cargo attachment point located within an accessible cargo storage area, a cargo handling point that helps move cargo shipments within an accessible cargo storage area (e.g., a roller, a caster, a portion of a roller deck, a roller ball mat, a castor mat, a turntable, and a conveyor)). Other additional inspection points may be externally exposed on the delivery vehicle, such as a designated inspection area aerially accessible from above the delivery vehicle that is not visible from a ground level perspective relative to the delivery vehicle or an aircraft component (e.g., a panel, a rivet, a seam, an engine, a flight control surface, a window seal, a closable entry to within the aircraft, aircraft lighting, an antenna, landing gear, and a tire).

The PID 1325 then conducts the modified inspection of the delivery vehicle by gathering sensor-based inspection information related to each of the targeted inspection points (based upon the additional inspection points information). The PID 1325 may use one or more sensors when gathering this inspection information, such as an image sensor (e.g., visual imaging sensor, an infrared (IR) imaging sensor, and a thermal imaging sensor) that captures one or more images relative to the additional inspection points and in accordance with information related to the additional inspection points, or a depth measuring sensor (e.g., a LIDAR sensor and a sound transducer) that maps a surface relative to an additional inspection point in accordance with information related to that additional inspection point. In a further embodiment, the PID 1325 may use two sensors of different types a particular additional inspection point or use different types of sensors for different ones of the additional inspection points in accordance with the updated information stored in the modified inspection profile record that indicates the type of sensor to use with the targeted inspection points (including any additional inspection points).

A further embodiment may, for example, have the onboard controller of PID 1325 autonomously send flight control input to the lifting engines to cause PID 1325 to traverse respective aerial positions proximate each of the targeted inspection points as part of conducting the modified inspection of the delivery vehicle. When doing so, the onboard controller of PID 1325 may automatically identify an inspection condition about at least one of the targeted inspection points when the sensor-based inspection information for the at least one of the targeted inspection points is outside of an acceptable range related to that particular targeted inspection point, and then cause the communication interface of PID 1325 to responsively transmit an inspection notification message to the delivery vehicle transceiver upon identifying the inspection condition for that targeted inspection point.

Figure 15:
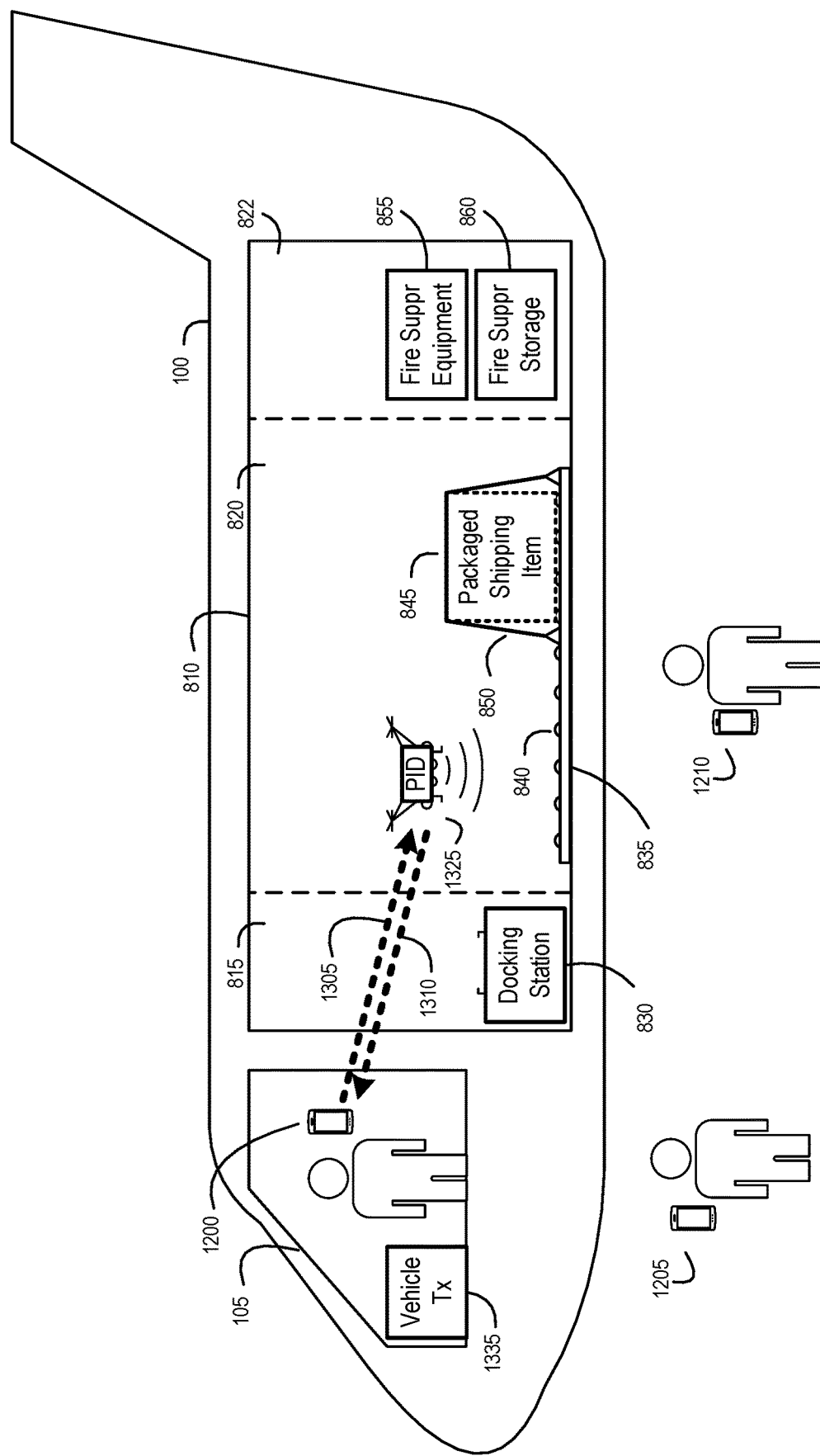
FIG. 15 is a diagram of an exemplary drone-based system for conducting a modified inspection of a delivery vehicle that includes a mobile transceiver device used in support of delivery vehicle operations that is physically separate from the delivery vehicle in accordance with an embodiment of the invention.

As shown in FIG. 13, the delivery vehicle transceiver 1335 is disposed in a control compartment 105 for the aircraft 100 and, in some implementations, may be implemented as an integrated part of aircraft 100. However, in other embodiments, such as that shown in FIG. 15, the above described system's delivery vehicle transceiver may be a mobile transceiver device used in support of delivery vehicle operations that is physically separate from the delivery vehicle. Referring now to FIG. 15, radio-based transceiver 1200 is shown as an exemplary mobile interactive transceiver associated with and operated by an aircraft operator (e.g., pilot, co-pilot, flight engineer, cargo specialist, and the like) in compartment 105 that is responsible for controlling the aircraft 100. As noted above, exemplary radio-based transceiver 1200 may be implemented as a ruggedized radio-based tablet or smartphone used by aircraft crew personnel and carried with them while performing duties within aircraft 100. Relative to a system embodiment for conducting a modified inspection, exemplary radio-based transceiver 1200 may interact with PID 1325 in the same role as transceiver 1335 is described above. In this manner, an operator of radio-based transceiver 1200 may provide input on one or more additional inspection points related to the delivery vehicle so that radio-based transceiver 1200 transmits the inspection updated message to PID 1325. In one example, this may allow the operator of radio-based transceiver 1200 to have received a prior inspection notification message from PID 1325 and provide further detailed and changed inspection parameters for a particular targeted inspection point (e.g., updated information considered as an additional inspection point) or provide further relevant parts of the aircraft 100 that are to be inspected as additional inspection points. In another example, this may allow the operator of radio-based transceiver 1200 to update PID 1325 to reflect new cargo attachment points are being used within aircraft 100 or certain cargo handling points have been changed or configured differently to accommodate the current cargo of items to be shipped within the aircraft's internal shipment storage area 820. In this manner, interactive signaling 1305, 1310 may be used between radio-based transceiver 1200 (operating as a type of delivery vehicle transceiver) and PID 1325 as part of an exemplary drone-based system for conducting a modified inspection of the delivery vehicle. Furthermore, while not shown in FIG. 15, those skilled in the art will appreciate that one or more of exemplary radio-based transceivers 1205 and 1210 may similarly interact with PID 1325 in the same role as transceiver 1335 is described above in other embodiments of a drone-based system for conducting a modified inspection of the delivery vehicle.

Figure 16:
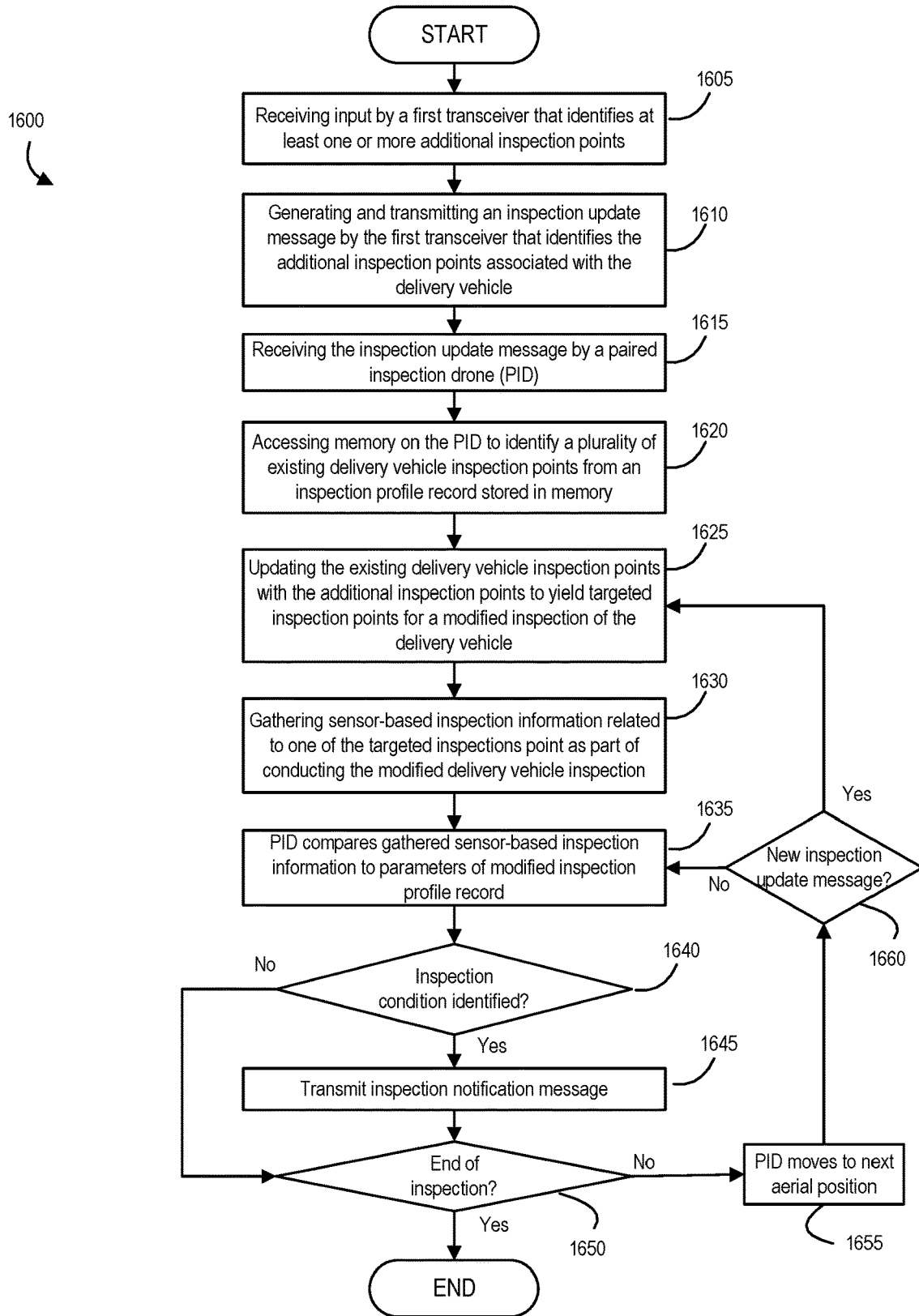
FIG. 16 is a flow diagram illustrating an exemplary drone-based method for conducting a modified inspection of a delivery vehicle in accordance with an embodiment of the invention.

In similar fashion, this type of system embodiment may operate in accordance with an exemplary drone-based method for conducting a modified inspection of a delivery vehicle. FIG. 16 is a flow diagram illustrating such an exemplary drone-based method for conducting a modified inspection of a delivery vehicle in accordance with an embodiment of the invention. Referring now to FIG. 16, method 1600 begins at step 1605 where a first transceiver receives input that identifies at least one or more additional inspection points. For example, the first transceiver (e.g., delivery vehicle transceiver 1335 or one of the mobile radio-based transceivers 1200, 1205, 1210 physically separate from the delivery vehicle) may receive such input through its user interface components, where the input accepted identifies information about the additional inspection points. Such information may include the identification of further parts of the delivery vehicle to inspect as well as further or different inspection parameters to use when inspecting those further parts or the existing parts to be inspected. Such information may reflect a change in the configuration of the delivery vehicle or the addition of new equipment used onboard the delivery vehicle. In another example, the first transceiver may receive information about the additional inspection points as data from an external source, such as a memory storage coupled to the first transceiver (e.g., an update file that includes the information about the additional inspection points). The external information may be accepted through a prompted input using the user interface elements of the first transceiver (e.g., depressing a switch or button, or tapping an interactive touchscreen display interface when selecting such information or when downloading such information).

At step 1610, method 1600 proceeds by generating and transmitting an inspection update message by the first transceiver to a paired inspection drone (PID), such as PID 1325, which is a linked part of the delivery vehicle and that travels with the delivery vehicle during delivery vehicle based shipment operations (such as when shipping cargo items maintained within a cargo storage area of the delivery vehicle). The inspection update message essentially identifies at least one or more additional inspection points associated with the delivery vehicle using the information obtained and accepted in step 1605.

At step 1615, method 1600 has the PID receiving the inspection update message transmitted by the first transceiver. For example, as shown in FIG. 13, exemplary delivery vehicle transceiver 1335 transmits a wireless signal 1305 to PID 1325 that includes an inspection update message that has information identifying additional inspection points relative to what is to be inspected on aircraft 100.

At step 1620, method 1600 proceeds with the PID accessing memory to identify existing delivery vehicle inspection points from an inspection profile record stored in memory. The inspection profile record, such as record 945, essentially maintains delivery vehicle dependent information in the form of data indicating the different targeted delivery vehicle inspection points corresponding to parts of the delivery vehicle to be inspected and an acceptable range of sensor-based inspection information for each of the targeted inspection points for operation of the delivery vehicle. This existing set of information may also include prior sensor-based inspection information detected for one or more of the targeted delivery vehicle inspection points and, in some instances, may include a prioritized subset of the targeted delivery vehicle inspection points designated for an enhanced level of sensor-based inspection.

At step 1625, method 1600 proceeds with the PID updating the existing delivery vehicle inspection points with the information on additional inspection points to yield an updated set of targeted inspection points corresponding to respective parts of the delivery vehicle. In more detail, the PID may generate a modified inspection profile record that identifies the updated targeted inspection points as a first group of designated inspection areas specific to the delivery vehicle as the existing delivery vehicle inspection points and identifies a second group of designated inspection areas specific to the delivery vehicle as the additional inspection points. Embodiments may collectively identify both groups as the new targeted set of inspection points, which may include a changed set of inspection points, a set of inspection points having changed inspection parameters on how to inspection such points, and/or a set of inspection points having changed inspection thresholds for acceptable operation.

At step 1630, method 1600 proceeds to use at least one sensor on the PID to conduct the modified inspection of the delivery vehicle by gathering sensor-based inspection information related to each of the targeted inspection points and provide the sensor-based inspection information by the sensor to an onboard processor on the PID. For example, this may involve capturing one or more images relative to a targeted inspection point using an image sensor (e.g., a visual imaging sensor, an infrared (IR) imaging sensor, and a thermal imaging sensor), or surface mapping relative to a targeted inspection point using a depth sensor (e.g., a LIDAR sensor and a sound transducer). In another example, this may involve detecting the sensor-based inspection information for one targeted inspection point with a first type of sensor and detecting the sensor-based inspection information for a second targeted inspection point with a second type of sensor according to the modified inspection profile record.

When the relevant sensor-based inspection information for a particular targeted inspection point identified in the modified inspection profile record has been gathered, steps 1635 and 1640 automatically identify an inspection condition about that targeted inspection point (which may be one of the additional inspection points). In particular, at step 1635, method 1600 proceeds with the PID comparing the gathered sensor-based inspection information to reference parameters for that targeted inspection point (which may be one of the additional inspection points) in accordance with information in the modified inspection profile record. In one embodiment, the reference information or parameters may be prior sensor-based inspection information for this targeted inspection point. In another embodiment, the reference information or parameters may be measurement or sensor based ranges for the targeted inspection point that corresponds with acceptable operation of that part of the delivery vehicle. In a further embodiment, such reference information or parameters may include both prior sensor-based inspection information for this targeted inspection point and sensor data ranges that may be used in the comparison. In other words, the comparison at step 1635 may involve a more simplistic comparison of sensor information detected to a limit or range, but may also involve multiple comparisons of different types of detected sensor information to various types of reference information as reflected in the modified inspection profile record for that targeted inspection point.

At step 1640, method 1600 automatically identifies an inspection condition related to the targeted inspection point (which may be one of the additional inspection points) based upon the results of the comparison in step 1635. In other words, the processing of the currently gathered sensor-based inspection information for this targeted inspection point may yield a result that the targeted inspection point is now outside an acceptable range for operation of the delivery vehicle according to the modified information in the inspection profile record. Thus, if step 1640 fails to automatically identify an inspection condition for the targeted inspection point, step 1640 proceeds directly to step 1650. However, if step 1640 does automatically identify an inspection condition based upon the sensor-based inspection information detected (e.g., the comparison of such sensor-based inspection information to reference information for the targeted inspection point), step 1640 proceeds to step 1645.

At step 1645, an embodiment of method 1600 may have the PID responsively transmit an inspection notification message to a delivery vehicle receiver disposed on the delivery vehicle (such as exemplary delivery vehicle transceiver 1335). This inspection notification message is a type of feedback for a paired inspection drone-based system associated with the delivery vehicle (or including the delivery vehicle) as the PID conducts the modified inspection of the delivery vehicle. As such, the delivery vehicle receiver is able to alert personnel associated with the delivery vehicle, such as an aircraft operator (e.g., pilot, co-pilot, flight engineer, cargo specialist, and the like) in compartment 105 that is responsible for controlling the aircraft 100. A further embodiment may have step 1645 also (or alternatively) transmit the inspection notification message to a mobile interactive radio-based transceiver 1200 separate from the delivery vehicle but operated by vehicle crew personnel for the delivery vehicle to notify the vehicle crew personnel that operate the delivery vehicle (e.g., a flight engineer that uses a ruggedized tablet as a type of mobile interactive transceiver and can view the inspection notification message as well as relevant sensor-based inspection information about the related targeted inspection point). Likewise, another embodiment may have step 1645 also (or alternatively) transmit the inspection notification message to a maintenance radio-based transceiver 1205 operated by maintenance personnel for the delivery vehicle to notify the maintenance personnel that service the delivery vehicle (e.g., an aircraft mechanic that uses a ruggedized tablet as a type of maintenance receiver and can view the inspection notification message as well as relevant sensor-based inspection information about the related targeted inspection point). Furthermore, an embodiment may have step 1645 also (or alternatively) transmit the inspection notification message to a logistics radio-based transceiver 1210 (operated by maintenance personnel for the delivery vehicle to notify the maintenance personnel that service the delivery vehicle (e.g., an aircraft mechanic that uses a ruggedized tablet as a type of maintenance receiver and can view the inspection notification message as well as relevant sensor-based inspection information about the related targeted inspection point).

At step 1650, method 1600 has the PID determine if it is at the end of the modified inspection associated with each of the targeted inspection points (including any additional inspection points) for the delivery vehicle. If not, then step 1650 proceeds to step 1655 where the PID moves to the next aerial position proximate another of the targeted inspection points and then continues to step 1660. Otherwise, the PID is at the end of the modified inspection and method 1600 concludes after step 1650.

At step 1660, the PID determines if another inspection update message has been received mid-stream during the modified inspection of the delivery vehicle. If so, step 1660 proceeds back to step 1625 to further update the currently targeted inspection points (e.g., the information identifying relevant parts to be inspected and how they are to be inspected including their related reference parameters). If not, step 1660 proceeds back to step 1635 to gather sensor-based inspection information for the next targeted inspection point in the modified inspection of the delivery vehicle.

Verified Inspection Using a Paired Inspection Drone

Expanding upon the embodiments described above that use an aerial inspection drone exclusively paired as part of a delivery vehicle, further embodiments may implement exemplary paired-drone based systems and methods for conducting a verified inspection of the delivery vehicle. In general, a verified inspection is one that is performed after an initial inspection identifies a potential adverse issue with a part of the delivery vehicle, and further inspection is warranted in order to make a determination related to the part's acceptability for proper deliver vehicle operation. In a verified inspection embodiment, a radio-based transceiver (such as a delivery vehicle transceiver or a mobile interactive transceiver operated by delivery vehicle related personnel) generally provides a unique interface for interactively intervening to verify an issue related to a potential adverse inspection condition automatically discovered by the paired inspection drone. The transceiver presents information about an interactive intervention request about the potential adverse inspection condition, generates a visual interface that unconventionally assists with conducting the verified inspection related to the request, and integrates with operations of the exclusively paired inspection drone to help implement or conduct the desired verified inspection. This dynamic and unconventional ability to verify what may be wrong with a previously inspected inspection point that may be problematic using an inspection drone exclusively paired to the delivery vehicle provides a yet another improvement on how a delivery vehicle is inspected and how such inspections may be enhanced. Thus, the embodiments shown in FIGS. 17-19 and described below provide a technical solution that improves how a potential adverse inspection condition with part of a delivery vehicle may be interactively addressed in a manner that leverages the exclusively paired inspection drone and advantageous user interface interactions via a separate transceiver operated by delivery vehicle personnel that speed up and enhance the delivery vehicle inspection process.

Figure 17:
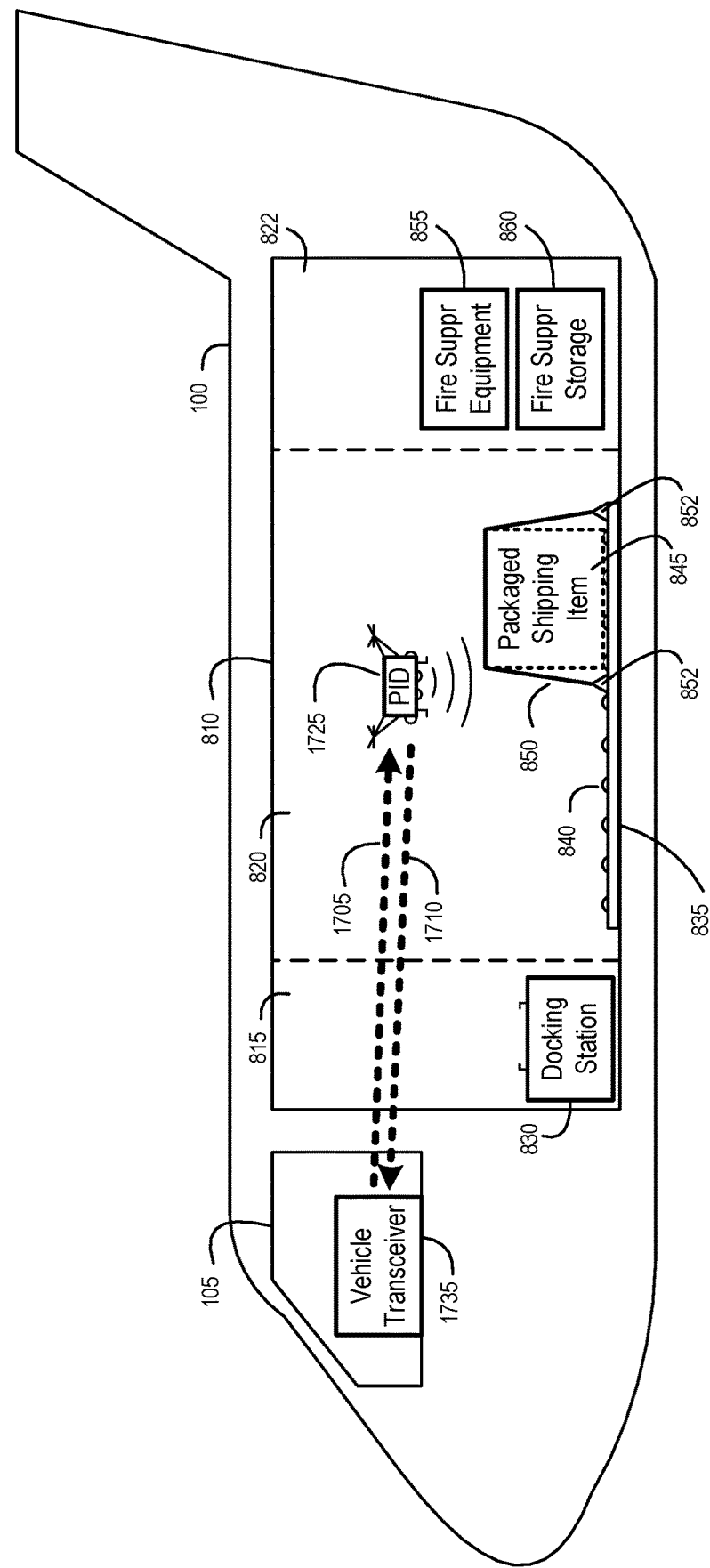
FIG. 17 is a diagram of an exemplary drone-based system used to conduct a verified inspection of a delivery vehicle in accordance with an embodiment of the invention.

FIG. 17 is a diagram of an exemplary drone-based system used to conduct a verified inspection of a delivery vehicle in accordance with an embodiment of the invention. As shown in FIG. 17, this exemplary system embodiment includes an inspection drone (PID) 1725 paired to aircraft 100 that interfaces with a radio-based transceiver, such as delivery vehicle transceiver 1735. Exemplary PID 1725 is configured similar to PID 825 and PID 1325 (as described above) with some functional differences in its inspection program 925 as it operates as an element of an exemplary system for conducting a verified inspection of a delivery vehicle. In more detail and with similar parts as explained and shown for exemplary PID 825, exemplary PID 1725 is used to aerially inspect parts of aircraft 100 and includes a main housing, an onboard controller disposed within the main housing, a memory storage coupled to the onboard controller, and multiple lifting engines that are coupled with respective lifting rotors fixed to a different portions of the main housing. Each of the lifting engines on PID 1725 is responsive to flight control input generated by the onboard controller as part of maintaining a desired flight profile. Exemplary PID 1725 further includes one or more sensors (such as sensors from sensor array 230) along with a communication interface that each are coupled to the onboard controller. The sensor detects or gathers sensor-based inspection information while the PID 1725 is airborne and then provides the detected sensor-based inspection information to the onboard controller. The communication interface is deployed, in this example, as a wireless radio-based communication interface (similar to communication interface 365) that can send and receive wireless signals (such as signals 1705, 1710) from other radio-based devices, such as delivery vehicle transceiver 1735. For example, signal 1705 may be a verification command or other drone control input transmitted by delivery vehicle transceiver 1735 and received by the communication interface on PID 1725, while signal 1710 may be an interactive intervention request or additional sensor-based inspection information transmitted by the communication interface on PID 1725 to the delivery vehicle transceiver 1735.

Exemplary delivery vehicle transceiver 1735, as shown in FIGS. 17-18E and explained with reference to embodiments that conduct a verified inspection of a delivery vehicle, is configured similar to delivery vehicle transceiver 1325 (as described above and with the details shown in FIG. 14) with further details as explained below regarding its operation as an element of an exemplary system for conducting a verified inspection of a delivery vehicle. In general, delivery vehicle transceiver 1735 functions as a type of radio-based interactive transceiver where the operator may receive different types of information from PID 1725 about a potential adverse inspection condition for part of the delivery vehicle, interact with the PID 1725 as part of conducting a follow-up verified inspection, and use the transceiver to rapidly and efficiently view and review information related to additional sensor-based inspection information gathered about that part of the delivery vehicle. In doing so, the delivery vehicle transceiver 1735 allows the operator to input a verification result and then update the PID 1725 with feedback on the verification result.

As with exemplary delivery vehicle transceiver 1335, delivery vehicle transceiver 1735 shown in FIGS. 17-18E has a housing that supports a user interface that includes a display 1410 (e.g., a CRT display, flat screen display, dot matrix LCD display, interactive touchscreen display, and the like); a panel 1420 of buttons 1425 (e.g., power button, illumination button, and the like) and control knobs/switches 1430-1440; and a set of keys 1415 that function as a type of keyboard for user input. In some instances, the interactive touchscreen display 1410 may show graphic images representing the delivery vehicle and highlighted parts of the delivery vehicle. The display 1410 may also show additional sensor-based inspection information gathered relative to parts of the delivery vehicle, which may, for example, be in the form of one or more still images, a video, numeric sensor data, or a depth sensor mapping of part of the delivery vehicle (e.g., a 3D generated model representing the part being subjected to the verified inspection). The user interface components for delivery vehicle transceiver 1735 may display such information to a user via display 1410 and accept input from the user via keys 1415 and panel 1420.

Figure 18A:
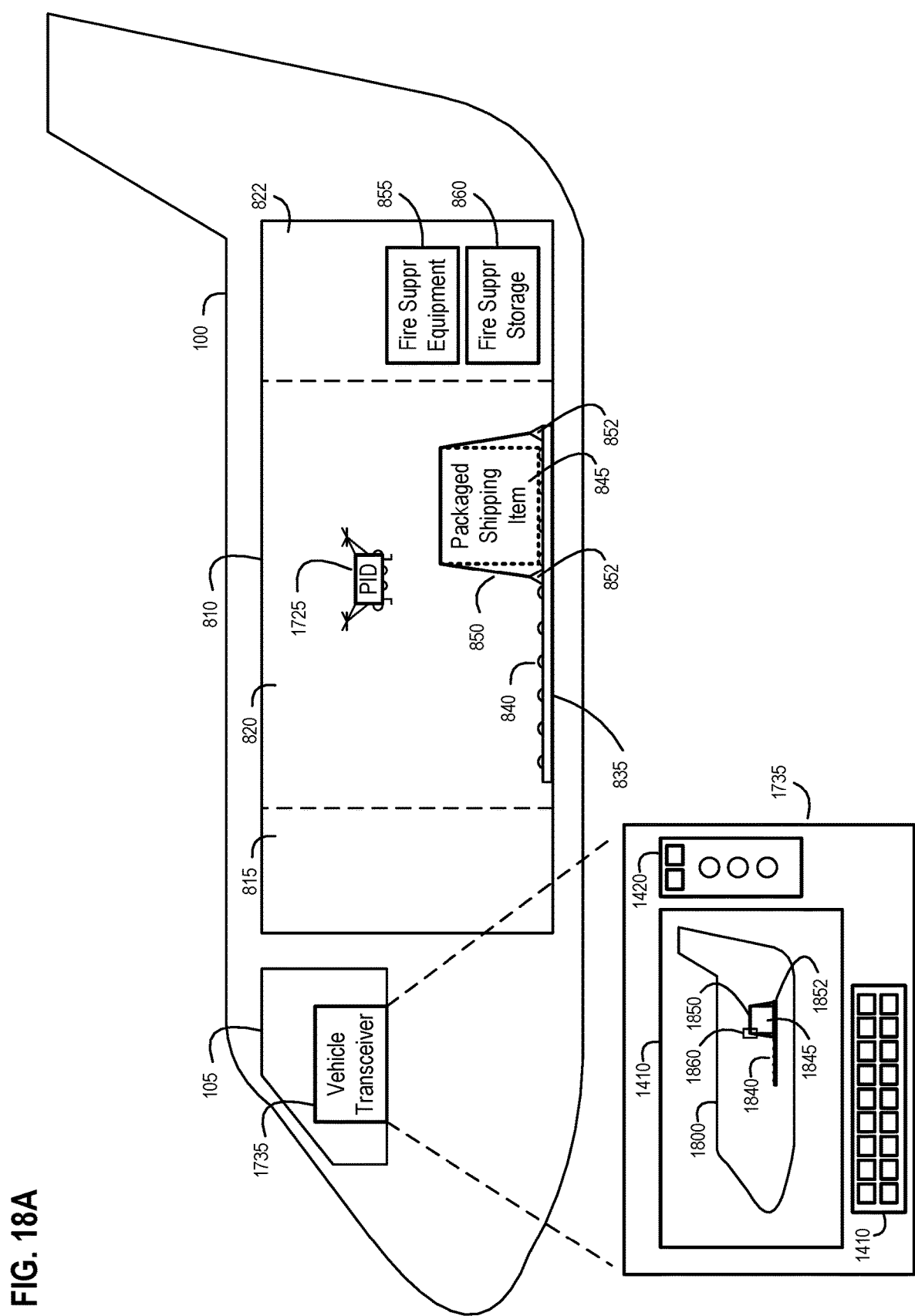

Referring now to FIGS. 18A-18F, the exemplary drone-based system of FIG. 17 is shown in a general example involving a modified inspection for a part of the delivery vehicle. As shown in FIG. 17, the system's PID 1725 has detected sensor-based inspection information related to a targeted inspection point on aircraft—for example, the tie down strap 850 that is part of a cargo attachment point securing packaged shipping item 845. However, as such sensor-based inspection information is gathered, PID 1725 automatically identified a potential adverse inspection condition related to the tie down strap 850 because the strap is not where it was in a prior inspection of that cargo attachment point. As a result, PID 1725 transmits an interactive intervention request in signal 1710 sent to delivery vehicle transceiver 1735. In response, as shown in FIG. 18A, the delivery vehicle transceiver 1735 displays a notification on its user interface e.g., a graphic model 1800 representing aircraft 100 on display 1410 of the transceiver 1735. The graphic model 1800 shows areas of the delivery vehicle, such as a cargo mat 1840 where items 1845 may be secured using tie down strap 1850 via cargo attachment points 1852. Additionally, the graphic model 1800 generated on display 1410 includes a highlighted area 1860 where the tie down strap is located. This highlighted area 1860 is a selectable region of the displayed graphic model of the aircraft 1800. As such, the operator of the delivery vehicle transceiver 1735 is notified about the potential adverse inspection condition related to the tie down strap 850 and that there is a need for a verified inspection to be conducted relative to area 1860.

Figure 18B:
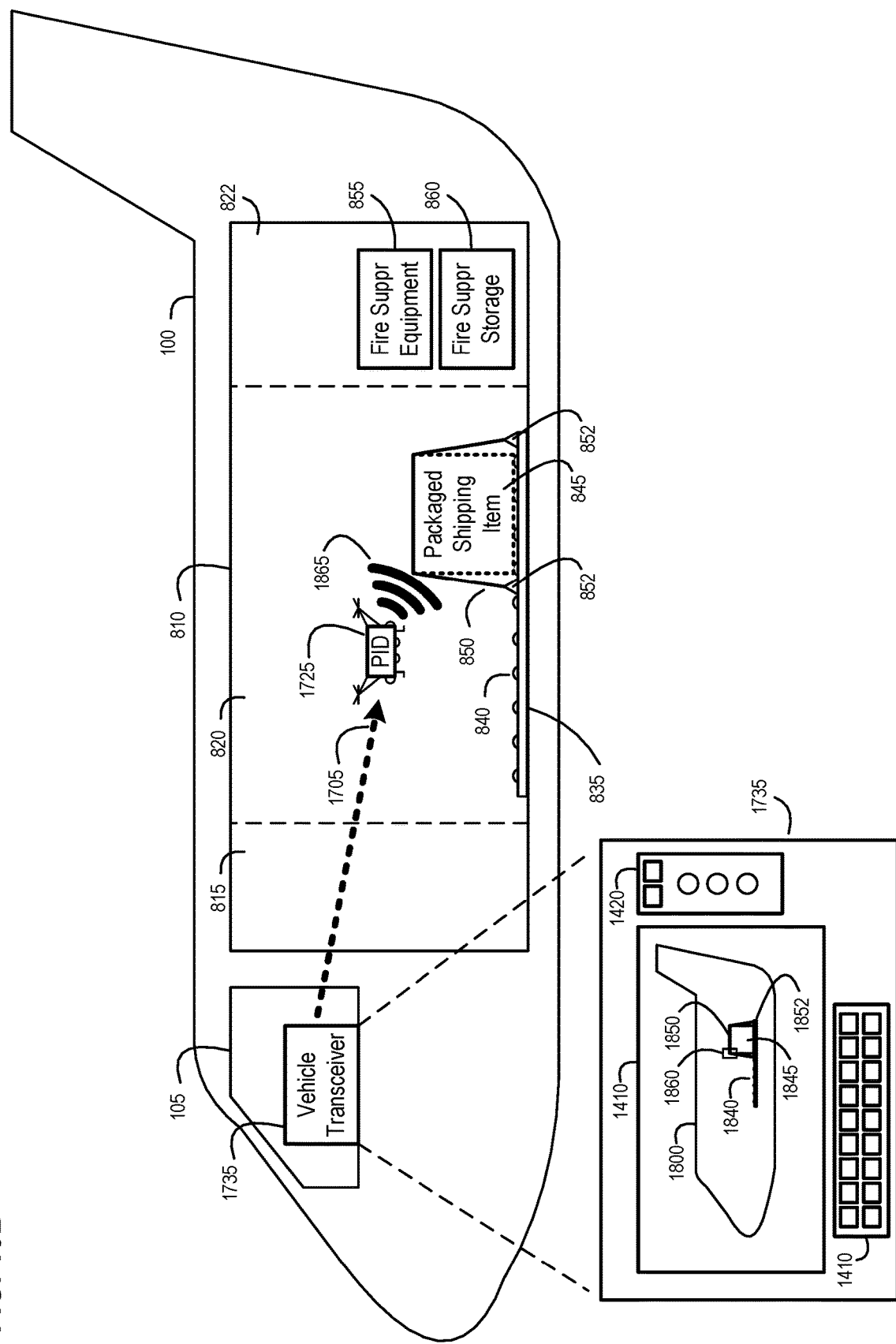
Figure 18D:
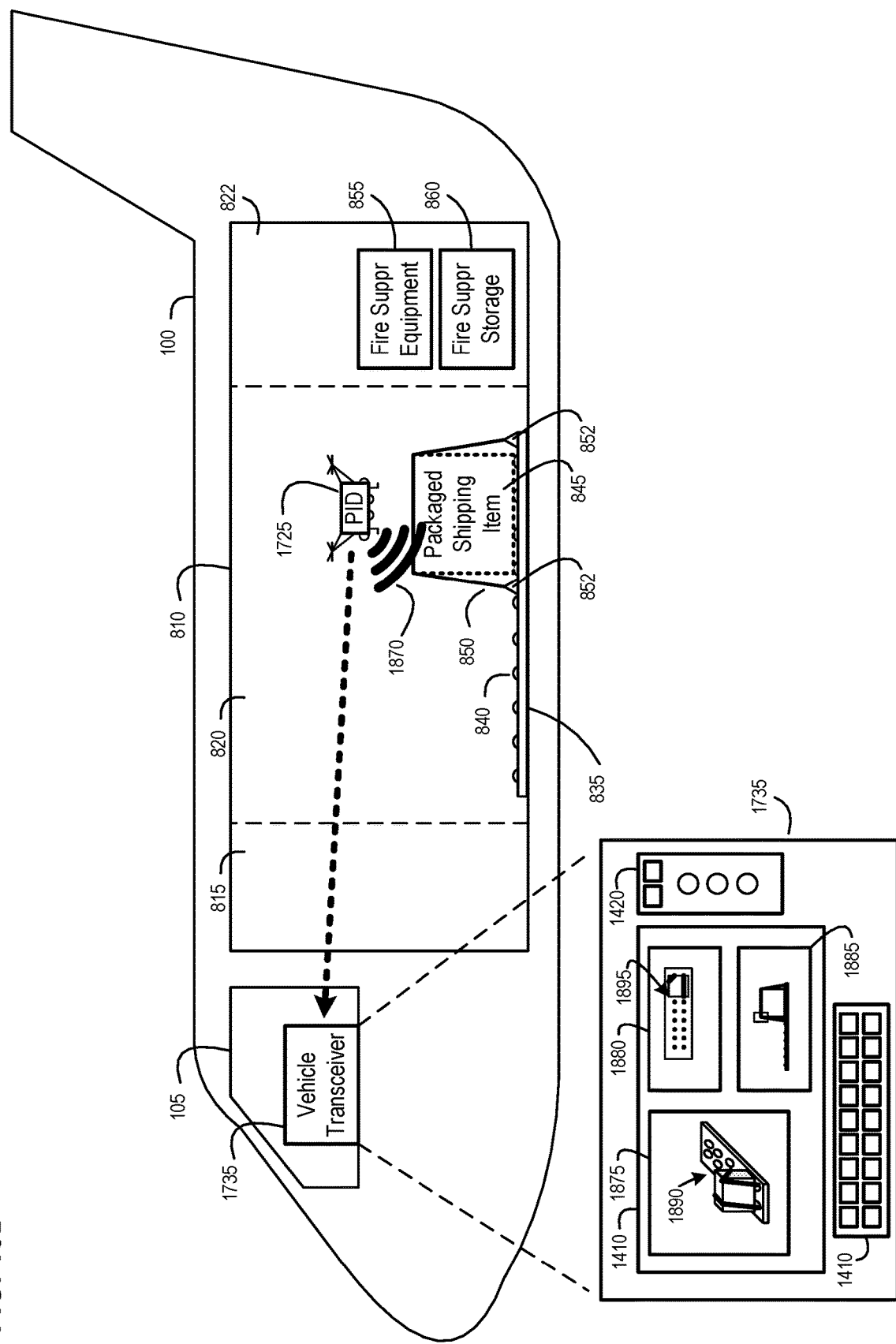

The operator, at this point, may personally perform such a verified inspection by physically moving to the actual area of the aircraft 100 where the PID 1725 has identified such a potential adverse inspection condition. While this may be done for some parts of the aircraft, this often is time consuming or difficult to do given the location and/or exposure of that part to human inspection. Therefore, an embodiment may have the operator initiate such a verified inspection by selecting the highlighted area 1860 (as a selectable region) with user interface elements, such as a touch interface or buttons/knobs that allow the operator to identify the area 1860 and then select it for further automated inspection via a verification type of inspection that provides enhanced additional sensor-based inspection information. For example, as shown in FIG. 18B, flight personnel may select area 1860 on display 1410 of delivery vehicle transceiver 1735. Delivery vehicle transceiver 1735 detects this selection action and generates a verification command that is then transmitted via signal 1705 to PID 1725. Upon receipt of the verification command (which may identify parameters or drone control input to be used as part of this follow-up inspection of the tie down strap 850), PID 1725 moves to a different aerial position to provide a different perspective relative to the tie down strap 850, and engages select sensors to gather more detailed additional sensor-based inspection information 1865. As shown in FIG. 18C, PID 1725 moves to another aerial position to provide yet another perspective relative to the tie down strap 850 (an exemplary inspection point), and again engages select sensors to gather more detailed additional sensor-based inspection information 1870. Such additional sensor-based inspection information 1865, 1870 may include still images and/or video imagery, which are then fed back to the delivery vehicle transceiver 1735 and shown on display 1410. Specifically, as shown in FIG. 18D, a live-feed video 1890 may be shown in one frame 1875 on display 1410 while still images 1895 may be shown in another frame 1880. Flight personnel may interactively control PID 1725 while viewing the live-feed video 1890 in order to refine what additional sensor-based inspection information is gathered. Thus, the flight personnel can then better view and review the tie down strap 850 as positioned on shipping item 845 and can make a verification result determination—e.g., about whether the extent the tie down strap 850 has moved as indicated by the video inspection information 1890 and still imagery 1895 is, in fact, problematic and needs addressing or whether such movement is sufficiently small or minor indicative of continued safe operation of the aircraft.

Depending upon the particular inspection point at issue, the system may use different sensors, different perspectives, and/or different limits for the additional sensor-based inspection information gathered in a verified inspection. For example, a verification command sent by delivery vehicle transceiver 1735 to PID 1725 may identify parameters that have PID 1725 using a depth sensor to surface map the area around the inspection point at issue as part of the verified inspection. In another example, the verification command may identify parameters that have PID 1725 using an ultrasonic transducer as another type of sensor that uses sound waves to map surfaces, which can help validate or supplement data received by a depth sensor that maps the area around the inspection point at issue.

For example, as shown in FIG. 18E, PID 1725 has deployed its onboard depth sensor to map the relevant area around the tie down strap 850 that was identified in the potential adverse inspection condition. Such a mapping may be performed from multiple vantage points or perspectives relative to the location of the tie down strap 850. As such, the mapping information may be used, in this example, to generate a three-dimensional (3D) model of the current state of that inspection point, such as exemplary 3D model 1896 shown in frame 1897 of an interactive touchscreen display 1410 on delivery vehicle transceiver 1735. Personnel operating the delivery vehicle transceiver 1735 may select different onscreen touch icons 1898 to manipulate and move the 3D model 1896 on display 1410 (without requiring remote control or interacting further with PID 1725). In this manner, such personnel operating the delivery vehicle transceiver 1735 may zoom in and out, and change perspectives when investigating the potential adverse inspection condition related to the tie down strap 850 used on shipping item 845 as part of a verified inspection.

Figure 18F:
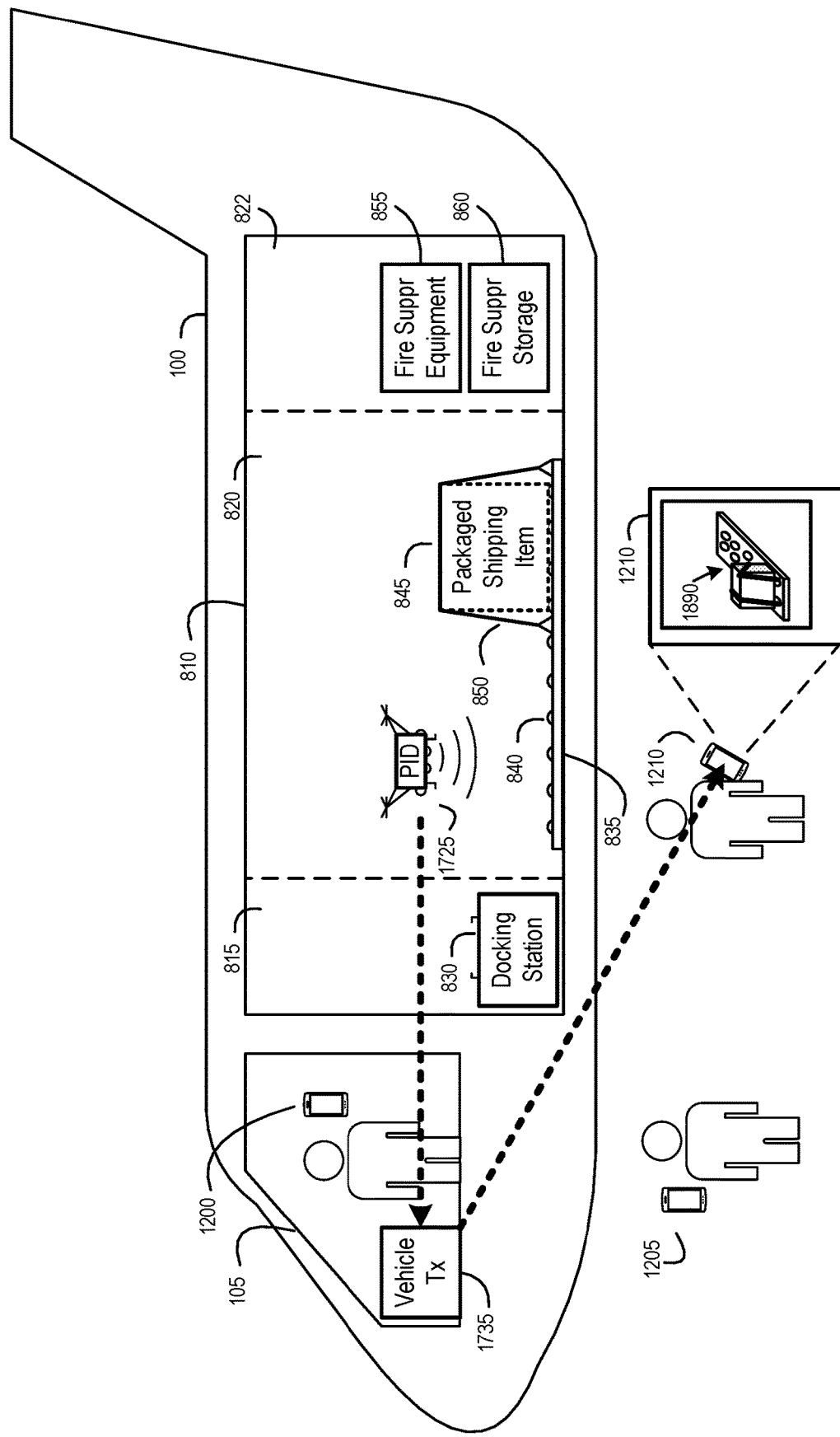

While the example shown and explained above used delivery vehicle transceiver 1735 as the particular transceiver interacting with PID 1725 related to conducting a verified inspection, those skilled in the art will appreciate that other transceivers may be substituted for transceiver 1735 (such as mobile interactive radio-based transceivers 1200, 1205, and 1210 that may communicate with each other, PID 1725, and/or delivery vehicle transceiver 1735). For example, mobile interactive radio-based transceiver 1210 may be a ruggedized radio-based tablet or smartphone used by logistics personnel responsible for loading and unloading shipping items (such as item 845) within aircraft 100. Mobile interactive transceiver 1210 may operate the same as delivery vehicle transceiver 1735 described above in FIGS. 17-18E related to verified inspections and having the mobile interactive transceiver 1210 interacting with PID 1725 in the manner described above. Alternatively, an embodiment may deploy mobile interactive transceiver 1210 where delivery vehicle transceiver 1735 operates as a communication hub related to verified inspections conducted by PID 1725 and interactive user input and displayed verification related additional sensor-based inspection information are received and shown on mobile interactive transceiver 1210, as shown in FIG. 18F.

In light of the example described above relative to FIGS. 17-18F, details about an exemplary drone-based system used to conduct a verified inspection of a delivery vehicle (e.g., an aircraft, a trailer and related motorized vehicle, a marine vessel, and a railroad car) may be further explained. An embodiment of such a system may include a paired inspection drone and a display-enabled transceiver (such as PID 1725 and delivery vehicle transceiver 1735 that has display 1410). The inspection drone is exclusively paired to the delivery vehicle and has one or more sensors (such as a still image camera, a video camera, and/or a depth sensor) used to gather inspection information related to parts of the delivery vehicle. As part of this system, the paired inspection drone aerially inspects targeted inspection points defined in an inspection profile record for the delivery vehicle (e.g., inspection profile record 945) and corresponding to respective parts of the delivery vehicle (such as a roller 840 or tie down strap 850). The display-enabled transceiver, which communicates with the paired inspection drone via a wireless communication interface, is operated through an interactive user interface (such as interactive touchscreen display 1410 on transceiver 1735), which accepts input from the operator and displays notification information, such as that shown on display 1410 in FIGS. 18A-18E. The display-enabled transceiver may be fixed and part of the delivery vehicle (such as how transceiver 1735 is fixed and located in the control compartment 105 of the aircraft 100) or it may be implemented as a mobile display-enabled transceiver device physically separate from the delivery vehicle (such as mobile interactive transceiver 1210 operated by logistics personnel related to aircraft 100).

In this system embodiment, the paired inspection drone executes its inspection program stored onboard. Execution of this particular exemplary inspection program allows for particular functionality in the paired inspection drone so that the drone becomes configured to identify the relevant targeted inspection points from the inspection profile record stored within the paired inspection drone, and then detect sensor-based inspection information using one or more sensors relative to one of the targeted inspection points once the paired inspection drone has aerially moved to a first aerial position proximate that targeted inspection point (such as when PID 1725 has moved to an aerial position proximate tie down strap 850 and then uses a camera to take pictures of the tie down strap 850). The paired inspection drone then automatically identifies a potential adverse inspection condition regarding that targeted inspection point based upon the detected sensor-based inspection information (such as when PID 1725 automatically identifies there is a potential adverse inspection condition with the tie down strap 850 given the currently gathered image shows movement of the strap relative to a prior inspection of the strap. As such, the paired inspection drone automatically generates and responsively transmits an interactive intervention request to the display-enabled transceiver so that an appropriate level of follow-up inspecting may occur to quickly determine whether the identified potential adverse inspection condition warrants finding that the targeted inspection point needs attention by fixing or replacement. In general, an exemplary interactive intervention request identifies the potential adverse inspection condition regarding the targeted inspection point, which indicates a need for a verified inspection, and requests feedback regarding the one of the targeted inspection points. Such an interactive intervention request may, for example, identify the tie down strap 850 and indicate a need for a verified inspection from the results of comparing sensor-based inspection information gathered (e.g., camera imagery) with reference parameters (e.g., a prior image showing a previous configuration of the tie down strap 850) with a feedback request. Depending on how the system implements such an interactive intervention request, the feedback request may be automatic and, thus, inherent in any interactive intervention request transmitted by the paired inspection drone given the drone updates its own inspection profile record based on the verification results that follow from the interactive intervention request.

Upon receipt of the interactive intervention request, the display-enabled transceiver displays a notification related to the interactive intervention request on the user interface. Such a displayed notification presents information about the potential adverse inspection condition regarding the targeted inspection point at issue, the need for the verified inspection regarding that targeted inspection point. For example, as shown in FIG. 18A, the touchscreen user interface 1410 of transceiver 1735 displays the notification in the form of graphic model 1800 representing aircraft 100 and identifying the targeted inspection point related to the interactive intervention request with a highlighted area 1860 of the aircraft 100 associated with that tie down strap 850. This presents the highlighted area 1860 as a type of user selectable region of the displayed graphic model 1800 of the aircraft 100.

When the operator of transceiver 1735 selects this region, the transceiver's user interface detects the selection action and generates a verification command to be sent to the paired inspection drone. The verification command may be generated based upon verification inspection input received by the user interface of the display-enabled transceiver, which may identify parameters related to the task of obtaining additional sensor-based inspection information as part of the verification follow-up inspection performed by the paired inspection drone. For example, the verification inspection input may include parameters identifying the type of sensor to be used, the different vantage points from which the paired inspection drone should be positioned to gather the additional sensor-based inspection information, and/or different reference information to use when gathering the additional sensor-based inspection information. In more detail, the parameters identified by the verification inspection input and related to the additional sensor-based inspection information may include specific autonomous or interactive drone control input for the paired inspection drone that causes the paired inspection drone to gather such additional sensor-based inspection information from a set of different aerial positions relative to and proximate to the inspection point at issue. In an embodiment, the drone control input may put the paired inspection drone in a given orbit moving around the inspection point. In another embodiment, the drone control input may place the paired inspection drone in specific aerial locations so as to view the inspection point from defined perspectives.

In one embodiment, exemplary verification inspection input may be selectively input using the user interface of the display-enabled transceiver; but in another embodiment, the verification inspection input may be a set of default or customizable default settings and parameters for that inspection point.

Once generated, the display-enabled transceiver transmits the verification command to the paired inspection drone, where the paired inspection drone initiates the follow-up verification inspection of the inspection point at issue using the parameters included with the verification command. When or as the paired inspection drone obtains the additional sensor-based inspection information (e.g., using particular sensors as identified by the parameters of the verification command), the paired inspection drone provides the additional sensor-based inspection information back to the display-enabled transceiver as part of the verified inspection. From there, the display-enabled transceiver generates information on its display with the additional sensor-based inspection information. For example, as shown in FIG. 18D, the displayed additional sensor-based inspection information may include a still image 1895 or video images 1890 (e.g., real-time imagery) related to the targeted inspection point at issue. In a further embodiment, the displayed additional sensor-based inspection information may take the form of three-dimensional mapping related information about the targeted inspection point at issue, such as the 3D model 1896 shown in FIG. 18E that may be interactively manipulated to review the potential adverse inspection condition found related to the targeted inspection point at issue.

Based upon the presented additional sensor-based inspection information obtained in this type of follow-up verification inspection using the paired inspection drone, the display-enabled transceiver receives verification result input related to or associated with a result of the verified inspection of the one of the targeted inspection points. For example, an operator of transceiver 1735 may view the video 1890 or still image 1895 or manipulate the 3D model 1896 and determine that the tie down strap 850 has not sufficiently moved to cause a problem with safe operation of the aircraft 100. With this verification result input, the display-enabled transceiver can then transmit the requested feedback to the paired inspection drone to reflect the operator's determined result of the verified inspection.

A further embodiment of a drone-based system for verified inspection of the delivery vehicle may extend such an exemplary system to include a paired inspection drone, a drone docking station, and one or more display-enabled transceivers (e.g., one of which may be part of the delivery vehicle while another may be a mobile interactive display-enable transceiver). A first display-enabled transceiver has an interactive user interface (such as a touchscreen display 1410) and communicates with the paired inspection drone. Similar to what is described above, the system's paired inspection drone (such as PID 1725) is exclusively paired to the delivery vehicle and operative to aerially inspect a plurality of targeted inspection points corresponding to respective parts of the delivery vehicle. The paired inspection drone includes at least a main housing, an onboard controller, a memory storage, lifting engines, a sensor array, a wireless communication interface, and a drone capture interface disposed on the main house that helps secure the paired inspection drone to the drone docking station. The memory storage is coupled to the onboard controller and maintains an inspection profile record that defines targeted inspection points corresponding to respective parts of the delivery vehicle to be inspected. The lifting engines are each coupled with respective lifting rotors, are fixed to different portions of the main housing, and are responsive to flight control input generated by the onboard controller as part of maintaining a desired flight profile. The sensor array may include one or more different types of sensors coupled to the onboard controller and that (a) detect sensor-based inspection information while the paired inspection drone is airborne and has aerially moved relative to different parts of the delivery vehicle and (b) provide the detected sensor-based inspection information to the onboard controller. The wireless communication interface of the paired inspection drone is also coupled to the onboard controller, and configured to transmit messages (e.g., an inspection notification message or an interactive intervention request message) in response to a transmission command from the onboard controller.

The drone docking station (such as docking station 830 shown in at least FIGS. 8A, 8B, and 17) is fixed to the delivery vehicle. As part of the system, the drone docking station provides a physical mating interface to the paired inspection drone's drone capture interface. In this way, the drone docking station and the drone capture interface can selectively maintain the paired inspection drone in a secured position within a delivery vehicle, such as within a drone storage area 815 of aircraft 100.

In operation, the onboard controller of the system's paired inspection drone identifies the targeted inspection points from the inspection profile record stored within the memory storage, causes the lifting engines to position the paired inspection drone at a first aerial position proximate to one of the targeted inspection points, and then proceeds to have one or more sensors detect sensor-based inspection information about the targeted inspection point while the paired inspection drone is in the first aerial position. If the onboard controller of the paired inspection drone automatically identifies a potential adverse inspection condition regarding the targeted inspection point based upon the detected sensor-based inspection information, the controller responsively generates and has the wireless communication interface transmit the interactive intervention request to the first display-enabled transceiver. The system's first display-enabled transceiver (e.g., delivery vehicle transceiver 1735 as shown and explained relative to FIGS. 17-18E) receives the interactive intervention request from the paired inspection drone, and responds by displaying a notification related to the interactive intervention request on the interactive user interface. In particular, the displayed notification includes a highlighted region of a displayed graphic model (such as model 1800) representing the delivery vehicle, where the highlighted region (such as region 1860) is associated with the targeted inspection point identified in the interactive intervention request. The system's first display-enabled transceiver then generates a prompt on its interactive user interface for the need for the verified inspection regarding the one of the targeted inspection points. In response to operator input, the system's first display-enabled transceiver detects a selection action relative to the highlighted region of the displayed graphic model. Such a selection action indicates the operator's desire to begin the verified inspection of the targeted inspection point that has the potential adverse inspection condition.

After reviewing additional sensor-based inspection information gathered as part of the follow-up verified inspection (such as an image related to the targeted inspection point, a video related to the targeted inspection point, and/or other sensor-based information such as three-dimensional mapping information about the targeted inspection point), the interactive user interface of the first display-enabled transceiver receives verification result input related to a result of the verified inspection of the one of the targeted inspection points. Such verification result input may be a detected selection of a button or key that indicates the targeted inspection point at issue needs replacement or maintenance intervention based on the additional sensor-based inspection information shown to the operator of the first display-enabled transceiver, or indicates that the targeted inspection point at issue is in a satisfactory condition after the scrutiny of the automated verification inspection conducted by the paired inspection drone and under the enhanced inspection parameters associated with that verification inspection. Thereafter, the first display-enabled transceiver then transmits a feedback message to the paired inspection drone, where the feedback message corresponds to the result of the verified inspection as reflected by the received verification result input.

Those skilled in the art will appreciate that the first display-enabled transceiver may be a radio-based interactive transceiver fixed to the delivery vehicle, such as exemplary delivery vehicle transceiver 1735, or may be a mobile display-enabled transceiver separate from the delivery vehicle, such as one of transceivers 1200-1210 as described above. Each of such exemplary mobile display-enabled transceivers may be used in such a system as directly communicating and interacting with the paired inspection drone. However, in other embodiments, such as that shown in FIG. 18F, exemplary mobile display-enabled transceivers may be deployed as mobile interactive display platforms that rely on and communicate with a primary transceiver on the delivery vehicle when conducting verified inspections of parts.

In more detail and with reference to FIG. 18F showing an extension of this system embodiment, the system may include a second mobile display-enabled transceiver (e.g., the mobile ruggedized tablet-based transceiver 1210 used by logistics personnel loading aircraft 100) in communication with the first display-enabled transceiver (e.g., delivery vehicle transceiver 1735). This second mobile display-enabled transceiver is physically separate from the delivery vehicle while the first display-enabled transceiver is disposed in a control compartment of the delivery vehicle, such as compartment 105 where flight personnel operate the aircraft 100. In this extended system embodiment, the first display-enabled transceiver may be programmatically configured to receive the additional sensor-based inspection information related to the targeted inspection point at issue directly from the paired inspection drone and then provide the received additional sensor-based inspection information to the second mobile display-enabled transceiver. The first display-enabled transceiver may prompt the second mobile display-enabled transceiver for the verification result input based upon at least the additional sensor-based inspection information sent and receive the verification result input from the second mobile display-enabled transceiver. In doing so, the second mobile display-enabled transceiver has a user interface and allows an operator of the second mobile display-enabled transceiver to view a display of the additional sensor-based inspection information on the user interface of the second mobile display-enabled transceiver. In particular, the second mobile display-enabled transceiver may generate a user notification prompting a user of the second mobile display-enabled transceiver to provide the verification result stemming from the verified inspection of the targeted inspection point at issue. With such a prompt appearing on the display of the second mobile display-enabled transceiver, the second mobile display-enabled transceiver receives the verification result input (e.g., yes—the targeted inspection point is within range for safe operation of the delivery vehicle or, no—the targeted inspection point is outside of an acceptable range and needs services or replacement), and transmits the verification result input to the first display-enabled transceiver (which may then relay that verification result back to the paired inspection drone so that the drone may update the drone's inspection profile record accurately).

Additionally, this extended system embodiment may have the verification command generated by the second display-enabled transceiver and sent to the paired inspection drone via the first display-enabled transceiver. As part of the verification command, the interactive drone control input provided to the paired inspection drone by the first display-enabled transceiver (as generated by the second mobile display-enabled transceiver) is based upon remote drone control input provide to the first display-enabled transceiver by the second mobile display-enabled transceiver. In other words, the second mobile display-enabled transceiver may be responsible for generating interactive drone control input remotely through its mobile interactive user interface.

Figure 19A:
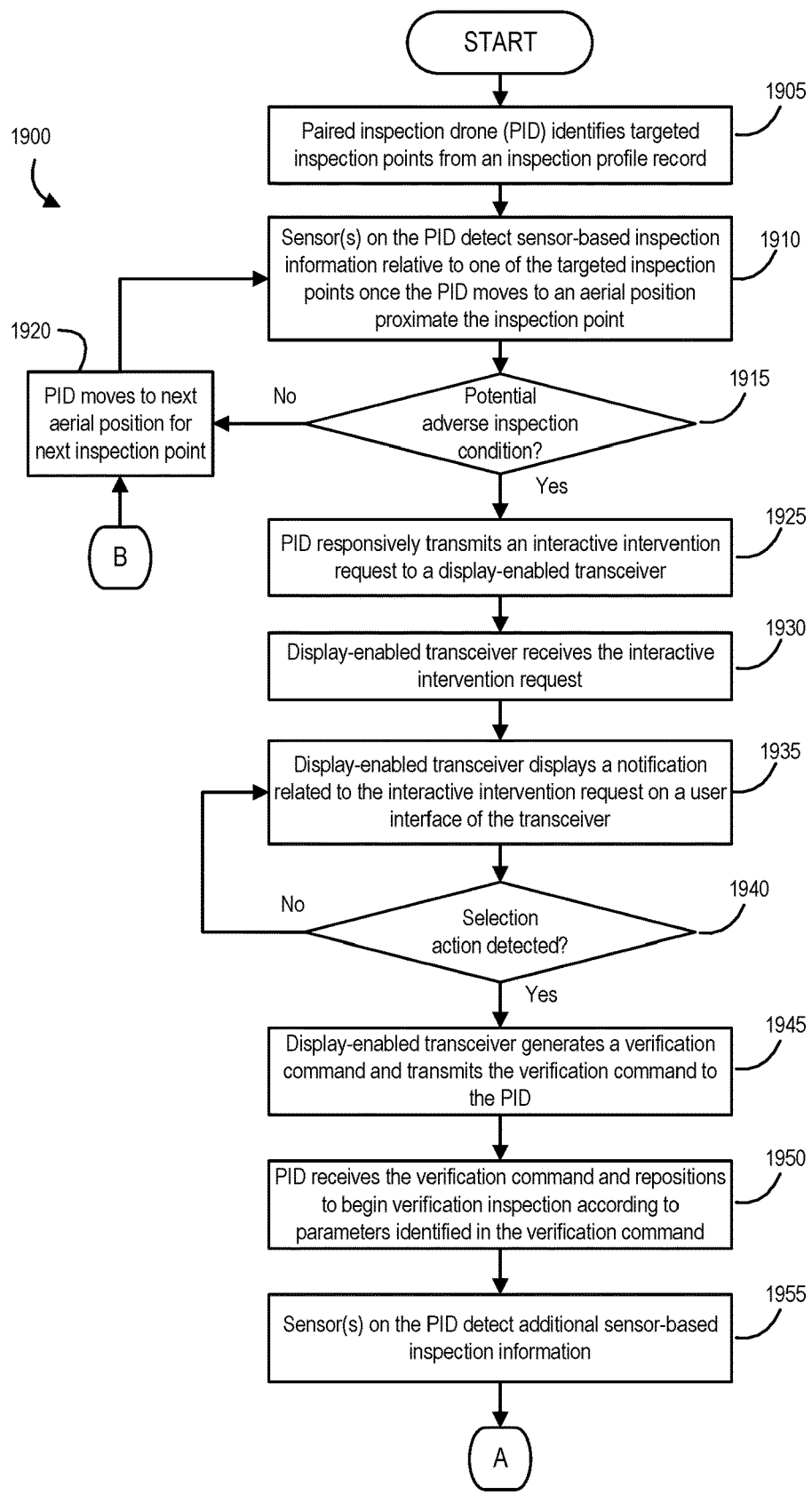
FIGS. 19A-19B are flow diagrams that collectively illustrate an exemplary drone-based method for conducting a verified inspection of a delivery vehicle that involves an automatically generated interactive intervention request in accordance with an embodiment of the invention.
Figure 19B:
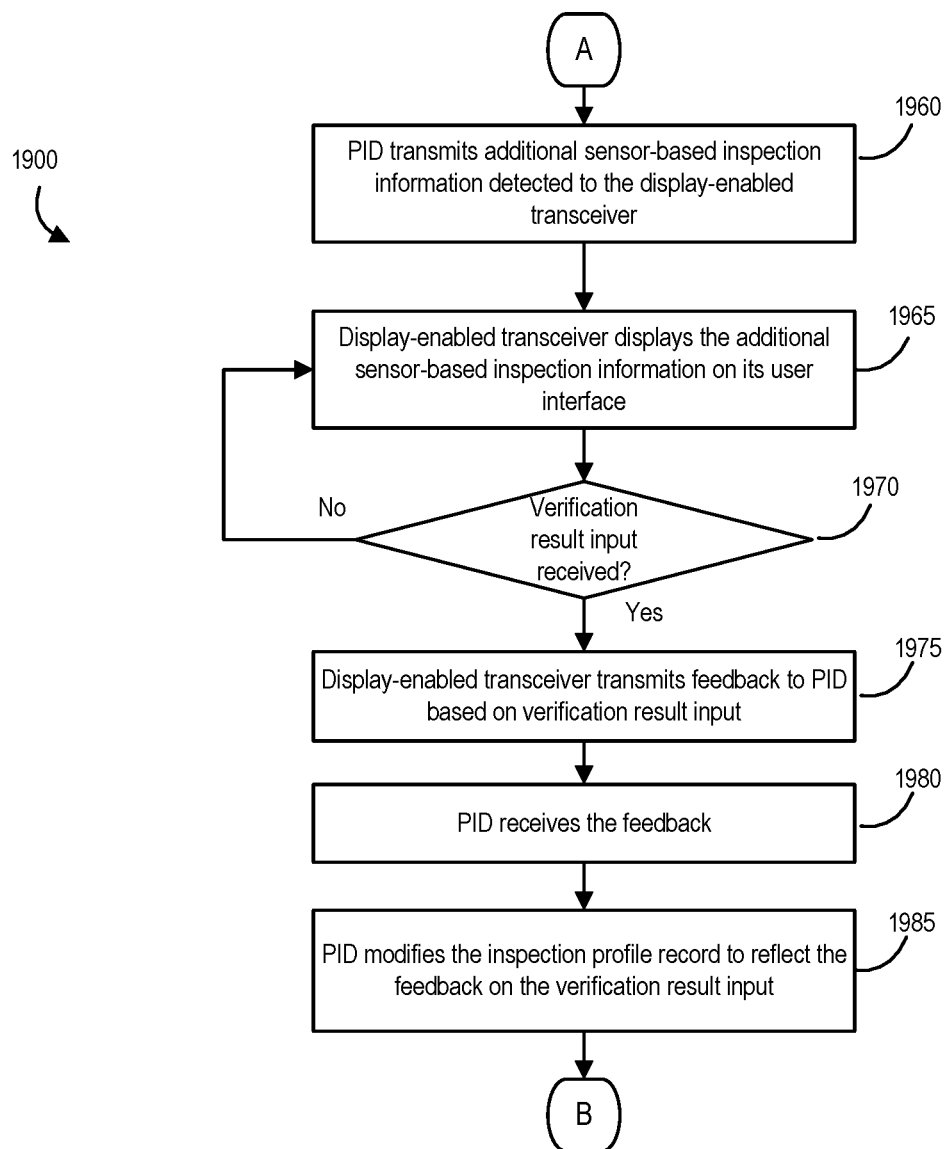

The system embodiments described above may be used as part of a drone-based method embodiment for verified inspection of a delivery vehicle involving an automatically generated interactive intervention request. In more detail, FIGS. 19A-19B are flow diagrams that collectively illustrate an exemplary drone-based method for conducting a verified inspection of parts of a delivery vehicle that involves an automatically generated interactive intervention request. Referring now to FIG. 19A, method 1900 begins at step 1905 where a paired inspection drone (PID) exclusively assigned to the delivery vehicle identifies multiple targeted inspection points related to the delivery vehicle's parts from an inspection profile record stored within the PID (such as inspection profile record 945 as explained above). The delivery vehicle may be implemented as an aircraft (such as aircraft 100), a cargo trailer and related motorized vehicle, a marine vessel, or a railroad car.

At step 1910, method 1900 has at least one sensor on the PID detecting sensor-based inspection information relative to one of the targeted inspection points once the paired inspection drone has aerially moved to a first aerial position proximate the one of the targeted inspection points. For example, as shown in FIG. 17, PID 1725 moves to an aerial position proximate the tie down strap 850 and commences to use a camera sensor on PID 1725 to detect imagery inspection information about the current state of the tie down strap 850 as one of the targeted inspection points on aircraft 100.

At step 1915, method 1900 may automatically identify a potential adverse inspection condition related to the targeted inspection point based upon the detected sensor-based inspection information. More specifically, processing and comparison of the currently detected sensor-based inspection information for this targeted inspection point may yield a result that indicates the targeted inspection point is now outside an acceptable range for operation of the delivery vehicle. Thus, if step 1915 fails to automatically identify an inspection condition for the targeted inspection point, step 1915 proceeds directly to step 1920 where the PID moves to the next aerial position for gathering sensor-base inspection information on the next inspection point, and method 1900 then proceeds back to step 1910. However, if step 1915 does automatically identify an inspection condition based upon the sensor-based inspection information detected (e.g., a comparison of such sensor-based inspection information to reference information for the targeted inspection point indicates an out of range situation), step 1915 proceeds to step 1925.

At step 1925, the PID responsively transmits the interactive intervention request to a display-enabled transceiver, which may be part of the delivery vehicle or a mobile interactive radio-based transceiver (such as a wireless enabled tablet device, a smartphone device, or a laptop computer device). In this embodiment, the interactive intervention request at least identifies the potential adverse inspection condition regarding the one of the targeted inspection points. The interactive intervention request may also indicate a need for or explicitly request a verified inspection on the targeted inspection point at issue and request feedback regarding that targeted inspection point.

At step 1930, the display-enabled transceiver receives the interactive intervention request from the PID and then, at step 1935, method 1900 has the display-enabled transceiver displaying a notification related to the interactive intervention request on a user interface of the display-enabled transceiver (e.g., an interactive touchscreen display interface). The notification generally presents information on the user interface about the potential adverse inspection condition regarding the one of the targeted inspection points and the need for the verified inspection regarding the one of the targeted inspection points (e.g., via displaying a graphic model representing the delivery vehicle on the user interface of the display-enabled transceiver, where the displayed graphic model identifies the particular targeted inspection point at issue, may highlight an area of the delivery vehicle associated with that targeted inspection point, and may have the highlighted area of the delivery vehicle presented as a selectable region of the displayed graphic model).

At step 1940, method 1900 determines whether the user interface of the display-enabled transceiver has detected a selection action relative to the selectable region of the displayed graphic model. For example, an operator of the display-enabled transceiver 1735 or 1210 may touch a particular section of that transceiver's interactive touchscreen interface as a selection action. Thus, if the selection action is detected relative to the selectable region of the model, step 1940 proceeds to step 1945. Otherwise, step 1940 proceeds back to step 1935.

At step 1945, the display-enabled transceiver generates a verification command based upon verification inspection input received by the display-enabled transceiver. In particular, the verification inspection input received identifies one or more parameters related to the additional sensor-based inspection information to be gathered by the PID. This may be received via further prompted inputs from the operator of the transceiver, or may be received as a set of defaults or customizable default verification inspection parameters on, for example, what sensors to use, how long to measure the inspection point, what reference information to use when conducting the verification inspection, and what the desired aerial position for the PID should be when making the verified inspection. Accordingly, such parameters related to the additional sensor-based inspection information to be gathered as part of the verification inspection may include autonomous or interactive drone control input to be received by the PID from the display-enabled transceiver when the PID is gathering such additional sensor-based inspection information for the verification inspection.

At step 1950, method 1900 has the PID receiving the verification command and, in response, repositioning the PID to begin the verified inspection according to the parameters identified in the verification command. At step 1955, the sensor or set of sensors on the PID detect the additional sensor-based inspection information in accordance with the verification command and parameters identified as part of the command. In more detail, the additional sensor-based inspection information detected may include an image related to the targeted inspection point at issue, a video related to that targeted inspection point, or real-time imagery of an area of the delivery vehicle proximate that targeted inspection point to provide a broader view of the current state of the inspection point and its surroundings. Further still, the additional sensor-based inspection information may be three-dimensional mapping information about the targeted inspection point at issue, such as the 3D model 1896 shown in FIG. 18E where the operator of the display-enabled transceiver 1735 can artificially manipulate this 3D image built from the depth sensor mappings of the targeted tie down strap 850 and its surrounding area. After step 1955, method 1900 transitions through point A on FIG. 19A to point A on FIG. 19B.

At step 1960 on FIG. 19B, method 1900 proceeds with the PID transmitting the additional sensor-based inspection information detected to the display-enabled transceiver. Such a transmission may, in some cases, be a singular event type of transmission. But in other cases and with other types of data, the transmission may be repeated, periodic, or streaming depending on the extent of inspection information desired for this verification inspection. For example, still images may be transmitted by PID back to the display-enabled transceiver one by one or in groups, while video information may be transmitted to the display-enabled transceiver in a streaming format where it may be buffered on the display-enabled transceiver or as a single video recording file. Three-dimensional mapping information may also be transmitted by the PID in parts as the depth sensor is detecting the mapping information or in a final group of three-dimensional mapping information after the PID performs the necessary aerial maneuvers relative to the targeted inspection point to capture depth information on the point itself and the surrounding area.

At step 1965, the display-enabled transceiver has received the additional sensor-based inspection information from the verification inspection and displays the additional sensor-based inspection information relative to the targeted inspection point at issue in response to the detected selection action relative to the selectable region of the displayed graphic model. Thus, if the selection action had the verification inspection to be performed on tie down strap 850, the display-enabled transceiver displays the additional sensor-based inspection on the tie down strap 850 (e.g., still images of the tie down strap 850 from an increased number and variety of different camera angles; video of the tie down strap 850 from one or more camera angles; or a 3D model representing the tie down strap 850 and the proximate area near the strap 850 on packaged shipping item 845 and cargo attachment points 852).

At step 1970, method 1900 may determine if verification result input has been received on the user interface of the display-enabled transceiver, where the verification result input relates to a result of the verified inspection of the one of the targeted inspection points. For example, the verification result input may be provided by the operator of the display-enabled transceiver that is essentially an "intervening" party judging the results of the verification inspection. Such verification result input may reflect or indicate that the particular targeted inspection point at issue is fine and can still be used on the delivery or, alternatively, may reflect or indicate that the particular targeted inspection point at issue has been confirmed or otherwise verified to be in an adverse inspection condition where it is out of range for safe or desired operation of the delivery vehicle.

At step 1975, method 1900 may have the display-enabled transceiver transmitting feedback to the PID, where the feedback corresponds to the result of the verified inspection as reflected by the verification result input received by the display-enabled transceiver. At step 1980, the PID may receive the feedback and then, at step 1985, modify the inspection profile record to reflect the feedback on the verification result input. Thus, the inspection profile record may be updated with the result of the verification inspection so that the inspection profile record keeps a record of what happened relative to inspections of this particular targeted inspection point. Thereafter, step 1985 transitions through point B on FIG. 19B back to point B on FIG. 19A where method 1900 continues at step 1920 to move on to the next targeted inspection point.

Airborne Relocatable Communication Hub Using a Paired Communication Drone

As explained above, an exemplary delivery vehicle may temporarily maintain custody of items being shipped that are broadcast-enabled. In more detail, an embodiment of such a broadcast-enabled item has an associated radio-based device that is configured to communicate with other broadcast-enabled items maintained within the delivery vehicle or radio-based devices external to the delivery vehicle. However, the broadcast-enabled device may encounter issues with having a limited reception or transmission range. In other words, while two broadcast-enabled items adjacent one another may have no issue communicating with each other, two broadcast-enabled items physically separated from each other by a large enough distance within the delivery vehicle may experience communication difficulties due to inconsistent reception to no reception at all given their respective transmission and reception ranges and the dynamic movement of structure being placed within the delivery vehicle (e.g., placement of one or more metal containers or other items that may shield or otherwise attenuate signals being transmitted a broadcast-enabled item from one side of such structure to another broadcast-enabled item on the other side). For example, a package outfitted with a broadcast-enabled radio transceiver for monitoring the package's contents may be located in the rear of the delivery vehicle's internal shipment storage. This particular broadcast-enabled package may have a limited communication range, and be unable to communicate with other broadcast-enabled items or a central communication station located at the front of the delivery vehicle's internal shipment storage. This inability to communicate with other devices on the delivery vehicle may become even more acute when the broadcast-enabled radio transceiver in the package uses low broadcast power as a way of conserving battery life or when the broadcast-enabled radio transceiver is designed to be low power, such as a Bluetooth® Low Energy (BLE) radio or ZigBee radio transceiver.

To help unconventionally and adaptively facilitate communication between such broadcast-enabled devices and so they may handle longer distances between devices as they are disposed within the delivery vehicle and to accommodate the changing internal environment of the delivery vehicle, embodiments described below generally deploy an aerial communication drone that is exclusively paired with the delivery vehicle and operates in an airborne mode within the delivery vehicle (such as within an internal shipment storage area of the delivery vehicle). This type of exclusively paired drone is advantageously used within the delivery vehicle as a repositionable communication hub to improve the onboard communication environment for what is being transported within the delivery vehicle and for what may be a changing communication environment. Accordingly, the embodiments shown in FIGS. 20-27 and described below provide a technical solution with systems and methods that improve how different broadcast-enabled devices within a delivery vehicle can establish and maintain adequate communications with each other using a paired aerial communication hub drone strategically deployed within the delivery vehicle.

Figure 20:
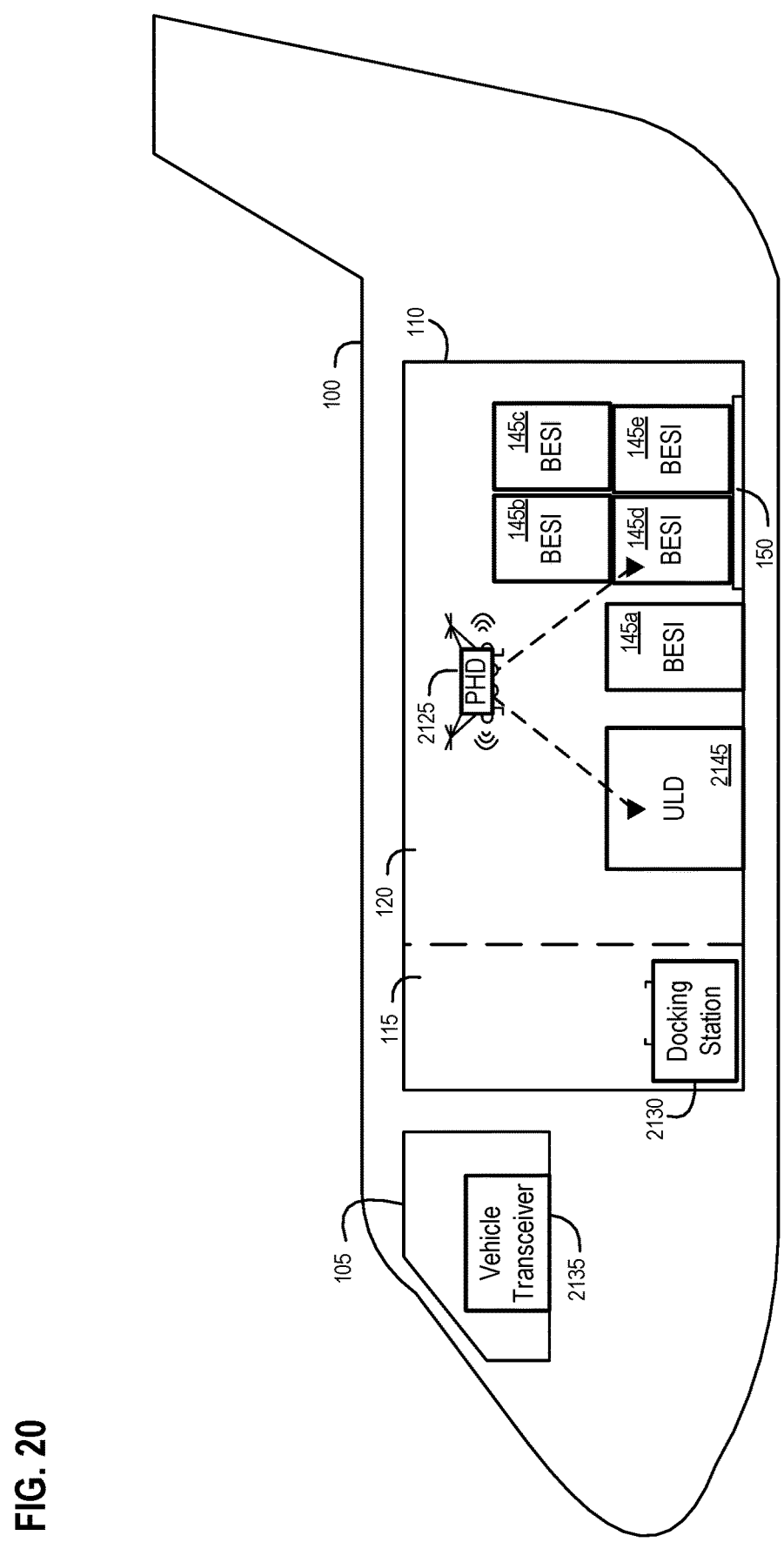
FIG. 20 is a diagram of an exemplary paired aerial drone-based system used to provide an airborne relocatable communication hub within a delivery vehicle for a plurality of broadcast-enabled devices maintained within the delivery vehicle in accordance with an embodiment of the invention.

FIG. 20 is a diagram of an exemplary paired aerial drone-based system used to provide an airborne relocatable communication hub within a delivery vehicle for broadcast-enabled devices maintained within the delivery vehicle in accordance with an embodiment of the invention. Referring now to FIG. 20, exemplary aircraft 100 (a type of delivery vehicle) has an exemplary control compartment 105 and an exemplary shipment storage 110. As explained above, the exemplary shipment storage 110 includes interior shipment storage area 120 and drone storage area 115. In the embodiment shown in FIG. 20, a vehicle transceiver 2135 is disposed within the control compartment 105, an internal docking station 2130 is disposed within the drone storage area 115, and an aerial communication drone 2125 is shown as flying within the interior shipment storage area 120 but may be secured on docking station 2130 when not flying. Aerial communication drone 2125 is exclusively paired to the aircraft 100 and is also referred to as a paired communication hub drone or PHD herein.

In general, vehicle transceiver 2135 of FIG. 20 is a type of central communication station on the aircraft 100 and may be implemented as a standalone radio-based unit or an integrated part of the aircraft's avionics suite. Vehicle transceiver 2135 may be used in embodiments as a network element that may communicate with devices located inside of aircraft 100 (such as broadcast-enabled shipping items 145a-145e) and devices located outside of aircraft 100. For example, vehicle transceiver 2135 may communicate externally disposed radio-based communication devices, such as a local logistics operation server that has a wireless network interface (not shown), a remote cloud-based logistics management system (i.e., a network of remote servers hosted on the Internet that can store, manage, and process shipment management information (such as updated sensor data related to the status of broadcast-enabled shipping items on aircraft 100, and the like)) accessible through a wireless network interface (not shown), or flight operations personnel via other radio-based transceivers (such as handheld transceiver 2300 shown in FIG. 23). In more detail, such radio-based transceivers that communicate with broadcast-enabled devices within the delivery vehicle 100 may be implemented as wireless handheld devices (such as smartphones, ruggedized tablets, UHF/VHF handheld radios, and the like) that communicate with vehicle transceiver 2135 over a compatible communication path (e.g., a designated radio frequency, a cellular network, a data communication network, and the like). Additionally, an embodiment of exemplary vehicle transceiver 2135 shown in FIG. 20 may be used to communicate with internal docking station 2130 (e.g., via a wired or wireless connection) and/or PHD 2125 (e.g., via a wireless connection) disposed within aircraft 100 as described in more detail below. Further still, exemplary vehicle transceiver 2135 may provide an intermediary role between two other devices, such as between the PHD 2125 and a local server or a remote cloud-based logistics management system.

As noted above, exemplary broadcast-enabled shipping items 145a-145e may communicate with each other and with exemplary vehicle transceiver 2135 in an embodiment. In general, exemplary broadcast-enabled shipping items 145a-145e may include packaged or unpackaged items being transported alone or as part of a group of items (e.g., the group of items 145b-145e strapped and fixed relative to shipping pallet 150 or a group of items maintained within a single packaged shipping item, such as a crate, box, or other logistics container). Likewise, those skilled in the art will appreciate that a shipping item may be implemented with a unit load device (ULD) used with aircraft-based logistics operations and, when equipped with a broadcast-enabled device, exemplary ULD 2145 becomes a type of broadcast-enabled shipping item.

Exemplary broadcast-enabled shipping items 145a-145e as well as exemplary broadcast-enabled ULD 2145 (a type of broadcast-enabled shipping container) may be deployed in some embodiments within interior shipment storage area 120 as intercommunicating devices. For example, such broadcast-enabled shipping items 145a-145e and exemplary broadcast-enabled ULD 2145 may be configured, via their respective radios, to broadcast signals related to the condition of the respective item or items being shipped and function as different network elements at different levels of a hierarchically structured communication network. Exemplary broadcast-enabled shipping items 145a-145e and ULD 2145 may accomplish such broadcast functionality with a radio-based wireless transmitter or transceiver and that can broadcast messages about, for example, the condition of item (e.g., an environmental condition of the item using one or more sensors on the device) without being polled or interrogated to do so. In particular, such radio-based devices deployed as part of the broadcast-enabled shipping items 145a-145e and ULD 2145 may, for example, transmit or receive Bluetooth®, Zigbee, cellular, or other wireless formatted signals. Such devices may be attached or otherwise secured to the shipping item, included in a package with the shipping item, or embedded as part of the package or packaging material used with the shipping item.

Exemplary internal docking station 2130 shown in FIG. 20 is structurally similar to internal docking stations 130 and 830 described above and shown relative to FIGS. 4A and 4B. As such, docking station 2130 uses a physical docking interface (similar to PDI 415) that facilitates maintaining PHD 2125 in a secure position on the station 2130, an electronic charging connection interface (similar to ECCI 440) that can provide power to PHD 2125, and an electronic data connection interface (similar to EDCI 435) that can provide a wired bi-direction data link with PHD 2125. Docking station 2130 may also be implemented to communicate with vehicle transceiver 2135—e.g., via a wired data connection (similar to the wired connection of communication interface 430) to transceiver 2135 and/or a wireless communication path (accessed via a similar wireless interface part of communication interface 430) to vehicle transceiver 2135. Thus, docking station 2130 may be deployed as yet another type of broadcast-enabled device that operates as a network element of networked broadcast-enabled devices.

Exemplary PHD 2125 shown in FIG. 20 may be initially secured to exemplary docking station 2130 within the drone storage area 115 as a linked part of aircraft 100. In general, PHD 2125 is a paired aerial communication drone that travels with the aircraft 100 (or other type of delivery vehicle, such as a trailer hauled by a truck, a train car moved by a locomotive on a railway system, or a marine vessel that has an internal storage compartment or hold for transporting broadcast-enabled items). Furthermore, exemplary PID 2125 is configured with hardware similar to IMD 125 and PID 825 (as described above) with the exception of the sensors carried on IMD 125 and PID 825, which are basically replaced with a wireless communication hub interface that can establish one or more wireless data communication paths to different broadcast-enabled devices within the aircraft 100, such as to ULD 2145 and BESI 145*d*. In this way, PHD 2125 operates as an airborne relocatable communication hub deployed within such a delivery vehicle that enhances how broadcast-enabled devices may communicate while being maintained within the delivery vehicle and as the interior configuration of the shipment storage of the delivery vehicle changes with new items that may inhibit or interfere with communications between such broadcast-enabled devices.

Figure 21:
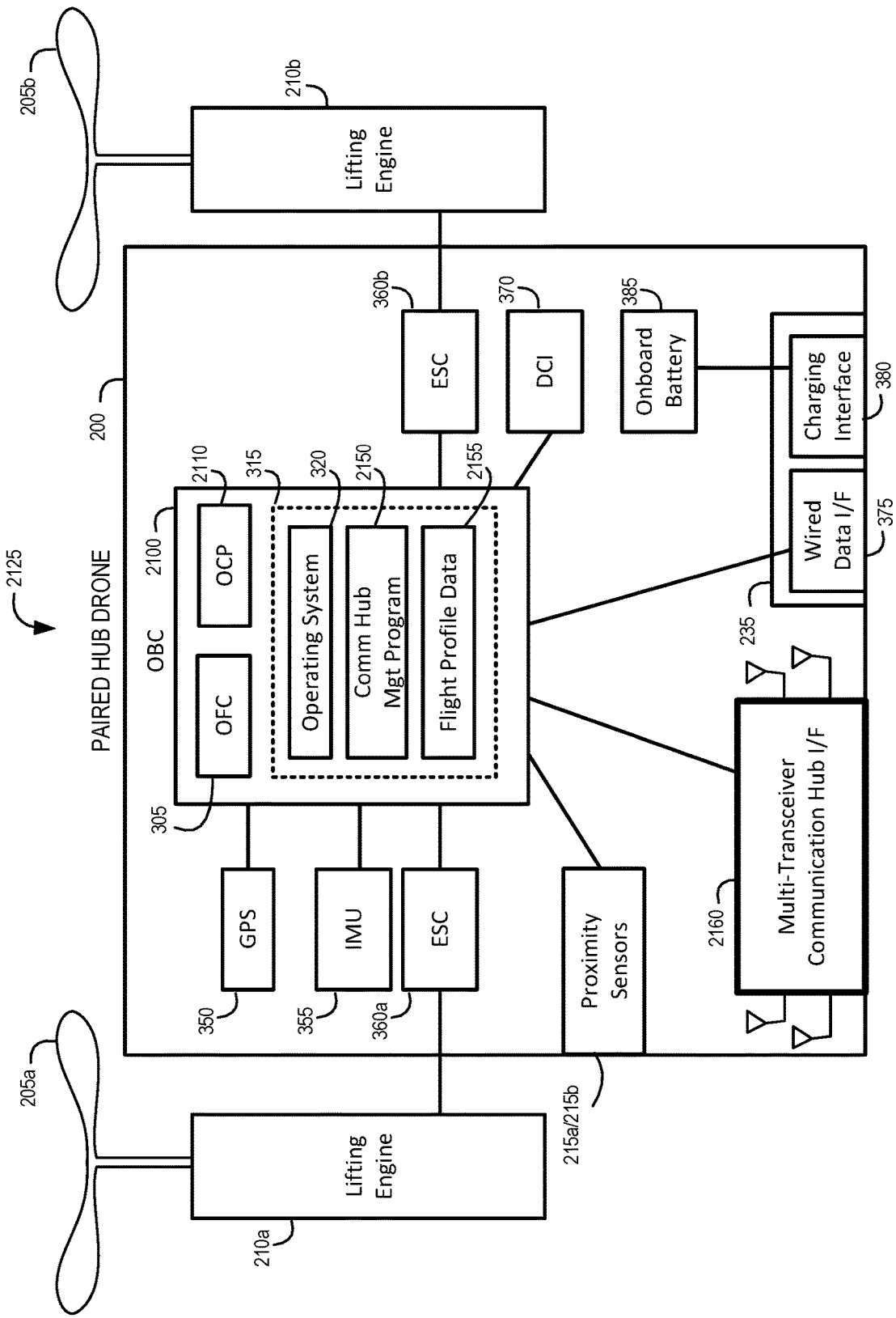
FIG. 21 is a schematic illustration of connected electronic and sensory components of an exemplary paired aerial communication drone in accordance with an embodiment of the invention.

In more detail, as shown in FIG. 21, exemplary PHD 2125 includes similar core parts as explained and shown for IMD 125 and PID 825, such as a main housing 200, an onboard controller (OBC) 2100 disposed within the main housing, a memory storage 315 coupled to the OBC 2100, and multiple lifting engines 210*a*, 210*b* that are coupled with respective lifting rotors 205*a*, 205*b* fixed to a different portions of the main housing 200. Each of the lifting engines on PID 2125 is responsive to flight control input generated by the OBC 2100 as part of maintaining a desired flight profile according to flight profile data 2155. As part of the exemplary PHD 2125, the OBC 2100 generally controls autonomous flying and docking of the drone 2125 as well as communication hub management tasks related to broadcast-enabled devices located within the shipment storage area 120 using multi-transceiver communication hub interface 2160 and communication hub management program 2150.

In some embodiments, OBC 2100 may be implemented with a single processor, multi-core processor, or multiple processors and have different programs concurrently running to manage and control the different autonomous flying/docking and internal communication hub management tasks. For example, in the embodiment shown in FIG. 21, flight/docking control and monitoring operations may be divided between onboard flight controller (OFC) 305 and an onboard communication management processor (OCP) 2110. In such an embodiment, OFC 305 and OCP 2110 may have access to the same memory, such as memory storage 315 or, alternatively, OBC 2100 may be implemented with separate dedicated memories that are accessible by each of OFC 305 and OCP 2110. Those skilled in the art will appreciate that memory accessible by OFC 305 may have different accessibility and size requirements compared to memory accessible by OCP 2110 given the different memory demands for the different responsibilities. Furthermore, OFC 305 and OCP 2110 may include peripheral interface circuitry that couples the processing element(s) to the different onboard peripheral circuitry, such as the GPS 350, inertial measurement unit 355, the proximity sensors 215*a*, 215*b*, the electronic speed controllers 360*a*, 360*b* that control each lifting engine 210*a*, 210*b*, and the like.

In general, exemplary multi-transceiver communication hub interface 2160 includes multiple independent radio-based transceivers controlled by the OBC 2100 (e.g., by OCP 2110 when executing the communication hug management program 2150) that collectively provide a communication access and extension functionality between two or more broadcast-enabled devices. Essentially, the OBC 2100 is configured to cause interface 2160 to establish different wireless data communication paths with different broadcast-enabled devices so that the interface 2160 may couple the paths with the broadcast-enabled devices so as to allow the devices to connect and communicate. Such connections may appear as peer-to-peer connections for devices at the same network level or wireless access point connections to a higher network level in a hierarchically structured communication network. For example, an exemplary multi-transceiver communication hub interface 2160 to be used during flight of the PHD 2125 may be implemented with a MIMO type (multiple in, multiple out, multiple antenna technology) communication transceiver disposed on PHD 2125 and coupled to the OBC 2100. Such an exemplary multi-transceiver communication hub interface 2160 may use one or more different communication protocols, such as a Wi-Fi communication protocol (e.g., supporting an IEEE 802.11 a/b/g/n and 802.11ac standard), a cellular communication protocol, a Bluetooth® communication protocol, or a Zigbee communication protocol. When coupling different protocols, the multi-transceiver communication hub interface 2160 uses an onboard protocol converter (implemented in hardware or firmware) to transform communications of data and commands (including coding, framing, and timing) between the distinct protocols. Using such a converter, the exemplary multi-transceiver communication hub interface 2160 may bridge communications between different broadcast-enabled devices even when the devices use different communication protocols in their respective paths to the PHD 2125.

Referring back to FIG. 21 and consistent with the discussions above relative to 1 MB 125 and PID 825, the operating system 320 stored in PHD 2125 may provide basic functions, such as program task scheduling, executing of application program code (such as exemplary communication hub management program 2160), and controlling lower level circuitry (e.g., registers, buffers, buses, counters, timers, and the like) on OCP 2110 that interface with other peripheral circuitry onboard PHD 2125 (such as the multi-transceiver communication hub interface 2160, proximity sensors 215*a*, 215*b*, the electronic docking connection 235, GPS 350, IMU 355, ESC 360*a*, 360*b*, and DCI 370).

Once operating system 320 is loaded, exemplary communication hub management program 2160 may load and be executed as part of implementing a method for adaptively deploying an airborne relocatable communication hub within a delivery vehicle, such as aircraft 100, that improves communication between broadcast-enabled devices maintained within the delivery vehicle. Exemplary communication hub management program 2150 is a set of executable instructions in the form of one or more machine-readable, non-transient program code modules or applications. The program code module(s) may be loaded and executed by OBC 2100 (or by OCP 2110 when flight control is dedicated to a separate OFC 305) to adapt the PHD 2125 into an unconventionally configured aerial communication hub apparatus exclusively paired to the aircraft 100 as a linked part of the aircraft that travels with the aircraft during shipment operations providing quick and assured inspection functionality for the aircraft wherever the aircraft is located. This specially configured OBC 2100 of PHD 2125, as described in more detail herein as a part of an embodiment, implements operative process steps and provides functionality that is unconventional, especially when the overall steps that provide extended communication access functionality using the PHD 2125 are considered collectively as a whole. Such a specially adapted and configured paired communication hub drone (e.g., PHD 2125) helps, as a part of an embodiment, to improve how broadcast-enabled devices on the delivery vehicle (e.g., radio-based transceivers associated with shipping items (such as the transceivers in BESI 145a-145e) and associated with shipping containers (such as the transceiver in ULD 2145)) communicate with each other while being disposed in the delivery vehicle and as the storage within the delivery vehicle may change presenting further difficulties to maintaining adequate communications between such devices.

In addition to the exemplary communication hub management program 2150, memory storage 315 of PHD 2125 also maintains flight profile data 2155. Flight profile data 2155 comprises information that defines how the PHD 2125 is to be flying. This data may include navigational data on an airborne monitoring path for the drone 2125 to transit, as well as flight control setting information to use when generating flight control input for the ESCs 360a, 360b. In some embodiments, remote flight control commands may be received by PHD 2125 and kept as a type of flight profit data 2155 that provides the OFC 305 with flight control input to control aerial movement of the PHD 2125. In other embodiments, OFC 305 is able to generate the flight control input autonomously to enable the PHD 2125 to self-control aerial movements of the aerial communication drone from the secured position on the internal docking station to at least the first deployed airborne position. Thus, PHD 2125 maintains and uses flight profile data 2155 as part of moving about the interior 110 of aircraft 100 when providing relocatable communication hub services for broadcast-enabled devices maintained on aircraft 100.

Using components shown in FIGS. 20 and 21 and described above, an exemplary embodiment may be described in more detail of an airborne drone-based system that adaptively provides communication hub services within a delivery vehicle. In particular, such an exemplary system adaptively provides communication hub services within the delivery vehicle to broadcast-enabled devices maintained within the delivery vehicle and essentially includes internal docking station 2130 and PHD 2125 as described above. In operation, the OBC 2100 of PHD 2125 executes at least the communication hub management program 2150 in order to adaptively provide such relocatable communication hub services within the aircraft 100 (as a type of delivery vehicle). In more detail, the OBC 2100 of PHD 2125 is configured and operative to transition from at least a low power state to an active power state and then cause the DCI 370 of PHD 2125 to automatically uncouple PHD 2125 from a secured position on the internal docking station 2130 fixed within the delivery vehicle 100 once the PHD 2125 transitions to the active power state. The OBC 2100 of PHD 2125 (or OFC 305 of PHD 2125) changes the desired flight profile to cause the lifting engines 210a, 210b to move PHD 2125 from the secured position on the internal docking station 2130 to a deployed airborne position within an interior shipment storage area 120 of the aircraft 100. For example, as shown in FIG. 20, exemplary PHD 2125 has moved from being secured to docking station 2130 to being airborne at a deployed position within the internal shipment storage area 120 of aircraft 100 located above and between ULD 2145 and BESI 145d. Such a movement from the docking station 2130 to an airborne deployed position within and relative to aircraft 100 may occur when aircraft 100 is in motion (e.g., during taxi on the ground or when airborne) or when the aircraft 100 is not moving (e.g., is being loaded, unloaded, or just sitting on the tarmac of an airport).

Once at this deployed position relative to the aircraft 100, the OBC 2100 of PHD 2125 causes its onboard communication hub interface 2160 to establish a first wireless data communication path to one of the broadcast-enabled devices on the aircraft 100—such as the broadcast-enabled device associated with UDL 2145 (denoted by the triangular symbol within ULD 2145). The OBC 2100 of PHD 2125 then causes its onboard communication hub interface 2160 to establish a second wireless data communication path to another of the broadcast-enabled devices on the aircraft 100—such as the broadcast-enabled device associated with BESI 145d. Thereafter, the OBC 2100 of PHD 2125 causes its onboard communication hub interface 2160 to couple the first wireless data communication path and the second wireless data communication path. This has a tangible result of adaptively facilitating communications between the broadcast-enabled device on ULD 2145 and the broadcast-enabled device associated with BESI 145d. This may be especially advantageous because, for example, direct communications between the broadcast-enabled device on ULD 2145 and the broadcast-enabled device associated with BESI 145d may not be possible given the respective devices may be geographically separated by a large enough distance relative to their respective transmission and reception ranges. Furthermore, in another example, direct communication between the broadcast-enabled device on ULD 2145 and the broadcast-enabled device associated with BESI 145d may be hindered or rendered impossible when BESI 145a is placed in-between ULD 245 and BESI 145d (e.g., a dynamic change in the configuration occurs with respect to what is maintained within the shipment storage area 120, which may alter the communication environment and related connectivity for different broadcast-enabled devices within area 120).

Figure 22:
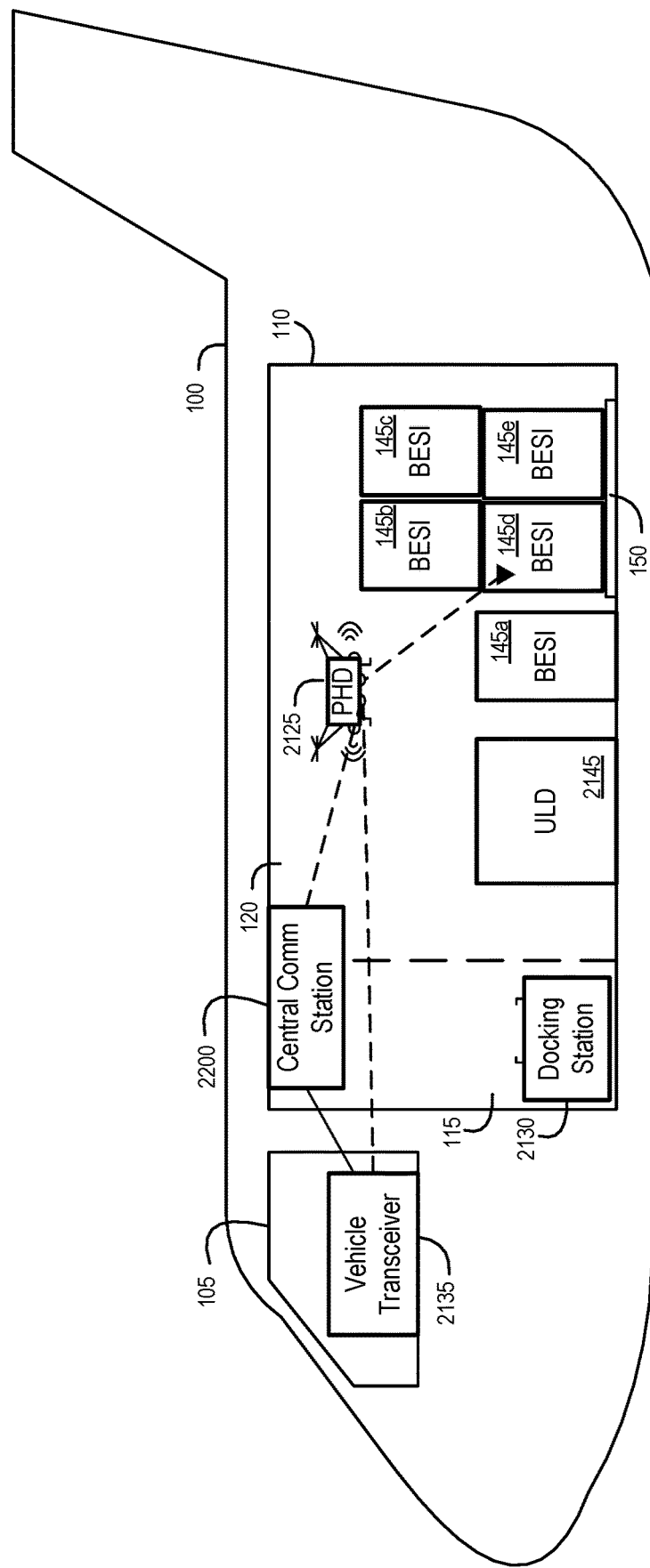
FIG. 22 is a diagram of another exemplary paired aerial drone-based system used to provide an airborne relocatable communication hub within a delivery vehicle between a central communication station and a broadcast-enabled device maintained within the delivery vehicle in accordance with an embodiment of the invention.

FIG. 22 is a diagram of another exemplary paired aerial drone-based system used to provide an airborne relocatable communication hub within a delivery vehicle between other types of broadcast-enabled devices within aircraft 100. Referring now to FIG. 22, the illustrated exemplary paired aerial drone-based system includes a central communication station 2200 disposed within aircraft 100 that may communicate with vehicle transceiver 2135 (similar to basic transceiver 135 or display enabled interactive vehicle transceiver 1335 as described above). Central communication station 2200 may be deployed is this embodiment as a hub that may forward data from vehicle transceiver 2135 or as a hub to an external communication device (not shown), such as a satellite or other remote communication transceiver. Further, central communication station 2200 may be used to directly communicate with any of the broadcast-enabled devices on the aircraft 100 (such as BESI 145d as shown in FIG. 22), but may also interact with PHD 2125 when direct communication with BESI 145d is hindered or not possible. As such, central communication station 2200 may operate as one of the broadcast-enabled devices on aircraft 100 and the OBC 2100 of PHD 2125 causes its onboard communication hub interface 2160 to couple a wireless data communication path with the central communication station 2200 with a second wireless data communication path established with another broadcast-enabled device (such as BESI 145d shown in FIG. 22). Likewise, another embodiment may deploy vehicle transceiver 2135 as one of the broadcast-enabled devices on the aircraft that communicates with BESI 145d via two wireless data communication paths adaptively established and coupled by PHD 2125.

Figure 23A:
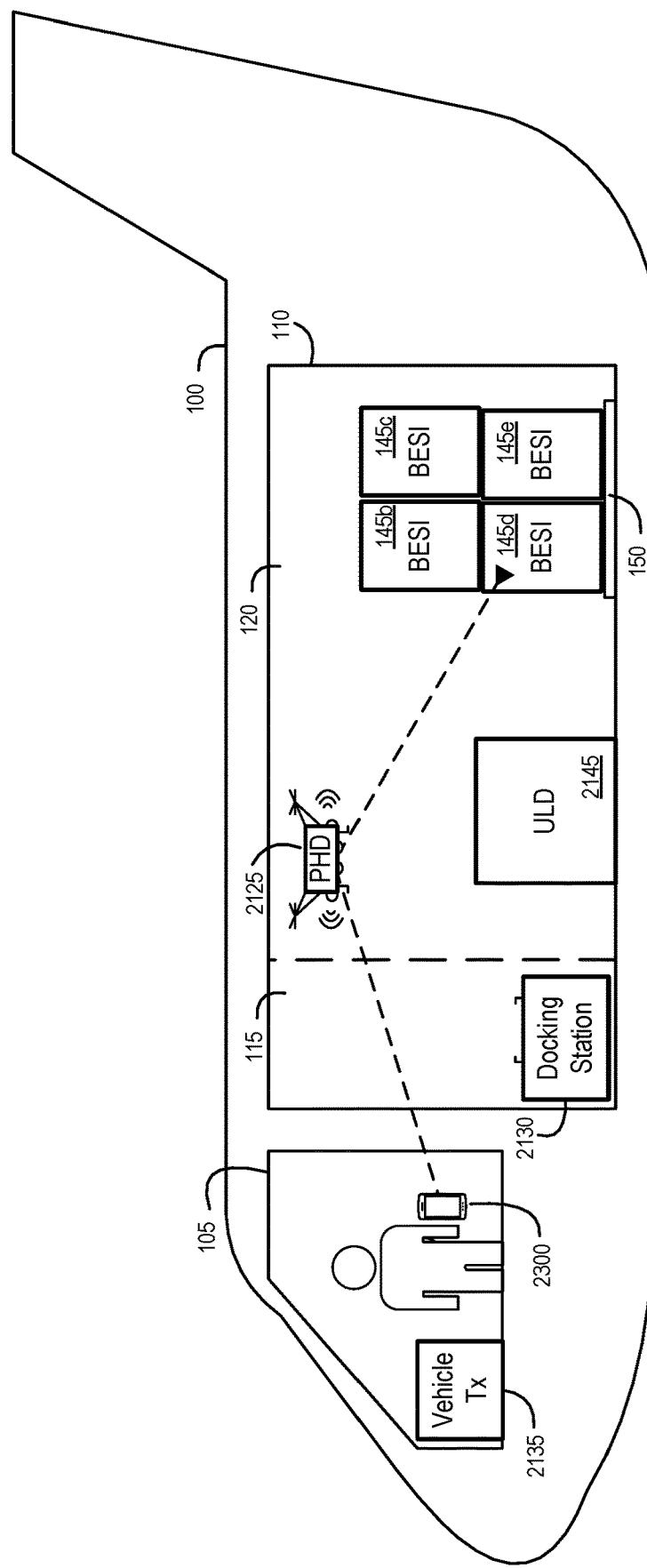
FIGS. 23A and 23B are diagrams of another exemplary paired aerial drone-based system used to provide an airborne relocatable communication hub within a delivery vehicle where at least one of the broadcast-enabled devices maintained within the delivery vehicle is a mobile personal communication device in accordance with an embodiment of the invention.
Figure 23B:
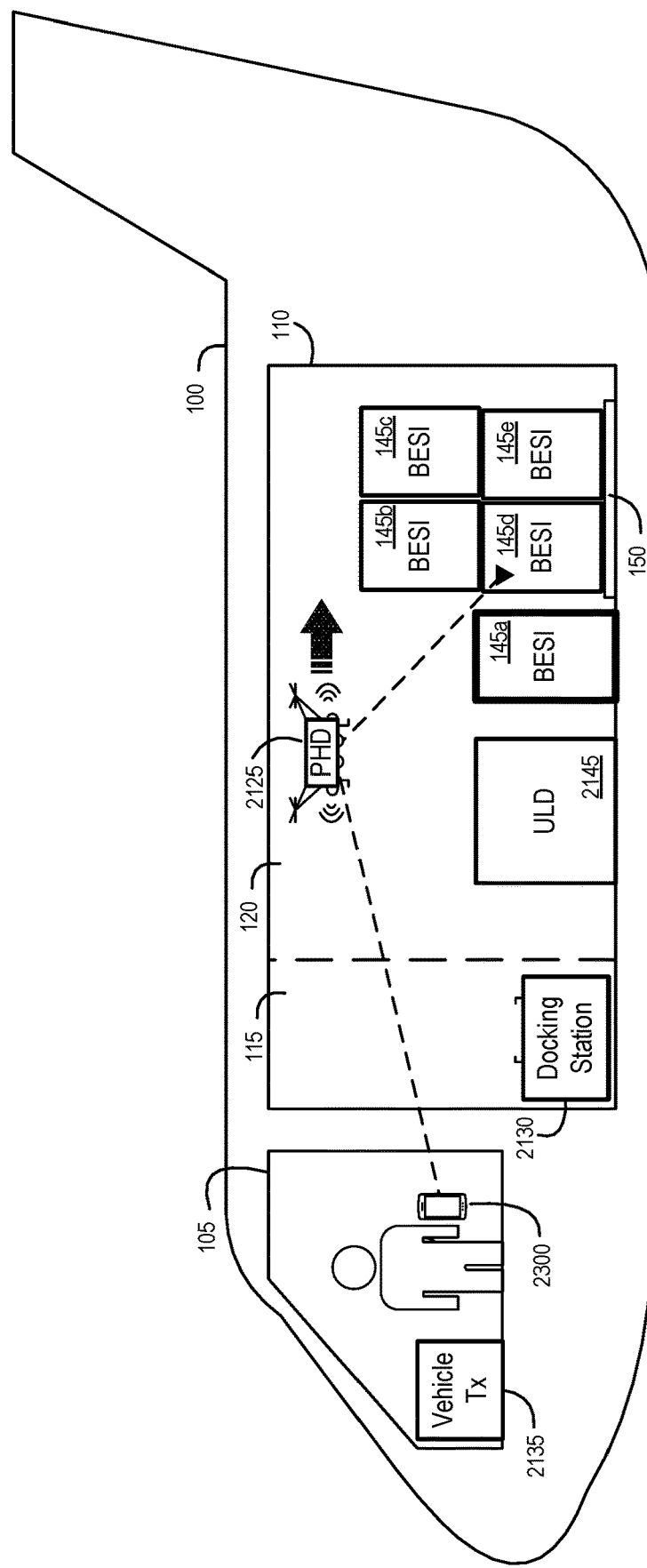

FIGS. 23A and 23B are diagrams of another exemplary paired aerial drone-based system used to provide an airborne relocatable communication hub within aircraft 100 where at least one of the broadcast-enabled devices maintained within the aircraft 100 is a mobile personal communication device 2300 in accordance with an embodiment of the invention. Referring now to FIG. 23A in particular, the illustrated embodiment may deploy mobile personal communication device 2300 as one of the broadcast-enabled devices on the aircraft 1000 that communicates with BESI 145d via two wireless data communication paths adaptively established and coupled by PHD 2125. An exemplary mobile personal communication device 2300 may be implemented similar to radio-based transceivers 1200, 1205, and 1210 as described above. As such, for example, the mobile personal communication device 2300 shown in FIG. 23A may be implemented as a ruggedized radio-based tablet or smartphone used by aircraft crew personnel and carried with them while performing duties within aircraft 100.

However, changes in the configuration of what is stored within aircraft 100 may dynamically create undesirable communication environments that further hinder communications along the coupled first and second wireless communications paths that are coupled by PHD 2125. For example, as shown in FIG. 23B, aircraft 100 may receive BESI 145a, which has been placed between BESI 145d and mobile personal communication device 2300 (operating as an exemplary broadcast-enabled device). The material making up BESI 145a may, as a result, cause attenuation and shielding relative to the communication path established between PHD 2125 and BESI 145d. Thus, a further system embodiment may have PHD 2125 adaptively reposition itself upon detecting such a change in the configuration of what is stored within aircraft 100. In more detail, the OBC 2100 of PHD 2125 may be operative and configured to cause the multi-transceiver communication hub interface 2160 to actively monitor the strength of communications received from the different coupled broadcast-enabled devices (such as mobile personal communication device 2300 and/or BESI 145d) so that PHD 2125 may detect any change in such signal strengths. When a sufficient change in signal strength is detected relative to one of the broadcast-enabled devices, PHD 2125 may then responsively control its lifting engines 210a, 210b to move itself from an initial airborne deployed position to a different airborne position where PHD 2125 can better communicate with the broadcast-enabled device experiencing a drop in signal strength (e.g., such as BESI 145d after BESI 145a has been placed between ULD 2145 and BESI 145d). Thus, as shown in FIG. 23B, PHD 2125 may move and re-position itself as part of such a system embodiment to provide further adaptive communication hub services to different broadcast-enabled devices on aircraft 100 based upon a detect change in the configuration of what is stored within the delivery vehicle.

Figure 24:
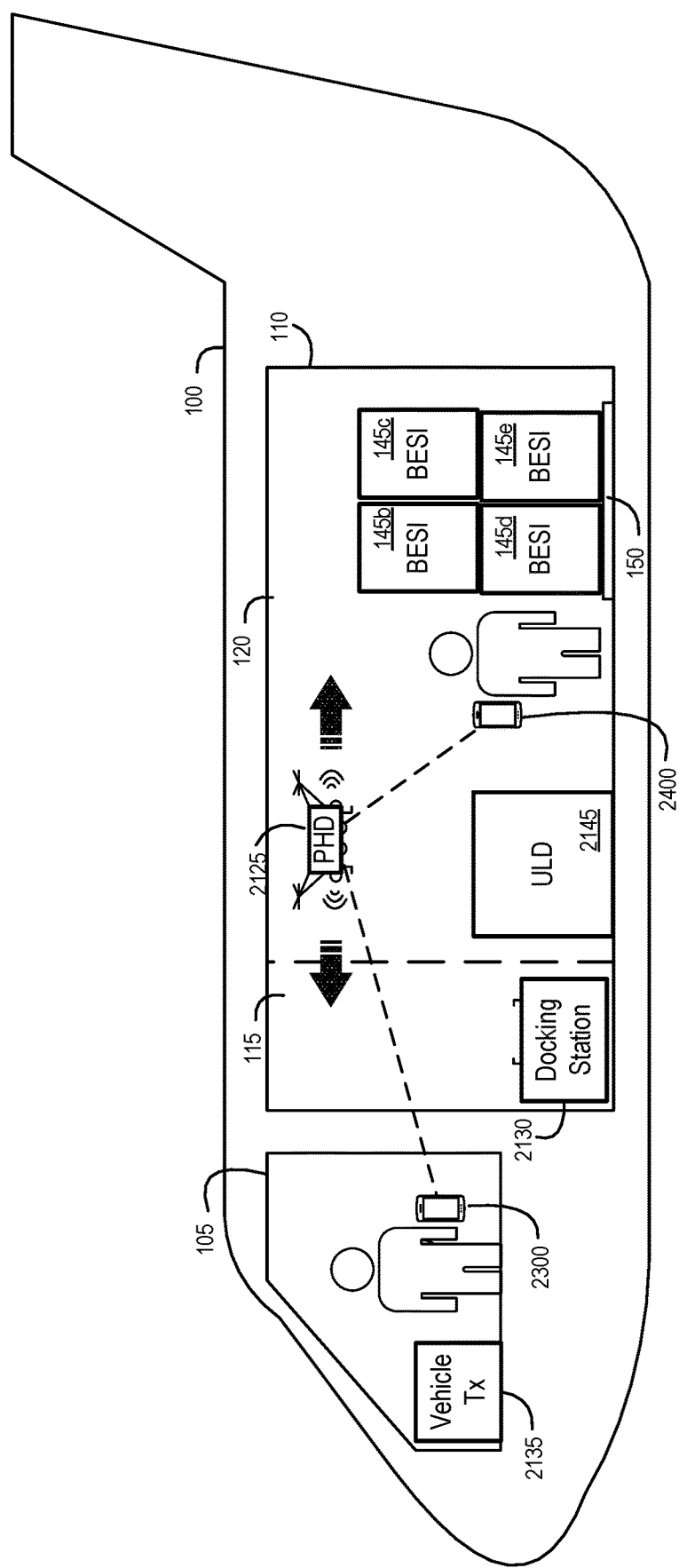
FIG. 24 is a diagram of another exemplary paired aerial drone-based system used to provide an airborne relocatable communication hub within a delivery vehicle where two of the broadcast-enabled devices maintained within the delivery vehicle are mobile personal communication devices in accordance with an embodiment of the invention.

In another embodiment, both of the broadcast-enabled devices may be mobile personal communication devices and one or more of them may be moving in the delivery vehicle. Here, for example and as shown in FIG. 24, one of the mobile personal communication devices 2300 may be located within the control compartment 105 of the aircraft 100 while the other mobile personal communication device 2400 may be moving within the shipment storage area 120 of aircraft 100. This may occur, for example, when the operator of mobile personal communication device 2400 conducts a pre-flight or in-flight inspection of what is stored within area 120. As the operator of mobile personal communication device 2400 moves within the storage area 120, direct communications between mobile personal communication device 2400 and mobile personal communication device 2300 may become hindered or otherwise problematic. In this situation, PHD 2125 may relocate to a different deployed airborne position within the interior of the aircraft 100; establish a wireless data communication path to each of the mobile personal communication devices 2300 and 2400; and couple the different wireless data communication paths as part of providing a relocatable airborne communication hub service for devices 2300 and 2400. This different deployed position may continue to be updated as one or more of the devices move (e.g., by monitoring signal strengths from each of devices 2300 and 2400). Thus, instead of losing communication between device 2300 and 2400 as the operator of device 2400 moves further back into the internal shipment storage area 120 (where more and more shielding structure may be placed between devices 2300 and 2400), this type of system embodiment that deploys at least a docking station 2130 and PHD 2125 may provide a technical airborne solution within the aircraft 100 to avoid lost communications.

Figure 25A:
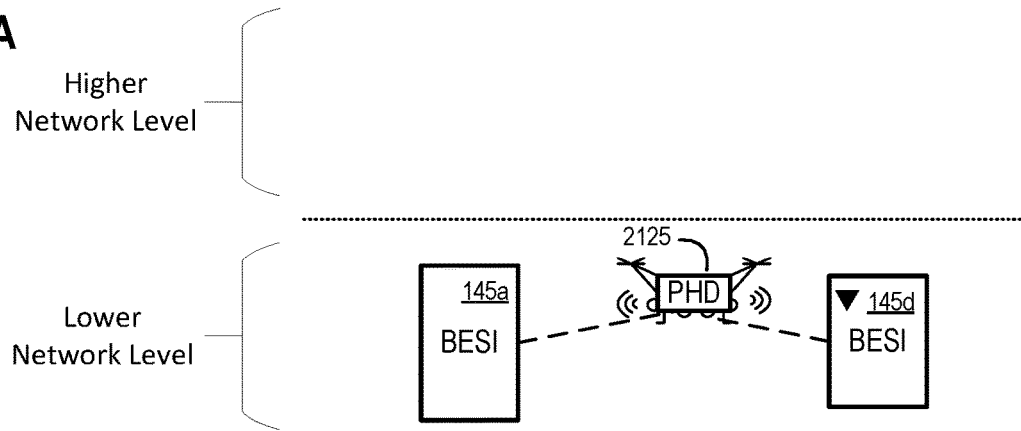
FIGS. 25A-25C are logical diagrams illustrating exemplary relationships between an exemplary paired aerial communication drone and multiple broadcast-enabled devices maintained within a delivery vehicle at different network levels in accordance with an embodiment of the invention.

Those skilled in the art will appreciate that embodiments may deploy a paired aerial communication drone (such as PHD 2125) as part of a network of communicating devices that may have different network levels and where the paired communication drone provides bridging and upper level access point types of functionality as part of the network. For example, FIG. 25A is a logical diagram illustrating a network level configuration of two such communicating devices i.e., an exemplary paired aerial communication drone and multiple broadcast-enabled devices maintained within a delivery vehicle in accordance with an embodiment of the invention. As shown in FIG. 25A, the broadcast-enabled devices BESI 145a with BESI 145d are logically disposed at a same network level of a hierarchically structured communication network, but may be sufficiently physically separate so that they are unable to reliably communicate directly with each other or may have structure between them that degrades the electronic reception of one or both of them. As such, an embodiment may have broadcast-enabled devices BESI 145a and BESI 145d each being in communication with each other via different wireless communication paths established and coupled together by PHD 2125. Thus, BESI 145d and BESI 145a are in a peer-to-peer relationship at the same network level of the hierarchically structured communication network, but rely upon the airborne relocatable communication hub services provided by PHD 2125 to realize this peer-to-peer relationship and communicate with each other.

Figure 25B:
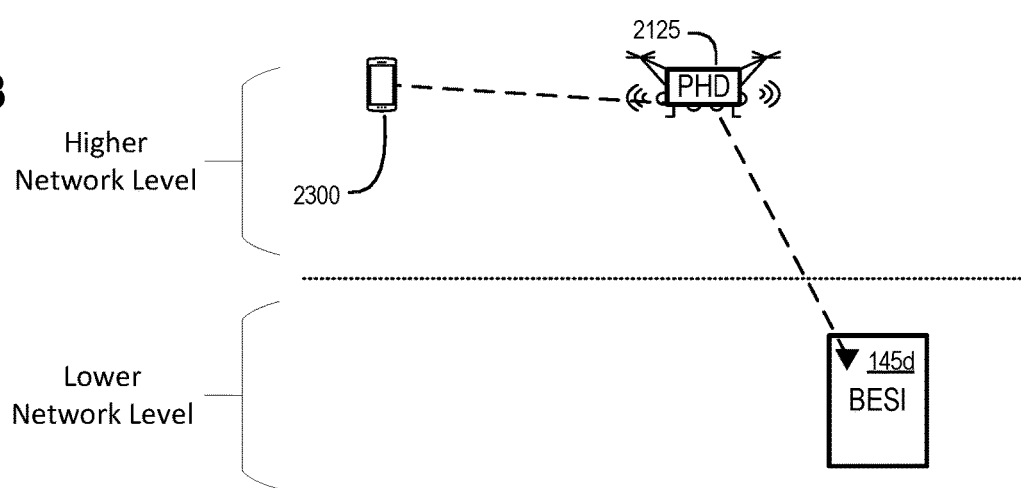

In another example, the broadcast-enabled devices may be logically disposed at different network levels of a hierarchically structured communication network. For example, as shown in FIG. 25B, mobile personal communication device 2300 may be disposed at a higher level of the hierarchically structure communication network of broadcast-enabled devices than BESI 145d. In this example configuration of the devices, PHD 2125 may also be deployed at the higher level and be disposed as to provide airborne relocatable communication hub services to establish different wireless communication paths to device 2300 as well as to BESI 145d, and to couple the communication paths together to allow device 2300 and BESI 145d to communicate while being on different network levels. As such, PHD 2125 may operate as a type of wireless access point for BESI 145d on the lower level of the network so that BESI 145d can communicate with one or more devices at higher levels in the network.

Figure 25C:
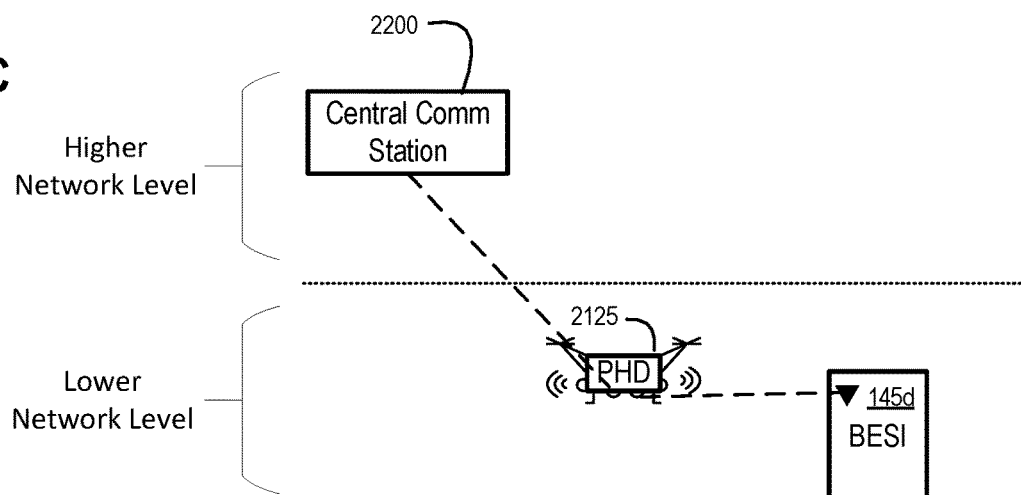

In the example shown in FIG. 25C, PHD 2125 may be deployed at the lower level but provide airborne relocatable communication hub services to establish different wireless communication paths to central communication station 2200 (on the higher network level) and to BESI 145d (on the lower network level), and to couple the communication paths together to allow central communication station 2200 and BESI 145d to communicate while being on different network levels but with PHD 2125 operating as more of a bridging extension device to extend communications out to BESI 145d on the same lower network level. As such, the central communication station 2200 may operate as a type of wireless access point for BESI 145d (as coupled through PHD 2125 operating as an airborne relocatable communication bridge to BESI 145d).

Figure 26B:
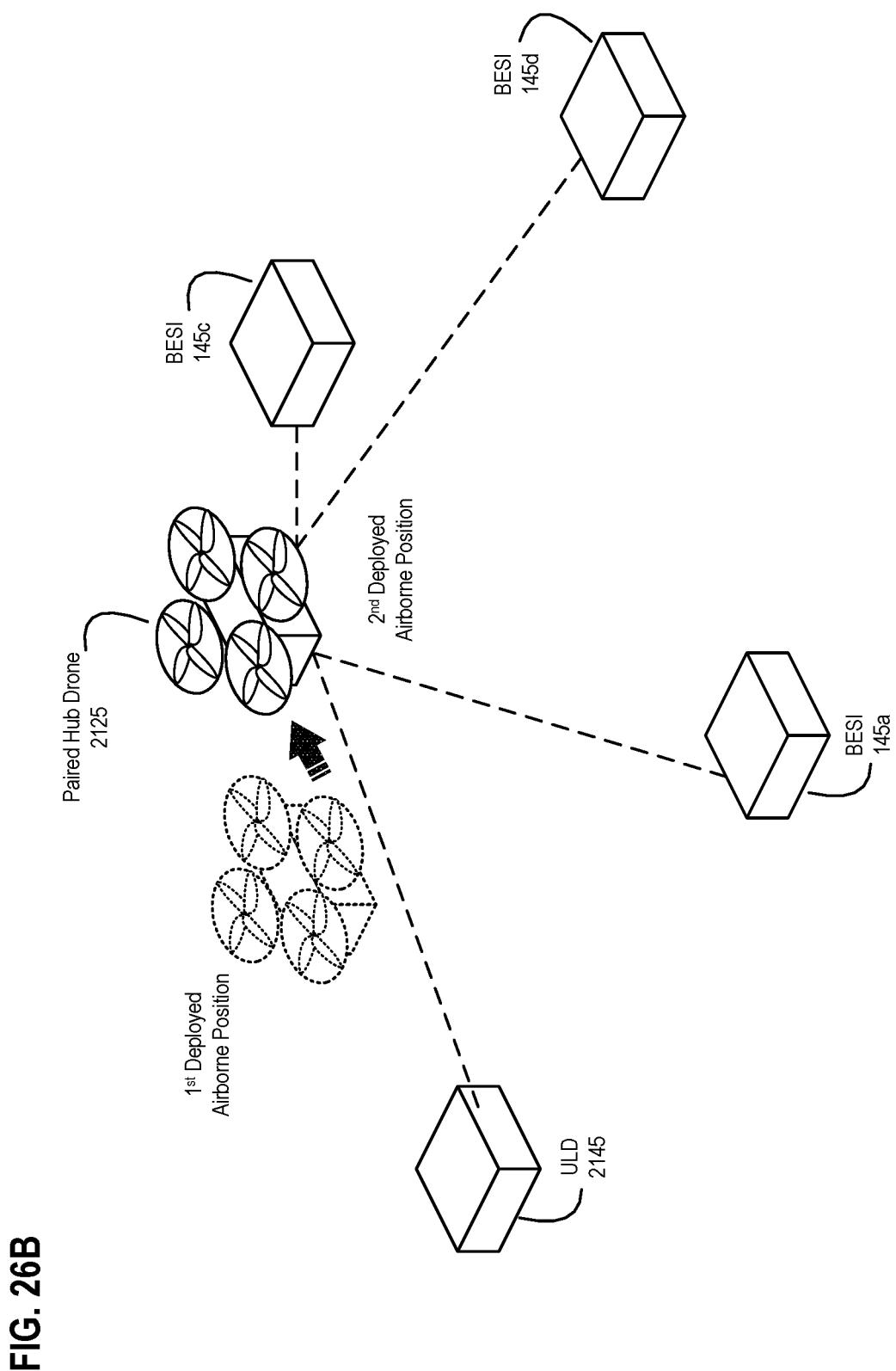
FIG. 26B is a diagram of an exemplary paired aerial communication drone at a second deployed airborne position within a delivery vehicle and multiple broadcast-enabled devices maintained within the delivery vehicle in accordance with an embodiment of the invention.

Beyond moving PHD 2125 to accommodate changes in the configuration of what is stored within the storage area 120 of aircraft 100 or movement of at least one of the different broadcast-enabled devices that PHD 2125 may provide adaptive airborne communication hub services to, further embodiments may provide systems and methods that provide an airborne relocatable communication hub within the aircraft 100 for more than two broadcast-enabled devices. For example, FIGS. 26A and 26B are perspective diagrams showing an exemplary paired aerial communication drone (e.g., PHD 2125) at a first deployed airborne position within a delivery vehicle and amidst multiple broadcast-enabled devices maintained within the delivery vehicle in accordance with an embodiment of the invention. Referring now to FIG. 26A, exemplary PHD 2125 is shown in a first deployed airborne position within the aircraft 100 with established communications with ULD 2145 and BESI 145a that are then coupled so that ULD 2145 and BESI 145a may communicated.

However, as shown in FIG. 26B, the onboard controller of PHD 2125 may cause PHD 2125 to move so as to accommodate providing aerial communication hub services to one or more of BESI 145c and/or BESI 145d. In more detail, the embodiment shown in FIG. 26B has the onboard controller of the PHD 2125 programmatically operating (e.g., by executing the communication hub management program 2150) to change the desired flight profile for PHD 2125 to causing its lifting engines 210a, 210b to move PHD 2125 from the first deployed airborne position within the interior of the aircraft 100 to a second deployed airborne position closer to at least one of BESI 145c and/or BESI 145d. While at this second deployed airborne position, the onboard controller of PHD 2125 then causes its communication hub interface 2160 to establish a third wireless data communication path to a third of the broadcast-enabled devices within the aircraft 100, such as BESI 145c. Thereafter, PHD 2125 has its communication hub interface 2160 couple the established wireless data communication path with BESI 145c to one or more of ULD 2145 and/or BESI 145a.

Furthermore, in some embodiments, airborne communication hub services may be provided to more than three broadcast-enabled devices using PHD 2125. For example, the onboard controller of PHD may cause its communication hub interface 2160 to establish a fourth wireless data communication path to a fourth of the broadcast-enabled devices within the aircraft 100, such as BESI 145d. Thereafter, PHD 2125 has its communication hub interface 2160 couple the established wireless data communication path with BESI 145d to one or more of ULD 2145, BESI 145a, and/or BESI 145c. In this way, PHD 2125 may move to adaptively facilitate wireless communications amongst different ones of three or more broadcast-enabled devices as an airborne communication hub platform.

In more detail, the PHD 2125 may move to go within range of the other as part of moving on an airborne communication path of waypoints, or in response to a change in what power is received from a particular transmitting BESI (e.g., when structure is moved to cause interference or shielding of between the BESI and the PHD).

As the PHD 2125 establishes wireless communication paths to different broadcast-enabled devices, its onboard communication hub interface 2160 may also collect data generated on of the broadcast-enabled devices and retransmit the collected data to another of the broadcast-enabled devices as part of its aerial communication hub services. Such collected data may include scan data generated by a scanner on the broadcast-enabled device (e.g., scan data related to what is contained within with a shipping container associated with the broadcast-enabled device), sensor data generated by one or more sensors on the broadcast-enabled devices (e.g., temperature, moisture, or other environmental data sensed by an onboard broadcast-enabled devices associated with a packaged item being shipped), and shared data generated in a memory on a broadcast-enabled device representing information provided to that broadcast-enabled device by another broadcast-enabled device.

In a further embodiment of systems and methods for adaptively providing communication hub services within a delivery vehicle using an aerial communication drone (such as PHD 2125), the system may use a type of tether for flight control. In particular, a system embodiment may include the delivery vehicle, an aerial communication drone paired to the delivery vehicle (such as PHD 2125 as described above), plus a base controller and tether. The base controller (such as base controller 1000 as similarly shown in FIG. 10) is fixed to the delivery vehicle and provides flight commands to the onboard controller on the aerial communication drone through a tether linking the base controller and the aerial communication drone. In more detail, such a control tether may provide an electrical conduit for data (e.g., flight control data or flight commands) and power related to the aerial communication drone. An exemplary control tether may provide a fiber optic conduit, which allows for movement of information from the aerial communication drone to the base controller. For example, such a control tether having a fiber optic conduit may allow image type of sensor-based inspection information (e.g., video feed data stream or still image pictures) to be moved or otherwise transferred from the aerial communication drone to the base controller. In more detail, the aerial communication drone may include a control receiver coupled to the onboard controller, where the control receiver has an input connected to the control tether. The control receiver as deployed on such an aerial communication drone is configured and operative to receive, for example, a flight command from the base controller on the input and pass the received flight command to the onboard controller (such as the OFC 305 part of the OBC 2100 in PHD 2125), which then may generate the flight control input for the lifting engines based upon the received flight command.

In another detailed example, the onboard controller of the aerial communication drone (such as the OFC 305 part of the OBC 2100 in PHD 2125) may responsively generate landing control input for the lifting engines 210a, 210b if the aerial communication drone detects that the control tether is broken. In response to detecting the tether is broken (e.g., an anticipated signal or signal level is not received by the control receiver on the drone from the base controller), the landing control input generated by the aerial communication drone facilitates and causes the drone to return to the internal docking station and securing of the drone capture interface on the drone (e.g., DCI 370 on PHD 2125) to the physical docking interface of the internal docking station. Alternatively, the landing control input generated when detecting the tether is broken may have the drone land in a designated part of the delivery vehicle and wirelessly broadcast a message indicating so, which may be received by vehicle transceiver 2135 or mobile device 2300.

In still another embodiment, the aerial communication may further include a restrictive tether connected to the aerial communication drone and to the delivery vehicle. In this manner, the restrictive tether may place a control on where the aerial communication drone moves and, as a result, limit movement of the aerial communication drone. Such a restrictive tether may help to avoid unintentional collisions with objects within the delivery vehicle or act as a fallback physical barrier to help limit overlap if an embodiment has multiple aerial communication drones active within the same delivery vehicle.

Thus, various system embodiments have been described that rely on an aerial communication drone (such as PHD 2125) when adaptively providing communication hub services to one or a multitude of similar or different types of broadcast-enabled devices. Some system embodiments may include the PHD and its associated docking station, while other system embodiments may include the delivery vehicle and its paired PHD. Further system embodiments that provide similar adaptive communication hub services within a delivery vehicle may include the PHD and the delivery vehicle transceiver, which may operate as one of the broadcast-enabled devices and provide a communication path outside of the vehicle for the PHD and the other of the broadcast-enabled devices (see FIG. 22). Indeed, still another system embodiment may include the PHD (such as PHD 2125), a central communication station disposed within the delivery vehicle (such as central communication station 2200) where the central communication station may provide a communication path outside of the vehicle for the PHD and other broadcast-enabled devices coupled to the PHD.

Figure 27:
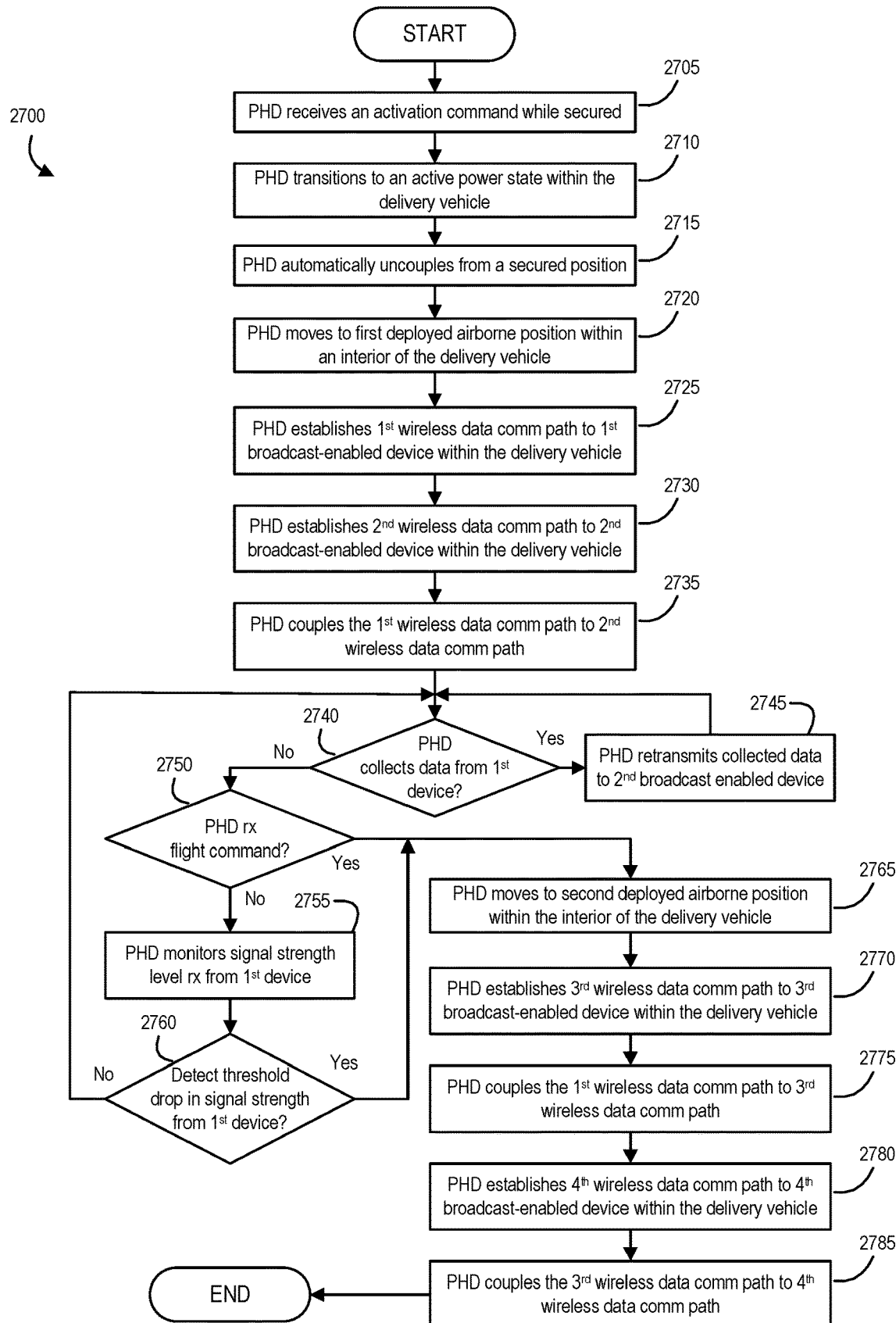
FIG. 27 is a flow diagram illustrating an exemplary aerial drone-based method for providing an airborne relocatable communication hub within a delivery vehicle for a plurality of broadcast-enabled devices maintained within the delivery vehicle in accordance with an embodiment of the invention.

FIG. 27 is a flow diagram illustrating an exemplary aerial drone-based method for providing an airborne relocatable communication hub within a delivery vehicle for a plurality of broadcast-enabled devices maintained within the delivery vehicle in accordance with an embodiment of the invention. As discussed above, an exemplary delivery vehicle may be an aircraft (such as aircraft 100), a trailer capable of being moved by a truck, a train car capable of being moved on a railway system, a marine vessel, or an automotive vehicle (such as a delivery van). And as also discussed above, exemplary broadcast-enabled devices that may use the paired aerial communication drone in such a method may come in different forms, such as an RF transceiver-based device (e.g., a transceiver-based Zigbee device that communicates using IEEE 802.15 formatted communications, a transceiver-based Wi-Fi device that communicates using IEEE 802.11 formatted communications, and the like), a central communication station on the delivery vehicle, a delivery vehicle transceiver disposed in a control compartment (e.g., a cockpit, truck cab, etc.) of the delivery vehicle, a broadcast-enabled shipping container maintained within the delivery vehicle, a broadcast-enabled network device associated with an item being shipped within the delivery vehicle, or a mobile personal communication device (e.g., wireless handheld devices such as smartphones, ruggedized tablets, UHF/VHF handheld radios, and the like). In this method embodiment, consistent with the systems and system components described above, the broadcast-enabled devices that may be coupled by the paired aerial communication drone may be geographically separated and incapable of direct communication with each other without the first wireless data communication path and the second wireless data communication path established by the paired aerial communication drone.

Referring now to FIG. 27, exemplary method 2700 begins at step 2705 where the aerial communication drone paired with the delivery vehicle (referred to as PHD in FIG. 27) may receive an activation command while in a secured position within the delivery vehicle. The activation command for the PHD, for example, may be in the form of a wireless message received by PHD 2125 from the internal docking station 2130, the vehicle transceiver 2135, central communication station 2200, or from a radio-based transceiver 2300 operated by personnel within the operational control section of the vehicle or within the internal shipment storage for the vehicle. Alternatively, the activation command may be received in the form of a time-based command generated onboard the PHD 2125 where, for example, the PHD may be deployed to activate from the secured position so that the airborne relocatable communication hub services provided to the broadcast-enabled devices within the delivery vehicle may occur after recharging of PHD 2125. In other words, the PHD 2125 may recharge while on internal docking station 2130 and, upon detecting a threshold charging status (which may operate as the activation command), deploy from the docking station 2130.

Generally, steps 2710 through 2720 prepare and deploy the PHD within the delivery vehicle. In particular, at step 2710, method 2700 continues with the PHD transitioning from at least a low power state to an active power state as part of deploying into the interior of the delivery vehicle. The low power state of the PHD may be a complete shut off condition where the PHD is unpowered. In other embodiments, the low power state may be a sleep type of state where some circuitry within the PHD is off (e.g., the lifting engines 210*a*, 210*b* of PHD 2125 shown in FIG. 21) while another subset of the onboard circuitry remains powered on (e.g., GPS 350 and IMU 355 to help avoid delays prior to lift off from the docking station 2130). When transitioning to the active monitoring state, where the PHD will be ready for airborne communication hub activities within the shipment storage of the delivery vehicle, the PHD prepares to separate from the internal docking station.

At step 2715, method 2700 continues by automatically uncoupling the PHD from a secured position on an internal docking station fixed within the delivery vehicle once the PHD transitions to the active power state. For example, PHD 2125 may automatically uncouple from the internal docking station 2130 as a precursor to flying into the internal shipment storage 120 shown in FIG. 20. In this embodiment, the PHD's landing gear (similar to landing gear 220*a*, 220*b* shown in FIG. 4A) separates from being mated with the securing clamps (similar to the securing claims 405*a*, 405*b* shown in FIG. 4B) of the docking station 2130 to accomplish such automatic uncoupling. This may be implemented by articulating the landing gear articulating the securing clamps, or both the landing gear and the securing clamps being moved to articulate to different positions that, as a result, uncouple the PHD 2125 from docking station 2130 depending on the complexity of the PHD, docking station, and anticipated vibrational environment within the drone storage area 115.

At step 2720, method 2700 continues with the PHD moving from the secured position on the internal docking station to a first deployed airborne position within an interior of the delivery vehicle. Moving off the docking station to the first deployed airborne position may be done in response to receiving a flight command to redirect aerial movement of the PHD from being on the docking station to be aloft and flying to the first deployed position. In some embodiments, such a flight command may be received over a control tether connected to the PHD (similar to tether 1005 shown in FIG. 10) or may be received wirelessly through the PHD's multi-transceiver communication hub interface (such as interface 2160 on PHD 2125).

At step 2725, method 2700 continues with the PHD establishing a first wireless data communication path to a first of the broadcast-enabled devices within the delivery vehicle, such as ULD 2145 as shown in FIG. 20. At step 2730, method 2700 has the PHD establishing a second wireless data communication path to a second of the broadcast-enabled devices within the delivery vehicle, such as BESI 145d as shown in FIG. 20. Such communication paths may be a common wireless data communication protocol (e.g., a 2G/3G/4G/5G cellular communication protocol, a Bluetooth communication protocol, a Wi-Fi communication protocol, a Zigbee communication protocol, and the like). However, in other embodiments the multi-transceiver communication hub interface 2160 of PHD 2125 may deploy different types of transceivers establish communication paths with different broadcast-enabled devices using different wireless communication protocols and use a protocol converter device installed as part of the communication hub interface 2160 to help manage the coupling of differently formatted wireless communication paths (as performed in step 2735).

At step 2735, method 2700 continues with the PHD coupling the first wireless data communication path and the second wireless data communication path for at least the first of the broadcast-enabled devices and the second of the broadcast-enabled devices. As noted, this may be accomplished, in particular, using such an embedded protocol converter device deployed within the PHD's multi-transceiver communication hub interface. The two coupled broadcast-enabled communication devices may be logically disposed at a same network level of a hierarchically structured communication network (e.g., in a peer-to-peer relationship at the same network level of the hierarchically structured communication network), or be logically disposed at different network levels of the network where (e.g., where the first of the broadcast-enabled devices and the second of the broadcast-enabled devices are coupled by the aerial communication drone operating as a wireless access point for the first of the broadcast-enabled devices). Furthermore, those skilled in the art will appreciate that at least the steps 2725-2735 may be performed as the delivery vehicle is in motion and while the PHD is airborne within the delivery vehicle.

In some embodiments, the coupling of communication paths done by PHD at step 2735 (as well as the below described steps 2775 and 2785) allows for communications off the delivery vehicle. In particular, a further embodiment of step 2735 may have the PHD couple one of the broadcast-enabled devices to a delivery vehicle transceiver operating as one of the broadcast-enabled device (and which is in communication with a remote transceiver external to the delivery vehicle over an external wireless data communication path). In this manner, the delivery vehicle transceiver effectively couples the first wireless data communication path (established between it and the PHD) and the external wireless data communication.

Moving forward, method 2700 continues to step 2740 where the PHD may collect data generated on the first of the broadcast-enabled devices. This type of data generated on the first of the broadcast-enabled devices may include scan data, sensor data, or shared data. In more detail, scan data may be generated by a scanner on the first of the broadcast-enabled devices, such as barcode data generated by a laser scanner component on a broadcast-enabled barcode device. Sensor data may, for example, be generated by one or more environmental sensors on the first of the broadcast-enabled devices (e.g., temperature sensors, light sensors, moisture sensors, motion sensors, and the like). Shared data may be generated in a memory on the first of the broadcast-enabled devices, and represent information provided to that first broadcast-enabled device by another broadcast-enabled device. For example, ULD 2145 may include a first broadcast-enabled device having shared data it its memory representing information provided by a broadcast-enabled device embedded in a package within ULD 2145. The broadcast-enabled device in the package within ULD 2145 may have temperature information generated by onboard temperature sensors, and provide that temperature information to the ULD's broadcast-enabled device, which then is collected by the PHD 2125. Thus, if the PHD collects such data from the first of the broadcast-enabled devices in step 2740, then the PHD retransmits the collected data to the second of the broadcast-enabled devices at step 2745. Otherwise, method 2700 proceeds from step 2740 directly to step 2750.

At step 2750, method 2700 continues with the PHD determining whether it has received a flight command that may redirect the drone to another airborne position. If so, then step 2750 moves directly to step 2765. But if not, then step 2750 proceeds to step 2755 where the PHD monitors for changes that impact communications with the first of the broadcast-enabled devices. In more detail, at step 2755, exemplary method 2700 continues with the PHD monitoring a first strength level of what is received from the first of the broadcast-enabled devices over the first wireless data communication path. Then, at step 2760, method 2700 has the PHD detecting if there is a threshold drop in the first strength level of what is received from the first of the broadcast-enabled devices as monitored in step 2755. For example, the threshold drop in the first strength level may be associated with a changed configuration of what is maintained within the delivery vehicle. A configuration of what is maintained within the delivery vehicle may change, which then causes the threshold drop in signal strength resulting from the placement of attenuating structure between the first of the broadcast-enabled devices and the PHD. In other words, changes to the physical environment between the first broadcast-enabled device and the PHD may cause interference or attenuation on the first wireless data communication path. Such changes may come from movement of the first broadcast-enabled device relative to the PHD (which may thrust different structure in a line of sight distances between the first broadcast-enabled device and the PHD), or may come from placing new attenuating structure between the first broadcast-enabled device and the PHD. Upon detecting such a threshold drop at step 2760, method 2700 proceeds to step 2765. Otherwise, method 2700 proceeds back to step 2740. Those skilled in that art will understand that steps 2755 and 2760 may also be performed relative to the second of the broadcast-enabled devices as well in some embodiments.

At step 2765, a change in aerial position is warranted due to a flight command or as a result of detecting lower signal strengths from one of the broadcast-enabled devices coupled by the PHD. Thus, method 2700 continues at step 2765 with the PHD moving from the first deployed airborne position within the interior of the delivery vehicle to a second deployed airborne position. Such a second deployed airborne position may be one of a number of airborne positions on an airborne communication path flown by the PHD within the interior of the delivery vehicle. For example, PHD 2125 may typically fly on an airborne communication path above the shipping items maintained within the internal shipment storage area 120, such that PHD 2125 may move to a position closer to BESI 145*d* after BESI 145*a* is placed between mobile device 2300 and BESI 145*d* as shown in FIG. 23 B. Similarly, in another example, PHD 2125 may move to a position closer to mobile device 2400 as the operator of device 240 moves within the internal shipment storage area 120 away from the initial position of PHD 2125 as shown in FIG. 24.

At this second deployed airborne position, step 2770 of method 2700 has the PHD establishing a third wireless data communication path to a third of the broadcast-enabled devices within the delivery vehicle. For example, as shown in FIG. 26 B, PHD 2125 has moved to the second deployed airborne position and may establish another communication path to another broadcast-enabled device, such as BESI 145*c*. Then, at step 2775, method 2700 has the PHD coupling the first wireless data communication path and the third wireless data communication path. Alternatively, step 2775 may couple the second and third wireless data communications paths or couple the first, second, and third wireless data communication paths together. In this manner, the third broadcast-enabled device (e.g., BESI 145*c* shown in FIG. 26B) may communication with one or more of the first two broadcast-enabled devices.

At step 2780, method 2700 continues with the PHD establishing a fourth wireless data communication path to a fourth of the broadcast-enabled devices within the delivery vehicle (such as BESI 145*d* shown in FIG. 26B). Then, at step 2785, method 2700 has the PHD coupling the third wireless data communication path and the fourth wireless data communication path by the aerial communication drone operating as the airborne relocatable communication hub for at least the third of the broadcast-enabled devices and the fourth of the broadcast-enabled devices.

Those skilled in the art will appreciate that method 2700 as disclosed and explained above in various embodiments may be implemented by an apparatus, such as exemplary PHD 2125, running an embodiment of communication hub management program code 2150, and as a part of a system including the internal docking station 2130 and PHD 2125 or a system that includes the delivery vehicle 100 and the PHD 2125. Such code 2150 may be stored on a non-transitory computer-readable medium in the PHD, such as memory storage 315 as shown on FIG. 21. Thus, when executing code 2150, the OBC 2100 (or OCP 2110) of PHD 2125 (in cooperation with other circuitry onboard the PHD 2125, such as the multi-transceiver communication hub interface 2160) may be operative to perform certain operations or steps from the exemplary methods disclosed above, including method 2700 and variations of that method.

Enhanced Positioning of a Paired Aerial Communication Hub Drone

As noted above, there are times when an exemplary paired aerial communication hub drone (i.e., an exemplary PHD) may be flown, redirected, or repositioned to a different aerial deployed position so that the PHD may more effectively link two or more wireless devices. For example, a communications environment relative to the PHD's delivery vehicle may dynamically change, which may cause problems on where to most effectively position the PHD. Items placed within the delivery vehicle may interfere with communications between broadcast-enabled wireless devices on the delivery vehicle or the devices themselves may be moving within or relative to the delivery vehicle. In another example, the PHD may detect two such wireless devices that should be linked, but the PHD may currently be in an inconvenient position to reliably establish and couple the wireless devices. In such an environment, linking wireless devices using the PHD may be better accomplished with intelligent positioning of the PHD based on having the PHD perform certain types of assessments while airborne. Thus, a further set of embodiments involves enhanced airborne relocatable communication hub systems and improved methods for positioning an airborne relocatable communication hub that supports multiple wireless devices.

Referring back to FIG. 21, exemplary PHD 2125 is shown as a type of communication drone apparatus that may be further enhanced as part of an embodiment so that it can advantageously and intelligently repositions itself while supporting wireless devices disposed within a delivery vehicle. As explained above, exemplary PHD 2125 includes lifting engines 210*a*, 210*b* that are responsive to flight control input generated by the onboard controller 2100 as part of maintaining a desired flight profile within the delivery vehicle (such as aircraft 100). In an embodiment of PHD 2125, repositioning may generally be based upon a comparison of connection signal strengths for different signals detected by multi-transceiver communication hub interface 2160 as the PHD 2125 executes an enhanced embodiment of communication hub management program 2150. As noted above, implementations of exemplary communication hub management program 2150 may be a set of executable instructions in the form of one or more machine-readable, non-transient program code modules or applications. The communication hub management program 2150 adapts the PHD 2125 into an unconventionally configured aerial communication hub apparatus exclusively paired to the aircraft 100 as a linked part of the aircraft that travels with the aircraft during shipment operations providing improved repositionable airborne communication hub services to wireless devices within and around the delivery vehicle. This specially configured OBC 2100 of PHD 2125, as described in more detail herein as a part of an embodiment, implements operative process steps and provides functionality that is unconventional, especially when the overall steps that provide extended communication access functionality using the PHD 2125 and how it can be intelligently repositioned to solve a technical communication issue. In other words, a specially adapted and configured paired communication hub drone (e.g., PHD 2125) helps, as a part of an embodiment, to improve how wireless devices in and around the delivery vehicle (e.g., radio-based transceivers associated with shipping items (such as the transceivers in BESI 145*a*-145*e*) and associated with shipping containers (such as the transceiver in ULD 2145)) communicate with each other while being disposed in or being around the delivery vehicle.

In an exemplary apparatus embodiment, PHD 2125 may be deployed to include at least an aerial drone main housing (such as housing 200), an onboard controller disposed within the housing (such as OBC 2100), multiple lifting engines (such as engines 210*a*, 210*b*), and a communication hub interface (such as multi-transceiver communication hub interface 2160). Generally, this PHD 2125 controls and uses its communication hub interface 2160 in this repositioning embodiment to detect one or more signals broadcast from the wireless devices in or around the delivery vehicle, compare such signals, change the PHD's flight profile to reposition the PHD based on the comparison, and then link the wireless devices via wireless data communication paths to the wireless devices. Such wireless devices may, for example, include a central communication station on the delivery vehicle (e.g., station 2200 or vehicle transceiver 2135), a broadcast-enabled shipping container (e.g., ULD 2145), a broadcast-enabled network device associated with an item being shipped within the delivery vehicle (e.g., BESI 145*d*), or a mobile personal communication device (e.g., devices 2300, 2400).

In more detail, as the onboard controller 2100 of PHD 2125 executes the communication hub management program 2150 in this embodiment, the onboard controller first changes the desired flight profile to cause the lifting engines to move the PHD from a secured position within an interior of the delivery vehicle to a first deployed airborne position within a different part of the interior of the delivery vehicle (such as in the position shown in FIG. 24 where PHD 2125 may have moved from a secured position on docking station 2130 to the illustrated airborne position of PHD 2125 above ULD 2145 within the interior shipment storage 120 of aircraft 100). At this first deployed airborne position, the onboard controller of the PHD receives a first signal from the communication hub interface. This first signal is broadcast by a first wireless device and detected by the communication hub interface. The onboard controller then receives a second signal from the communication hub interface, where the second signal is broadcast by a second wireless device and detected by the communication hub interface. With these two detected signals, the onboard controller compares their respective connection signal strengths (e.g., power levels as detected by multi-transceiver communication hub interface 2160). Based upon the comparison of connection signal strengths, the onboard controller can change the desired flight profile to cause the lifting engines to reposition the PHD to a second deployed airborne position within the delivery vehicle. For example, when the first connection signal strength is lower than the second connection signal strength, the PHD may reposition to a different deployed airborne position closer to the first wireless device and not as close to the second wireless device. In a more detailed embodiment, the lifting engines reposition the PHD to the second deployed airborne position based upon a detected balance between the first connection signal strength and the second connection signal strength as the PHD moves within the delivery vehicle. In other words, the PHD may iteratively monitor the connection signal strength of each signal while moving so as to balance those signal strengths. Further embodiments may balance and attempt to move to a second position that minimized the balanced connection signal strengths.

Thereafter, the onboard controller causes the communication hub interface to link the first wireless device and the second wireless device after the aerial communication drone is repositioned at the second deployed airborne position. Thus, this apparatus embodiment of PHD 2125 enables an intelligent physical movement and repositioning of the PHD that supports linking the two wireless devices and maintaining that link in an improved way that solves a technical problem dealing with how and where to position such a paired airborne communication hub drone device when actively and dynamically supporting different wireless devices in and around the delivery vehicle.

In a further embodiment of such a PHD apparatus, repositioning may be based on comparing three signals from three devices. For example, the onboard controller may further receive a third signal from the communication hub interface, where the third signal was broadcast by a third wireless device and detected by the communication hub interface. Then, as part of repositioning, the onboard controller may cause the lifting engines to reposition the PHD to a third deployed airborne position within the delivery vehicle based upon a comparison of the first connection signal strength, the second connection signal strength, and a third connection signal strength for the third signal. In other words, this third deployed airborne position may be a point within the delivery vehicle where the communication hub interface detects a balance between the first connection signal strength, the second connection signal strength, and the third connection signal strength.

In still another embodiment of such a PHD apparatus, adaptive repositioning may be implemented when one of the wireless devices changes signal strength. In more detail, as the PHD is airborne and has linked the first and second wireless devices, the communication hub interface may detect a change in the first connection signal strength. This may, for example, be due to a change in what may be stored within the delivery vehicle or if the first wireless device is moving. As such, the onboard controller may be responsive to the detected change in the first connection signal strength to alter the desired flight profile and cause the lifting engines to reposition the PHD to a third deployed airborne position based upon a comparison of an updated value of the first connection signal strength and the second connection signal strength.

In yet another embodiment, adaptive repositioning may be implemented when both wireless devices change signal strength. In more detail, the PHD's communication hub interface may be further operative to detect a first change in the first connection signal strength and a second change in the second connection signal strength. The onboard controller may be responsive to the detected first change and second change to then alter the desired flight profile and cause the lifting engines to reposition the PHD to a third deployed airborne position based upon a comparison of a first updated value of the first connection signal strength and a second updated value of the second connection signal strength. Such changes may, for example, be due to changes within the delivery vehicle or movement of the different wireless devices relative to the current location of the PHD and its communication hub interface or an altered broadcast signal level as changed by the broadcasting device.

Such a PHD-based apparatus embodiment that repositions based on comparing connection signal strengths may be further used as part of a system embodiment. Such an enhanced airborne relocatable communication hub system generally includes a delivery vehicle and that delivery vehicle's paired aerial communication drone. The delivery vehicle (e.g., aircraft 100 as shown in FIGS. 20, 22, 23A, 23B, and 24) maintains multiple wireless devices while transporting the wireless devices. The delivery vehicle has an interior storage area (such as shipment storage 120) for maintaining the wireless devices and a drone storage area (such as drone storage area 115) disposed within the delivery vehicle. The system's paired aerial communication drone (referred to as PHD) can be secured within the drone storage area and may be implemented consistent with the apparatus embodiments described above as having at least an onboard controller, lifting engines, and a communication hub interface. The system's PHD generally operates to detect signals from different wireless devices, compare the connection signal strength of such detected signals, and reposition the PHD based on that comparison before linking the two wireless devices as described in more detail above. Thus, such an enhanced airborne relocatable communication hub system collectively provides a movable storage system that has a dynamically repositionable PHD that enhances how wireless devices maintained within the storage system may communicate with each other.

Figure 28:
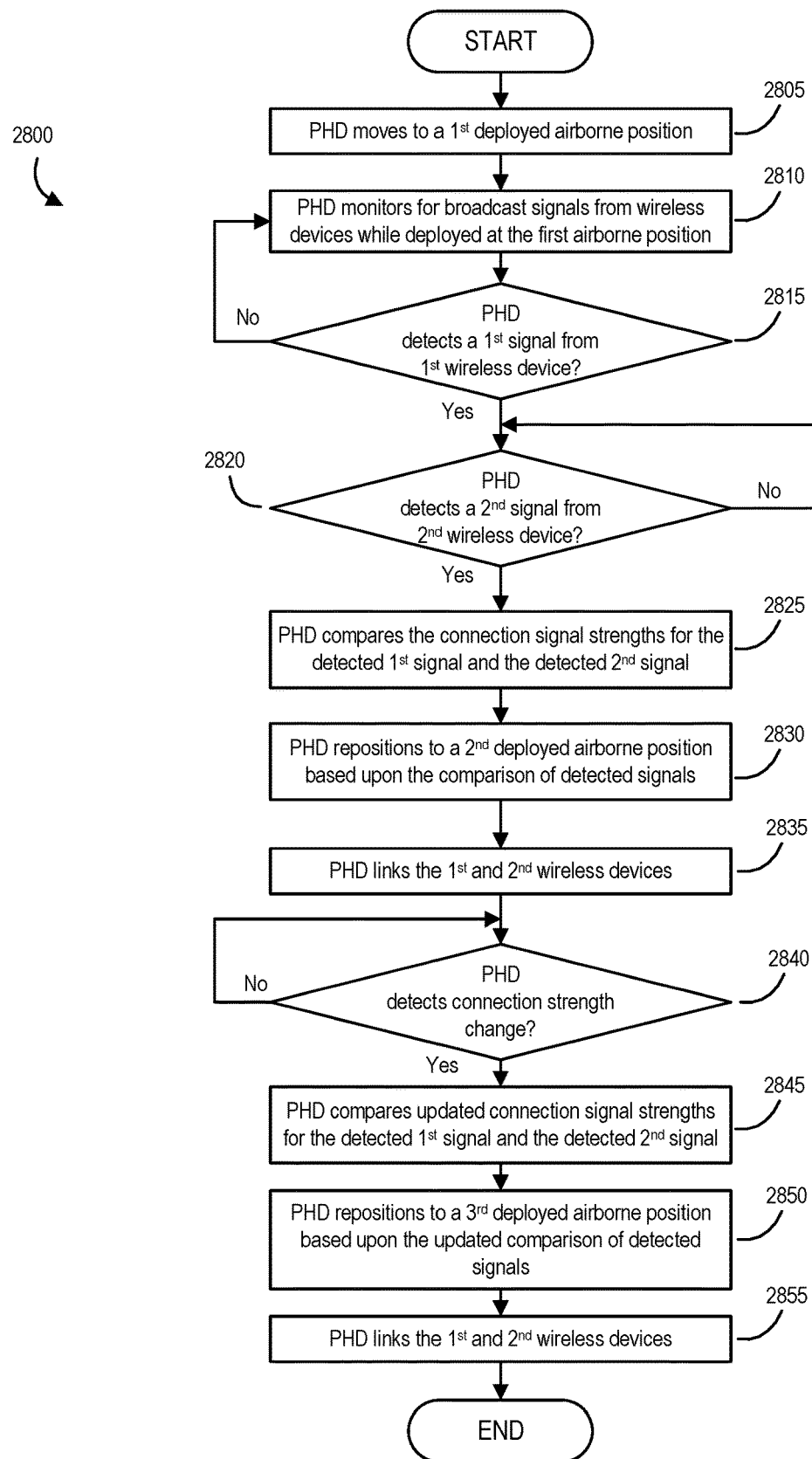
FIG. 28 is a flow diagram illustrating an improved method for enhanced positioning of an airborne relocatable communication hub supporting a plurality of wireless devices and based on connection signal strength in accordance with an embodiment of the invention.

Consistent with the exemplary enhanced aerial communication drone apparatus that supports wireless devices disposed within and near a delivery vehicle and the exemplary enhanced airborne relocatable communication hub system as described above, a further embodiment may take the form of a drone-based method for repositioning the airborne relocatable communication hub drone while providing communication hub services to the wireless devices. In particular, FIG. 28 is a flow diagram illustrating an improved method for enhanced positioning of an airborne relocatable communication hub (e.g., PHD 2125) supporting a group of wireless devices and based on connection signal strength in accordance with an embodiment of the invention. Such wireless devices may, for example, be on a delivery vehicle (e.g., aircraft 100) and include a central communication station on the delivery vehicle (e.g., station 2200 or vehicle transceiver 2135), a broadcast-enabled shipping container (e.g., ULD 2145), a broadcast-enabled network device associated with an item being shipped within the delivery vehicle (e.g., BESI 145d), or a mobile personal communication device (e.g., devices 2300, 2400) operating within or near the delivery vehicle. Another exemplary wireless device that may interact with the airborne relocatable communication drone or PHD may be a broadcast-enabled network device associated with a fixed physical location, such as a wireless access point device disposed at the fixed physical location within a building (e.g., a warehouse, storage hanger, and the like).

Referring now to FIG. 28, exemplary method 2800 begins at step 2805 where the aerial communication drone operating as the airborne relocatable communication hub moves to a first deployed airborne position. The aerial communication drone (such as PHD 2125 shown in FIG. 21) may be exclusively paired to specific delivery vehicle (such as aircraft 100). As such, moving the aerial communication drone may be done by moving to a deployed airborne position within a delivery vehicle as the first position.

At step 2810, method 2800 has the aerial communication drone monitoring for broadcast signals from wireless devices while deployed at the first airborne position. At step 2815, method 2800 proceeds by detecting a first signal broadcast by a first of the wireless devices using a communication hub interface on the aerial communication drone, such as the multi-transceiver communication hub interface 2160 on PHD 2125. When this first signal is detected, step 2815 proceeds to step 2820. Otherwise, step 2815 proceeds back to step 2810 to continue monitoring for such a first detected signal. At step 2820, method 2800 continues by detecting a second signal broadcast by a second of the wireless devices using the communication hub interface on the aerial communication drone. When this second signal is detected, step 2820 proceeds to step 2825. Otherwise, step 2820 remains searching for the second detected signal.

At step 2825, two different signals from two different wireless devices have been detected and method 2800 uses the onboard controller of the aerial communication drone (such as OBC 2100 of PHD 2125) to compare a first connection signal strength for the first signal and a second connection signal strength for the second signal. The connection signal strength may, for example, be an absolute power level as measured by the aerial communication drone's communication interface or an RSSI level indicative of how well the drone is receiving the related signal from the particular wireless device.

At step 2830, method 2800 proceeds with repositioning the aerial communication drone operating as the airborne relocatable communication hub to a second deployed airborne position based upon the comparison of the first connection signal strength and the second connection signal strength. For example, PHD 2125 may compare the different connection signal strengths of the first and second signals as the PHD 2125 is moving. In other words, the PHD may compare such connection signal strengths while moving as a type of feedback, which has the effect of improving a balance between the first and second connection signal strengths as the PHD approaches the second deployed airborne position. Thus, when there is an equal balance of connection signal strengths, the PHD may be considered to have been repositioned at the second deployed airborne position.

At step 2835, method 2800 proceeds with the aerial communication drone linking the first of the wireless devices and the second of the wireless devices using the communication hub interface on the aerial communication drone once repositioned at the second deployed airborne position. Such linking may allow signals of the same or different format to effectively let information flow from the first wireless device to the second wireless device and vice versa by leveraging use of the aerial communication drone as intelligently positioned to improve the reliability and robust nature of such linked information flow from the second deployed airborne position. In one embodiment, the linking in step 2845 has the communication hub interface establishing a peer-to-peer connection between the first and second wireless devices. In another embodiment, the linking in step 2845 has the communication hub interface establishes a wireless access point connection from the first wireless device to the second wireless device In general, steps 2840 through 2855 of an embodiment of method 2800 further account for changes in the connection signal strengths. In more detail, at step 2840, method 2800 proceeds with detecting a change in the first connection signal strength. The detected change in the first connection signal strength may be caused by and correspond to movement of the first of the wireless devices relative to the communication hub interface on the aerial communication drone. For example, as shown in FIG. 24, mobile personal communication device 2400 may be moving within the internal shipment storage 120 of aircraft 100, which may cause PHD 2125 to detect a change (higher or lower) of the connection signal strength of signals received from mobile personal communication device 2400.

At step 2845, method 2800 proceeds to compare an updated value of the first connection signal strength for the first signal and the second connection signal strength for the second signal, and then at step 2850, reposition the aerial communication drone operating as the airborne relocatable communication hub to a third deployed airborne position based upon the comparison of step 2845. Then, at step 2855, method 2800 links the first wireless device and the second wireless device using the communication hub interface on the aerial communication drone once repositioned at the third deployed airborne position.

In some embodiments of method 2800, the aerial communication drone (PHD) may interact with three or more different wireless devices. For example, a further embodiment of method 2800 may have the aerial communication drone detecting a third signal broadcast by a third wireless device using the communication hub interface on the aerial communication drone. As such, the comparing of step 2825 may be implemented as comparing the first connection signal strength, the second connection signal strength, and a third connection signal strength for the third signal. The results of this comparison may then be used as a basis for repositioning the aerial communication drone to another deployed airborne position where the three different connection signal strengths may be within a tolerable range or substantially balanced.

Furthermore, an embodiment of method 2800's steps 2840-2855 may be modified to handle when both wireless devices change signal strength, which may be attributed to movement of the first and second wireless devices (e.g., when they are mobile devices, such as mobile personal communication device devices 2300, 2400). As such and in that modified method, the aerial communication drone may detect a first change in the first connection signal strength, detect a second change in the second connection signal strength, and then compare a first updated value of the first connection signal strength and a second updated value for the second connection signal strength. This comparison of both updated values (given the dynamic situation of where both devices are located or how both devices may be transmitting), may be used to reposition the aerial communication drone operating as the airborne relocatable communication hub to a fourth deployed airborne position. Once repositioned at the fourth deployed airborne position, the aerial communication drone may link the first and second wireless devices using the communication hub interface on the aerial communication drone.

Those skilled in the art will appreciate that method 2800 as disclosed and explained above in various embodiments may be implemented by an apparatus, such as exemplary PHD 2125 as already described above, running an embodiment of communication hub management program code 2150, and as a part of a system including the internal docking station 2130 and PHD 2125 or a system that includes the delivery vehicle 100 and the PHD 2125. Such code 2150 may be stored on a non-transitory computer-readable medium in the PHD, such as memory storage 315 as shown on FIG. 21. Thus, when executing code 2150, the OBC 2100 (or OCP 2110) of PHD 2125 (in cooperation with other circuitry onboard the PHD 2125, such as the multi-transceiver communication hub interface 2160) may be operative to perform certain operations or steps from the exemplary methods disclosed above, including method 2800 and variations of that method.

While the embodiments of method 2800 (and related apparatus and system embodiments) described above involve actively positioning the aerial communication drone based upon detecting and comparing connection signal strengths of different wireless devices, other embodiments of enhanced positioning may reposition or relocate based upon detecting wireless device concentrations. In general, an embodiment may have an aerial communication drone detect different concentrations of wireless devices along an airborne scanning path, and then relocate the drone to the airborne position near the highest concentration of detected wireless devices so that it may be in a position to most effectively serve wireless devices that need to be linked in order to communicate with each other. The drone may periodically resurvey the concentration of detected wireless devices and then update its deployed position near where the updated highest concentration of detected wireless devices are now currently located so to account for movement of wireless devices or changes in what may be shielding such devices.

Figure 29:
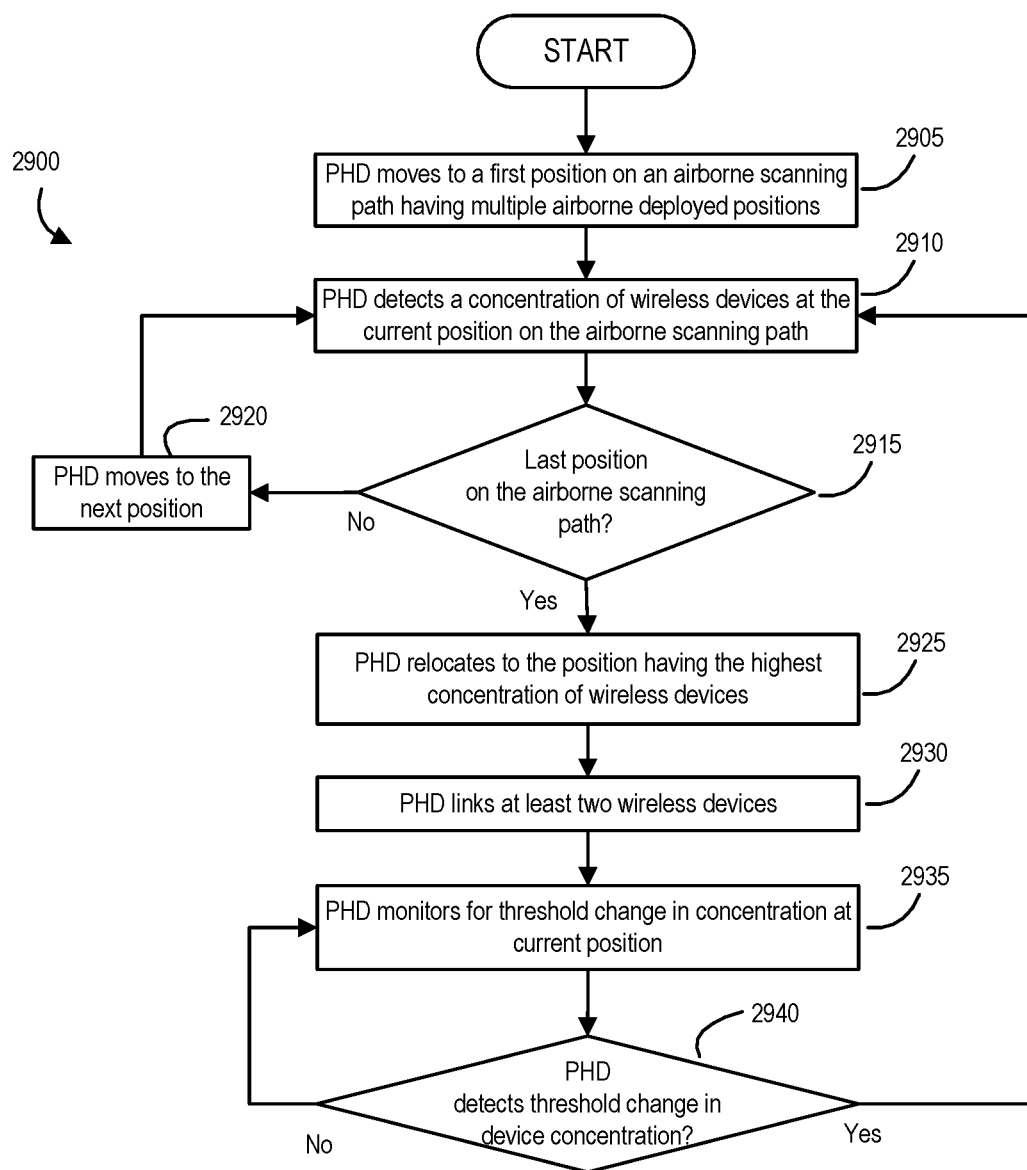
FIG. 29 is a flow diagram illustrating another improved method for enhanced positioning of an airborne relocatable communication hub supporting a plurality of wireless devices and based on device concentration in accordance with an embodiment of the invention.

FIG. 29 is a flow diagram illustrating such an exemplary improved method for enhanced positioning of an airborne relocatable communication hub that supports multiple wireless devices and is based on device concentration in accordance with an embodiment of the invention. As noted above, such exemplary wireless devices may be on a delivery vehicle (e.g., aircraft 100) and include a central communication station on the delivery vehicle (e.g., station 2200 or vehicle transceiver 2135), a broadcast-enabled shipping container (e.g., ULD 2145), a broadcast-enabled network device associated with an item being shipped within the delivery vehicle (e.g., BESI 145*d*), or a mobile personal communication device (e.g., devices 2300, 2400) operating within or near the delivery vehicle. Another exemplary wireless device that may interact with the airborne relocatable communication drone or PHD may be a broadcast-enabled network device associated with a fixed physical location that may be on the delivery vehicle or simply near the delivery vehicle, such as a wireless access point device disposed at the fixed physical location within a building (e.g., a warehouse, storage hanger, and the like).

Referring now to FIG. 29, method 2900 begins at step 2905 where the aerial communication drone operating as the airborne relocatable communication hub (generally referred to as "PHD" in FIG. 29) is moved on an airborne scanning path with multiple airborne deployed positions, which begins with moving to a first position. For example, the PHD may be deployed within a delivery vehicle where the airborne scanning path is one that extends along different airborne positions within the delivery vehicle's shipment storage area. The delivery vehicle (such as aircraft 100 shown in FIG. 24), which may be exclusively paired with the PHD, may house a docking station for the PHD (such as docking station 2130) from which the PHD may initially move as it begins to move to the first position on its airborne scanning path programmed into its flight profile data (such as data 2155 in memory 315 of exemplary PHD 2125).

In general, steps 2910 through 2920 have the PHD using its communication hub interface to detect different concentrations of the wireless devices as the PHD moves to each of the airborne deployed positions on the airborne scanning path. In particular, at step 2910, method 2900 has the PHD detecting a concentration of wireless devices at its current airborne deployed position along the programmed airborne scanning path. The detected concentration represents at least a portion of the wireless devices actively broadcasting within a detection range of the communication hub interface proximate to that specific airborne deployed position. At step 2915, method 2900 determines whether the current position of the PHD on the airborne scanning path is the last position for detecting wireless device concentrations. If so, step 2915 proceeds to step 2925. But if not, step 2915 proceeds to step 2920 where the PHD moves to the next airborne deployed position on the airborne scanning path before moving again to step 2910 to detect concentrations at that next airborne deployed position. In this manner, an embodiment may have the PHD essentially surveying how the wireless devices it may support are located relative to each other, which may then be used for positioning the PHD when providing airborne communication hub services.

At step 2925, method 2900 continues with the PHD relocating to the position on the airborne scanning path that was detected to have a highest concentration of the wireless devices within its detection range. Then, at step 2930, method 2900 has the PHD linking at least two of the wireless devices using the PHD's communication hub interface once repositioned at the airborne deployed position corresponding to the highest concentration of the wireless devices. In more detail, this linking of the wireless devices may establish a peer-to-peer connection between the at least two wireless devices or establish a wireless access point connection from one wireless device to another (e.g., providing access to a higher level in a hierarchical wireless device network).

An embodiment of method 2900 may also respond to the dynamic nature of the wireless devices, which may have the PHD further relocating based on an updated detection of wireless device concentrations. In more detail, method 2900 may continue from step 2930 to step 2935, where the PHD monitors for a threshold change in the previously detected highest of the concentrations of the wireless devices. For example, while PHD may hover at a position within the internal shipment storage 120 of aircraft 100, some of the wireless devices may no longer be broadcasting or additional wireless devices within range of PHD 2125 may begin broadcasting that alters the prior concentration detected back in step 2910. Accordingly, at step 2940, method 2900 proceeds to back to step 2935 if no threshold change was detected, but proceeds back to step 2910 if there was a threshold change in device concentration. This allows the PHD to re-survey the updated wireless device concentrations. In more detail, the PHD's communication hub interface may redetect the different concentrations of the wireless devices at each of the airborne deployed positions on the airborne scanning path; the PHD then is repositioned to the airborne deployed position having a highest of the updated concentrations of the wireless devices; and then the PHD proceeds to link at least two of the wireless devices using its communication hub interface once repositioned at the airborne deployed position corresponding to the highest updated concentration of the wireless devices.

A further embodiment may also perform this type of update response or at least periodically perform such tasks (rather than wait for a threshold change detection) given the PHD may be unable to sense or detect changes in the number of broadcasting wireless devices outside the PHD's immediate detection range. Thus, an embodiment of method 2900 may skip steps 2935 and 2940 and, instead, simply proceed back to step 2910 from step 2930 after some defined period of time (or once the linked wireless devices are no longer communicating through the airborne communication hub services provided by the PHD).

Those skilled in the art will appreciate that method 2900 as disclosed and explained above in various embodiments may be implemented by an apparatus, such as exemplary PHD 2125, running an embodiment of communication hub management program code 2150, and as a part of a system including the internal docking station 2130 and PHD 2125 or a system that includes the delivery vehicle 100 and the PHD 2125. Such code 2150 may be stored on a non-transitory computer-readable medium in the PHD, such as memory storage 315 as shown on FIG. 21. Thus, when executing code 2150, the OBC 2100 (or OCP 2110) of PHD 2125 (in cooperation with other circuitry onboard the PHD 2125, such as the multi-transceiver communication hub interface 2160) may be operative to perform certain operations or steps from the exemplary methods disclosed above, including method 2900 and variations of that method.

While the above described embodiments of method 2900 (and related apparatus and system embodiments) involve actively positioning the aerial communication drone based upon detected concentrations of different wireless devices when moving along an airborne scanning path, another embodiment may strategically position the PHD using a directional antenna deployed as part of the PHD's communication hub interface. In general, an embodiment of the aerial communication drone or PHD may use a communication hub interface having a directional antenna that allows for directional detection of signals broadcast by wireless devices supported by the PHD. For example, the multi-transceiver communication hub interface 2160 of exemplary PHD 2125 may include one or more directional antennas. Such a directional antenna may, for example, be implemented with a beam forming antenna that can electronically steer and change its reception pattern in different directions from a stationary PHD 2125. However, in another example, the directional antenna may have a characteristic reception pattern that is directional in a fixed direction (not omni-directional nor electronically steering/shaping the antenna's reception pattern). Here, the PHD 2125 may physically spin or rotate to steer the directional reception pattern in different directions relative to the location of the PHD 2125. As such, the PHD 2125 is able to survey different concentrations of operating wireless devices in different locations relative to the current deployed airborne position of PHD 2125 without the need to first traverse and move through different positions on an airborne scanning path.

FIG. 30 is a flow diagram illustrating yet another improved method for enhanced positioning of an airborne relocatable communication hub supporting a plurality of wireless devices and based on directional sensing of the wireless devices in accordance with an embodiment of the invention. Again, as noted above, such exemplary wireless devices may be on a delivery vehicle (e.g., aircraft 100) and include a central communication station on the delivery vehicle (e.g., station 2200 or vehicle transceiver 2135), a broadcast-enabled shipping container (e.g., ULD 2145), a broadcast-enabled network device associated with an item being shipped within the delivery vehicle (e.g., BESI 145*d*), or a mobile personal communication device (e.g., devices 2300, 2400) operating within or near the delivery vehicle. Another exemplary wireless device that may interact with the airborne relocatable communication drone or PHD may be a broadcast-enabled network device associated with a fixed physical location that may be on the delivery vehicle or simply near the delivery vehicle, such as a wireless access point device disposed at the fixed physical location within a building (e.g., a warehouse, storage hanger, and the like).

Referring now to FIG. 30, method 3000 begins at step 3005 where the aerial communication drone operating as the airborne relocatable communication hub (generally referred to as "PHD" in FIG. 30) is moved to a first airborne deployed position. For example, the PHD may be deployed within a delivery vehicle's shipment storage area at an initial central airborne position relative to where wireless devices may be located in the shipment storage area. The delivery vehicle (such as aircraft 100 shown in FIG. 24), which may be exclusively paired with the PHD, may house a docking station for the PHD (such as docking station 2130) from which the PHD may initially move as it begins to move to this first airborne deployed position programmed into its flight profile data (such as data 2155 in memory 315 of exemplary PHD 2125). Such a position may be a geographic coordinate or a relative proximity location as detected by the PHD's proximity sensors.

In general, step 3010 has the PHD using the directional antenna of its communication hub interface to detect different concentrations of the wireless devices relative to different directions while at the current airborne deployed position. Each detected concentration is thus a portion of the wireless devices actively broadcasting within a detection range of the communication hub interface proximate to the first airborne deployed position.

For example, PHD 2125 may have a phased array directional antenna as part of its multi-transceiver communication hub interface 2160. Using this phased array directional antenna, the PHD 2125 may perform a focused survey at different directions out from the PHD 2125 looking for a concentration of operating wireless devices (e.g., how many signals are detected from wireless devices operating in that direction from the PHD 2125). To do this, the PHD 2125 may cause the directional antenna of the communication hub interface 2160 to change the reception pattern so as to focus on a particular direction relative to where the PHD 2125 is currently located. In other words, the PHD 2125 may electronically steer the reception pattern of the communication hub interface's phased array directional antenna to focus on different directions relative to the PHD's location. Thus, in this example, PHD 2125 may have the directional antenna focus straight ahead of PHD 2125 to detect a concentration of operating wireless devices at that direction relative to the current airborne deployed position of the PHD 2125. This may be repeated for other directions—such as to the right, left, and behind the PHD 2125. Depending on the steering granularity and ability to tightly focus the reception pattern, another embodiment may do this type of electronic steering of the directional reception pattern at set degrees of a compass, such as at every 15 degrees of the 360 degree view relative to the PHD's location. Thus, such examples allow the PHD to detect wireless device concentrations from different directions without requiring the PHD to rotate in place.

Another embodiment implementing step 3010 may use a fixed directional antenna as part of the PHD's communication hub interface. Here, the PHD may rotate its airborne hovering position on a vertical axis so as to alter where the fixed directional antenna is aimed as part of detecting wireless device concentrations from different directions. Thus, the PHD in this embodiment physically moves rather than causing the reception pattern to electronically change.

At step 3015, method 3000 continues with the PHD relocating to a second airborne deployed position based upon a highest of the concentrations of the wireless devices. In particular, the second airborne deployed position to which the PHD is relocated is in the direction corresponding to the highest detected concentration of the wireless devices. In other words, the PHD relocates to this second position in the direction of the highest wireless device concentration. Then, at step 3020, method 3000 has the PHD linking at least two of the wireless devices using the PHD's communication hub interface once the PHD has been relocated to this second position. In more detail, this linking of the wireless devices may establish a peer-to-peer connection between the at least two wireless devices or establish a wireless access point connection from one wireless device to another (e.g., providing access to a higher level in a hierarchical wireless device network).

An embodiment of method 3000 may further include steps, such as steps 3025-3035, that have the PHD reassessing or resurveying the current concentrations of active wireless devices and repositioning based on that updated concentration information. This may be done after a set time at the second position or be based upon monitored activity that indicates a threshold change in actively broadcasting wireless devices at the second position. In more detail, method 3000 moves to step 3025 where the directional antenna coupled to the communication hub interface on the PHD detects updated concentrations of the wireless devices while the PHD is located at the second deployed position. The mechanism and process for detecting updated concentrations is similar to that explained above relative to step 3010. Each of these updated concentrations corresponds to active and operating wireless devices in a particular direction from the second deployed airborne position.

At step 3030, method 3000 relocates the PHD to a third airborne deployed position based upon the highest updated concentrations of the wireless devices. Generally, this third airborne deployed position is located in a direction corresponding to the highest detected updated concentrations of the wireless devices.

In a further embodiment, this type of relocation to the third position may be accomplished when the PHD moves from the second airborne deployed position along the direction corresponding to the highest detected updated concentrations of the wireless devices while monitoring for operating wireless devices by the directional antenna coupled to the communication hub interface. Thereafter, this type of sensory focused manner of intelligent airborne relocation then may have the PHD hovering (or transitioning to a hover) at the third airborne position when the PHD has moved at least a predetermined distance from the second airborne position and monitoring for operating wireless devices indicates at least one of the actively operating wireless devices has a received connection strength above a threshold level. Similarly, the PHD may finish relocating by hovering (or transitioning to a hover) at the third airborne position once the PHD has moved along the direction corresponding to the highest detected updated concentrations of the wireless devices and then detected a threshold number of operating wireless devices. At that point, the PHD may stop on its transit out from the second position and along that direction, so as to situate itself in an intelligent manner that compensates for changes in the operating environment of wireless devices.

Thereafter, at step 3035, method 3000 concludes with the PHD linking at least two of the wireless devices using the PHD's communication hub interface once the PHD has been relocated to this third position. Those skilled in the art will appreciate that the PHD may repeatedly go through such a concentration assessment via direction antenna operations and updating of where to relocate based on the latest assessment in order to actively adapt to a changing environment of operating wireless devices.

Those skilled in the art will also appreciate that method 3000 as disclosed and explained above in various embodiments may be implemented by an apparatus, such as exemplary PHD 2125, running an embodiment of communication hub management program code 2150, and as a part of a system including the internal docking station 2130 and PHD 2125 or a system that includes the delivery vehicle 100 and the PHD 2125. Such code 2150 may be stored on a non-transitory computer-readable medium in the PHD, such as memory storage 315 as shown on FIG. 21. Thus, when executing code 2150, the OBC 2100 (or OCP 2110) of PHD 2125 (in cooperation with other circuitry onboard the PHD 2125, such as the multi-transceiver communication hub interface 2160 and its directional antenna) may be operative to perform certain operations or steps from the exemplary methods disclosed above, including method 3000 and variations of that method.

In summary, it should be emphasized that the sequence of operations to perform any of the methods and variations of the methods described in the embodiments herein are merely exemplary, and that a variety of sequences of operations may be followed while still being true and in accordance with the principles of the present invention as understood by one skilled in the art.

At least some portions of exemplary embodiments outlined above may be used in association with portions of other exemplary embodiments to enhance and improve logistics using an aerial monitor, inspection or communication drone to enhance monitoring of shipped items in a delivery vehicle, perform various types of inspections of the delivery vehicle, and providing a drone-based airborne relocatable communication hub within a delivery vehicle. As noted above, the exemplary embodiments disclosed herein may be used independently from one another and/or in combination with one another and may have applications to devices and methods not disclosed herein. However, those skilled in the art will appreciate that the exemplary monitor/inspection/communication drone as deployed with a delivery vehicle, systems using such an apparatus, and methods of how such an apparatus may operate as part of a logistics operation as described above provide enhancements and improvements to technology used in logistics and shipment operations, such as loading, unloading, and in-flight monitoring of a delivery vehicle.

Those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention, as recited in the claims below, is intended to cover modifications and variations.

What is claimed:

1. An airborne drone-based system that adaptively provides communication hub services within a delivery vehicle for a plurality of broadcast-enabled devices maintained within the delivery vehicle, comprising:
    an internal docking station fixed within the delivery vehicle, the internal docking station further comprising a physical docking interface, an electronic charging connection interface, and an electronic data connection interface; and
    an aerial communication drone paired to the delivery vehicle, the aerial communication drone further comprising:
        a main housing,
        an onboard controller disposed within the main housing,
        a plurality of lifting engines coupled with respective lifting rotors, each of the lifting engines being fixed to a different portion of the main housing and responsive to flight control input generated by the onboard controller as part of maintaining a desired flight profile,
        a drone capture interface responsive to the onboard controller and disposed on the main housing, the drone capture interface being operative to selectively mate to the physical docking interface of the internal docking station in response to a docking command from the onboard controller, wherein the drone capture interface holds the aerial communication drone in a secure position when selectively mated to the physical docking interface of the internal docking station,
        a communication hub interface comprising a multi-transceiver and coupled to the onboard controller, the communication hub interface being operative to establish a plurality of wireless data communication paths to at least two of the broadcast-enabled devices within the delivery vehicle by using the multi-transceiver for the communication paths to the at least two broadcast-enabled devices, and
        an onboard battery providing electrical power to each of the onboard controller, the lifting engines, the drone capture interface, and the communication hub interface, wherein the onboard battery connecting to the electronic charging connection interface when the aerial communication drone is in the secure position on the internal docking station; and
    wherein the onboard controller of the aerial communication drone is operative to:
        transition from at least a low power state to an active power state,
        cause the drone capture interface to automatically uncouple the aerial communication drone from the secure position on the internal docking station fixed within the delivery vehicle once the aerial communication drone transitions to the active power state,
        change the desired flight profile to cause the lifting engines to move the aerial communication drone from the secure position on the internal docking station to a first deployed airborne position within an interior of the delivery vehicle,
        cause the communication hub interface to establish a first wireless data communication path to a first of the broadcast-enabled devices within the delivery vehicle,
        cause the communication hub interface to establish a second wireless data communication path to a second of the broadcast-enabled devices within the delivery vehicle, and
        cause the multi-transceiver of the communication hub interface on the aerial communication drone to couple the first wireless data communication path and the second wireless data communication path for at least the first of the broadcast-enabled devices and the second of the broadcast-enabled devices so as to allow the first of the broadcast-enabled devices to connect and communicate with the second of the broadcast-enabled devices.

2. The system of claim 1, wherein at least one of the first of the broadcast-enabled devices and the second of the broadcast-enabled devices comprises a central communication station on the delivery vehicle.

3. The system of claim 1, wherein at least one of the first of the broadcast-enabled devices and the second of the broadcast-enabled devices comprises a broadcast-enabled shipping container maintained within the delivery vehicle.

4. The system of claim 3, wherein the broadcast-enabled shipping container comprises a unit load device (ULD) container coupled with a radio transceiver.

5. The system of claim 1, wherein at least one of the first of the broadcast-enabled devices and the second of the broadcast-enabled devices comprises a broadcast-enabled network device associated with an item being shipped within the delivery vehicle.

6. The system of claim 1, wherein at least one of the first of the broadcast-enabled devices and the second of the broadcast-enabled devices comprises a mobile personal communication device.

7. The system of claim 1, wherein the first of the broadcast-enabled devices and the second of the broadcast-enabled devices are geographically separated and incapable of direct communication with each other without the first wireless data communication path and the second wireless data communication path established by the aerial communication drone.

8. The system of claim 1, wherein the first of the broadcast-enabled devices and the second of the broadcast-enabled devices are logically disposed at a same network level of a hierarchically structured communication network.

9. The system of claim 8, wherein the first of the broadcast-enabled devices and the second of the broadcast-enabled devices are coupled by the aerial communication drone in a peer-to-peer relationship at the same network level of the hierarchically structured communication network.

10. The system of claim 1, wherein the first of the broadcast-enabled devices and the second of the broadcast-enabled devices are logically disposed at different network levels of a hierarchically structured communication network.

11. The system of claim 10, wherein the first of the broadcast-enabled devices is disposed at a first network level of the hierarchically structured communication network while the second of the broadcast-enabled devices is disposed at a second network level of the hierarchically structured communication network, wherein the first network level is disposed lower in the hierarchically structured communication network than the second network level.

12. The system of claim 11, wherein the first of the broadcast-enabled devices and the second of the broadcast-enabled devices are coupled by the aerial communication drone operating as a wireless access point for the first of the broadcast-enabled devices.

13. The system of claim 1, wherein the onboard controller is further operative to:
change the desired flight profile to cause the lifting engines to move the aerial communication drone from the first deployed airborne position within the interior of the delivery vehicle to a second deployed airborne position;
cause the communication hub interface to establish a third wireless data communication path to a third of the broadcast-enabled devices within the delivery vehicle while at the second deployed airborne position; and
cause the communication hub interface to couple the first wireless data communication path and the third wireless data communication path for at least the first of the broadcast-enabled devices and the third of the broadcast-enabled devices so as to adaptively facilitate wireless communications between the first of the broadcast-enabled devices, the second of the broadcast-enabled devices, and the third of the broadcast-enabled devices.

14. The system of claim 13, wherein the second deployed airborne position comprises one of a plurality of airborne positions on an airborne communication path flown by the aerial communication drone within the interior of the delivery vehicle.

15. The system of claim 1, wherein the onboard controller is further operative to:
change the desired flight profile to cause the lifting engines to move the aerial communication drone from the first deployed airborne position within the interior of the delivery vehicle to a second deployed airborne position;
while at the second deployed airborne position, cause the communication hub interface to establish a third wireless data communication path to a third of the broadcast-enabled devices within the delivery vehicle;
while at the second deployed airborne position, cause the communication hub interface to establish a fourth wireless data communication path to a fourth of the broadcast-enabled devices within the delivery vehicle; and
cause the communication hub interface to couple the third wireless data communication path and the fourth wireless data communication path for at least the third of the broadcast-enabled devices and the fourth of the broadcast-enabled devices so as to adaptively facilitate wireless communications between the first of the broadcast-enabled devices, the second of the broadcast-enabled devices, the third of the broadcast-enabled devices, and the fourth of the broadcast-enabled devices.

16. The system of claim 1, wherein the communication hub interface is further operative to collect data generated on the first of the broadcast-enabled devices and retransmit the collected data to the second of the broadcast-enabled devices.

17. The system of claim 16, wherein the data generated on the first of the broadcast-enabled devices comprises at least one of scan data generated by a scanner on the first of the broadcast-enabled devices, sensor data generated by one or more sensors on the first of the broadcast-enabled devices, and shared data generated in a memory on the first of the broadcast-enabled devices representing information provided to the first of the broadcast-enabled devices by a third of the broadcast-enabled devices.

18. The system of claim 1, wherein the delivery vehicle comprises an aircraft.

19. The system of claim 1, wherein the delivery vehicle comprises a trailer capable of being moved by a truck.

20. The system of claim 1, wherein the delivery vehicle comprises a train car capable of being moved on a railway system.

21. The system of claim 1, wherein the delivery vehicle comprises a marine vessel.

22. The system of claim 1, wherein the delivery vehicle is in motion as (a) the aerial communication drone moves from the secured position to the first deployed airborne position and (b) the communication hub interface on the aerial communication drone establishes first wireless data communication path and the second wireless data communication path.

23. The system of claim 1 further comprising:
a base controller for the aerial communication drone, the base controller being fixed to the delivery vehicle and operative to provide a flight command to the onboard controller on the aerial communication drone; and
a tether linking the base controller and the aerial communication drone.

24. The system of claim 23, wherein the tether provides an electrical conduit for at least one of data and power related to the aerial communication drone.

25. The system of claim 24, wherein the base controller provides the flight command to the aerial communication drone as data over the tether.

26. The system of claim 23, wherein the tether further providing a fiber optic conduit for movement of at least an image type of sensor-based inspection information from the aerial communication drone to the base controller.

27. The system of claim 23, wherein the onboard controller of the aerial communication drone is further operative to generate landing control input for the lifting engines if the aerial communication drone detects that the tether is broken, the landing control input generated in response to the detecting that the tether is broken causes a return of the aerial communication drone to the internal docking station and securing of the drone capture interface to the physical docking interface of the internal docking station.

28. The system of claim 23, wherein the aerial communication drone further comprises a control receiver coupled to the onboard controller, the control receiver having an input connected to the tether, the control receiver being operative to receive the flight command from the base controller on the input and pass the received flight command to the onboard controller; and wherein the onboard controller is further operative to generate the flight control input for the lifting engines based upon the received flight command.

29. The system of claim 1, wherein the aerial communication drone further comprises a restrictive tether connected to the aerial communication drone and to the delivery vehicle, the restrictive tether limiting movement of the aerial communication drone.

30. The system of claim 1, wherein the onboard controller is further operative to generate the flight control input autonomously to enable the aerial communication drone to self-control aerial movements of the aerial communication drone from the secured position on the internal docking station to at least the first deployed airborne position.

31. The system of claim 1, wherein the first wireless data communication path and the second wireless data communication path are established using a common communication protocol.

32. The system of claim 31, wherein the common communication protocol consists of one from the group comprising a cellular communication protocol, a Bluetooth communication protocol, a Wi-Fi communication protocol, and a Zigbee communication protocol.

33. The system of claim 1, wherein the first wireless data communication path uses a first wireless communication protocol and the second wireless data communication path uses a second wireless communication protocol different from the first wireless communication protocol.

\* \* \* \* \*